US008216649B2

(12) United States Patent
Akiike et al.

(10) Patent No.: US 8,216,649 B2
(45) Date of Patent: Jul. 10, 2012

(54) LIQUID CRYSTAL ALIGNING AGENT, METHOD OF PRODUCING A LIQUID CRYSTAL ALIGNMENT FILM AND LIQUID CRYSTAL DISPLAY DEVICE

(75) Inventors: Toshiyuki Akiike, Tokyo (JP); Tsutomu Kumagai, Tokyo (JP); Shoichi Nakata, Tokyo (JP); Kenichi Sumiya, Tokyo (JP); Eiji Hayashi, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 12/674,479

(22) PCT Filed: Aug. 20, 2008

(86) PCT No.: PCT/JP2008/005228

§ 371 (c)(1), (2), (4) Date: Sep. 28, 2010

(87) PCT Pub. No.: WO2009/025385

PCT Pub. Date: Feb. 26, 2009

(65) Prior Publication Data

US 2011/0068301 A1 Mar. 24, 2011

(30) Foreign Application Priority Data

| | | |
|---|---|---|
| Aug. 21, 2007 | (JP) | 2007-215144 |
| Oct. 19, 2007 | (JP) | 2007-272289 |
| Oct. 24, 2007 | (JP) | 2007-276189 |
| Nov. 13, 2007 | (JP) | 2007-294227 |
| Nov. 15, 2007 | (JP) | 2007-296479 |
| Nov. 27, 2007 | (JP) | 2007-305525 |
| Dec. 26, 2007 | (JP) | 2007-334243 |
| Jan. 30, 2008 | (JP) | 2008-019346 |

(51) Int. Cl.
*C09K 19/00* (2006.01)
*C09K 19/06* (2006.01)
*C09K 19/52* (2006.01)

(52) U.S. Cl. ........... 428/1.1; 428/1.2; 428/1.23; 430/20; 252/299.01; 252/299.6; 349/123

(58) Field of Classification Search ................... 428/1.1, 428/1.2, 1.23; 349/123; 252/299.01, 299.6; 430/20

See application file for complete search history.

(56) References Cited

U.S. PATENT DOCUMENTS

| | | | | |
|---|---|---|---|---|
| 4,469,409 | A | 9/1984 | Nakano et al. | |
| 5,766,673 | A | 6/1998 | Nogami et al. | |
| 5,824,377 | A | 10/1998 | Pirwitz et al. | |
| 5,998,563 | A * | 12/1999 | Pirwitz et al. | 528/26 |
| 6,831,148 | B2 | 12/2004 | Buchecker et al. | |
| 2004/0209008 | A1 | 10/2004 | Liang et al. | |
| 2005/0134775 | A1 | 6/2005 | Chung et al. | |
| 2011/0043739 | A1* | 2/2011 | Sumiya et al. | 349/123 |

FOREIGN PATENT DOCUMENTS

| | | |
|---|---|---|
| JP | 63-291922 | 11/1988 |
| JP | 5-107544 | 4/1993 |
| JP | 6-222366 | 8/1994 |
| JP | 6-281937 | 10/1994 |
| JP | 9-197411 | 7/1997 |
| JP | 9-278890 | 10/1997 |
| JP | 9-281502 | 10/1997 |
| JP | 11-181127 | 7/1999 |
| JP | 2003-49069 | 2/2003 |
| JP | 2003-107486 | 4/2003 |
| JP | 2003-149648 | 5/2003 |
| JP | 2003-520878 | 7/2003 |
| JP | 2006-519414 | 8/2006 |

OTHER PUBLICATIONS

U.S. Appl. No. 12/674,057, filed Feb. 18, 2010, Akiike, et al.
U.S. Appl. No. 12/674,537, filed Feb. 22, 2010, Akiike, et al.
Ronald H. Baney, et al., "Silsesquioxanes", Chemical Reviews, vol. 95, 1995, pp. 1409-1430. Cecil L. Frye, et al., "The Oligomeric Silsesquioxanes, $(HSiO_{3/2})_n$", Journal of the American Chemical Society, vol. 92, No. 19, Sep. 23, 1970, pp. 5586-5588.
Fumio Nakano, et al., "Simple Method of Determining Liquid Crystal Tilt-Bias Angle", Japanese Journal of Applied Physics, vol. 19, No. 10, 1980, pp. 2013-2014.
Jia Liu, et al., "Novel Photoalignment Materials for Liquid Crystals Based on Modified Polysiloxane", Japanese Journal of Applied Physics, vol. 39, No. 3A, Mar. 2000, pp. 1221-1224.
U.S. Appl. No. 12/865,535, filed Jul. 30, 2010, Sumiya, et al.
Extended European Search Report issued Mar. 28, 2011, in Patent Application No. 08792754.7.

* cited by examiner

*Primary Examiner* — Geraldina Visconti
(74) *Attorney, Agent, or Firm* — Oblon, Spivak, McClelland, Maier & Neustadt, L.L.P.

(57) ABSTRACT

The present invention relates to a liquid crystal aligning agent which contains a reaction product of at least one selected from the group consisting of a polysiloxane having a structure represented by the following formula (S-1), a hydrolysate thereof and a condensate of the hydrolysate and a compound represented by the following formula (1):

(S-1)

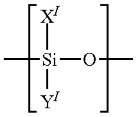

(1)

R—Z ($Y^I$ in the formula (S-1) is a hydroxyl group, an alkoxyl group having 1 to 10 carbon atoms, an alkyl group having 1 to 6 carbon atoms or an aryl group having 6 to 10 carbon atoms, R in the formula (1) is a group having an alkyl group with 4 to 20 carbon atoms, a fluoroalkyl group with 1 to 20 carbon atoms or a cyclohexyl group, or a group having 17 to 51 carbon atoms and a steroid skeleton, and $X^I$ in the formula (S-1) and Z in the formula (1) are reacted with each other to form a bond group for bonding the silicon atom in the formula (S-1) to R in the formula (1)).

20 Claims, No Drawings

LIQUID CRYSTAL ALIGNING AGENT, METHOD OF PRODUCING A LIQUID CRYSTAL ALIGNMENT FILM AND LIQUID CRYSTAL DISPLAY DEVICE

CROSS REFERENCE TO RELATED APPLICATION

This application is a 371 of PCT/JP08/065,228, filed on Aug. 20, 2008, and claims priority to the following Japanese Patent Applications: 2007-215144, filed on Aug. 21, 2007; 2007-272289, filed on Oct. 19, 2007; 2007-276189, filed on Oct. 24, 2007; 2007-294227, filed on Nov. 13, 2007; 2007-296479, filed on Nov. 15, 2007; 2007-305525, filed on Nov. 27, 2007; 2007-334243, filed on Dec. 26, 2007; and 2008-019346, filed on Jan. 30, 2008.

TECHNICAL FIELD

The present invention relates to a liquid crystal aligning agent, a method of producing a liquid crystal alignment film and a liquid crystal display device.

BACKGROUND ART

As a liquid crystal display device, there is currently known a TN liquid crystal display device having a so-called TN (Twisted Nematic) liquid crystal cell which is obtained by forming a liquid crystal alignment film from an organic resin on the surface of a substrate having a transparent conductive film to produce a liquid crystal display device substrate, opposing two of the liquid crystal display device substrates to each other, forming a nematic liquid crystal layer having positive dielectric anisotropy in the gap between the two substrates to fabricate a sandwich-structured cell and twisting the long axis of each liquid crystal molecule at 90° continuously from one substrate to the other. Further, an STN (Super Twisted Nematic) liquid crystal display device which can achieve a higher contrast ratio than that of the TN liquid crystal display device, an IPS (In-Plane Switching) liquid crystal display device which has little dependence upon the view angle and a VA (Vertical Alignment) liquid crystal display device which has negative dielectric anisotropy have been developed.

The operation principles of these liquid crystal display devices are roughly divided into a transmission type and a reflection type. The transmission type liquid crystal display device displays, making use of a change in the intensity of light from a backlight source transmitted from the rear of the device at the time of driving the device. The reflection type liquid crystal display device displays, making use of a change in the intensity of reflected light from the outside such as sunlight at the time of driving the device without using a backlight source. Therefore, it is considered that this reflection type liquid crystal display device is especially advantageous when it is used outdoors as its consumption power is smaller than that of the transmission type liquid crystal display device.

In the transmission type liquid crystal display device, a liquid crystal alignment film provided in the device is exposed to light from the backlight source for a long time. Especially in the application of the transmission type liquid crystal display device in liquid crystal projectors which are in growing demand as a home theater in addition to its business application, a light source having very high irradiation intensity such as a metal halide lamp is used. It is also considered that the temperature of the liquid crystal display device itself rises at the time of driving due to the application of light having high intensity.

It is fairly possible that the reflection type liquid crystal display device is used outdoors. In this case, sunlight including strong ultraviolet radiation is a light source. The distance of light passing through the reflection type liquid crystal display device is longer than that of the transmission type liquid crystal display device theoretically.

Further, there is a trend toward the use of both the transmission type liquid crystal display device and the reflection type liquid crystal display device in private vehicles, and the use and installation environment of these display devices at a high temperature are becoming realistic as compared with the conventional use and installation environment of a liquid crystal display device.

In the production process of the liquid crystal display device, a liquid crystal dropping process, that is, ODF (One Drop Fill) process has begun to be used to shorten the process and improve the yield. In the ODF process, unlike the prior art process in which liquid crystals are injected into an empty liquid crystal cell assembled by using a thermosetting sealing agent, an ultraviolet curable sealing agent is applied to a required position of one substrate on which a liquid crystal alignment film has been formed, liquid crystals are dropped on required positions, the other substrate is joined to the above substrate, and ultraviolet radiation is applied to the entire surface of the obtained assembly to cure the sealing agent so as to fabricate a liquid crystal cell. The ultraviolet radiation to be applied at this point is strong with several Joule or more per $cm^2$. That is, in the production process of the liquid crystal display device, the liquid crystal alignment film is exposed to this strong ultraviolet radiation together with the liquid crystals.

Thus, the liquid crystal display device is exposed to a harsh environment which has been inconceivable in the prior art, such as the application of high-intensity light, a high-temperature environment and long-term drive as it is more functional and used for more purposes and its production process is improved more. Even under the above environment, higher electric properties such as liquid crystal alignability and voltage holding ratio and higher display properties than those of the prior art are required, and further longer service life is required for the liquid crystal display device.

As the material of the liquid crystal alignment film constituting the liquid crystal display device, there have been known organic resins such as polyimides, polyamic acids, polyamides and polyesters. Especially polyimides have been used in many liquid crystal display devices because they have excellent physical properties such as heat resistance, affinity for liquid crystals and mechanical strength (refer to JP-A 9-197411, JP-A 2003-149648 and JP-A 2003-107486).

However, new requirements are becoming stronger for the liquid crystal display devices of these days due to the above harsh production environment and use environment, whereby heat resistance and light resistance which can be achieved by the conventionally accepted organic resins are still unsatisfactory.

Then, a liquid crystal alignment film having excellent heat resistance and light resistance is now under study. For example, JP-A 9-281502 discloses a homeotropic alignment type liquid crystal alignment film which is formed from a polysiloxane solution obtained from a silicon compound having 4 alkoxyl groups and a silicon compound having 3 alkoxyl groups and teaches that the film is excellent in homeotropic alignability, heat resistance and homogeneity and that the coating solution has high stability. However, as the liquid crystal alignment film formed by this technology does not satisfy the requirements from the current harsh production environment and use environment and the storage stability of the coating solution is unsatisfactory, it has a problem with convenience when it is industrially used.

Further, demand for the development of a liquid crystal aligning agent which does not cause an after image problem as a liquid crystal display device, that is, a liquid crystal aligning agent having excellent electric properties is still strong.

A liquid crystal aligning agent which can provide a liquid crystal alignment film having sufficiently high heat resistance and light resistance even in the current very harsh production environment and use environment, has excellent storage stability and shows excellent electric properties when a liquid crystal display device is obtained therefrom is not known yet.

DISCLOSURE OF THE INVENTION

It is an object of the present invention which has been made under the above situation to provide a liquid crystal aligning agent which has high storage stability, and can provide a liquid crystal alignment film having excellent liquid crystal alignability, high heat resistance, high light resistance and excellent electric properties as its voltage holding ratio rarely lowers even when it is exposed to high-intensity light in a high-temperature environment.

It is another object of the present invention to provide a method of forming a liquid crystal alignment film having the above excellent properties by using the liquid crystal aligning agent of the present invention.

It is still another object of the present invention to provide a liquid crystal display device having excellent heat resistance, light resistance and electric properties.

Other objects and advantages of the present invention will become apparent from the following description.

According to the present invention, firstly, the above objects and advantages of the present invention are attained by a liquid crystal aligning agent which contains a reaction product of at least one selected from the group consisting of a polysiloxane having a structure represented by the following formula (S-1), a hydrolysate thereof and a condensate of the hydrolysate and a compound represented by the following formula (1):

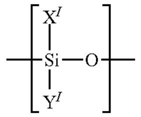
(S-1)

R—Z (1)

($Y^I$ in the formula (S-1) is a hydroxyl group, an alkoxyl group having 1 to 10 carbon atoms, an alkyl group having 1 to 6 carbon atoms or an aryl group having 6 to 10 carbon atoms, R in the formula (1) is a group having an alkyl group with 4 to 20 carbon atoms, a fluoroalkyl group with 1 to 20 carbon atoms or a cyclohexyl group, or a group having 17 to 51 carbon atoms and a steroid skeleton, and $X^I$ in the formula (S-1) and Z in the formula (1) are reacted with each other to form a bond group for bonding the silicon atom in the formula (S-1) to R in the formula (1)).

Preferably, R in the above formula (S-0) further has a structure represented by the following formula (2):

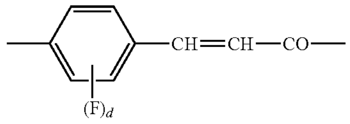
(2)

(in the above formula (2), d is an integer of 0 to 4).

Secondly, the above objects and advantages of the present invention are attained by a method of forming a liquid crystal alignment film, comprising the step of applying a liquid crystal aligning agent in which the compound represented by the above formula (1) is a preferred group as described above to a substrate to form a coating film and applying radiation to the coating film.

Thirdly, the above objects and advantages of the present invention are attained by a liquid crystal display device comprising a liquid crystal alignment film formed from the above liquid crystal aligning agent.

BEST MODE FOR CARRYING OUT THE INVENTION

The liquid crystal aligning agent of the present invention contains a reaction product (to be referred to as "liquid crystal aligning polyorganosiloxane" hereinafter) of at least one (to be referred to as "reactive polyorganosiloxane" hereinafter) selected from the group consisting of a polyorganosiloxane having a recurring unit represented by the above formula (S-1), a hydrolysate thereof and a condensate of the hydrolysate and a compound represented by the following formula (1) (to be referred to as "compound R—Z" hereinafter).

<Reactive Polyorganosiloxane>

$X^I$ in the reactive polyorganosiloxane in the present invention is a group which reacts with Z of the compound R—Z to become a bond group for bonding the silicon atom in the above formula (S-1) to R in the formula (1).

Examples of $X^I$ include monovalent groups having an oxiranyl group, oxetanyl group, vinyl group, (meth) acryloyloxyl group or mercapto group and hydrogen atom. Examples of the monovalent group having an oxiranyl group include groups represented by the following formulas ($X^I$-1) and ($X^I$-2); examples of the monovalent group having an oxetanyl group include a group represented by the following formula ($X^I$-3); examples of the monovalent group having a vinyl group include a group represented by the following formula ($X^I$-6); examples of the group having a (meth)acryloyloxyl group include groups represented by the following formulas ($X^I$-4) and ($X^I$-5); and examples of the monovalent group having a mercapto group include a group represented by the following formula ($X^I$-7).

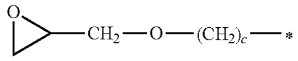
($X^I$-1)

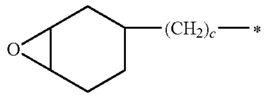
($X^I$-2)

-continued (X$^I$-3)

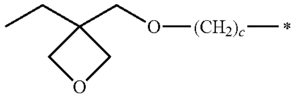

(X$^I$-4)

$CH_2{=}CH{-}COO{-}(CH_2)_c{-}*$ (X$^I$-5)

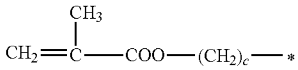

(X$^I$-6)

$CH_2{=}CH{-}*$ (X$^I$-7)

$HS{-}(CH_2)_c{-}*$ (in the above formulas, c is an integer of 1 to 10, and "*" means that the bond marked with this is bonded to a silicon atom.)

In the above formula (S-1), examples of the hydroxyl group and the alkoxyl group having 1 to 10 carbon atoms represented by $Y^I$ include methoxyl group and ethoxyl group; examples of the alkyl group having 1 to 6 carbon atoms include methyl group, ethyl group, n-propyl group, n-butyl group, n-pentyl group and n-hexyl group; and examples of the aryl group having 6 to 10 carbon atoms include phenyl group. $Y^I$ is preferably a hydroxyl group or alkoxyl group having 1 to 10 carbon atoms. In this case, it is more preferred that the group $Y^I$ having a plurality of structures (S-1) should have at least one structure selected from the group consisting of a ladder-like structure and a basket-like structure through hydrolysis/condensation.

The reactive polyorganosiloxane in the present invention has a weight average molecular weight in terms of polystyrene measured by gel permeation chromatography (GPC) of preferably 500 to 100,000, more preferably 1,000 to 10,000, much more preferably 1,000 to 5,000.

The above reactive polyorganosiloxane can be synthesized by hydrolyzing or hydrolyzing/condensing a silane compound represented by the following formula (S-1-1) or a mixture of the silane compound represented by the following formula (S-1-1) and another silane compound in the presence of an alkali metal compound or an organic base, preferably in the presence of a suitable organic solvent and water, when $X^I$ is a group other than hydrogen atom.

(S-1-1)

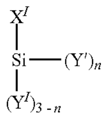

(In the formula (S-1-1), $X^I$ and $Y^I$ are as defined in the above formula (S-1), Y' is an alkoxyl group having 1 to 10 carbon atoms or halogen atom, and n is an integer of 1 to 3.)

Examples of the silane compound of the above formula (S-1-1) in which $X^I$ is a monovalent group having an oxiranyl group include 3-glycidoxypropyl trimethoxysilane, 3-glycidoxypropyl triethoxysilane, 3-glycidoxypropylmethyl dimethoxysilane, 3-glycidoxypropylmethyl diethoxysilane, 3-glycidoxypropyldimethyl methoxysilane, 3-glycidoxypropyldimethyl ethoxysilane, 2,(3,4-epoxycyclohexyl)ethyl trimethoxysilane and 2-(3,4-epoxycyclohexyl)ethyl triethoxysilane. Out of these, 3-glycidoxypropyl trimethoxysilane or 2-(3,4-epoxycyclohexyl)ethyl trimethoxysilane is preferred.

A compound represented by the following formula is given as an example in which $X^I$ is a monovalent group having an oxetanyl group.

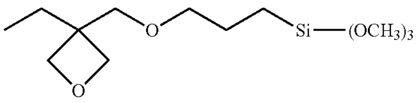

in which $X^I$ is a monovalent group having a (meth) acryloyloxyl group include 3-acryloxypropyl trimethoxysilane, 3-methacryloxypropyl trimethoxysilane, 3-acryloxypropyl triethoxysilane and 3-methacryloxypropyl triethoxysilane. Out of these, 3-acryloxypropyl trimethoxysilane is preferred.

Examples of the silane compound of the formula (S-1-1) in which $X^I$ is a monovalent group having a vinyl group include vinyl trimethoxysilane, vinyl triethoxysilane, vinyl trichlorosilane, (methyl)(vinyl)dichlorosilane, (methyl)(vinyl) dimethoxysilane, (methyl)(vinyl)diethoxysilane, divinyl dichlorosilane, divinyl dimethoxysilane, divinyl diethoxysilane, allyl trichlorosilane, allyl trimethoxysilane, allyl triethoxysilane, allyl tri-n-propoxysilane, allyl tri-i-propoxysilane, allyl tri-n-butoxysilane and allyl tri-sec-butoxysilane. Out of these, vinyl trimethoxysilane is preferred.

Examples of the silane compound of the formula (S-1-1) in which $X^I$ is a monovalent group having a mercapto group include 3-mercaptopropyl trichlorosilane, 3-mercaptopropyl trimethoxysilane, 3-mercaptopropyl triethoxysilane, mercaptomethyl trimethoxysilane, mercaptomethyl triethoxysilane, (methyl) (3-mercaptopropyl)dimethoxysilane and (methyl)(3-mercaptopropyl)diethoxysilane. Out of these, 3-mercaptopropyl trimethoxysilane or mercaptomethyl trimethoxysilane is preferred.

Examples of the another silane compound include silane compounds having one silicon atom such as tetrachlorosilane, tetramethoxysilane, tetraethoxysilane, tetra-n-propoxysilane, tetra-i-propoxysilane, tetra-n-butoxysilane, tetra-sec-butoxysilane, trichlorosilane, trimethoxysilane, triethoxysilane, tri-n-propoxysilane, tri-i-propoxysilane, tri-n-butoxysilane, tri-sec-butoxysilane, fluorotrichlorosilane, fluorotrimethoxysilane, fluorotriethoxysilane, fluorotri-n-propoxysilane, fluorotri-i-propoxysilane, fluorotri-n-butoxysilane, fluorotri-sec-butoxysilane, methyl trichlorosilane, methyl trimethoxysilane, methyl triethoxysilane, methyl tri-n-propoxysilane, methyl tri-i-propoxysilane, methyl tri-n-butoxysilane, methyl tri-sec-butoxysilane, 2-(trifluoromethyl)ethyl trichlorosilane, 2-(trifluoromethyl)ethyl trimethoxysilane, 2-(trifluoromethyl)ethyl triethoxysilane, 2-(trifluoromethyl)ethyl tri-n-propoxysilane, 2-(trifluoromethyl)ethyl tri-i-propoxysilane, 2-(trifluoromethyl)ethyl tri-n-butoxysilane, 2-(trifluoromethyl)ethyl tri-sec-butoxysilane, 2-(perfluoro-n-hexyl)ethyl trichlorosilane, 2-(perfluoro-n-hexyl)ethyl trimethoxysilane, 2-(perfluoro-n-hexyl)ethyl triethoxysilane, 2-(perfluoro-n-hexyl)ethyl tri-n-propoxysilane, 2-(perfluoro-n-hexyl)ethyl tri-i-propoxysilane, 2-(perfluoro-n-hexyl)ethyl tri-n-butoxysilane, 2-(perfluoro-n-hexyl)ethyl tri-sec-butoxysilane, 2-(perfluoro-n-octyl)ethyl trichlorosilane, 2-(perfluoro-n-octyl) ethyl trimethoxysilane, 2-(perfluoro-n-octyl)ethyl triethoxysilane, 2-(perfluoro-n-octyl)ethyl tri-n-propoxysilane, 2-(perfluoro-n-octyl)ethyl tri-i-propoxysilane, 2-(perfluoro-n-octyl)ethyl tri-n-butoxysilane, 2-(perfluoro-n-octyl)ethyl tri-sec-butoxysilane, hydroxymethyl trichlorosilane, hydroxymethyl trimethoxysilane, hydroxyethyl trimethoxysilane, hydroxymethyl tri-n-propoxysilane, hydroxymethyl tri-i-propoxysilane, hydroxymethyl tri-n-butoxysilane, hydroxymethyl tri-sec-butoxysilane, phenyl trichlorosilane, phenyl trimethoxysilane, phenyl triethoxysilane, phenyl tri-n-propoxysilane, phenyl tri-i-propoxysilane, phenyl tri-n-butoxysilane, phenyl tri-sec-butoxysilane, methyl dichlorosilane, methyl dimethoxysilane, methyl diethoxysilane, methyl di-n-propoxysilane, methyl di-i-propoxysilane, methyl di-n-butoxysilane, methyl di-sec-butoxysilane, dimethyl dichlorosilane, dimethyl dimethoxysilane, dimethyl diethoxysilane, dimethyl di-n-propoxysilane, dimethyl di-i-propoxysilane, dimethyl di-n-butoxysilane, dimethyl di-sec-butoxysilane, (methyl)[2-(perfluoro-n-octyl)ethyl]dichlorosilane, (methyl)[2-(perfluoro-n-octyl)ethyl]dimethoxysilane, (methyl)[2-(perfluoro-n-octyl)ethyl]diethoxysilane, (methyl)[2-(perfluoro-n-octyl)ethyl]di-n-propoxysilane, (methyl)[2-(perfluoro-n-octyl)ethyl]di-i-propoxysilane, (methyl)[2-(perfluoro-n-octyl)ethyl]di-n-butoxysilane, (methyl)[2-(perfluoro-n-octyl)ethyl]di-sec-butoxysilane, (methyl)(3-mercaptopropyl)dichlorosilane, diphenyl dichlorosilane, diphenyl dimethoxysilane, diphenyl diethoxysilane, diphenyl di-n-propoxysilane, diphenyl di-i-propoxysilane, diphenyl di-n-butoxysilane, diphenyl di-sec-butoxysilane, chlorodimethylsilane, methoxydimethylsilane, ethoxydimethysilane, chlorotrimethylsilane, bromotrimethylsilane, iodotrimethylsilane, methoxytrimethylsilane, ethoxytrimethylsilane, n-propoxytrimethylsilane, i-propoxytrimethylsilane, n-butoxytrimethylsilane, sec-butoxytrimethylsilane, t-butoxytrimethylsilane, (chloro)(vinyl)dimethylsilane, (methoxy)(vinyl)dimethylsilane, (ethoxy)(vinyl)dimethylsilane, (chloro)(methyl)diphenylsilane, (methoxy)(methyl)diphenylsilane and (ethoxy)(methyl)diphenylsilane; and partial condensates under the trade names of KC-89, KC-89S, X-21-3153, X-21-5841, X-21-5842, X-21-5843, X-21-5844, X-21-5845, X-21-5846, X-21-5847, X-21-5848, X-22-160AS, X-22-170B, X-22-170BX, X-22-170D, X-22-170DX, X-22-176B, X-22-176D, X-22-176DX, X-22-176F, X-40-2308, X-40-2651, X-40-2655A, X-40-2671, X-40-2672, X-40-9220, X-40-9225, X-40-9227, X-40-9246, X-40-9247, X-40-9250, X-40-9323, X-41-1053, X-41-1056, X-41-1805, X-41-1810, KF6001, KF6002, KF6003, KR212, KR-213, KR-217, KR220L, KR242A, KR271, KR282, KR300, KR311, KR401N, KR500, KR510, KR5206, KR5230, KR5235, KR9218 and KR9706 (of Shin-Etsu Chemical Co., Ltd.); Glass Resin (of Showa Denko K.K.); SH804, SH805, SH806A, SH840, SR2400, SR2402, SR2405, SR2406, SR2410, SR2411, SR2416 and SR2420 (of Dow Corning Toray Co., Ltd.); FZ3711 and FZ3722 (of Nippon Unicar Co., Ltd.); DMS-S12, DMS-S15, DMS-S21, DMS-S27, DMS-S31, DMS-S32, DMS-S33, DMS-S35, DMS-S38, DMS-542, DMS-S45, DMS-551, DMS-227, PSD-0332, PDS-1615, PDS-9931 and XMS-5025 (of Chisso Corporation); Methyl Silicate MS51 and Methyl Silicate MS56 (of Mitsubishi Chemical Corporation); Ethyl Silicate 28, Ethyl Silicate 40 and Ethyl Silicate 48 (of Colcoat Co., Ltd.); and GR100, GR650, GR908 and GR950 (of Showa Denko K.K.).

Out of these silane compounds, tetramethoxysilane, tetraethoxysilane, methyl trimethoxysilane, methyl triethoxysilane, phenyl trimethoxysilane, phenyl triethoxysilane, dimethyl dimethoxysilane or dimethyl diethoxysilane is preferred.

When a silane compound represented by the above formula (S-1-1) and another silane compound are used in combination to synthesize the reactive polyorganosiloxane, the amount of the silane compound represented by the above formula (S-1-1) is preferably not less than 5 mol %, more preferably not less than 20 mol % of the total of the silane compound represented by the above formula (S-1-1) and the another silane compound.

An organic solvent which can be used to synthesize the reactive polyorganosiloxane is selected from a hydrocarbon, ketone, ester, ether and alcohol.

Examples of the above hydrocarbon include toluene and xylene; examples of the above ketone include methyl ethyl ketone, methyl isobutyl ketone, methyl n-amyl ketone, diethyl ketone and cyclohexanone; examples of the above ester include ethyl acetate, n-butyl acetate, i-amyl acetate, propylene glycol monomethyl ether acetate, 3-methoxybutyl acetate and ethyl lactate; examples of the above ether include ethylene glycol dimethyl ether, ethylene glycol diethyl ether, tetrahydrofuran and dioxane; and examples of the above alcohol include 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether and propylene glycol mono-n-propyl ether. Out of these, water-insoluble organic solvents are preferred. These organic solvents may be used alone or in combination of two or more.

The amount of the organic solvent is preferably 10 to 10,000 parts by weight, more preferably 50 to 1,000 parts by weight based on 100 parts by weight of the total of all the silane compounds.

The amount of water used to produce the reactive polyorganosiloxane is preferably 0.01 to 100 times, more preferably 1 to 30 times the total molar amount of all the silane compounds.

The above alkali metal compound or the above organic base serves as a catalyst in the hydrolysis or hydrolysis/condensation reaction of the silane compounds.

Examples of the above alkali metal compound include sodium hydroxide, potassium hydroxide, sodium methoxide, potassium methoxide, sodium ethoxide and potassium ethoxide.

Examples of the above organic base include primary and secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; and quaternary organic amines such as tetramethylammonium hydroxide. Out of these organic bases, tertiary organic amines such as triethylamine, tri-n-propylamine, tri-n-butylamine, pyridine and 4-dimethylaminopyridine; and quaternary organic amines such as tetramethylammonium hydroxide are preferred.

The amount of the catalyst used to produce a reactive polyorganosiloxane in which $X^I$ is not a hydrogen atom differs according to the type of the catalyst and reaction conditions such as temperature and should be suitably set. When an alkali metal compound is used as the catalyst, its amount is preferably 0.01 to 3 times, more preferably 0.05 to 1 time the total molar amount of all the silane compounds. When an organic base is used as the catalyst, its amount is preferably 0.01 to 3 times, more preferably 0.05 to 1 time the total molar amount of all the silane compounds.

An alkali metal compound or an organic base is preferably used as the catalyst used to produce a reactive polyorganosiloxane in which $X^I$ is not a hydrogen atom. The liquid crystal aligning agent which contains a reaction product of the reactive polyorganosiloxane synthesized by using an alkali metal compound or an organic base as the catalyst and the compound R—Z is advantageous because it has excellent storage stability. The reason for this is assumed to be that when an alkali metal compound or an organic base is used as a catalyst in the hydrolysis/condensation reaction, a random structure, ladder-like structure or basket-like structure is formed, thereby obtaining a polyorganosiloxane having a low content of a silanol group, as described in Chemical Reviews, vol. 95, p. 1409 (1995). That is, since the polyorganosiloxane has a low content of the silanol group, a condensation reaction between silanol groups is suppressed and further when the liquid crystal aligning agent of the present invention contains another polymer as will be described hereinafter, a condensation reaction between the silanol group and the another polymer is suppressed with the result that excellent storage stability is obtained. When $X^I$ is a monovalent group having an oxiranyl group, the polyorganosiloxane of interest can be obtained at a high hydrolysis/condensation rate without causing a side reaction such as the ring opening of the oxiranyl group by using an alkali metal compound or an organic base as a catalyst.

At the time of the hydrolysis/condensation reaction, heating is desirably carried out at preferably 130° C. or lower, more preferably 40 to 100° C. for preferably 0.5 to 12 hours, more preferably 1 to 8 hours. During heating, a mixed solution may be stirred or refluxed.

When a catalyst is used in the hydrolysis/condensation reaction, after the catalyst is removed after the end of the reaction, the polyorganosiloxane is preferably reacted with the compound R—Z. The catalyst can be removed by washing the reaction solution or substituting the solvent. The reaction solution is preferably washed in water containing a small amount of a salt, for example, an aqueous solution containing about 0.2 wt % of ammonium nitrate because the washing operation is easy. Washing is carried out until the water layer after washing becomes neutral and then the organic solvent layer is dried with a suitable drying agent such as anhydrous calcium sulfate or molecular sieve to remove the solvent, thereby making it possible to obtain the reactive polyorganosiloxane of interest. As the substitution solvent when the catalyst is removed by the substitution of the solvent may be used the same organic solvent as that used for the synthesis of the reactive polyorganosiloxane.

Commercially available products of the reactive polyorganosiloxane may be used in the present invention. Commercially available products having an oxiranyl group include DMS-E01, DMS-E12, DMS-E21 and EMS-32 (of Chisso Corporation), commercially available products having an oxetanyl group include OX-SZ (of Toagosei Co., Ltd.), and commercially available products having a (meth)acryl group include AC-SQ and MC-SQ (of Toagosei Co., Ltd.).

The reactive polyorganosiloxane of the above formula (S-1) in which $X^I$ is a hydrogen atom is generally obtained by condensing trichlorosilane in concentrated sulfuric acid to obtain a basket-like silsesquioxane. This reaction can be carried out by the method described in Journal of American Chemical Society, Vol. 92, No. 19, p. 5586 (1970).

Alternatively, a commercially available product may be used as the reactive polyorganosiloxane in which $X^I$ is a hydrogen atom. Commercially available products of the reactive polyorganosiloxane include "octakis(hydridosilsesquioxane)" which is the trade name of TAL MATERIALS Inc.

<Compound R—Z>

The compound R—Z in the present invention is a compound represented by the above formula (1). Examples of the alkyl group in the group having an alkyl group with 4 to 20 carbon atoms represented by R in the above formula (1) include n-butyl group, n-pentyl group, n-hexyl group, n-octyl group, n-nonyl group, n-decyl group, n-lauryl group, n-dodecyl group, n-tridecyl group, n-tetradecyl group, n-pentadecyl group, n-hexadecyl group, n-heptadecyl group, n-stearyl group and n-eicosyl group.

Examples of the alkyl group in the group having a fluoroalkyl group with 1 to 20 carbon atoms represented by R include 4,4,4-trifluorobutyl group, 4,4,5,5,5-pentafluoropentyl group and 3,3,4,4,5,5,5-heptafluoropentyl group.

The group having 17 to 51 carbon atoms and a steroid skeleton represented by R is preferably a group having 17 to 30 carbon atoms. Examples of the group include cholestan-3-yl group, cholesta-5-ene-3-yl group, cholesta-24-ene-3-yl group, cholesta-5,24-diene-3-yl group and lanostan-3-yl group.

When R in the above formula (1) has a structure represented by the following formula (2) in addition to the alkyl group having 4 to 20 carbon atoms, fluoroalkyl group having 1 to 20 carbon atoms or cyclohexyl group, or steroid skeleton, a liquid crystal aligning agent containing a liquid crystal aligning polyorganosiloxane obtained from this can provide a liquid crystal alignment film by the photo-alignment method.

(2)

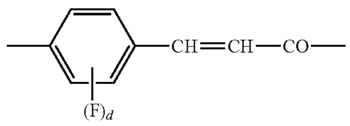

(In the formula (2), d is an integer of 0 to 4.) In the above formula (2), d is preferably 0 or 1, more preferably 0.

Z in the above formula (1) is a group which reacts with $X^I$ in the formula (S-1) to become a bond group for bonding the silicon atom in the formula (S-1) to R in the formula (1). Examples of Z include —COOH, —OH,

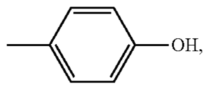

—C≡CH

—SH, —NCO, —NHR' (R' is a hydrogen atom, alkyl group having 1 to 6 carbon atoms or aryl group having 6 to 30 carbon atoms), $—CH{=}CH_2$, (meth)acryloyloxyl group and $—SO_2Cl$.

When R has a structure represented by the above formula (2) in addition to the alkyl group having 4 to 20 carbon atoms, fluoroalkyl group having 1 to 20 carbon atoms or steroid skeleton, compounds represented by the following formulas (A-1) to (A-8) are preferred.

(A-1)

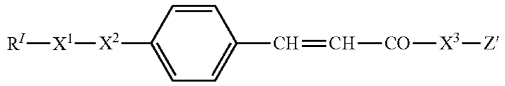

(In the formula (A-1), $R^I$ is an alkyl group having 4 to 20 carbon atoms, fluoroalkyl group having 1 to 20 carbon atoms, cyclohexyl group, alkylcyclohexyl group having an alkyl group with 1 to 20 carbon atoms or fluoroalkylcyclohexyl group having a fluoroalkyl group with 1 to 20 carbon atoms, or group having 17 to 51 carbon atoms and a steroid skeleton, $X^1$ is a single bond, oxygen atom, sulfur atom, 1,4-phenylene group, 1,4-cyclohexylene group, —COO—, —NHCO—, —CONH— or —CO—, $X^2$ is a single bond or a group represented by any one of the following formulas ($X^2$-1) to ($X^2$-6):

($X^2$-1)

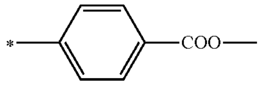

($X^2$-2)

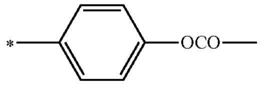

($X^2$-3)

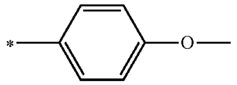

($X^2$-4)

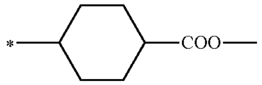

($X^2$-5)

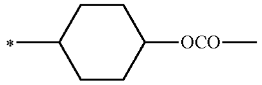

($X^2$-6)

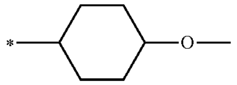

(in the above formulas, "*" means that a bond marked with this is on the $X^1$ side), $X^3$ is a single bond, phenylene group, *-O—$(CH_2)_a$—, *—O—$(CH_2)_a$—CO—,

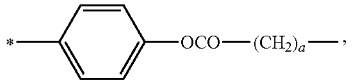

or *-$(CH_2)_a$—OCO—$(CH_2)_a$— (a's are each independently an integer of 1 to 6, and "*" means that a bond marked with this is on the —CH═CH—CO— side), and Z' is —COOH, —OH,

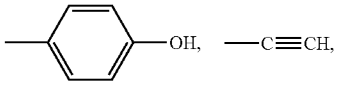

—SH, —NCO, —NHR' (R' is a hydrogen atom, alkyl group having 1 to 6 carbon atoms or aryl group having 6 to 30 carbon atoms), —CH═$CH_2$ or —$SO_2Cl$, with the proviso that when two adjacent bonds are single bonds, they are collectively regarded as one single bond.)

(A-2)

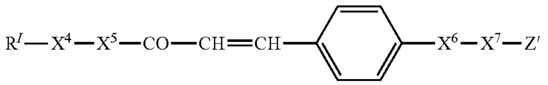

(In the formula (A-2), $R^I$ and Z' are the same as $R^I$ and Z' in the above formula (A-1), $X^4$ is a single bond, oxygen atom, sulfur atom, —COO—, —OCO—, —NHCO—, —CONH— or —CO—, $X^5$ is a single bond or phenylene group, $X^6$ is a single bond or group represented by the following formula ($X^6$-1):

($X^6$-1)

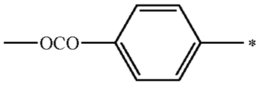

(in the formula ($X^6$-1), "*" means that a bond marked with this is on the $X^7$ side), and $X^7$ is *-CO—, *-OCO—$(CH_2)_a$—, *-OCO—$(CH_2)_a$—CO—, *—O—$(CH_2)_a$— or

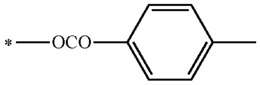

(a is an integer of 1 to 6, and "*" means that a bond marked with this is on the $X^6$ side)

with the proviso that when two adjacent bonds are single bonds, they are collectively regarded as one single bond.)

(A-3)

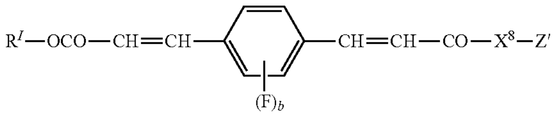

(In the formula (A-3), $R^I$ and Z' are the same as $R^I$ and Z' in the above formula (A-1), $X^8$ is a single bond or *-O—$(CH_2)_a$— (a is an integer of 1 to 6, and "*" means that a bond marked with this is on the —CH═CH—CO— side), and b is an integer of 0 to 4.)

(A-4)

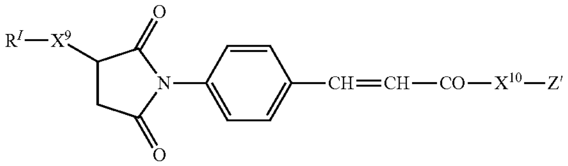

(A-5)

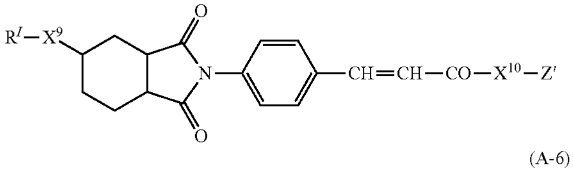

(A-6)

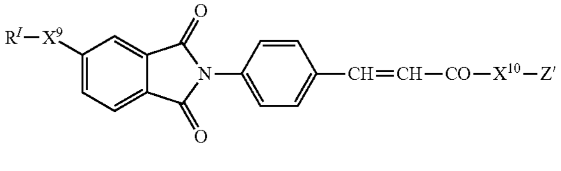

(In the above formulas (A-4) to (A-6), $R^I$ and Z' are the same as $R^I$ and Z' in the above formula (A-1), $X^9$ is a single bond, oxygen atom, sulfur atom, —COO—, —COO—, —NHCO—, —CONH— or —CO—, and $X^{10}$ is a single bond, oxygen atom, sulfur atom or —$(CH_2)_a$—* (a is an integer of 1 to 6, and "*" means that a bond marked with this is on the Z' side.))

(A-7)

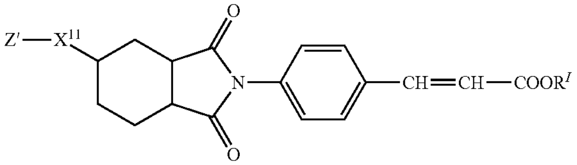

(A-8)

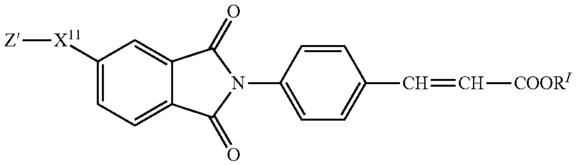

(In the above formulas (A-7) and (A-8), $R^I$ and Z' are the same as $R^I$ and Z' in the above formula (A-1), and $X^{11}$ is a single bond, *-$(CH_2)_a$—COO—, —COO—$(CH_2)_a$— or *-O—$(CH_2)_a$—O— (a is an integer of 1 to 6, and "*" means that a bond marked with this is on the Z' side.))

In the above formulas (A-1) to (A-8), a combination of substituents which can form a O—O— bond or an α,β-diketo structure is not accepted.

The alkyl group having 4 to 20 carbon atoms represented by $R^I$ in the above formulas is preferably a linear alkyl group such as n-butyl group, n-pentyl group, n-hexyl group, n-octyl group, n-decyl group, n-dodecyl group, n-hexadecyl group, n-octadecyl group or n-eicosyl group.

Examples of the fluoroalkyl group having 1 to 20 carbon atoms include trifluoromethyl group, perfluoroethyl group, 3,3,3-trifluoropropyl group, 4,4,4-trifluorobutyl group, 4,4,5,5,5-pentafluoropentyl group and 4,4,5,5,6,6,6-heptafluorohexyl group.

The monovalent organic group having a steroid skeleton represented by $R^I$ preferably has 17 to 30 carbon atoms. Examples of $R^I$ having a steroid skeleton include cholestan-3-yl group, cholesta-5-ene-3-yl group, cholesta-24-ene-3-yl group, cholesta-5,24-diene-3-yl group and lanostan-3-yl group.

When Z is —COOH, preferred examples of the compound R—Z include compounds represented by the following formulas (A-1-C1) to (A-1-C15) as the compound represented by the above formula (A-1); compounds represented by the following formulas (A-2-C1) to (A-2-C5) as the compound represented by the above formula (A-2); compounds represented by the following formulas (A-3-C1) and (A-3-C2) as the compound represented by the above formula (A-3); compounds represented by the following formulas (A-4-C1) to (A-4-C3) as the compound represented by the above formula (A-4); a compound represented by the following formula (A-5-C1) as the compound represented by the above formula (A-5); compounds represented by the following formulas (A-6-C1) and (A-6-C2) as the compound represented by the above formula (A-6); a compound represented by the following formula (A-7-C1) as the compound represented by the above formula (A-7); and compounds represented by the following formulas (A-8-C1) and (A-8-C2) as the compound represented by the above formula (A-8).

(A-1-C1)

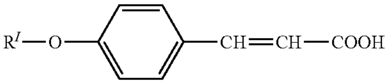

(A-1-C2)

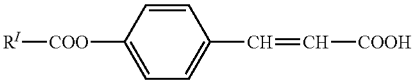

(A-1-C3)

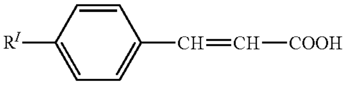

(A-1-C4)

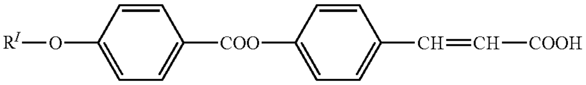

(A-1-C5)

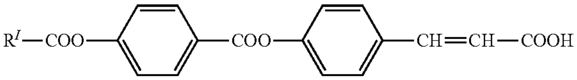

(A-1-C6)

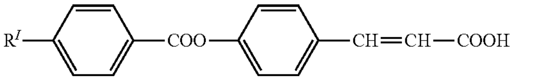

(A-1-C7)

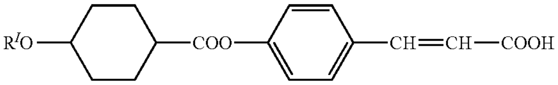

(A-1-C8)

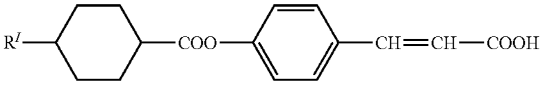

(A-1-C9)

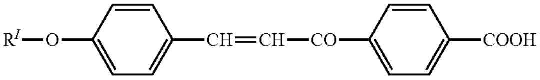

(A-1-C10)

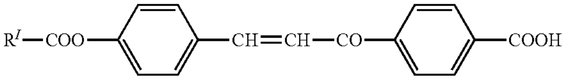

(A-1-C11)

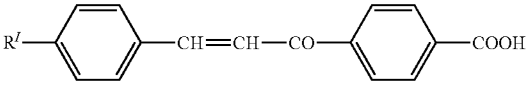

(A-1-C12)

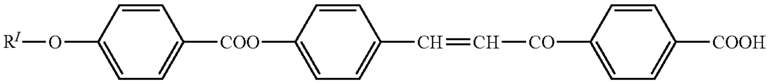

-continued
(A-1-C13)
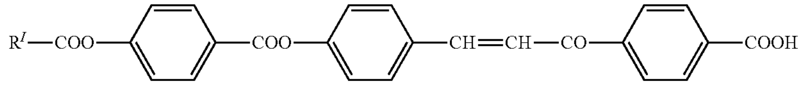
(A-1-C14)
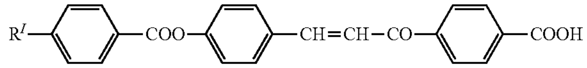
(A-1-C15)
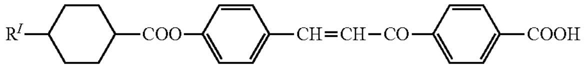
(A-2-C1)
(A-2-C2)
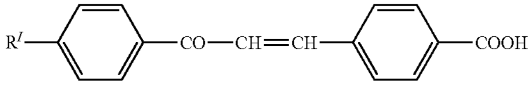
(A-2-C3)
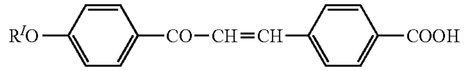
(A-2-C4)
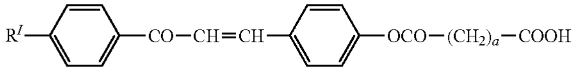
(A-2-C5)
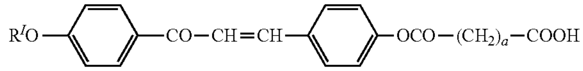
(A-3-C1)
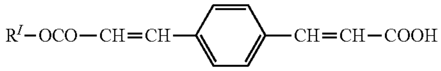
(A-3-C2)
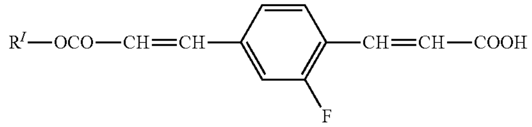
(A-4-C1)
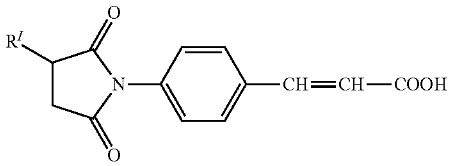
(A-4-C2)
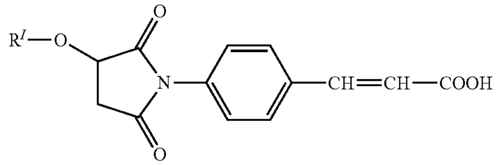
(A-4-C3
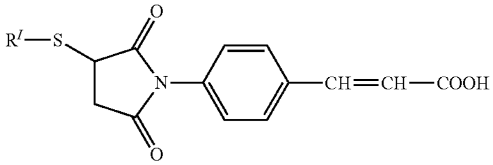
(A-5-C1)
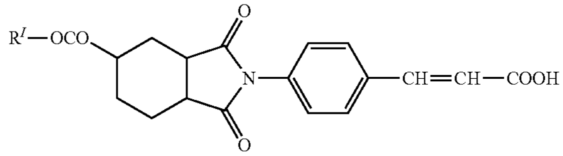
(A-6-C1)
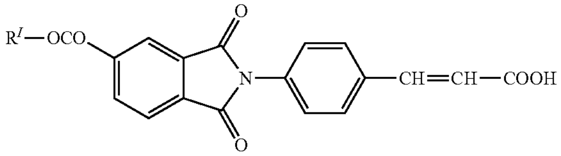
(A-6-C2)
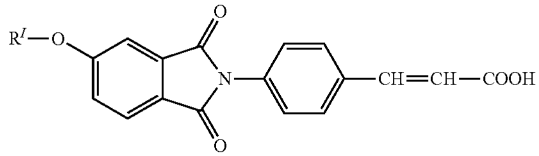
(A-7-C1)
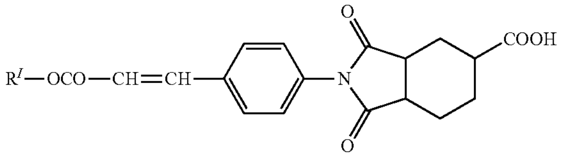
(A-8-C1)
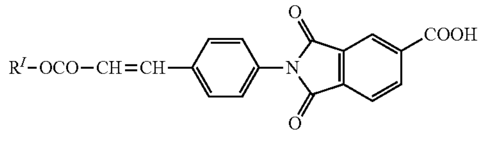
(A-8-C2)
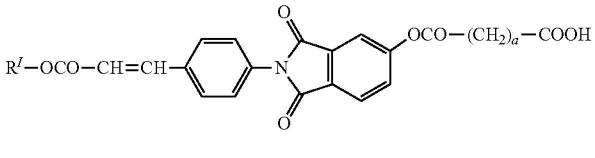

(In the above formulas, $R^I$ is as defined in the above formulas (A-1) to (A-8), and a is an integer of 1 to 10.)

When Z is —OH or

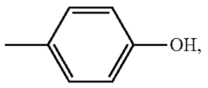

further preferred examples of the compound R—Z include compounds represented by the following formulas (A-1-O1) to (A-1-O7) as the compound represented by the above formula (A-1); compounds represented by the following formulas (A-2-O1) to (A-2-O3) as the compound represented by the above formula (A-2); and a compound represented by the following formula (A-8-O1) as the compound represented by the above formula (A-8).

(A-1-O1)

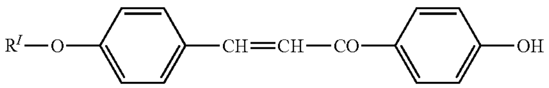

(A-1-O2)

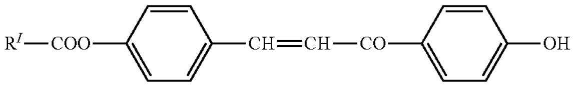

(A-1-O3)

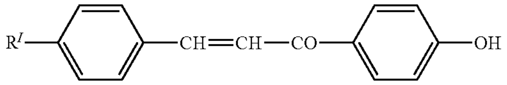

(A-1-O4)

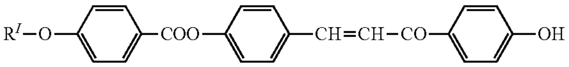

(A-1-O5)

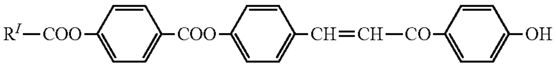

(A-1-O6)

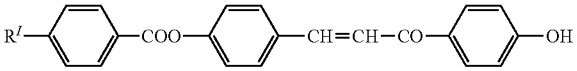

-continued (A-1-O7)

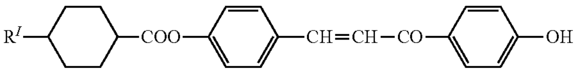

(A-2-O1)

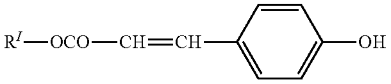

(A-2-O2)

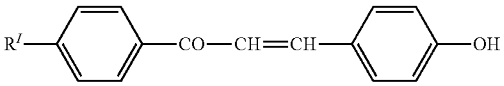

(A-2-O3)

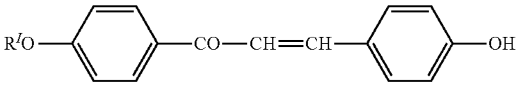

(A-8-O1)

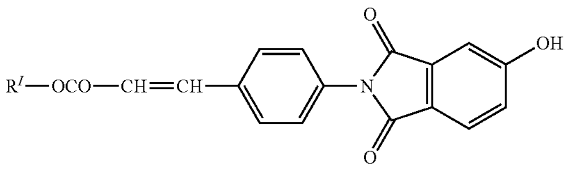

(In the above formulas, $R^I$ is as defined in the above formulas (A-1), (A-2) and (A-8).)

When Z is $—CH{=}CH_2$, still preferred examples of the compound R—Z include compounds represented by the following formulas (A-1-P1) to (A-1-P15) as the compound represented by the above formula (A-1); compounds represented by the following formulas (A-2-P1) to (A-2-P3) as the compound represented by the above formula (A-2); compounds represented by the following formulas (A-3-P1) and (A-3-P2) as the compound represented by the above formula (A-3); compounds represented by the following formulas (A-4-P1) to (A-4-P3) as the compound represented by the above formula (A-4); a compound represented by the following formulas (A-5-P1) as the compound represented by the above formula (A-5); compounds represented by the following formulas (A-6-P1) and (A-6-P2) as the compound represented by the above formula (A-6); a compound represented by the following formula (A-7-P1) as the compound represented by the above formula (A-7); and compounds represented by the following formulas (A-8-P1) and (A-8-P2) as the compound represented by the above formula (A-8).

(A-1-P1)

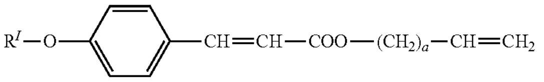

(A-1-P2)

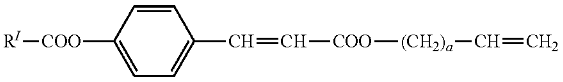

(A-1-P3)

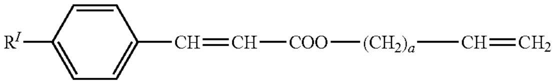

(A-1-P4)

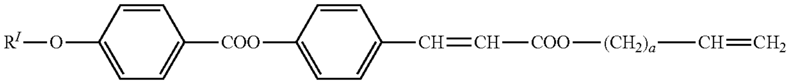

(A-1-P5)

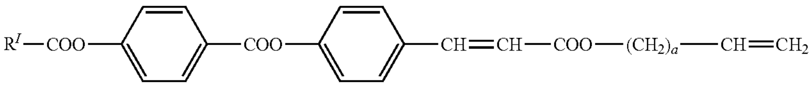

-continued
(A-1-P6)
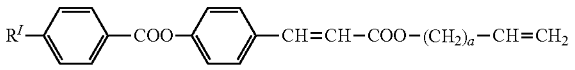
(A-1-P7)
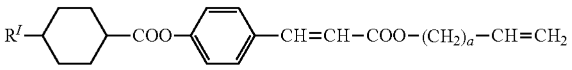
(A-1-P8)
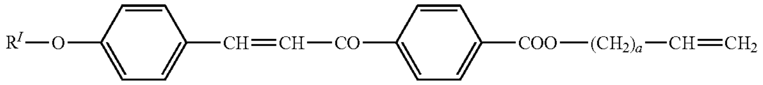
(A-1-P9)
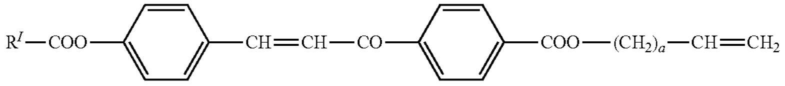
(A-1-P10)
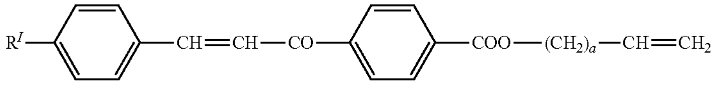
(A-1-P11)
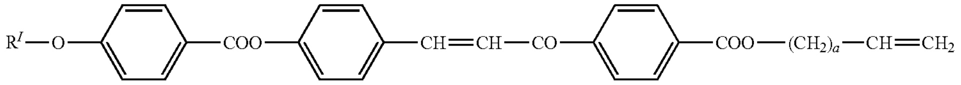
(A-1-P12)
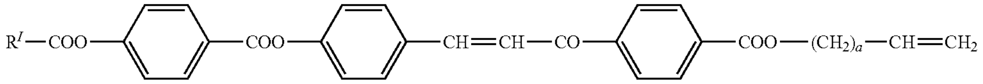
(A-1-P13)
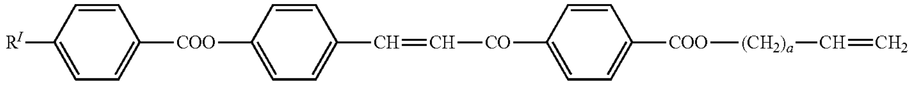
(A-1-P14)
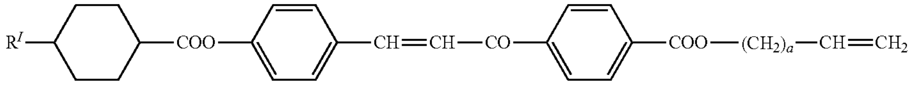
(A-1-P15)
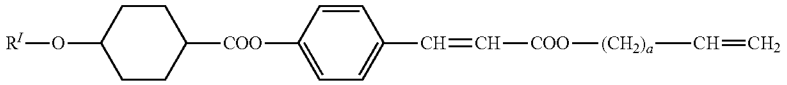
(A-2-P1)
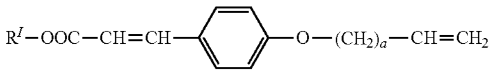
(A-2-P2)
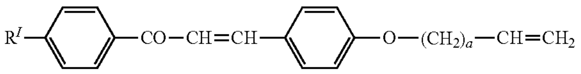
(A-2-P3)
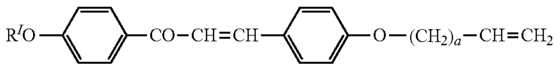
(A-3-P1)
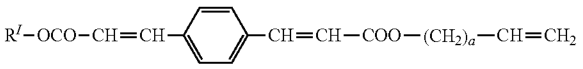
(A-3-P2)
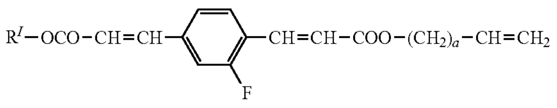
(A-4-P1)
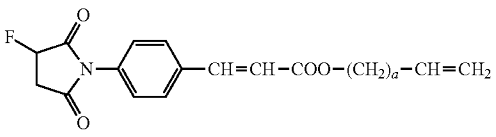
(A-4-P2)
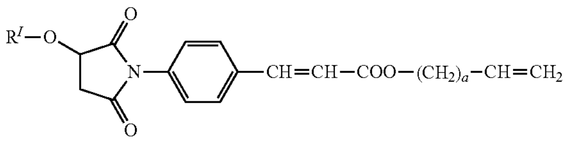
(A-4-P3)
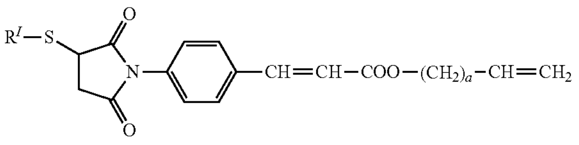
(A-5-P1)
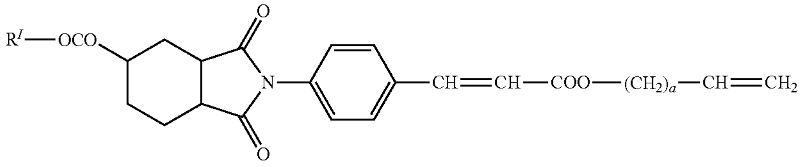

-continued (A-6-P1)

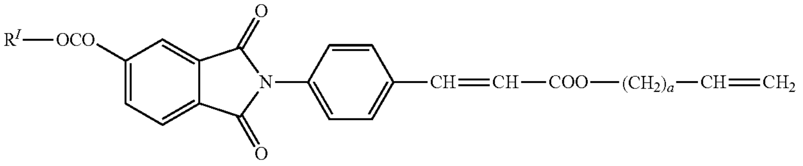

(A-6-P2)

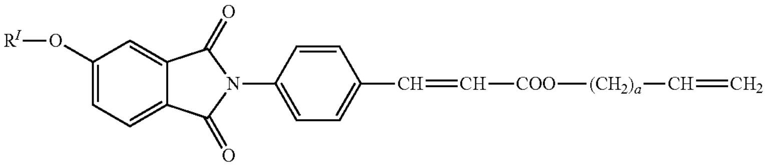

(A-7-P1)

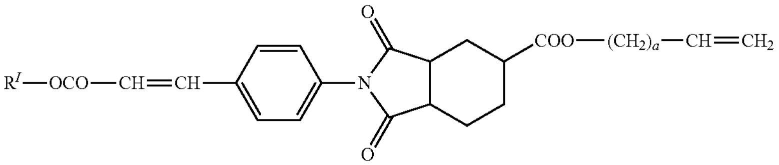

(A-8-P1)

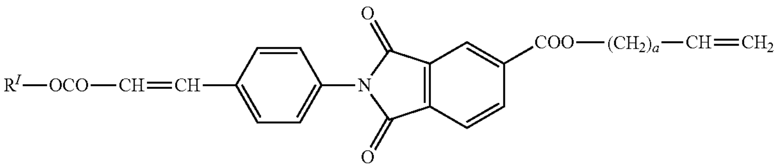

(A-8-P2)

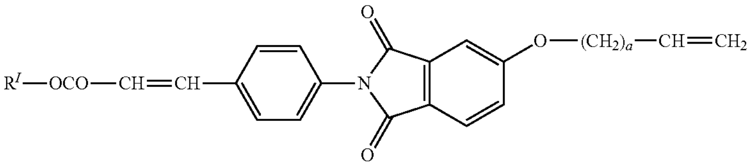

(In the above formulas, $R^I$ is as defined in the above formulas (A-1) to (A-7), and a is an integer of 0 to 10.)

When Z is an acryloyloxyl group, still preferred examples of the compound R—Z include compounds represented by the following formulas (A-1-A1) to (A-1-A15) as the compound represented by the above formula (A-1); compounds represented by the following formulas (A-2-A1) to (A-2-A3) as the compound represented by the above formula (A-2); compounds represented by the following formulas (A-3-A1) and (A-3-A2) as the compound represented by the above formula (A-3); compounds represented by the following formulas (A-4-A1) to (A-4-A3) as the compound represented by the above formula (A-4); a compound represented by the following formulas (A-5-A1) as the compound represented by the above formula (A-5); compounds represented by the following formulas (A-6-A1) and (A-6-A2) as the compound represented by the above formula (A-6); a compound represented by the following formula (A-7-A1) as the compound represented by the above formula (A-7); and compounds represented by the following formulas (A-8-A1) and (A-8-A2) as the compound represented by the above formula (A-8).

(A-1-A1)

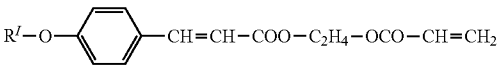

(A-1-A2)

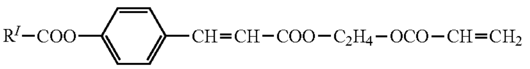

(A-1-A3)

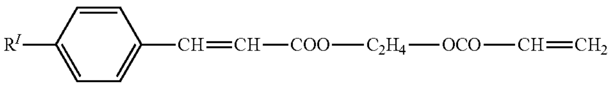

(A-1-A4)

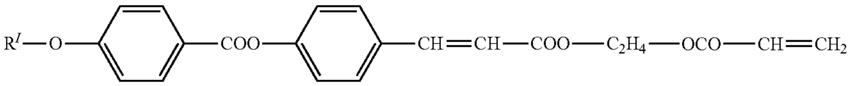

-continued
(A-1-A5)
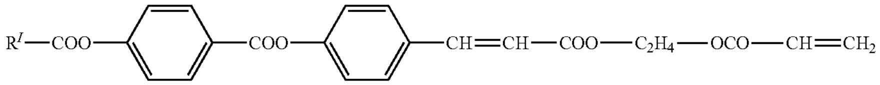
(A-1-A6)
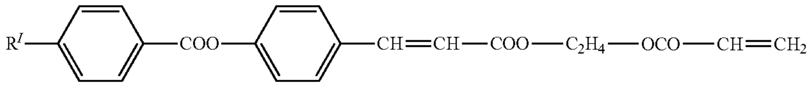
(A-1-A7)
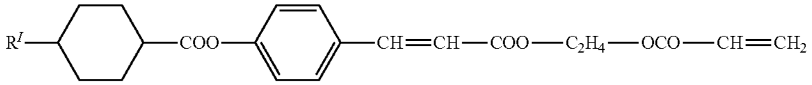
(A-1-A8)
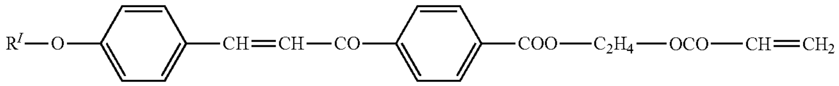
(A-1-A9)
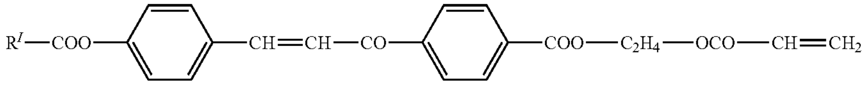
(A-1-A10)
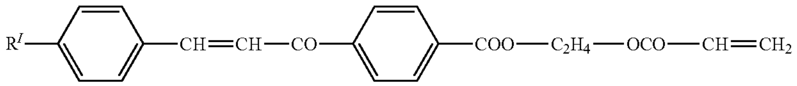
(A-1-A11)
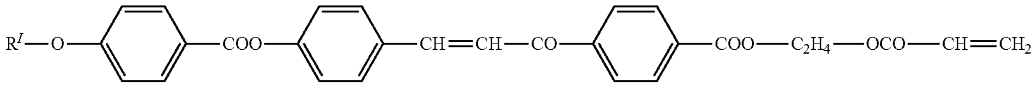
(A-1-A12)
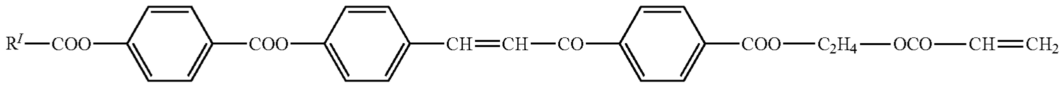
(A-1-A13)
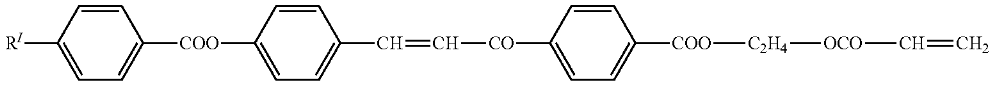
(A-1-A14)
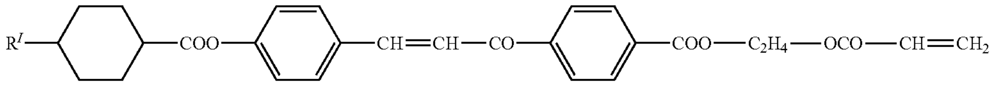
(A-1-A15)
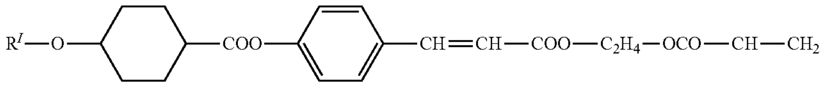
(A-2-A1)
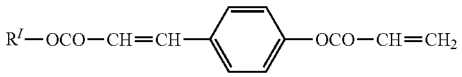
(A-2-A2)
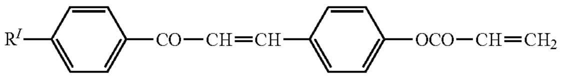
(A-2-A3)
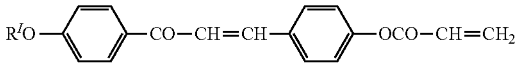
(A-3-A1)
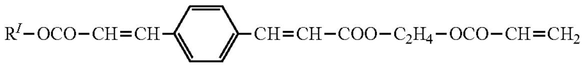
(A-3-A2)
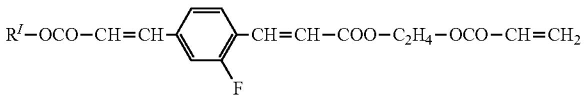
(A-4-A1)
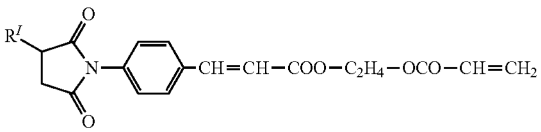
(A-4-A2)
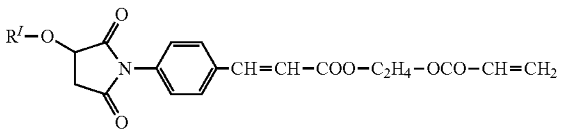
(A-4-A3)
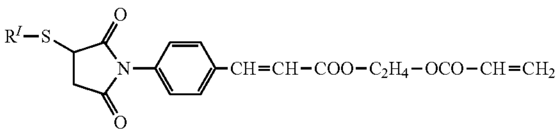

-continued (A-5-A1)

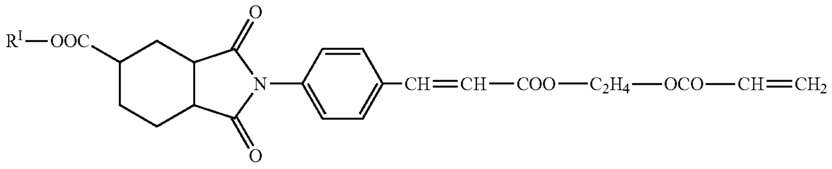

(A-6-A1)

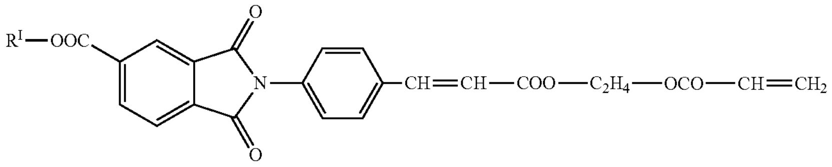

(A-6-A2)

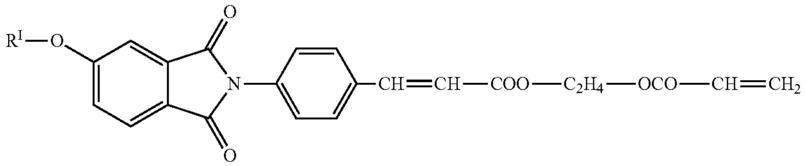

(A-7-A1)

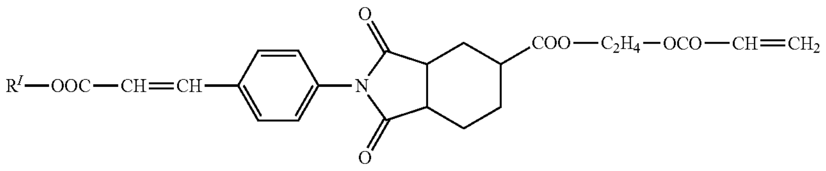

(A-8-A1)

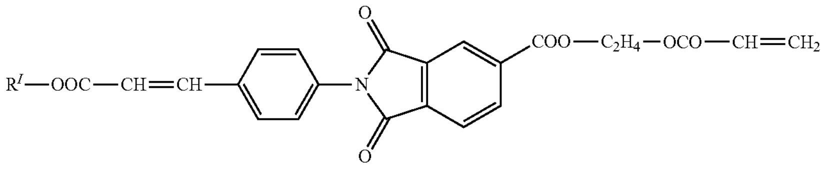

(A-8-A2)

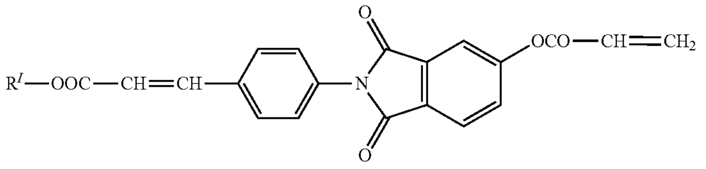

(In the above formulas, $R^I$ is as defined in the above formulas (A-1) to (A-7).)

Out of the compounds R—Z, when R has an alkyl group having 4 to 20 carbon atoms, fluoroalkyl group having 1 to 20 carbon atoms, cyclohexyl group or steroid structure but not the structure represented by the above formula (2), compounds represented by the following formulas (A-9) to (A-11) are preferred.

$R^I$—Z' (A-9)

(A-10)

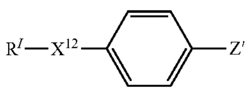

(A-11)

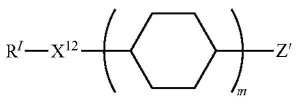

(In the above formulas, $R^I$ and Z' are as defined in the above formula (A-1), $X^{12}$ in the formulas (A-10) and (A-11) is a single bond, oxygen atom, —COO— or —COO—, and m in the formula (A-11) is 1 or 2.)

Examples of the compound represented by the above formula (A-9) in which Z' is —COOH include n-butanoic acid, n-pentanoic acid, n-hexanoic acid, n-heptanoic acid, n-octanoic acid, n-nonanoic acid, n-decanoic acid, n-lauric acid, n-dodecanoic acid, n-tridecanoic acid, n-tetradecanoic acid, n-pentadecanoic acid, n-hexadecanoic acid, n-heptadecanoic acid, n-stearic acid, n-nonadecanoic acid, n-eicosanoic acid, tetrahydroabietic acid, monocholestanyl succinate, monocholestanyl glutarate and compounds represented by the following formula (5-1):

$$C_hF_{2h+1}—C_iH_{2i}—COOH \quad (5\text{-}1)$$

(in the formula (5-1), h is an integer of 1 to 3, and i is an integer of 3 to 18); examples of the compound represented by the above formula (A-10) in which Z' is —COOH include, 4-methylbenzoic acid, 4-ethylbenzoic acid, 4-(n-propyl)benzoic acid, 4-(n-butyl)benzoic acid, 4-(n-pentyl)benzoic acid, 4-(n-hexyl)benzoic acid, 4-(n-heptyl)benzoic acid, 4-(n-octyl)

benzoic acid, 4-(n-nonyl)benzoic acid, 4-(n-decyl)benzoic acid, 4-(n-dodecyl)benzoic acid, 4-(n-octadecyl)benzoic acid, 4-(n-methoxy)benzoic acid, 4-(n-ethoxy)benzoic acid, 4-(n-propoxy)benzoic acid, 4-(n-butoxy)benzoic acid, 4-(n-pentyloxy)benzoic acid, 4-(n-hexyloxy)benzoic acid, 4-(n-heptyloxy)benzoic acid, 4-(n-octyloxy)benzoic acid, 4-(n-nonyloxy)benzoic acid, 4-(n-decyloxy)benzoic acid, 4-(n-dodecyloxy)benzoic acid, 4-(n-octadecyloxy)benzoic acid, and compounds represented by the following formulas (5-2) to (5-4):

(5-2)

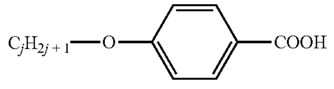

(5-3)

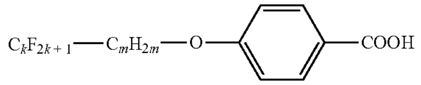

(5-4)

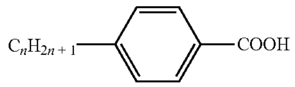

(in the above formulas, j is an integer of 5 to 20, k is an integer of 1 to 3, m is an integer of 0 to 18, and n is an integer of 1 to 18); and examples of the compound represented by the above formula (A-11) in which Z' is —COOH include 4-(n-butyl) cyclohexylcarboxylic acid, 4-(n-pentyl)cyclohexylcarboxylic acid, 4-(n-butyl)bicyclohexylcarboxylic acid and 4-(n-pentyl)bicyclohexylcarboxylic acid.

Further, examples of the compound represented by the above formula (A-9) in which Z' is —OH include 1-butanol, 1-pentanol, 1-hexanol, 1-heptanol, 1-octanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol and 1-eicosanol; examples of the compound represented by the above formula (A-9) in which Z' is —SH include 1-butanethiol, 1-pentanethiol, 1-hexanethiol, 1-heptanethiol, 1-octanethiol, 1-nonanethiol, 1-decanethiol, 1-undecanethiol, 1-dodecanethiol, 1-tridecanethiol, 1-tetradecanethiol, 1-pentadecanethiol, 1-hexadecanethiol, 1-heptadecanethiol, 1-octadecanethiol, 1-nonadecanethiol and 1-eicosanethiol; examples of the compound represented by the above formula (A-9) in which Z' is —NCO include butyl isocyanate, octyl isocyanate, dodecyl isocyanate and phenyl isocyanate; examples of the compound represented by the above formula (A-9) in which Z' is $—CH{=}CH_2$ include 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene; examples of the compound represented by the above formula (9) in which Z' is $—C{\equiv}CH$ include 1-hexyne, 1-heptyne, 1-octyne, 1-nonyne, 1-decyne, 1-undecyne, 1-dodecyne, 1-tridecyne, 1-tetradecyne, 1-pentadecyne, 1-hexadecyne, 1-heptadecyne, 1-octadecyne, 1-nonadecyne and 1-eicosyne; examples of the compound represented by the above formula (A-9) in which Z' is an acryloyloxyl group include butyl acrylate, pentyl acrylate, hexyl acrylate, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, nonadecyl acrylate and eicosyl acrylate; and examples of the compound represented by the above formula (A-9) in which Z' is a methacryloyloxyl group include butyl methacrylate, pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacrylate, heptadecyl methacrylate, octadecyl methacrylate, nonadecyl methacrylate, eicosyl methacrylate, 2,2,3,3,3-pentafluoropropyl methacrylate and 2,2,3,3-tetrafluoropropyl methacrylate.

The compounds represented by the above formulas (A-1) to (A-11) can be acquired as commercially available products or can be synthesized by suitably combining established organic chemical methods.

For example, the compound represented by the above formula (A-1-C1) can be obtained, for example, by reacting hydroxycinnamic acid with a halogenated alkyl having an alkyl group corresponding to $R^I$ under heating in the presence of a suitable base such as potassium carbonate and hydrolyzing the reaction product with a suitable alkali aqueous solution such as sodium hydroxide.

The compound represented by the above formula (A-1-C2) can be obtained, for example, by reacting hydroxycinnamic acid with an alkylcarboxylic acid chloride having an alkyl group corresponding to $R^I$ at a temperature of 0° C. to room temperature in the presence of a suitable base such as potassium carbonate.

The compound represented by the above formula (A-1-C4) can be obtained, for example, by reacting methyl hydroxybenzoate with a halogenated alkyl or tosylated alkyl having an alkyl group corresponding to $R^I$ at a temperature of room temperature to 100° C. in the presence of a suitable base such as potassium carbonate, hydrolyzing the reaction product with a suitable alkali aqueous solution such as sodium hydroxide, further converting the obtained hydrolysate into an acid chloride with thionyl chloride and reacting the acid chloride with hydroxycinnamic acid at a temperature of 0° C. to room temperature in the presence of a suitable base such as potassium carbonate.

The compound represented by the above formula (A-1-C5) can be obtained, for example, by reacting hydroxybenzoic acid with an alkylcarboxyclic acid chloride having an alkyl group corresponding to $R^I$ at a temperature of 0° C. to room temperature in the presence of a suitable base such as triethylamine, converting the obtained reaction product into an acid chloride with thionyl chloride and reacting the acid chloride with hydroxycinnamic acid at a temperature of 0° C. to room temperature in the presence of a suitable base such as potassium carbonate.

The compound represented by the above formula (A-1-C6) can be obtained, for example, by converting a 4-alkylbenzoic acid into an acid chloride with thionyl chloride and reacting the acid chloride with hydroxycinnamic acid at a temperature of 0° C. to room temperature in the presence of a suitable base such as potassium carbonate.

The compound represented by the above formula (A-1-C7) can be obtained, for example, by reacting methyl 4-hydroxycyclohexylcarboxylate with a halogenated alkyl having an alkyl group corresponding to $R^I$ in the presence of a suitable alkali such as sodium hydride or metallic sodium to obtain an ether, hydrolyzing the ether with an alkali aqueous solution such as sodium hydroxide, further converting the obtained hydrolysate into an acid chloride with thionyl chloride and reacting the acid chloride with hydroxycinnamic acid at a temperature of 0° C. to room temperature in the presence of a suitable base such as potassium carbonate.

The compound represented by the above formula (A-1-C8) can be obtained, for example, by converting a 4-alkylcyclohexylcarboxylic acid having an alkyl group corresponding to $R^I$ into an acid chloride with thionyl chloride and reacting the acid chloride with hydroxycinnamic acid at a temperature of 0° C. to room temperature in the presence of a suitable base such as potassium carbonate.

The compound represented by the above formula (A-1-C9) can be obtained by reacting a halogenated alkyl corresponding to $R^I$ with hydroxybenzaldehyde in the presence of a base such as potassium carbonate to form an ether bond and aldol condensing 4-acetylbenzoic acid with the ether bond in the presence of sodium hydroxide. The compounds represented by the above formulas (A-1-C10) to (A-1-C15) can be obtained in accordance with this method.

The compound represented by the above formula (A-2-C1) can be obtained, for example, by reacting 4-iodophenol with an alkyl acrylate having an alkyl group corresponding to $R^I$ in the presence of palladium and amine as catalysts (generally called "Heck reaction") and ring-opening adding a desired cyclic acid anhydride such as succinic anhydride or glutaric anhydride to the reaction product.

The compound represented by the above formula (A-2-C2) can be obtained by aldol condensing a 4-alkylacetophenone corresponding to $R^I$ with 4-formylbenzoic acid in the presence of sodium hydroxide. The compound represented by the above formula (A-2-C3) can be obtained in accordance with this method.

The compound represented by the above formula (A-2-C4) can be obtained by aldol condensing a 4-alkylacetophenone corresponding to $R^I$ with 4-hydroxybenzaldehyde in the presence of sodium hydroxide. The compound represented by the above formula (A-2-C5) can be obtained in accordance with this method.

The compound represented by the above formula (A-3-C1) can be obtained by reacting an acrylic acid ester having an alkyl group corresponding to $R^I$ with 4-bromocinnamic acid in the presence of a palladium catalyst (generally called "Heck reaction"). The compound represented by the above formula (A-3-C2) can be obtained in accordance with this method.

The compound represented by the above formula (A-4-C1) can be obtained, for example, by reacting an alkyl succinic anhydride having an alkyl group corresponding to $R^I$ with 4-aminocinnamic acid under reflux in acetic acid or under reflux in toluene or xylene in the presence of a suitable basic catalyst such as triethylamine when $R^I$ is an alkyl group.

When $R^I$ is a fluoroalkyl group, the above compound can be obtained by protecting maleic anhydride with a suitable protection group such as p-toluidine, coupling the protected maleic anhydride through a Grignard reaction with a fluoroalkyl iodide having a fluoroalkyl group corresponding to $R^I$, hydrolyzing the obtained product to remove the protection group, carrying out dehydration ring-closure, and reacting the obtained product with 4-aminocinnamic acid.

The compound represented by the above formula (A-4-C2) can be synthesized through any one of the following two routes.

As the first route, the above compound can be synthesized by protecting maleic anhydride with a suitable protection group such as p-toluidine, Michael adding an alcohol having an alkyl group corresponding to $R^I$ to the protected maleic anhydride in the presence of a suitable base such as potassium carbonate, hydrolyzing the obtained adduct to remove the protection group, further carrying out dehydration ring-closure, and reacting the obtained product with 4-aminocinnamic acid in the same manner as in the synthesis of the compound represented by the above formula (A-4-C1).

As the second route, the above compound can be synthesized by reacting methyl malate with a halogenated alkyl having an alkyl group corresponding to $R^I$ in the presence of silver oxide to obtain an ether, hydrolyzing the ether, further carrying out dehydration ring-closure, and reacting the obtained product with 4-aminocinnamic acid in the same manner as in the synthesis of the compound represented by the above formula (A-4-C1).

The compound represented by the above formula (A-4-C3) can be obtained in the same manner as the first route for the synthesis of the compound represented by the above formula (A-4-C2) except that a thiol having an alkyl group corresponding to $R^I$ is used in place of the alcohol having an alkyl group corresponding to $R^I$.

The compound represented by the above formula (A-5-C1) can be obtained, for example, by converting 1,2,4-tricarboxycyclohexane anhydride into an acid chloride with thionyl chloride, reacting the acid chloride with an alcohol having an alkyl group corresponding to $R^I$ in the presence of a suitable base such as triethylamine to obtain an ester, and reacting the obtained product with 4-aminocinnamic acid in the same manner as in the synthesis of the compound represented by the above formula (A-4-C1).

The compound represented by the above formula (A-6-C1) can be obtained by reacting a compound $R^I$—OH corresponding to a desired compound with anhydrous trimellitic acid halide to synthesize an ester compound as an intermediate and reacting this ester compound with 4-aminocinnamic acid. The synthesis of the intermediate ester compound is preferably carried out in a suitable solvent in the presence of a basic compound. The solvent which can be used herein is, for example, tetrahydrofuran and the basic compound is, for example, triethylamine. As for the reaction between the ester compound and 4-aminocinnamic acid, the both substances are refluxed in acetic acid or refluxed in toluene or xylene in the presence of a suitable catalyst (for example, an acid catalyst such as sulfuric acid or a basic catalyst such as triethylamine).

The compound represented by the above formula (A-6-C2) can be synthesized by refluxing 5-hydroxyphthalic acid in diethylbenzene to dehydrate/ring close it so as to obtain an acid anhydride, reacting the acid anhydride with 4-aminocinnamic acid in the same manner as above to synthesize an imide compound as a first intermediate, and reacting this imide compound with a compound $R^I$—X (X is a halogen atom) corresponding to a desired compound. At this point, this is carried out in a suitable solvent in the presence of a basic compound. The solvent which can be used herein is, for example, N,N-dimethylacetamide and the basic compound is, for example, potassium carbonate.

The compound represented by the above formula (A-7-C1) can be obtained, for example, by reacting 4-nitrocinnamic acid with a halogenated alkyl having an alkyl group corresponding to $R^I$ in the presence of potassium carbonate to form an ester, reducing the nitro group of the ester with tin chloride to obtain an amino group, and reacting the obtained product with 1,2,4-tricarboxycyclohexylcyclohexane anhydride. The latter reaction can be carried out by refluxing the raw material compounds in acetic acid or by refluxing the compounds in toluene or xylene in the presence of a suitable basic catalyst such as triethylamine. The compound represented by the above formula (A-8-C1) can also be synthesized in accordance with this method.

The compound represented by the above formula (A-8-C2) can be obtained by synthesizing a cinnamic acid derivative having an imide ring by using hydroxyphthalic acid in place of 1,2,4-tricarboxycyclohexylcyclohexane anhydride in the synthesis of the compound represented by the above formula (A-7-C1) and reacting the derivative with succinic anhydride or glutaric anhydride.

The compound represented by the above formula (A-1-O1) can be obtained by reacting a halogenated alkyl having an alkyl group corresponding to $R^I$ with 4-hydroxybenzaldehyde in the presence of a base such as potassium carbonate to form an ether bond and aldol condensing 4-hydroxyacetophenone with the ether bond in the presence of sodium hydroxide. The compounds represented by the above formulas (A-1-O2) to (A-1-O7) can also be obtained in accordance with this method.

The compound represented by the above formula (A-1-O1) can be obtained by reacting 4-iodophenol with an alkyl acrylate having an alkyl group corresponding to $R^I$ in the presence of palladium and amine catalysts (generally called "Heck reaction").

The compound represented by the above formula (A-1-O2) can be obtained by aldol condensing a 4-alkylacetophenone corresponding to $R^I$ with 4-hydroxybenzaldehyde in the presence of sodium hydroxide. The compound represented by the above formula (A-1-O3) can also be obtained in accordance with this method.

The compound represented by the above formula (A-1-O1) can be obtained by converting 4-nitrocinnamic acid into an acid chloride with thionyl chloride, reacting the acid chloride with an alcohol having an alkyl group corresponding to $R^I$ to form an ester, reducing the nitro group of the ester with tin chloride to form an amino group, and reacting the obtained product with hydroxyphthalic anhydride. The latter reaction can be carried out by refluxing the raw material compounds in acetic acid or by refluxing the compounds in toluene or xylene in the presence of a suitable basic catalyst such as triethylamine.

The compounds represented by the above formulas (A-1-P1) to (A-1-P15), (A-2-P1) to (A-2-P5), (A-3-P1), (A-3-P2), (A-4-P1) to (A-4-P3), (A-5-P1), (A-6-P1), (A-6-P2), (A-7-P1), (A-8-P1) and (A-8-P2) can be obtained by reacting the carboxyl groups of the compounds represented by the above formulas (A-1-C1) to (A-1-C15), (A-2-C1) to (A-2-05), (A-3-C1), (A-3-C2), (A-4-C1) to (A-4-C3), (A-5-C1), (A-6-C1), (A-6-C2), (A-7-C1), (A-8-C1) and (A-8-C2) with a compound $CH_2{=}CH(CH_2)_aX$ (a is an integer of 1 to 6, and X is a halogen atom) having a desired methylene chain preferably in potassium carbonate, respectively.

The compounds represented by the above formulas (A-1-A1) to (A-1-A15), (A-2-A1) to (A-2-A5), (A-3-A1), (A-3-A2), (A-4-A1) to (A-4-A3), (A-5-A1), (A-6-A1), (A-6-A2), (A-7-A1), (A-8-P1) and (A-8-P2) can be obtained by reacting the carboxyl groups of the compounds represented by the above formulas (A-1-C1) to (A-1-C15), (A-2-C1) to (A-2-05), (A-3-C1), (A-3-C2), (A-4-C1) to (A-4-C3), (A-5-C1), (A-6-C1), (A-6-C2), (A-7-C1), (A-8-C1) and (A-8-C2) with thionyl chloride to obtain acid chlorides and reacting the acid chlorides with hydroxyethyl acrylate in the presence of a suitable basic catalyst such as triethylamine, respectively.

Out of these compounds R—Z, preferred are the compounds represented by the above formulas (A-1-C1), (A-1-C3), (A-1-C4), (A-1-C6) to (A-1-C8), (A-4-C1), (A-4-C2), (A-5-C1), (A-7-C1), (A-1-P1), (A-1-P3), (A-1-P4), (A-1-P6), (A-1-P7), (A-4-P1), (A-4-P2), (A-5-P1), (A-7-P1), (A-1-A1), (A-1-A3), (A-1-A4), (A-1-A6), (A-1-A7), (A-4-A1), (A-4-A2), (A-5-A1) and (A-7-A1) in which R has the structure represented by the above formula (2).

The compounds R—Z of the above formulas in which R does not have the structure represented by the above formula (2) are n-butanoic acid, n-hexanoic acid, n-octanoic acid, n-lauric acid, n-stearic acid, 4-n-octadecylbenzoic acid, 4-n-dodecylbenzoic acid, 4-n-octylbenzoic acid, 4-n-hexylbenzoic acid, 4-n-octadecyloxybenzoic acid, 4-n-dodecyloxybenzoic acid, 4-n-octyloxybenzoic acid, 4-n-hexyloxybenzoic acid, 1-hexanethiol, 1-heptanethiol, 1-octanethiol, 1-nonanethiol, 1-decanethiol, 1-undecanethiol, 1-dodecanethiol, 1-tetradecanethiol, 1-hexadecanethiol, 1-octadecanethiol, 1-hexene, 1-heptene, 1-octene, 1-nonene, 1-decene, 1-undecene, 1-dodecene, 1-tetradecene, 1-hexadecene, 1-octadecene, hexyl acrylate, heptyl acrylate, octyl acrylate, nonyl acrylate, decyl acrylate, undecyl acrylate, dodecyl acrylate, tetradecyl acrylate, hexadecyl acrylate, octadecyl acrylate and compounds represented by the following formulas (5-3-1) to (5-3-3).

(5-3-1)

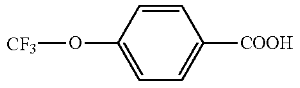

(5-3-2)

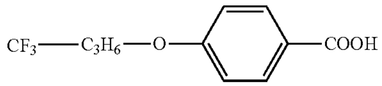

(5-3-3)

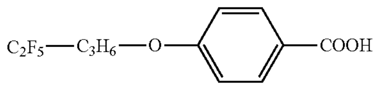

In this text, the compound R—Z in which R does not have the structure represented by the above formula (2) will be referred to as "another pretilt angle generating compound" hereinafter.

<Reaction Between Reactive Polyorganosiloxane and Compound R—Z>

To synthesize a liquid crystal aligning polyorganosiloxane by reacting the reactive polyorganosiloxane with the compound R—Z, a preferred combination of $X^I$ in the above formula (S-1) and R in the above formula (1) are given below.

(1) When $X^I$ is a monovalent group having an oxiranyl group or oxetanyl group, Z is preferably —COOH, —OH, —SH, —NCO, —NHR' (R' is a hydrogen atom, alkyl group having 1 to 6 carbon atoms or aryl group having 6 to 30 carbon atoms), $—CH{=}CH_2$ or $—SO_2C1$, particularly preferably —COOH.

(2) When $X^I$ is a hydrogen atom, Z is preferably $—CH{=}CH_2$, $—C{\equiv}CH$ or (meth)acryl group, particularly preferably $—CH{=}CH_2$.

(3) When $X^I$ is a monovalent group having a (meth)acryloyloxyl group, Z is preferably —OH, —SH or —NHR' (R' is a hydrogen atom, alkyl group having 1 to 6 carbon atoms or aryl group having 6 to 30 carbon atoms), particularly preferably —SH.

(4) When $X^I$ is a monovalent group having a vinyl group, Z is preferably —OH or —SH, particularly preferably —SH.

(5) When $X^I$ is a monovalent group having a mercapto group, Z is preferably a (meth) acryl group, particularly preferably an acryl group.

When $X^I$ is a monovalent group having an oxiranyl group in (1) above, the compound R—Z is used in an mount of preferably 0.001 to 1.5 moles, more preferably 0.01 to 1 mole, much more preferably 0.05 to 0.9 mole based on 1 mole of the oxiranyl group of the reactive polyorganosiloxane.

In this case, the reaction between the reactive polyorganosiloxane and the compound R—Z is preferably carried out in the presence of a catalyst. The catalyst is, for example, an organic base or a compound which is known as a curing accelerator for promoting a reaction between an oxiranyl compound and an acid anhydride.

Examples of the above organic base include primary and secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; and quaternary organic amines such as tetramethylammonium hydroxide. Out of these organic bases, tertiary organic amines such as triethylamine, tri-n-propylamine, tri-n-butylamine, pyridine and 4-dimethylaminopyridine, and quaternary organic amines such as tetramethylammonium hydroxide are preferred.

Examples of the above curing accelerator include tertiary amines such as benzyldimethylamine, 2,4,6-tris(dimethylaminomethyl)phenol, cyclohexyldimethylamine and triethanolamine; imidazole compounds such as 2-methylimidazole, 2-n-heptylimidazole, 2-n-undecylimidazole, 2-phenylimidazole, 2-phenyl-4-methylimidazole, 1-benzyl-2-methylimidazole, 1-benzyl-2-phenylimidazole, 1,2-dimethylimidazole, 2-ethyl-4-methylimidazole 1-(2-cyanoethyl)-2-methylimidazole, 1-(2-cyanoethyl)-2-n-undecylimidazole, 1-(2-cyanoethyl)-2-phenylimidazole, 1-(2-cyanoethyl)-2-ethyl-4-methylimidazole, 2-phenyl-4-methyl-5-hydroxymethylimidazole, 2-phenyl-4,5-di(hydroxymethyl)imidazole, 1-(2-cyanoethyl)-2-phenyl-4,5-di[(2'-cyanoethoxy)methyl]imidazole, 1-(2-cyanoethyl)-2-n-undecylimidazolium trimellitate, 1-(2-cyanoethyl)-2-phenylimidazolium trimellitate, 1-(2-cyanoethyl)-2-ethyl-4-methylimidazoliumtrimellitate, 2,4-diamino-6-[2'-methylimidazolyl-(1')]ethyl-s-triazine, 2,4-diamino-6-(2'-n-undecylimidazolyl)ethyl-s-triazine, 2,4-diamino-6-[2'-ethyl-4'-methylimidazolyl-(1')]ethyl-s-triazine, isocyanuric acid adduct of 2-methylimidazole, isocyanuric acid adduct of 2-phenylimidazole and isocyanuric acid adduct of 2,4-diamino-6-[2'-methylimidazolyl-(1')]ethyl-s-triazine; organic phosphorus compounds such as diphenyl phosphine, triphenyl phosphine and triphenyl phosphite; quaternary phosphonium salts such as benzyltriphenylphosphonium chloride, tetra-n-butylphosphonium bromide, methyltriphenylphosphonium bromide, ethyltriphenylphosphonium bromide, n-butyltriphenylphosphonium bromide, tetraphenylphosphonium bromide, ethyltriphenylphosphonium iodide, ethyltriphenylphosphonium acetate, tetra-n-butylphosphonium-o,o-diethylphosphorodiethionate, tetra-n-butylphosphonium benzotriazolate tetra-n-butylphosphonium tetrafluoroborate, tetra-n-butylphosphonium tetraphenylborate and tetraphenylphosphonium tetraphenylborate; diazabicycloalkenes such as 1,8-diazabicyclo[5.4.0]undecene-7 and organic acid salts thereof; organic metal compounds such as zinc octylate, tin octylate and aluminum acetylacetone complex; quaternary ammonium salts such as tetraethylammonium bromide, tetra-n-butylammonium bromide, tetraethylammonium chloride and tetra-n-butylammonium chloride; boron compounds such as boron trifluoride and triphenyl borate; metal halogen compounds such as zinc chloride and stannic chloride; high-melting point dispersible latent curing accelerators such as amine adduct type accelerators including an adduct of dicyandiamide or amine with epoxy resin; microcapsule type latent curing accelerators obtained by coating the surfaces of curing accelerators such as the above imidazole compounds, organic phosphorus compounds and quaternary phosphonium salts with a polymer; amine salt type latent curing accelerators; and high-temperature dissociation type thermally cationic polymerization latent curing accelerators such as Lewis acid salts and Brϕnsted acid salts.

Out of these, quaternary ammonium salts such as tetraethylammonium bromide, tetra-n-butylammonium bromide, tetraethylammonium chloride and tetra-n-butylammonium chloride are preferred.

The catalyst is used in an amount of preferably not more than 100 parts by weight, more preferably 0.01 to 100 parts by weight, much more preferably 0.1 to 20 parts by weight based on 100 parts by weight of the reactive polyorganosiloxane.

The reaction temperature is preferably 0 to 200° C., more preferably 50 to 150° C. The reaction time is preferably 0.1 to 50 hours, more preferably 0.5 to 20 hours.

The synthesis reaction of the above liquid crystal aligning polyorganosiloxane may be carried out in the presence of an organic solvent as required. Examples of the organic solvent include hydrocarbon compounds, ether compounds, ester compounds, ketone compounds, amide compounds and alcohol compounds. Out of these, ether compounds, ester compounds and ketone compounds are preferred from the viewpoints of the solubilities of the raw materials and the product and the purification ease of the obtained product. The solvent is used in an amount which ensures that the solids content (the ratio of the total weight of components except for the solvent in the reaction solution to the total weight of the solution) becomes preferably not less than 0.1 wt %, more preferably 5 to 50 wt %.

The above liquid crystal aligning polyorganosiloxane is obtained by reacting the reactive polyorganosiloxane having an oxiranyl group with the compound R—Z to introduce the group R having liquid crystal alignability into a polyorganosiloxane, making use of the ring-opening addition of the oxiranyl group. This production method is very advantageous because it is simple and can increase the introduction rate of the liquid crystal aligning group.

The above compounds R—Z may be used alone or in combination of two or more. When the group Z of the compound R—Z is —COOH, the reaction may be carried out by substituting part of the compound R—Z by another carboxylic acid.

When $X^I$ is a monovalent group having a oxetanyl group in (1) above, the compound R—Z is used in an amount of preferably 0.001 to 3 moles, more preferably 0.1 to 1 mole, much more preferably 0.2 to 0.9 mole based on 1 mole of the oxetanyl group of the reactive polyorganosiloxane.

In this case, the reaction between the reactive polyorganosiloxane and the compound R—Z is preferably carried out in the presence of a catalyst. Examples of the catalyst include aluminum oxide, tetrabutoxy titanium, tetraisopropoxy titanium, zinc octylate, tin octylate, aluminum acetylacetone complex, titanium acetylacetone complex, zirconium acetylacetone complex, benzyldimethylamine, paratoluenesulfonic acid and tetraphenylphosphine bromide. The amount of the catalyst is preferably 0.1 to 100 parts by weight, more preferably 0.1 to 20 parts by weight based on 100 parts by weight of the reactive polyorganosiloxane having an oxetanyl group.

The reaction temperature is preferably 0 to 300° C., more preferably 10 to 250° C., and the reaction time is preferably 0.1 to 50 hours, more preferably 0.5 to 20 hours.

To synthesize the above liquid crystal aligning polyorganosiloxane, an organic solvent such as hydrocarbon, ether, ester, ketone, amide or alcohol may be used as required. An ether, ester or ketone is preferred from the viewpoints of the solubilities of the raw materials and the product and purification ease. Particularly preferred examples of the organic solvent include toluene, xylene, diethylbenzene, mesitylene, methyl ethyl ketone, methyl isobutyl ketone, 2-heptanone and cyclohexanone. The organic solvent is used in an amount which ensures that the solids content (the ratio of the total weight of components except for the solvent in the reaction solution to the total weight of the solution) becomes preferably not less than 0.1 wt %, more preferably 5 to 50 wt %.

In the case of (2) above, that is, when $X^I$ is a hydrogen atom, the reaction between the reactive polyorganosiloxane and the compound R—Z is a hydrosilylation reaction which is carried out preferably in an organic solvent preferably in the presence of a catalyst.

The compound R—Z is used in an amount of preferably 0.001 to 1.5 moles, more preferably 0.01 to 1 mole, much more preferably 0.05 to 0.9 mole based on 1 mole of the silicon-hydrogen bond of the reactive polyorganosiloxane.

As the above catalyst may be used what are known as a catalyst used for the hydrosilylation reaction, as exemplified by compounds or complexes containing platinum, rhodium or palladium. Out of these, compounds or complexes containing platinum are preferred, such as hexachloroplatinic (IV) acid hexahydrate, platinum carbonyl vinyl methyl complex, platinum-divinyl tetramethyldisiloxane complex, platinum-cyclovinyl methylsiloxane complex, and platinum-octylaldehyde/octanol complex. The above platinum compounds or complexes may be supported by a suitable carrier such as activated carbon. The amount of the catalyst is preferably 0.01 to 10,000 ppm, more preferably 0.1 to 100 ppm based on the weight of the compound R—Z as the amount of the metal atom contained in the compound or complex.

The organic solvent which can be used in the above hydrosilylation reaction is preferably an aromatic hydrocarbon or ether, as exemplified by toluene, xylene, mesitylene, diethylbenzene, tetrahydrofuran, diethyl ether, 1,4-dioxane and diphenyl ether. The solvent is used in an amount which ensures that that the solids content (the ratio of the total weight of components except for the solvent in the reaction solution to the total weight of the solution) becomes preferably not less than 0.1 wt %, more preferably 5 to 50 wt %.

The reaction temperature is preferably room temperature to 250° C., more preferably 50 to 180° C. The reaction time is preferably 0.1 to 120 hours, more preferably 1 to 10 hours.

When the group Z of the compound R—Z is —CH=$CH_2$ in the above case, the reaction may be carried out by substituting part of the compound R—Z by another unsaturated compound. When allyl glycidyl ether, 1,2-epoxy-5-hexene, 1,2-epoxy-9-decene, glycidyl acrylate or 4-vinyl-1-cyclohexene 1,2-epoxide is used as the another unsaturated compound, the obtained liquid crystal aligning polyorganosiloxane has crosslinkability advantageously.

In the case of (3) above, that is, when $X^I$ is a monovalent group having a (meth)acryloyloxyl group, the reaction between the reactive polyorganosiloxane and the compound R—Z is a Michael addition reaction which is carried out preferably in an organic solvent preferably in the presence of a catalyst. In this case, the compound R—Z is used in an amount of preferably 0.01 to 2.0 moles, more preferably 0.1 to 1.0 mole, much ore preferably 0.2 to 0.8 mole based on 1 mole of the (meth)acryloyloxyl group of the reactive polyorganosiloxane.

As the above catalyst may be used tertiary organic amines such as triethylamine, tri-n-propylamine, tri-n-butylamine, pyridine, 4-dimethylaminopyridine and diazabicycloundecene, potassium carbonate, sodium hydroxide and potassium hydroxide. The catalyst may be used in an amount of preferably 0.001 to 1.5 moles, more preferably 0.1 to 1.1 moles based on the compound R—Z.

Examples of the above organic solvent include hydrocarbon compounds, ether compounds, ester compounds, amide compounds and nitrile compounds. Out of these, ether compounds, ester compounds and nitrile compounds are preferred from the viewpoints of the solubilities of the raw materials and the product and the purification ease of the product. The solvent may be used in an amount which ensures that the solids content (the ratio of the total weight of components except for the solvent in the reaction solution to the total weight of the solution) becomes 5 to 100 wt %.

The reaction temperature is preferably 0 to 200° C., more preferably 10 to 100° C. The reaction time is preferably 0.1 to 50 hours, more preferably 0.5 to 10 hours.

In the above case, the reaction may be carried out by substituting part of the compound R—Z by another alcohol or thiol. As the another alcohol or thiol which can be used herein, another thiol is preferred such as thioglycolic acid or mercaptopropionic acid.

In the case of (4), that is, when $X^I$ is a monovalent group having a vinyl group, the reaction between the reactive polyorganosiloxane and the compound R—Z is an addition reaction which is carried out preferably in an organic solvent preferably in the present of a radical initiator. In this case, the compound R—Z is used in an amount of preferably 0.01 to 2.0 moles, more preferably 0.1 to 1.0 mole, much more preferably 0.2 to 0.8 mole based on 1 mole of the vinyl group of the reactive polyorganosiloxane.

As the radical initiator may be used what are generally known as radical polymerization initiators. Examples of the radical initiator include azo compounds such as 2,2'-azobisisobutyronitrile, 2,2'-azobis-(2,4-dimethylvaleronitirle) and 2,2'-azobis-(4-methoxy-2,4-dimethylvaleronitrile); organic peroxides such as benzoyl peroxide, lauroyl peroxide, t-butylperoxy pivalate and 1,1'-bis-(t-butylperoxy)cyclohexane; and hydrogen peroxide. Out of these, 2,2'-azobisisobutyronitrile and 2,2'-azobis-(2,4-dimethylvaleronitrile) are preferred. The radical initiator is used in an amount of preferably 0.001 to 1.5 moles, more preferably 0.1 to 1.1 moles based on the compound R—Z.

Examples of the above organic solvent include alcohols, ethers, glycol ethers, ethylene glycol alkyl ether acetates, diethylene glycol alkyl ethers, propylene glycol monoalkyl ethers, propylene glycol alkyl ether acetates, propylene glycol alkyl ether propionates, aromatic hydrocarbons, ketones and esters.

As specific examples of these, the above alcohols include methanol, ethanol, benzyl alcohol, 2-phenylethyl alcohol and 3-phenyl-1-propanol; the above ethers include tetrahydrofuran and di-n-amyl ether; the above glycol ethers include ethylene glycol monomethyl ether and ethylene glycol monoethyl ether; the above ethylene glycol alkyl ether acetates include methyl cellosolve acetate, ethyl cellosolve acetate, ethylene glycol monobutyl ether acetate and ethylene glycol monoethyl ether acetate; the above diethylene glycol alkyl ethers include diethylene glycol monomethyl ether, diethylene glycol monoethyl ether, diethylene glycol dimethyl ether, diethylene glycol diethyl ether and diethylene glycol ethyl methyl ether; the above propylene glycol monoalkyl ethers include propylene glycol monomethyl ether, propylene glycol monoethyl ether, propylene glycol monopropyl ether and propylene glycol monobutyl ether; the above propylene glycol alkyl ether propionates include propylene glycol methyl ether propionate, propylene glycol ethyl ether propionate, propylene glycol propyl ether propionate and propylene glycol butyl ether propionate; the above propylene glycol alkyl ether acetates include propylene glycol methyl ether acetate, propylene glycol ethyl ether acetate, propylene glycol propyl ether acetate and propylene glycol butyl ether acetate; the above aromatic hydrocarbons include toluene and xylene; the above ketones include methyl ethyl ketone, cyclohexanone, 4-hydroxy-4-methyl-2-pentanone and diisobutyl ketone; and the above esters include methyl acetate, ethyl acetate, propyl acetate, butyl acetate, ethyl 2-hydroxypropionate, methyl 2-hydroxy-2-methylpropionate, ethyl 2-hydroxy-2-methylpropionate, methyl hydroxyacetate, ethyl hydroxyacetate, butyl hydroxyacetate, methyl lactate, ethyl lactate, propyl lactate, butyl lactate, methyl 3-hydroxypropionate, ethyl 3-hydroxypropionate, propyl 3-hydroxypropionate, butyl 3-hydroxypropionate, methyl 2-hydroxy-3-methylbutanoate, methyl methoxyacetate, ethyl methoxyacetate, propyl methoxyacetate, butyl methoxyacetate, methyl ethoxyacetate, ethyl ethoxyacetate, propyl ethoxyacetate, butyl ethoxyacetate, methyl propoxyacetate, ethyl propoxyacetate, propyl propoxyacetate, butyl propoxyacetate, methyl butoxyacetate, ethyl butoxyacetate, propyl butoxyacetate, butyl butoxyacetate, methyl 2-methoxypropionate, ethyl 2-methoxypropionate, propyl 2-methoxypropionate, butyl 2-methoxypropionate, methyl 2-ethoxypropionate, ethyl 2-ethoxypropionate, propyl 2-ethoxypropionate, butyl 2-ethoxypropionate, methyl 2-butoxypropionate, ethyl 2-butoxypropionate, propyl 2-butoxypropionate, butyl 2-butoxypropionate, methyl 3-methoxypropionate, ethyl 3-methoxypropionate, propyl 3-methoxypropionate, butyl 3-methoxypropionate, methyl 3-ethoxypropionate, ethyl 3-ethoxypropionate, propyl 3-ethoxypropionate, butyl 3-ethoxypropionate, methyl 3-propoxypropionate, ethyl 3-propoxypropionate, propyl 3-propoxypropionate, butyl 3-propoxypropionate, methyl 3-butoxypropionate, ethyl 3-butoxypropionate, propyl 3-butoxypropionate and butyl 3-butoxypropionate.

Out of these, ethylene glycol alkyl ether acetates, diethylene glycol alkyl ethers, propylene glycol monoalkyl ethers and propylene glycol alkyl ether acetates are preferred, and diethylene glycol dimethyl ether, diethylene glycol ethyl methyl ether, propylene glycol methyl ether, propylene glycol ethyl ether, propylene glycol methyl ether acetate and methyl 3-methoxypropionate are particularly preferred.

The solvent may be used in an amount which ensures that the solids content (the ratio of the total weight of components except for the solvent in the reaction solution to the total weight of the solution) becomes 5 to 100 wt %.

The reaction temperature is preferably 0 to 200° C., more preferably 10 to 100° C. The reaction time is preferably 0.1 to 50 hours, more preferably 0.5 to 10 hours.

The reaction may be carried out by substituting part of the compound R—Z by another alcohol or thiol. As the another alcohol or thiol which can be used herein, another thiol is preferred such as thioglycolic acid or mercaptopropionic acid.

In the case of (5) above, that is, when $X^I$ is a monovalent group having a mercapto group, the reaction between the reactive polyorganosiloxane and the compound R—Z is a Michael addition reaction which is carried out preferably in an organic solvent preferably in the present of a catalyst. In this case, the compound R—Z is used in an amount of preferably 0.01 to 2.0 moles, more preferably 0.1 to 1.0 mole, much more preferably 0.2 to 0.8 mole based on 1 mole of the vinyl group of the reactive polyorganosiloxane.

As the above catalyst may be used tertiary organic amines such as triethylamine, tri-n-propylamine, tri-n-butylamine, pyridine, 4-dimethylaminopyridine and diazabicycloundecene, potassium carbonate, sodium hydroxide and potassium hydroxide. The catalyst may be used in an amount of preferably 0.001 to 1.5 moles, more preferably 0.1 to 1.1 moles based on the compound R—Z.

Examples of the above organic solvent include hydrocarbon compounds, ether compounds, ester compounds, amide compounds and nitrile compounds. Out of these, ether compounds, ester compounds and nitrile compounds are preferred from the viewpoints of the solubilities of the raw materials and the product and the purification ease of the product. The solvent may be used in an amount which ensures that the solids content (the ratio of the total weight of components except for the solvent in the reaction solution to the total weight of the solution) becomes 5 to 100 wt %.

The reaction temperature is preferably 0 to 200° C., more preferably 10 to 100° C. The reaction time is preferably 0.1 to 50 hours, more preferably 0.5 to 10 hours.

The reaction may be carried out by substituting part of the compound R—Z by another (meth) acrylic acid derivative. Examples of this compound include 2,4-epoxycyclohexylmethyl acrylate, 2,4-epoxyccylohexylethyl acrylate, 2,4-epoxycyclohexylmethyl methacrylate, 2,4-epoxycyclohexylethyl methacrylate, acrylic acid and methacrylic acid.

Out of the above combinations of the reactive polyorganosiloxane and the compound R—Z, a combination of a reactive polyorganosiloxane in which $X^I$ is a group represented by the above formula ($X^I$-1) or ($X^I$-2) and a compound R—Z in which Z is —COOH, a combination of a reactive polyorganosiloxane in which $X^I$ is a hydrogen atom and a compound R—Z in which Z is $—CH{=}CH_2$, and a combination of a reactive polyorganosiloxane in which $X^I$ is a group represented by the above formula ($X^I$-4) and a compound R—Z in which Z is —SH are particularly preferred because the reaction yield is high and purification is easy.

<Other Components>

The liquid crystal aligning agent of the present invention contains the above-described liquid crystal aligning polyorganosiloxane.

The liquid crystal aligning agent of the present invention may further contain other components in addition to the above liquid crystal aligning polyorganosiloxane as long as the effect of the present invention is not impaired. The other components include a polymer except for the liquid crystal aligning polyorganosiloxane (to be referred to as "another polymer" hereinafter), a compound having at least one oxiranyl group in the molecule (to be referred to as "oxiranyl compound" hereinafter), a functional silane compound, a curing agent, a curing catalyst and a surfactant.

The above another polymer may be used to further improve the characteristic properties of a solution of the liquid crystal aligning agent of the present invention and the electric properties of the obtained liquid crystal alignment film. Examples of the another polymer include at least one polymer selected from the group consisting of a polyamic acid and a polyimide, at least one polymer selected from the group consisting of a polysiloxane having a structure represented by the following formula (S-2), a hydrolysate thereof and a condensate of the hydrolysate (to be referred to as "another polyorganosiloxane" hereinafter), a polyamic acid ester, a polyester, a polyamide, a cellulose derivative, a polyacetal, a polystyrene derivative, a poly(styrene-phenymaleimide) derivative and a poly(meth)acrylate.

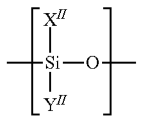

(S-2)

(In the above formula (S-2), $X^{II}$ is a hydroxyl group, alkoxy group having 1 to 10 carbon atoms, alkyl group having 1 to 6 carbon atoms or aryl group having 6 to 10 carbon atoms, and $Y^{II}$ is a hydroxyl group or alkoxyl group having 1 to 10 carbon atoms.)

[Polyamic Acid]

The above polyamic acid can be obtained by reacting a tetracarboxylic dianhydride with a diamine.

Examples of the tetracarboxylic dianhydride which can be used to synthesize the polyamic acid include aliphatic and alicyclic tetracarboyxlic dianhydrides such as 2,3,5-tricarboxycyclopentylacetic dianhydride, butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-(tetrahydro-2,5-dioxo-3-furanyl)-8-methyl-naphtho[1,2-c]-furan-1,3-dione, 5(2,5-dioxotetrahydrofuranyl)-3-methyl-3-cyclohexene-1-2-dicarboxylic anhydride, bicyclo[2.2.2]-oct-7-ene-2,3,5,6-tetracarboxylic dianhydride and tetracarboxylic dianhydrides represented by the following formulas (T-1) to (T-4)

(T-1)

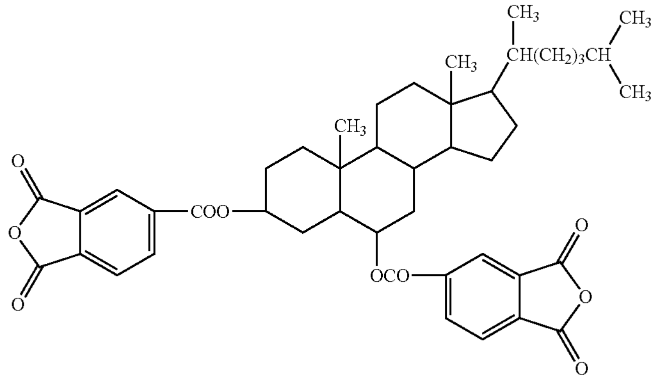

(T-2)

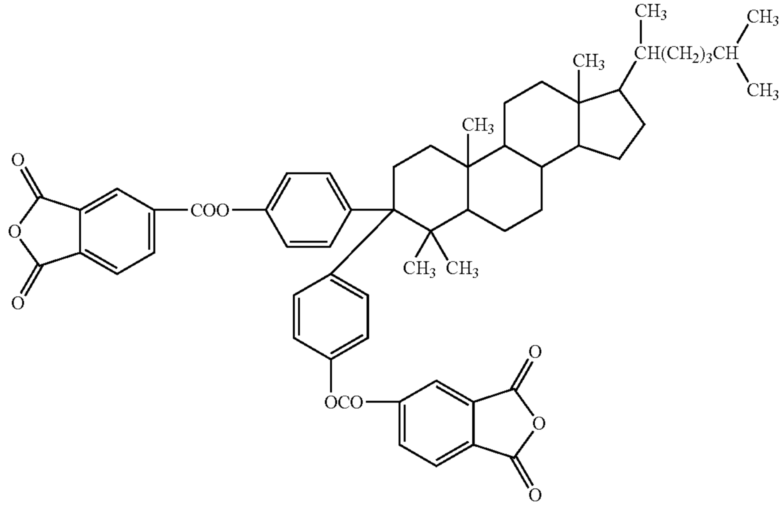

(T-3)

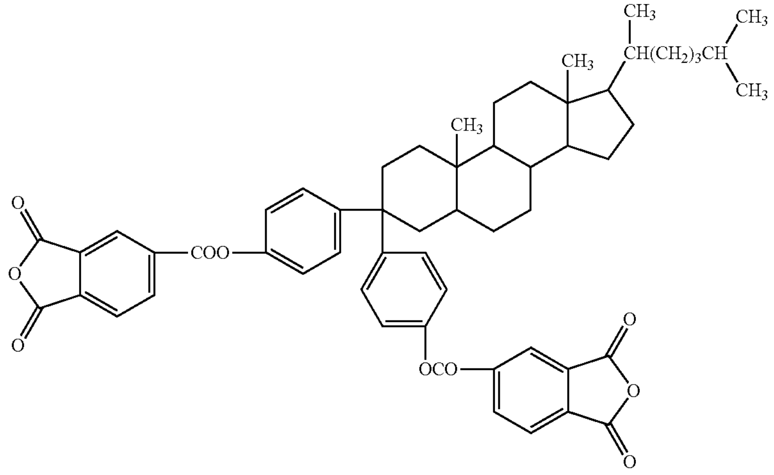

-continued (T-4)

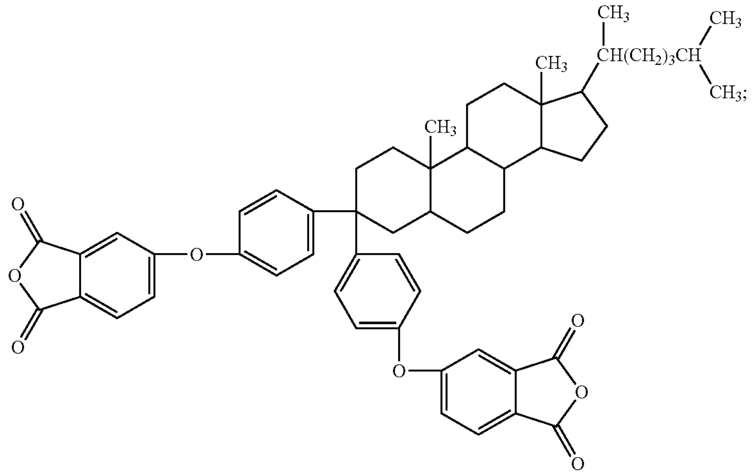

and aromatic tetracarboxylic dianhydrides such as pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxylic dianhydride, 4,4'-bis(3,4-dicarboxyphenoxy)diphenylsulfidedianhydride, 4,4'-bis(3,4-dicabroxyphenoxy)diphenylsulfone dianhydride, 4,4'-bis(3,4-dicabroxyphenoxy)diphenylpropane dianhydride, 3,3',4,4'-perfluoroisopropylidene tetracarboxylic dianhydride, 3,3',4,4'-biphenyl tetracarboxylic dianhydride, bis(phthalic acid) phenylphosphine oxide dianhydride, p-phenylene-bis (triphenylphthalic)dianhydride, m-phenylene-bis (triphenylphthalic)dianhydride, bis(triphenylphthalic acid)-4,4'-diphenyl ether dianhydride, bis(triphenylphthalic acid)-4,4'-diphenylmethane dianhydride and tetracarboxylic dianhydrides represented by the following formulas (T-5) to (T-8).

(T-5)

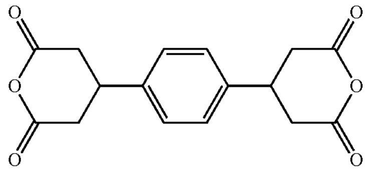

(T-6)

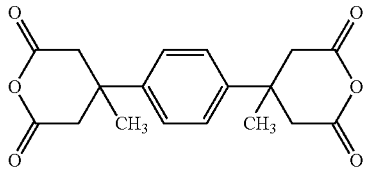

-continued (T-7)

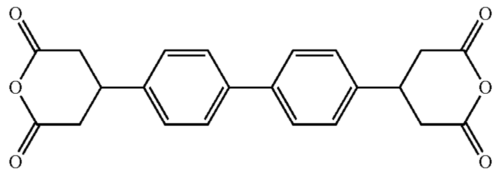

(T-8)

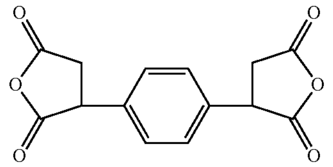

Out of these, preferred are 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-(tetrahydro-2,5-dioxo-3-furanyl)-8-methyl-naphtho[1,2-c]-furan-1,3-dione, 2,3,5-tricarboxycyclopentylacetic dianhydride, butanetetracarboxylic dianhydride, 1,3-dimethyl-1,2,3,4-cyclobutanetetracarboxylic dianhydride, 1,2,3,4-cyclobutanetetracarboxylic dianhydride, pyromellitic dianhydride, 3,3',4,4'-biphenylsulfone tetracarboxylic dianhydride, 1,4,5,8-naphthalenetetracarboxylic dianhydride, 2,3,6,7-naphthalenetetracarboxylic dianhydride, 3,3',4,4'-biphenylether tetracarboxylic dianhydride and tetracarboyxlic dianhydrides represented by the above formulas (T-1), (T-2) and (T-15) to (T-18).

These tetracarboxylic dianhydrides may be used alone or in combination of two or more.

Examples of the diamine which can be used to synthesize the above polyamic acid include aromatic diamines such as p-phenylenediamine, m-phenylenediamine, 4,4'-diaminodiphenylmethane, 4,4'-diaminodiphenylethane, 4,4'-diaminodiphenylsulfide, 4,4'-diaminodiphenylsulfone, 3,3'-dimethyl-4,4'-diaminobiphenyl, 4,4'-diaminobenzanilide, 4,4'-diaminodiphenyl ether, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 2,2-bis(4-aminophenoxy)propane, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2-bis[4-(4-amino-2-trifluoromethylphenoxy)phenyl]hexafluoropropane, 4,4'-diamino-2,2'-bis(trifluoromethyl)biphenyl, 4,4'-bis[(4-amino-2-trifluoromethyl)phenoxy]-octafluorobiphenyl, 6-(4-chalconyloxy)hexyloxy(2,4-diaminobenzene), 6-(4'-fluoro-4-chalconyloxy)hexyloxy(2,4-diaminobenzene), 8-(4-chalconyloxy)octyloxy(2,4-diaminobenzene), 8-(4'-fluoro-4-chalconyloxy)octyloxy(2,4-diaminobenzene), 1-dodecyloxy-2,4-diaminobenzene, 1-tetradecyloxy-2,4-diaminobenzene, 1-pentadecyloxy-2,4-diaminobenzene, 1-hexadecyloxy-2,4-diaminobenzene, 1-octadecyloxy-2,4-diaminobenzene, 1-cholesteryloxy-2,4-diaminobenzene, 1-cholestanyloxy-2,4-diaminobenzene, dodecyloxy(3,5-diaminobenzoyl), tetradecyloxy(3,5-diaminobenzoyl), pentadecyloxy(3,5-diaminobenzoyl), hexadecyloxy(3,5-diaminobenzoyl), octadecyloxy(3,5-diaminobenzoyl), cholesteryloxy(3,5-diaminobenzoyl), cholestanyloxy(3,5-diaminobenzoyl), (2,4-diaminophenoxy)palmitate, (2,4-diaminophenoxy)stearate, (2,4-diaminophenoxy)-4-trifluoromethyl benzoate and compounds represented by the following formulas (D-1) to (D-5):

(D-1)

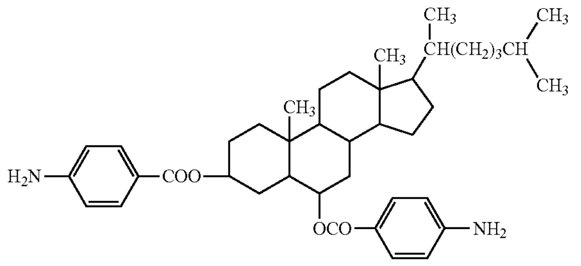

(D-2)

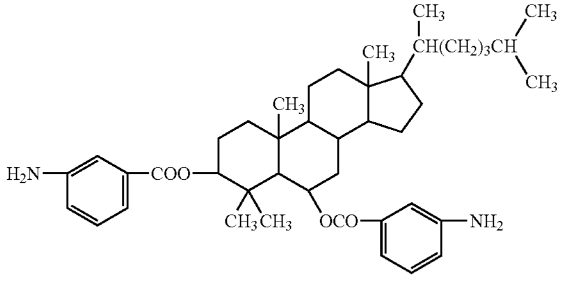

-continued (D-3)

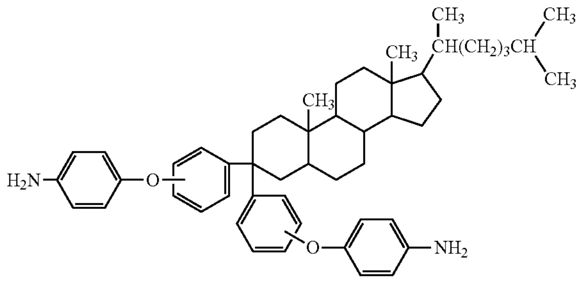

(D-4)

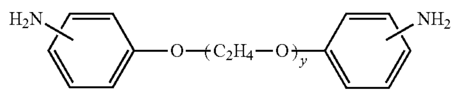

(D-5)

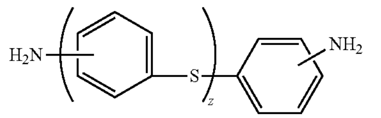

(y in the above formula (D-4) is an integer of 2 to 12 and z in the above formula (D-5) is an integer of 1 to 5); aromatic diamines having a hetero atom such as diaminotetraphenyl thiophene; aliphatic and alicyclic diamines such as metaxylylenediamine, 1,3-propanediamine, tetramethylenediamine, pentamethylenediamine, hexamethylenediamine, heptamethylenediamine, octamethylenediamine, nonamethylenediamine, 1,4-diaminocyclohexane, isophoronediamine, tetrahydrodicyclopentadienylenediamine, hexahydro-4,7-methanoindanylenedimethylenediamine, tricyclo $[6.2.1.0^{2,7}]$-undecylenedimethyldiamine and 4,4'-methylenebis(cyclohexylamine); and diaminoorganosiloxanes such as diaminohexamethyldisiloxane.

Out of these, preferred are p-phenylenediamine, 4,4'-diaminodiphenylmethane, 1,5-diaminonaphthalene, 2,7-diaminofluorene, 4,4'-diaminodiphenyl ether, 4,4'-(p-phenyleneisopropylidene)bisaniline, 2,2-bis[4-(4-aminophenoxy)phenyl]hexafluoropropane, 2,2-bis(4-aminophenyl)hexafluoropropane, 2,2-bis[4-(4-amino-2-trifluoromethylphenoxy)phenyl]hexafluoropropane, 4,4'-diamino-2,2'-bis(trifluoromethyl)biphenyl, 4,4'-bis[(4-amino-2-trifluoromethyl)phenoxy]-octafluorobiphenyl, 1-hexadecyloxy-2,4-diaminobenzene, 1-octadecyloxy-2,4-diaminobenzene, 1-cholesteryloxy-2,4-diaminobenzene, 1-cholestanyloxy-2,4-diaminobenzene, hexadecyloxy(3,5-diaminobenzoyl), octadecyloxy(3,5-diaminobenzoyl), cholesteryloxy(3,5-diaminobenzoyl), cholestanyloxy(3,5-diaminobenzoyl) and diamines represented by the above formulas (D-1) to (D-5).

These diamines may be used alone or in combination of two or more.

As for the ratio of the tetracarboxylic dianhydride to the diamine used in the synthesis reaction of the polyamic acid, the amount of the acid anhydride group of the tetracarboxylic dianhydride is preferably 0.2 to 2 equivalents, more preferably 0.3 to 1.2 equivalents based on 1 equivalent of the amino group contained in the diamine.

The synthesis reaction of the polyamic acid is carried out preferably in an organic solvent at a temperature of preferably −20 to 150° C., more preferably 0 to 100° C. for preferably 0.5 to 24 hours, more preferably 2 to 10 hours. The organic solvent is not particularly limited if it can dissolve the synthesized polyamic acid. Examples of the organic solvent include aprotic polar solvents such as N-methyl-2-pyrrolidone, N,N-dimethylacetamide, N,N-dimethylformamide, N,N-dimethylimidazolidinone, dimethyl sulfoxide, γ-butyrolactone, tetramethylurea and hexamethylphosphortriamide; and phenolic solvents such as m-cresol, xylenol, phenol and halogenated phenol. The amount (a) of the organic solvent is set to ensure that the total amount (b) of the tetracarboxylic dianhydride and the diamine becomes preferably 0.1 to 50 wt %, more preferably 5 to 30 wt % based on the total weight (a+b) of the reaction solution.

The reaction solution of the polyamic acid is obtained as described above. This reaction solution may be used to prepare a liquid crystal aligning agent directly or after the polyamic acid contained in the reaction solution is isolated, or after the isolated polyamic acid is purified. The polyamic acid can be isolated by a method in which the above reaction solution is injected into a large amount of a poor solvent to obtain a precipitate and this precipitate is dried under reduced pressure or a method in which the reaction solution is distilled off under reduced pressure by means of an evaporator. The polyamic acid can be purified by a method in which the polyamic acid is dissolved in an organic solvent again and precipitated with a poor solvent or a method in which the step of distilling off the reaction solution under reduced pressure by means of an evaporator is carried out once or several times.

[Polyimide]

The above polyimide can be produced by dehydrating/ring closing the amic acid structure of the polyamic acid obtained as described above. At this point, all of the amic acid structure may be dehydrated/ring closed to be completely imidized, or only part of the amic acid structure may be dehydrated/ring closed to obtain a partial imide having both an amic acid structure and an imide structure.

The dehydration ring-closure of the polyamic acid is carried out by (i) a method in which the polyamic acid is heated or (ii) a method in which the polyamic acid is dissolved in an organic solvent, a dehydrating agent and a dehydration ring-closure catalyst are added to the obtained solution and optionally heated.

In the above method (i) in which the polyamic acid is heated, the reaction temperature is preferably 50 to 200° C., more preferably 60 to 170° C. When the reaction temperature is lower than 50° C., the dehydration ring-closure reaction does not proceed fully and when the reaction temperature is higher than 200° C., the molecular weight of the obtained imidized polymer may lower. In this method in which the polyamic acid is heated, the reaction time is preferably 0.5 to 48 hours, more preferably 2 to 20 hours.

Meanwhile, in the above method (ii) in which a dehydrating agent and a dehydration ring-closure catalyst are added to the polyamic acid solution, an acid anhydride such as acetic anhydride, propionic anhydride or trifluoroacetic anhydride may be used as the dehydrating agent. The amount of the dehydrating agent is preferably 0.01 to 20 moles based on 1 mole of the structural unit of the polyamic acid. A tertiary amine such as pyridine, collidine, lutidine or triethylamine may be used as the dehydrating/ring closing catalyst. However, the catalyst is not limited to these. The amount of the dehydration ring-closure catalyst is preferably 0.01 to 10 moles based on 1 mole of the dehydrating agent. Examples of the organic solvent used in the dehydration ring-closure reaction are the same as the organic solvents enumerated above which are used to synthesize the polyamic acid. The reaction temperature of the dehydration ring-closure dehydration ring-closure reaction is preferably 0 to 180° C., more preferably 10 to 150° C., and the reaction time is preferably 0.5 to 20 hours, more preferably 1 to 8 hours.

The polyimide obtained in the above method (i) may be used to prepare a liquid crystal aligning agent directly or after the obtained polyimide is purified. Meanwhile, the reaction solution containing the polyimide is obtained in the above method (ii). This reaction solution may be used to prepare a liquid crystal aligning agent directly, or after the dehydrating agent and the dehydration ring-closure catalyst are removed from the reaction solution, after the polyimide is isolated or after the isolated polyimide is purified. To remove the dehydrating agent and the dehydration ring-closure catalyst from the reaction solution, means such as solvent substitution may be employed. The isolation and purification of the polyimide may be carried out by the same operations as described in the method of isolating and purifying the polyamic acid.

[Another Polyorganosiloxane]

The above another polyorganosiloxane can be synthesized by hydrolyzing or hydrolyzing/condensing at least one silane compound selected from the group consisting of an alkoxysilane compound and a halogenated silane compound (to be referred to as “raw silane compound” hereinafter) preferably in a suitable organic solvent in the present of water and a catalyst.

Examples of the raw silane compound which can be used herein include tetramethoxysilane, tetraethoxysilane, tetra-n-propoxysilane, tetra-iso-propoxysilane, tetra-n-butoxysilane, tetra-sec-butoxysilane, tetra-tert-butoxysilane and tetrachlorosilane; methyl trimethoxysilane, methyl triethoxysilane, methyl tri-n-propoxysilane, methyl tri-iso-propoxysilane, methyl tri-n-butoxysilane, methyl tri-sec-butoxysilane, methyl tri-tert-butoxysilane, methyl triphenoxysilane, methyl trichlorosilane, ethyl trimethoxysilane, ethyl triethoxysilane, ethyl tri-n-propoxysilane, ethyl tri-iso-propoxysilane, ethyl tri-n-butoxysilane, ethyl tri-sec-butoxysilane, ethyl tri-tert-butoxysilane, ethyl trichlorosilane, phenyl trimethoxysilane, phenyl triethoxysilane and phenyl trichlorosilane; dimethyl dimethoxysilane, dimethyl diethoxysilane and dimethyl dichlorosilane; and trimethylmethoxysilane, trimethylethoxysilane and trimethylchlorosilane. Out of these, preferred are tetramethoxysilane, tetraethoxysilane, methyl trimethoxysilane, methyl triethoxysilane, phenyl trimethoxysilane, phenyl triethoxysilane, dimethyl dimethoxysilane, dimethyl diethoxysilane, trimethyl methoxysilane and trimethyl ethoxysilane.

Examples of the organic solvent which may be optionally used to synthesize the another polyorganosiloxane include an alcohol compound, ketone compound, amide compound, ester compound and another aprotic compound. They may be used alone or in combination of two or more.

Examples of the above alcohol compound include monohydric alcohol compounds such as methanol, ethanol, n-propanol, i-propanol, n-butanol, i-butanol, sec-butanol, t-butanol, n-pentanol, i-pentanol, 2-methylbutanol, sec-pentanol, t-pentanol, 3-methoxybutanol, n-hexanol, 2-methylpentanol, sec-hexanol, 2-ethylbutanol, sec-heptanol, heptanol-3, n-octanol, 2-ethylhexanol, sec-octanol, n-nonyl alcohol, 2,6-dimethylheptanol-4, n-decanol, sec-undecylalcohol, trimethylnonyl alcohol, sec-tetradecyl alcohol, sec-heptadecyl alcohol, phenol, cyclohexanol, methyl cyclohexanol, 3,3,5-trimethylcyclohexanol, benzyl alcohol and diacetone alcohol; polyhydric alcohol compounds such as ethylene glycol, 1,2-propylene glycol, 1,3-butylene glycol, pentanediol-2,4, 2-methylpentanediol-2,4, hexanediol-2,5, heptanediol-2,4,2-ethylhexanediol-1,3, diethylene glycol, dipropylene glycol, triethylene glycol and tripropylene glycol; and partial ethers of a polyhydric alcohol compound such as ethylene glycol monomethyl ether, ethylene glycol monoethyl ether, ethylene glycol monopropyl ether, ethylene glycol monobutyl ether, ethylene glycol monohexyl ether, ethylene glycol monophenyl ether, ethylene glycol mono-2-ethylbutyl ether, diethylene glycol monomethyl ether, diethylene glycol monoethyl ether, diethylene glycol monopropyl ether, diethylene glycol monobutyl ether, diethylene glycol monohexyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether and dipropylene glycol monopropyl ether. These alcohol compounds may be used alone or in combination of two or more.

Examples of the above ketone compound include monoketone compounds such as acetone, methyl ethyl ketone, methyl-n-propyl ketone, methyl-n-butyl ketone, diethyl ketone, methyl-i-butyl ketone, methyl-n-pentyl ketone, ethyl-n-butyl ketone, methyl-n-hexyl ketone, di-i-butyl ketone, trimethyl nonanone, cyclohexanone, 2-hexanone, methyl cyclohexanone, 2,4-pentanedione, acetonitrile acetone, acetophenone and fenchone; and β-diketone compounds such as acetylacetone, 2,4-hexanedione, 2,4-heptanedione, 3,5-heptanedione, 2,4-octanedione, 3,5-octanedione, 2,4-nonanedione, 3,5-nonanedione, 5-methyl-2,4-hexanedione, 2,2,6,6-tetramethyl-3,5-heptanedione and 1,1,1,5,5,5-hexafluoro-2,4-heptanedione. These ketone compounds may be used alone or in combination of two or more.

Examples of the above amide compounds include formamide, N-methylformamide, N,N-dimethylformamide, N-ethylformamide, N,N-diethylformamide, acetamide, N-methylacetamide, N,N-dimethylacetamide, N-ethylacetamide, N,N-diethylacetamide, N-methylpropionamide, N-methylpyrrolidone, N-formylmorpholine, N-formylpiperidine, N-formylpyrrolidine, N-acetylmorpholine, N-acetylpiperidine and N-acetylpyrrolidine. These amide compounds may be used alone or in combination of two or more.

Examples of the above ester compound include diethyl carbonate, ethylene carbonate, propylene carbonate, diethyl carbonate, methyl acetate, ethyl acetate, γ-butyrolactone, γ-valerolactone, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, i-amyl propionate, diethyl oxalate, di-n-butyl oxalate, methyl lactate, ethyl lactate, n-butyl lactate, n-amyl lactate, diethyl malonate, dimethyl phthalate and diethyl phthalate. These ester compounds may be used alone or in combination of two or more.

Examples of the above another aprotic compound include acetonitrile, dimethyl sulfoxide, N,N,N',N'-tetraethyl sulfamide, hexamethylphosphoric triamide, N-methylmorphorone, N-methylpyrrole, N-ethylpyrrole, N-methyl-Δ3-pyrroline, N-methylpiperidine, N-ethylpiperidine, N,N-dimethylpiperazine, N-methylimidazole, N-methyl-4-piperidone, N-methyl-2-piperidone, N-methyl-2-pyrrolidone, 1,3-dimethyl-2-imidazolidinone and 1,3-dimethyltetrahydro-2(1H)-pyrimidinone.

Out of these solvents, polyhydric alcohol compounds, partial ethers of a polyhydric alcohol compound and ester compounds are particularly preferred.

The amount of water used to synthesize the another polyorganosiloxane is preferably 0.5 to 100 moles, more preferably 1 to 30 moles, much more preferably 1 to 1.5 moles based on 1 mole of the total of the alkoxyl group and halogen atom of the raw silane compound.

Examples of the catalyst which can be used to synthesize the another polyorganosiloxane include a metal chelate compound, organic acid, inorganic acid, organic base, ammonia and alkali metal compound.

Examples of the above metal chelate compound include titanium chelate compounds such as triethoxy.mono(acetylacetonato)titanium, tri-n-propoxy.mono(acetylacetonato)titanium, tri-i-propoxy.mono(acetylacetonato)titanium, tri-n-butoxy.mono(acetylacetonato)titanium, tri-sec-butoxy.mono (acetylacetonato)titanium, tri-t-butoxy.mono (acetylacetonato)titanium, diethoxy.bis(acetylacetonato) titanium, di-n-propoxy.bis(acetylacetonato)titanium, di-i-propoxy.bis(acetylacetonato)titanium, di-n-butoxy.bis (acetylacetonato)titanium, di-sec-butoxy.bis (acetylacetonato)titanium, di-t-butoxy.bis(acetylacetonato) titanium, monoethoxy.tris(acetylacetonato)titanium, mono-n-propoxy.tris(acetylacetonato)titanium, mono-i-propoxy.tris(acetylacetonato)titanium, mono-n-butoxy.tris (acetylacetonato)titanium, mono-sec-butoxy.tris (acetylacetonato)titanium, mono-t-butoxy.tris (acetylacetonato)titanium, tetrakis(acetylacetonato) titanium, triethoxy.mono(ethylacetoacetate)titanium, tri-n-propoxy.mono(ethylacetoacetate)titanium, tri-i-propoxy.mono(ethylacetoacetate)titanium, tri-n-butoxy.mono(ethylacetoacetate)titanium, tri-sec-butoxy.mono(ethylacetoacetate)titanium, tri-t-butoxy.mono (ethylacetoacetate)titanium, diethoxy.bis(ethylacetoacetate) titanium, di-n-propoxy.bis(ethylacetoacetate)titanium, di-i-propoxy.bis(ethylacetoacetate)titanium, di-n-butoxy.bis (ethylacetoacetate)titanium, di-sec-butoxy.bis (ethylacetoacetate)titanium, di-t-butoxy.bis (ethylacetoacetate)titanium, monoethoxy.tris (ethylacetoacetate)titanium, mono-n-propoxy.tris (ethylacetoacetate)titanium, mono-i-propoxy.tris (ethylacetoacetate)titanium, mono-n-butoxy.tris (ethylacetoacetate)titanium, mono-sec-butoxy.tris (ethylacetoacetate)titanium, mono-t-butoxy.tris (ethylacetoacetate)titanium, tetrakis(ethylacetoacetate) titanium, mono(acetylacetonato)tris(ethylacetoacetate) titanium, bis(acetylacetonato)bis(ethylacetoacetate)titanium and tris(acetylacetonato)mono(ethylacetoacetate)titanium; zirconium chelate compounds such as triethoxy.mono(acetylacetonato)zirconium, tri-n-propoxy.mono(acetylacetonato) zirconium, tri-i-propoxy.mono(acetylacetonato)zirconium, tri-n-butoxy.mono(acetylacetonato)zirconium, tri-sec-butoxy.mono(acetylacetonato)zirconium, tri-t-butoxy.mono (acetylacetonato)zirconium, diethoxy.bis(acetylacetonato) zirconium, di-n-propoxy.bis(acetylacetonato)zirconium, di-i-propoxy.bis(acetylacetonato)zirconium, di-n-butoxy.bis (acetylacetonato)zirconium, di-sec-butoxy.bis(acetylacetonato)zirconium, di-t-butoxy.bis(acetylacetonato)zirconium, monoethoxy.tris(acetylacetonato)zirconium, mono-n-propoxy.tris(acetylacetonato)zirconium, mono-i-propoxy.tris (acetylacetonato)zirconium, mono-n-butoxy.tris(acetylacetonato)zirconium, mono-sec-butoxy.tris(acetylacetonato) zirconium, mono-t-butoxy.tris(acetylacetonato)zirconium, tetrakis(acetylacetonato)zirconium, triethoxy.mono(ethylacetoacetate)zirconium, tri-n-propoxy.mono(ethylacetoacetate)zirconium, tri-i-propoxy.mono(ethylacetoacetate)zirconium, tri-n-butoxy.mono(ethylacetoacetate)zirconium, tri-sec-butoxy.mono(ethylacetoacetate)zirconium, tri-t-butoxy.mono(ethylacetoacetate)zirconium, diethoxy.bis(ethylacetoacetate)zirconium, di-n-propoxy.bis(ethylacetoacetate)zirconium, di-i-propoxy.bis(ethylacetoacetate)zirconium, di-n-butoxy.bis(ethylacetoacetate)zirconium, di-sec-butoxy.bis(ethylacetoacetate)zirconium, di-t-butoxy.bis(ethylacetoacetate)zirconium, monoethoxy.tris(ethylacetoacetate)zirconium, mono-n-propoxy.tris(ethylacetoacetate)zirconium, mono-i-propoxy.tris(ethylacetoacetate)zirconium, mono-n-butoxy.tris(ethylacetoacetate)zirconium, mono-sec-butoxy.tris(ethylacetoacetate)zirconium, mono-t-butoxy.tris(ethylacetoacetate)zirconium, tetrakis(ethylacetoacetate)zirconium, mono(acetylacetonato)tris(ethylacetoacetate)zirconium, bis(acetylacetonato)bis(ethylacetoacetate)zirconium and tris(acetylacetonato)mono(ethylacetoacetate)zirconium; and aluminum chelate compounds such as tris(acetylacetonato)aluminum and tris(ethylacetoacetate)aluminum.

Examples of the above organic acid include acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, mikimic acid, 2-ethylhexanoic acid, oleic acid, stearic acid, linoleic acid, linolenic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid and tartaric acid.

Examples of the above inorganic acid include hydrochloric acid, nitric acid, sulfuric acid, hydrofluoric acid and phosphoric acid.

Examples of the above organic base include pyridine, pyrrole, piperazine, piperidine, picoline, trimethylamine, triethylamine, monoethanolamine, diethanolamine, dimethyl monoethanolamine, monomethyl diethanolamine, triethanolamine, diazabicyclooclane, diazabicyclononane, diazabicycloundecene and tetramethylammonium hydroxide.

Examples of the above alkali metal compound include sodium hydroxide, potassium hydroxide, barium hydroxide and calcium hydroxide.

These catalysts may be used alone or in combination of two or more.

Out of these catalysts, metal chelate compounds, organic acids and inorganic acids are preferred, and titanium chelate compounds and organic acids are more preferred.

The amount of the catalyst is preferably 0.001 to 10 parts by weight, more preferably 0.001 to 1 part by weight based on 100 parts by weight of the raw silane compound.

Water which is added in the synthesis of the another polyorganosiloxane may be added to the raw silane compound or a solution prepared by dissolving the silane compound in an organic solvent intermittently or continuously.

The catalyst may be added to the raw silane compound or a solution prepared by dissolving the silane compound in an organic solvent in advance, or dissolved or dispersed into water to be added.

The reaction temperature for the synthesis of the another polyorganosiloxane is preferably 0 to 100° C., more preferably 15 to 80° C. The reaction time is preferably 0.5 to 24 hours, more preferably 1 to 8 hours.

[Amount of Another Polymer]

When the liquid crystal aligning agent of the present invention contains the above-described liquid crystal aligning polyorganosiloxane and another polymer, the content of the another polymer is preferably not more than 10,000 parts by weight based on 100 parts by weight of the liquid crystal aligning polyorganosiloxane. The more preferred content of the another polymer differs according to the type of the another polymer.

When the liquid crystal aligning agent of the present invention contains the liquid crystal aligning polyorganosiloxane and at least one polymer selected from the group consisting of a polyamic acid and a polyimide, the total amount of the polyamic acid and the polyimide is preferably 100 to 5,000 parts by weight, more preferably 200 to 2,000 parts by weight based on 100 parts by weight of the liquid crystal aligning polyorganosiloxane.

When the liquid crystal aligning agent of the present invention contains the liquid crystal aligning polyorganosiloxane and another polyorganosiloxane, the amount of the another polyorganosiloxane is preferably 100 to 2,000 parts by weight based on 100 parts by weight of the liquid crystal aligning polyorganosiloxane.

When the liquid crystal aligning agent of the present invention contains the liquid crystal aligning polyorganosiloxane and another polymer, the another polymer is preferably at least one polymer selected from the group consisting of a polyamic acid and a polyimide or another polyorganosiloxane. At least one polymer selected from the group consisting of a polyamic acid and a polyimide is particularly preferred.

[Oxiranyl Compound]

The above oxiranyl compound may be contained in the liquid crystal aligning agent of the present invention to further improve the adhesion to the surface of a substrate of the formed liquid crystal alignment film. Preferred examples of the oxiranyl compound include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromoneopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, N,N-diglycidyl-benzylamine and N,N-diglycidyl-aminomethylcyclohexane. The amount of the oxiranyl compound is preferably not more than 40 parts by weight, more preferably 0.1 to 30 parts by weight based on 100 parts by weight of the total of the polymers (the total of the liquid crystal aligning polyorganosiloxane and the another polymer, the same shall apply hereinafter). When the liquid crystal aligning agent of the present invention contains an oxiranyl compound, a basic catalyst such as 1-benzyl-2-methylimidazole may be used to cause the crosslinking reaction of the oxiranyl group efficiently.

[Functional Silane Compound]

The above functional silane compound may be used to improve the adhesion to a substrate of the obtained liquid crystal alignment film. Examples of the functional silane compound include 3-aminopropyl trimethoxysilane, 3-aminopropyl triethoxysilane, 2-aminopropyl trimethoxysilane, 2-aminopropyl triethoxysilane, N-(2-aminoethyl)-3-aminopropyl trimethoxysilane, N-(2-aminoethyl)-3-aminopropylmethyl dimethoxysilane, 3-ureidopropyl trimethoxysilane, 3-ureidopropyl triethoxysilane, N-ethoxycarbonyl-3-aminopropyl trimethoxysilane, N-ethoxycarbonyl-3-aminopropyl triethoxysilane, N-triethoxysilylpropyl triethylenetriamine, N-trimethoxysilylpropyl triethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyl trimethoxysilane, N-benzyl-3-aminopropyl triethoxysilane, N-phenyl-3-aminopropyl trimethoxysilane, N-phenyl-3-aminopropyl triethoxysilane, N-bis(oxyethylene)-3-aminopropyl trimethoxysilane, N-bis(oxyethylene)-3-aminopropyl triethoxysilane, 3-glycidoxypropyl trimethoxysilane and 2-(3,4-epoxycyclohexyl)ethyl trimethoxysilane. Further, reaction products of a tetracarboxylic dianhydride and a silane compound having an amino group as disclosed by JP-A 63-291922 are also included in the above examples.

When the liquid crystal aligning agent of the present invention contains a functional silane compound, the amount of the functional silane compound is preferably not more than 50 parts by weight, more preferably not more than 20 parts by weight based on 100 parts by weight of the total of all the polymers.

[Curing Agent, Curing Catalyst]

The above curing agent and the above curing catalyst may be contained in the liquid crystal aligning agent of the present invention in order to make the crosslinking of the liquid crystal aligning polyorganosiloxane stronger and further improve the strength of the liquid crystal alignment film. When the liquid crystal aligning agent of the present invention contains a curing agent, a curing accelerator may be used in combination.

As the above curing agent may be used a curing agent which is generally used for the curing of an oxiranyl group. As the curing agent may be used a polyamine, polycarboxylic anhydride or polycarboxylic acid. Examples of the polycarboxylic anhydride include cyclohexane-1,2,4-tricarboxylic acid, cyclohexane-1,3,5-tricarboxylic acid and cyclohexane-1,2,3-tricarboxylic acid. Examples of the cyclohexanetricarboxylic anhydride include cyclohexane-1,3,4-tricarboxylic-3,4-anhydride, cyclohexane-1,3,5-tricarboxylic-3,5-anhydride, cyclohexane-1,2,3-tricarboxylic-2,3-anhydride, 4-methyltetrahydrophthalic anhydride, methylnudic anhydride, dodecenylsuccinic anhydride, Diels-Alder reaction product of an alicyclic compound having a conjugated double bond such as α-terpinene and alloocimene and maleic anhydride, hydrogenated products thereof, succinic anhydride, maleic anhydride, phthalic anhydride, trimellitic anhydride and the compounds enumerated above as tetracarboxylic dianhydrides used for the synthesis of the polyamic acid.

Examples of the above curing accelerator include imidazole compounds, quaternary phosphorus compounds, quaternary amine compounds, and diazabicycloalkenes such as 1,8-diazabicyclo[5.4.0]undecene-7 and organic acid salts thereof; organic metal compounds such as zinc octylate, tin octylate and aluminum acetylacetone complex; boron compounds such as boron trifluoride and triphenyl borate; metal halogen compounds such as zinc chloride and stannic chloride; high-melting point dispersible latent curing accelerators such as amine addition type accelerators including dicyandiamide and an adduct of an amine and epoxy resin; microcapsule type latent curing accelerators prepared by coating a curing accelerator such as the above quaternary phosphonium salt with a polymer; amine salt type latent curing accelerators; and high-temperature dissociation type thermally cationic polymerization latent curing accelerators such as Lewis acid salts and Brϕnsted acid salts.

As the above curing catalyst may be used an antimony hexafluoride compound, phosphorus hexafluoride compound or trisacetylacetonatoaluminum.

[Surfactant]

Examples of the above surfactant include a nonionic surfactant, anionic surfactant, cationic surfactant, amphoteric surfactant, silicone surfactant, polyalkylene oxide surfactant and fluorine-containing surfactant.

When the liquid crystal aligning agent of the present invention contains a surfactant, the amount of the surfactant is preferably not more than 10 parts by weight, more preferably not more than 1 part by weight based on 100 parts by weight of the whole liquid crystal aligning agent.

<Liquid Crystal Aligning Agent>

The liquid crystal aligning agent of the present invention contains the liquid crystal aligning polyorganosiloxane as an essential component and optionally other components as described above and is preferably prepared as a composition solution obtained by dissolving these components in an organic solvent. Preferably, the organic solvent which can be used to prepare the liquid crystal aligning agent of the present invention dissolves the liquid crystal aligning polyorganosiloxane and optional other components and does not react with these.

The organic solvent which can be preferably used for the liquid crystal aligning agent of the present invention differs according to the type of the another polymer which is optionally added.

Preferred examples of the organic solvent which is used when the liquid crystal aligning agent of the present invention contains the liquid crystal aligning polyorganosiloxane and at least one polymer selected from a polyamic acid and a polyimide are organic solvents enumerated above which are used to synthesize the polyamic acid. These organic solvents may be used alone or in combination of two or more.

Meanwhile, when the liquid crystal aligning agent of the present invention contains only a liquid crystal aligning group-containing polyorganosiloxane as a polymer, or when the liquid crystal aligning agent contains a liquid crystal aligning group-containing polyorganosiloxane and another polyorganosiloxane, preferred examples of the organic solvent include 1-ethoxy-2-propanol, propylene glycol monoethyl ether, propylene glycol monopropyl ether, propylene glycol monobutyl ether, propylene glycol monoacetate, dipropylene glycol methyl ether, dipropylene glycol ethyl ether, dipropylene glycol propyl ether, dipropylene glycol dimethyl ether, ethylene glycol monomethyl ether, ethylene glycol monoethyl ether, ethylene glycol monopropyl ether, ethylene glycol monobutyl ether (butyl cellosolve), ethylene glycol monoamyl ether, ethylene glycol monohexyl ether, diethylene glycol, methyl cellosolve acetate, ethyl cellosolve acetate, propyl cellosolve acetate, butyl cellosolve acetate, methyl carbitol, ethyl carbitol, propyl carbitol, butyl carbitol, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, n-hexyl acetate, cyclohexyl acetate, octyl acetate, amyl acetate and isoamyl acetate. Out of these, n-propyl acetate, i-propyl acetate, n-butyl acetate, i-butyl acetate, sec-butyl acetate, n-pentyl acetate and sec-pentyl acetate are preferred.

As the preferred solvent used for the preparation of the liquid crystal aligning agent of the present invention, the organic solvents listed above may be used alone or in combination of two or more according to whether another polymer is used or not and the type of that polymer to ensure that the components contained in the liquid crystal aligning agent do not separate out when the solids content is in the preferred range below and that the surface tension of the liquid crystal aligning agent falls in the range of 25 to 40 mN/m.

The solids content of the liquid crystal aligning agent of the present invention, that is, the ratio of the total weight of all the components except for the solvent in the liquid crystal aligning agent to the whole weight of the liquid crystal aligning agent is selected in consideration of viscosity and volatility but preferably 1 to 10 wt. %. The liquid crystal aligning agent of the present invention is applied to the surface of a substrate to form a coating film as a liquid crystal alignment film. When the solids content is lower than 1 wt %, the thickness of this coating film becomes too small, thereby making it difficult to obtain a satisfactory liquid crystal alignment film. When the solids content is higher than 10 wt %, the thickness of the coating film becomes too large, thereby making it difficult to obtain a satisfactory liquid crystal alignment film, and the viscosity of the liquid crystal aligning agent becomes too high, whereby coating properties may become unsatisfactory. The particularly preferred solids content differs according to means of applying the liquid crystal aligning agent to the substrate. For example, when a spinner is used, the solids content is particularly preferably 1.5 to 4.5 wt %. In the case of printing, the solids content is particularly preferably set to 3 to 9 wt %, thereby setting the solution viscosity to 12 to 50 mPa·s. In the case of ink jet coating, the solids content is particularly preferably set to 1 to 5 wt %, thereby setting the solution viscosity to 3 to 15 mPa·s.

The temperature for the preparation of the liquid crystal aligning agent of the present invention is preferably 0 to 200° C., more preferably 10 to 60° C.

<Liquid Crystal Display Device>

The liquid crystal display device of the present invention comprises a liquid crystal alignment film formed from the above-described liquid crystal aligning agent of the present invention.

The method of forming the liquid crystal alignment film from the liquid crystal aligning agent of the present invention differs according to the structure of the group R of the compound R—Z used in the synthesis of the liquid crystal aligning polyorganosiloxane in the present invention.

When the compound R—Z does not have the structure represented by the above formula (2), the liquid crystal alignment film can be obtained by applying the liquid crystal aligning agent of the present invention to a substrate to form a coating film and optionally rubbing the coating film.

When the compound R—Z has the structure represented by the above formula (2), the liquid crystal alignment film can be obtained by applying the liquid crystal aligning agent of the present invention to a substrate to form a coating film and applying radiation to the coating film.

[When the Compound R—Z Does Not have the Structure Represented by the Above Formula (2)]

The coating film is first formed on a substrate by applying the liquid crystal aligning agent of the present invention to the substrate and heating the coated surface. The liquid crystal aligning agent of the present invention is applied to the transparent conductive film formed surfaces of a pair of substrates having a patterned transparent conductive film by roll coating, spinner coating, printing or ink jet coating. The coated surfaces are prebaked and then post-baked to form a coating film. The prebaking is carried out, for example, at a temperature of 40 to 120° C. for 0.1 to 5 minutes, and the post-baking is carried out at preferably 120 to 300° C., more preferably 150 to 250° C. for preferably 5 to 200 minutes, more preferably 10 to 100 minutes. The thickness of the coating film after post-baking is preferably 0.001 to 1 μm, more preferably 0.005 to 0.5 μm.

The above substrate is a transparent substrate obtained from glass such as float glass or soda glass; or plastic such as polyethylene terephthalate, polybutylene terephthalate, polyether sulfone, polycarbonate or alicyclic polyolefin.

As the transparent conductive film formed on one side of the substrate may be used a NESA film (the registered trademark of PPG of the U.S.) obtained from tin oxide ($SnO_2$) or an ITO film of indium oxide-tin oxide ($In_2O_3$—$SnO_2$). To obtain the patterned transparent conductive film, the transparent conductive film is formed without patterning and then a pattern is formed by photoetching, or a mask having a desired pattern is used at the time of forming the transparent conductive film. For the application of the liquid crystal aligning agent, to further improve the adhesion to the surface of the substrate and the transparent conductive film of the coating film, a pre-treatment for applying a functional silane compound or a functional titanium compound may be carried out on a plane on which the coating film is to be formed of the surface of the substrate.

When the liquid crystal aligning agent of the present invention is used to form a liquid crystal alignment film for homeotropic alignment type liquid crystal display devices, although the coating film formed as described above may be directly used as a liquid crystal alignment film for homeotropic alignment type liquid crystal display devices, this coating film may be optionally rubbed. When the liquid crystal aligning agent of the present invention is used to form a liquid crystal alignment film for horizontal alignment type liquid crystal display devices, a liquid crystal alignment film can be obtained by rubbing the coating film formed as described above.

The above rubbing can be carried out in a fixed direction with a roll wound with nylon, rayon or cotton fiber cloth. In this case, the pretilt angle may be changed by applying ultraviolet radiation to part of the formed liquid crystal alignment film as disclosed by JP-A 6-222366 and JP-A 6-281937, or the view field characteristics of the obtained horizontal alignment type liquid crystal display device may be improved by forming a resist film on part of the surface of the formed liquid crystal alignment film, rubbing the liquid crystal alignment film in a direction different from the above rubbing direction, and removing the resist film so that the liquid crystal alignment film can have different liquid crystal alignability in each region as disclosed by JP-A 5-107544.

Two substrates having this liquid crystal alignment film formed as described above are prepared and liquid crystals are interposed between the two substrates to fabricate a liquid crystal cell. To fabricate the liquid crystal cell, the following two processes may be employed.

The first process is a conventionally known process. First, two substrate are opposed to each other through a cell gap in such a manner that the liquid crystal alignment films of these substrates are opposed to each other, a sealing agent is used to join together the peripheral portions of the two substrates, liquid crystals are injected into the cell gap defined by the surfaces of the substrates and the sealing agent to fill the gap, and an injection hole is closed up to fabricate the liquid crystal cell.

The second process is called “ODF (One Drop Fill) process”. An ultraviolet curable sealing agent is applied to a predetermined position of one of the two substrates having a liquid crystal alignment film, liquid crystals are dropped on the surface of the liquid crystal alignment film, the other substrate is joined to the above substrate in such a manner that the liquid crystal alignment films of these substrates are opposed to each other, and ultraviolet radiation is applied to the entire surfaces of the substrates to cure the sealing agent so as to fabricate a liquid crystal cell.

In all of the above processes, after the liquid crystal cell is heated until the liquid crystals used take an isotropic phase, it is desired that flow alignment at the time of injection should be removed by gradually cooling the liquid crystal cell to room temperature.

Then, the liquid crystal display device of the present invention can be obtained by joining a polarizing plate to the outer surfaces of the liquid crystal cell.

As the above sealing agent may be used epoxy resin containing aluminum oxide spheres as a spacer and a curing agent.

As the above liquid crystals may be used nematic liquid crystals or smectic liquid crystals. To fabricate a liquid crystal display device having a TN liquid crystal cell or an STN liquid crystal cell, nematic liquid crystals having positive dielectric anisotropy (positive liquid crystals) are preferred, such as biphenyl-based liquid crystals, phenylcyclohexane-based liquid crystals, ester-based liquid crystals, terphenyl-based liquid crystals, biphenylcyclohexane-based liquid crystals, pyrimidine-based liquid crystals, dioxane-based liquid crystals, bicyclooctane-based liquid crystals and cubane-based liquid crystals. Cholesteric liquid crystals such as cholestyl chloride, cholesteryl nonanoate and cholesteryl carbonate; chiral agents marketed under the trade names of C-15 and CB-15 (of Merk & Co., Inc.); and ferroelectric liquid crystals such as p-decyloxybenzilidene-p-amino-2-methylbutyl cinnamate may be further added to these liquid crystals.

In the case of the homeotropic alignment type liquid crystal cell, nematic liquid crystals having negative dielectric anisotropy (negative liquid crystals) are preferred, such as dicyanobenzene-based liquid crystals, pyridazine-based liquid crystals, Schiff base-based liquid crystals, azoxy-based liquid crystals, biphenyl-based liquid crystals and phenylcyclohexane-based liquid crystals.

The polarizing plate placed on the outer sides of the liquid crystal cell may be a polarizing plate produced by sandwiching a polarizing film called "H film" which has absorbed iodine while polyvinyl alcohol is stretched and oriented between cellulose acetate protective films, or a polarizing plate composed of the H film itself.

[When the Compound R—Z has the Structure Represented by the Formula (2)]

In this case, a liquid crystal display device can be fabricated by applying radiation in stead of rubbing in the method of producing a liquid crystal alignment film when the above compound R—Z does not have the structure represented by the above formula (2).

The radiation used above may be linearly polarized radiation, partially polarized radiation or non-polarized radiation, for example, ultraviolet radiation or visible radiation including light having a wavelength of 150 to 800 nm, preferably ultraviolet radiation including light having a wavelength of 300 to 400 nm. When the radiation used is linearly polarized or partially polarized, the radiation may be applied in a direction perpendicular to the surface of the substrate, an oblique direction to provide a pretilt angle, or both directions. To apply non-polarized radiation, the application direction must be an oblique direction.

Examples of the light source used include low-pressure mercury lamp, high-pressure mercury lamp, deuterium lamp, metal halide lamp, argon resonance lamp, xenon lamp and excimer laser. The above ultraviolet radiation having a preferred wavelength range can be obtained by using the above light source in combination with a filter or a diffraction grating.

The dose of the radiation is preferably 1 $J/m^2$ or more and less than 10,000 $J/m^2$, more preferably 10 to 3,000 $J/m^2$. To provide liquid crystal alignability to a coating film formed from a conventionally known liquid crystal aligning agent by the photo-alignment method, a dose of 10,000 $J/m^2$ or more is required. However, when the liquid crystal aligning agent of the present invention is used, if the dose in the photo-alignment method is 3,000 $J/m^2$ or less, even 1,000 $J/m^2$ or less, excellent liquid crystal alignability can be provided, thereby reducing the production cost of a liquid crystal display device.

In this text, the term "pretilt angle" means the inclination angle of liquid crystal molecules from a direction parallel to the surface of the substrate.

The liquid crystal display device of the present invention fabricated as described above has excellent heat resistance, light resistance and electric properties and is free from the deterioration of liquid crystal alignability as its voltage holding ratio rarely lowers even when it is exposed to high-intensity light in a high-temperature environment for a long time.

EXAMPLES

The following examples are provided for the purpose of further illustrating the present invention but are in no way to be taken as limiting.

The weight average molecular weight in the following examples is a value in terms of polystyrene measured by gel permeation chromatography under the following conditions.

Column: TSKgelGRCXLII of Tosoh Corporation

Solvent: tetrahydrofuran

Temperature: 40° C.

Pressure: 68 $kgf/cm^2$

The epoxy equivalent was measured in accordance with the "hydrochloric acid-methyl ethyl ketone method" prescribed in JIS C2105.

Required amounts of products used in synthesis examples and examples below were ensured by repeating the following synthesis examples on the following synthesis scales as required.

<Synthesis of Reactive Polyorganosiloxane>

Synthesis Example 1

100.0 g of 2-(3,4-epoxycyclohexyl)ethyl trimethoxysilane, 500 g of methyl isobutyl ketone and 10.0 g of triethylamine were fed to a reactor equipped with a stirrer, a thermometer, a dropping funnel and a reflux cooling tube and mixed together at room temperature. Thereafter, 100 g of deionized water was added dropwise to the resulting mixture from the dropping funnel over 30 minutes to carry out a reaction at 80° C. for 6 hours while it was mixed under reflux. After the end of the reaction, an organic layer was taken out and washed with a 0.2 wt % ammonium nitrate aqueous solution until water after washing became neutral, and the solvent and water were distilled off under reduced pressure to obtain a reactive polyorganosiloxane EPS-1 as a viscous transparent liquid.

When this reactive polyorganosiloxane EPS-1 was analyzed by $^1$H-NMR, a peak based on the oxiranyl group and having theoretical intensity was seen at around a chemical shift (δ) of 3.2 ppm. Thus, it was confirmed that a side reaction of the oxiranyl group did not occur during the reaction.

The viscosity, Mw and epoxy equivalent of this reactive polyorganosiloxane are shown in Table 1.

Synthesis Examples 2, 3 and 6 to 11

Reactive polyorganosiloxanes EPS-2, -3 and -6 to -10 were obtained as viscous transparent liquids in the same manner as in Synthesis Example 1 except that the charged raw materials were changed as shown in Table 1.

Mw's and epoxy equivalents of these reactive polyorganosiloxanes are shown in Table 1.

Synthesis Example 4

After 150 g of isopropanol, 5.4 g of a 10 wt % tetramethylammonium hydroxide aqueous solution (containing 5.93 mmol of tetramethylammonium hydroxide and 270 mmol of water) and 12 g of water were fed to a reactor equipped with a stirrer and a thermometer, 42.5 g (180 mmol) of γ-glycidoxypropyl trimethoxysilane was gradually added to the resulting mixture to carryout a reaction under agitation at room temperature for 20 hours.

After the end of the reaction, 200 g of toluene was added to the reaction mixture, and isopropanol was removed under reduced pressure. As for the residue, the reaction solution was washed in distilled water by using a separating funnel. After washing in distilled water was repeated until the water layer of the separating funnel became neutral, an organic layer was recovered and dehydrated with anhydrous sodium sulfate, and toluene was distilled off under reduced pressure to obtain a reactive polyorganosiloxane EPS-4.

The weight average molecular weight Mw and epoxy equivalent of this reactive polyorganosiloxane EPS-4 are shown in Table 1.

Synthesis Example 5

A reactive polyorganosiloxane EPS-5 was obtained in the same manner as in the above Synthesis Example 1 except that the reaction temperature was changed to 70° C. and the reaction time was changed to 7 hours.

The weight average molecular weight Mw and epoxy equivalent of this reactive polyorganosiloxane EPS-5 are shown in Table 1.

In Table 1, the symbols of the raw silane compounds denote the following compounds.

ECETS: 2-(3,4-epoxycyclohexyl)ethyl trimethoxysilane

MTMS: methyltrimethoxysilane

PTMS: phenyltrimethoxysilane

GPTMS: 3-gycidyloxypropyl trimethoxysilane

MCTMS: 3-methacryloxypropyl trimethoxysilane

MRTMS: 3-mercaptopropyl trimethoxysilane

ATMS: 3-acryloxypropyl trimethoxysilane

The reactive groups of the synthesized reactive polyorganosiloxanes are as follows.

EPS-1 to 5, 10 and 11: oxiranyl group

EPS-6: oxiranyl group and methacryloyloxyl group

EPS-7: oxiranyl group and mercapto group

EPS-8 and 9: oxiranyl group and acryloyloxyl group

TABLE 1

| | Name of reactive polyorganosiloxane | raw silane compound (g) | | | | | | | Mw | Epoxy equivalent (g/mole) |
|---|---|---|---|---|---|---|---|---|---|---|
| | | ECETS | MTMS | PTMS | GPTMS | MCTMS | MRTMS | ATMS | | |
| SE 1 | EPS-1 | 100 | 0 | 0 | 0 | 0 | 0 | 0 | 2,200 | 186 |
| SE 2 | EPS-2 | 80 | 20 | 0 | 0 | 0 | 0 | 0 | 2,500 | 210 |
| SE 3 | EPS-3 | 80 | 0 | 20 | 0 | 0 | 0 | 0 | 2,000 | 228 |
| SE 4 | EPS-4 | 0 | 0 | 0 | 42.5 | 0 | 0 | 0 | 3,000 | 183 |
| SE 5 | EPS-5 | 100 | 0 | 0 | 0 | 0 | 0 | 0 | 2,300 | 185 |
| SE 6 | EPS-6 | 80 | 0 | 0 | 0 | 20 | 0 | 0 | 2,100 | 248 |
| SE 7 | EPS-7 | 50 | 0 | 0 | 0 | 0 | 50 | 0 | 4,100 | 330 |
| SE 8 | EPS-8 | 50 | 0 | 0 | 0 | 0 | 0 | 50 | 2,000 | 340 |
| SE 9 | EPS-9 | 80 | 0 | 0 | 0 | 0 | 0 | 20 | 1,900 | 249 |
| SE 10 | EPS-10 | 50 | 50 | 0 | 0 | 0 | 0 | 0 | 4,200 | 258 |
| SE 11 | EPS-11 | 50 | 0 | 50 | 0 | 0 | 0 | 0 | 3,800 | 320 |

SE: Synthesis Example

<Synthesis of Compound R—COOH>

[Synthesis of Compound Represented by the Above Formula (A-1)]

Synthesis Example A-1-C(1)

A compound (A-1-C1-1) was synthesized based on the following scheme.

(A-1-C1-1)

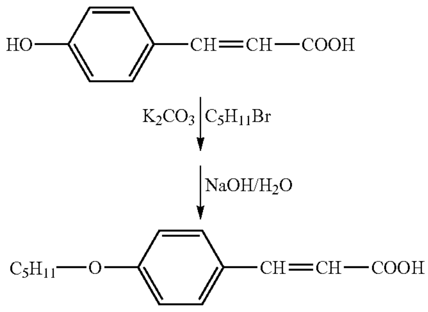

After 82 g of p-hydroxycinnamic acid, 304 g of potassium carbonate and 400 ml of N-methyl-2-pyrrolidone were fed to a 1-liter eggplant-shaped flask and stirred at room temperature for 1 hour, 166 g of 1-bromopentane was added to the resulting mixture and stirred at 100° C. for 5 hours. Thereafter, the solvent was distilled off under reduced pressure. 48 g of sodium hydroxide and 400 ml of water were added to the obtained residue and refluxed for 3 hours to carry out a hydrolytic reaction. After the end of the reaction, the reaction system was neutralized with hydrochloric acid, and the formed precipitate was collected and recrystallized with ethanol to obtain 80 g of a white crystal of the compound (A-1-C1-1).

Synthesis Example A-1-C(2)

A compound (A-1-C4-1) was synthesized based on the following scheme.

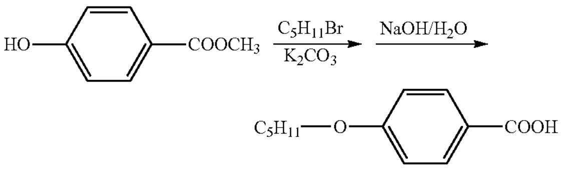

(A-1-C4-1A)

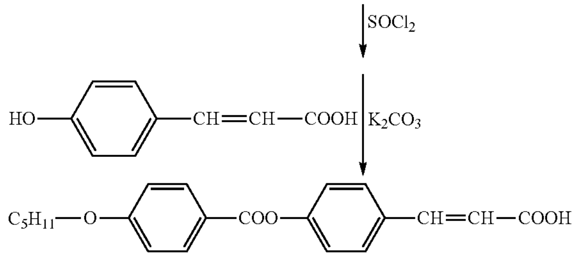

(A-1-C4-1)

After 91.3 g of p-hydroxybenzoic acid, 182.4 g of potassium carbonate and 320 ml of N-methyl-2-pyrrolidone were fed to a 1-liter eggplant-shaped flask and stirred at room temperature for 1 hour, 99.7 g of 1-bromopentane was added to the resulting mixture to carry out a reaction under agitation at 100° C. for 5 hours. After the end of the reaction, reprecipitation was carried out with water. Then, 48 g of sodium hydroxide and 400 ml of water were added to this precipitate and refluxed for 3 hours to carry out a hydrolytic reaction. After the end of the reaction, the reaction solution was neutralized with hydrochloric acid, and the formed precipitate was recrystallized with ethanol to obtain 104 g of a white crystal of a compound (A-1-C4-1A).

104 g of this compound (A-1-C4-1A) was put into a reactor, and 1 liter of thionyl chloride and 770 μl of N,N-dimethylformamide were added to this compound and stirred at 80° C. for 1 hour. Then, thionyl chloride was distilled off under reduced pressure, methylene chloride was added, the resulting mixture was washed with a sodium hydrogen carbonate aqueous solution, dried with magnesium sulfate and concentrated, and tetrahydrofuran was added to prepare a solution.

Thereafter, 74 g of 4-hydroxycinnamic acid, 138 g of potassium carbonate, 4.8 g of tetrabutylammonium, 500 ml of tetrahydrofuran and 1 liter of water were fed to a different 5-liter three-necked flask. This aqueous solution was cooled with ice, and a tetrahydrofuran solution containing a reaction product of the above compound (A-1-C4-1A) and thionyl chloride was added dropwise slowly to carry out a reaction under agitation for 2 hours. After the end of the reaction, hydrochloric acid was added to the reaction mixture to neutralize it, extraction was carried with ethyl acetate, and the extract was dried with magnesium sulfate, concentrated and recrystallized with ethanol to obtain 90 g of a white crystal of the compound (A-1-C4-1).

Synthesis Example A-1-C(3)

A compound (A-1-C4-2) was synthesized based on the following scheme.

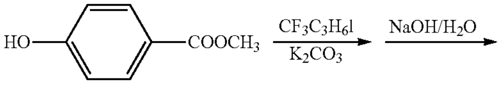

-continued

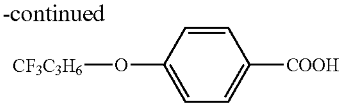

(A-1-C4-2A)

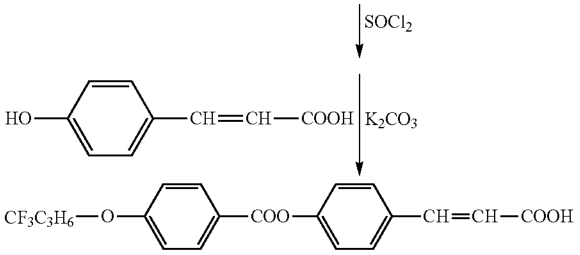

(A-1-C4-2)

After 82 g of methyl 4-hydroxybenzoate, 166 g of potassium carbonate and 400 ml of N,N-dimethylacetamide were fed to a 1-liter eggplant-shaped flask and stirred at room temperature for 1 hour, 95 g of 4,4,4-trifluoro-1-iodobutane was added to carry out a reaction under agitation at room temperature for 5 hours. After the end of the reaction, reprecipitation was carried out with water. Then, 32 g of sodium hydroxide and 400 ml of water were added to this precipitate and refluxed for 4 hours to carry out a hydrolytic reaction. After the end of the reaction, the reaction product was neutralized with hydrochloric acid, and the formed precipitate was recrystallized with ethanol to obtain 80 g of a white crystal of a compound (A-1-C4-2A).

46.4 g of this compound (A-1-C4-2A) was put into a reactor, and 200 ml of thionyl chloride and 0.2 ml of N,N-dimethylformamide were added to this compound and stirred at 80° C. for 1 hour. Then, thionyl chloride was distilled off under reduced pressure, methylene chloride was added, the resulting mixture was washed with a sodium hydrogen carbonate aqueous solution, dried with magnesium sulfate and concentrated, and tetrahydrofuran was added to prepare a solution.

Thereafter, 36 g of 4-hydroxycinnamic acid, 55 g of potassium carbonate, 2.4 g of tetrabutylammonium, 200 ml of tetrahydrofuran and 400 ml of water were fed to a different 2-liter three-necked flask. This aqueous solution was cooled with ice, and a tetrahydrofuran solution containing a reaction product of the above compound (A-1-C4-2A) and thionyl chloride was added dropwise slowly to carry out a reaction under agitation for 2 hours. After the end of the reaction, hydrochloric acid was added to the reaction mixture to neutralize it, extraction was carried with ethyl acetate, and the extract was dried with magnesium sulfate, concentrated and recrystallized with ethanol to obtain 39 g of a white crystal of the compound (A-1-C4-2).

Synthesis Example A-1-C(4)

A compound (A-1-C4-3) was synthesized based on the following scheme.

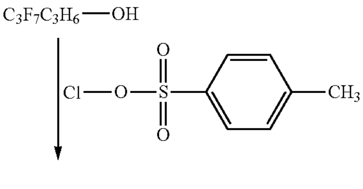

-continued

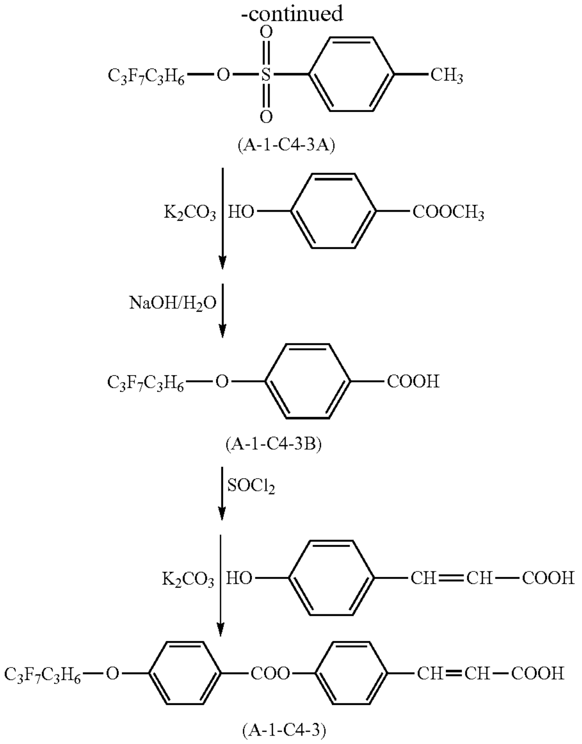

(A-1-C4-3A)

(A-1-C4-3B)

(A-1-C4-3)

53 g of 3,3,4,4,5,5,5-heptafluoropentanol and 100 ml of pyridine were fed to a 500 ml eggplant-shaped flask and cooled with ice. A solution prepared by dissolving 63 g of p-toluenesulfonic acid chloride in 100 ml of pyridine was added dropwise to the resulting mixture over 30 minutes and further stirred at room temperature for 5 hours to carryout a reaction. After the end of the reaction, 120 ml of concentrated hydrochloride acid and 500 g of ice were added to the reaction mixture, ethyl acetate was further added, and an organic layer was washed with water and a saturated sodium hydrogen carbonate aqueous solution sequentially. The organic layer was dried with magnesium sulfate, concentrated and dried up to obtain 96 g of a compound (A-1-C4-3A).

Then, 96 g of this compound (A-1-C4-3A), 55 g of methyl 4-hydroxybenzoate, 124 g of potassium carbonate and 300 ml of N,N-dimethylacetamide were fed to a 500 ml three-necked flask equipped with a thermometer and stirred at 80° C. for 8 hour to carry out a reaction. After the end of the reaction, ethyl acetate was added to the reaction mixture, and an organic layer was rinsed in water. The organic layer was then dried with magnesium sulfate, concentrated and dried up to obtain a white powder. 60 g of sodium hydroxide, 300 ml of water and 300 ml of tetrahydrofuran were added to this white powder to carryout a reaction under reflux for 24 hours. After the end of the reaction, filtration was carried out, and concentrated hydrochloric acid was added to the filtrate to neutralize it so as to produce a white precipitate. This precipitate was separated by filtration and recrystallized with ethanol to obtain 34 g of a white crystal of a compound (A-1-C4-3B).

Thereafter, 100 ml of thionyl chloride and 0.2 ml of N,N-dimethylformamide were added to 34 g of this compound (A-1-C4-3B) and stirred at 80° C. for 1 hour to carry out a reaction. Then, thionyl chloride was distilled off under reduced pressure, and methylene chloride was added. An organic layer was washed with a sodium hydrogen carbonate aqueous solution, dried with magnesium sulfate and concentrated, and tetrahydrofuran was added to the organic layer.

14 g of 4-hydroxycinnamic acid, 22 g of potassium carbonate, 0.96 g of tetrabutylammonium, 80 ml of tetrahydrofuran and 160 ml of water were fed to a different 2-liter three-necked flask. A tetrahydrofuran solution containing a reaction product of the above compound (A-1-C4-3B) and thionyl chloride was added dropwise slowly and then stirred for another 2 hours to carryout a reaction. After the end of the reaction, hydrochloric acid was added to the reaction mixture to neutralize it, extraction was carried with ethyl acetate, and the extract was dried with magnesium sulfate, concentrated and recrystallized with ethanol to obtain 19 g of a white crystal of the compound (A-1-C4-3).

Synthesis Example A-1-C(5)

A compound (A-1-C8-1) was synthesized based on the following scheme.

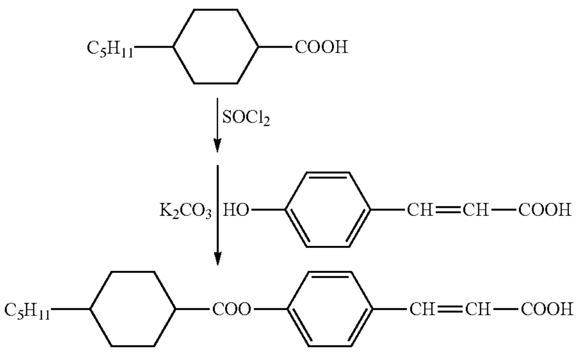

(A-1-C8-1)

That is, 13 g of a white crystal of the compound (A-1-C8-1) was obtained in the same manner as in the synthesis of the compound (A-1-C4-1) in the above Synthesis Example A-1-C(2) except that 9.91 g of 4-pentyl-transcyclohexylcarbxylic acid was used in place of the compound (A-1-C4-1A).

Synthesis Example A-1-C(6)

A compound (A-1-C9-1) was synthesized based on the following scheme.

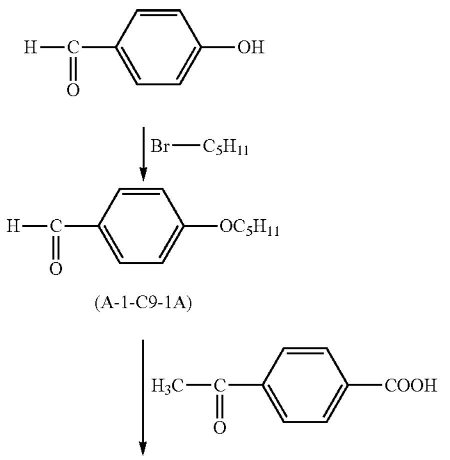

(A-1-C9-1A)

-continued

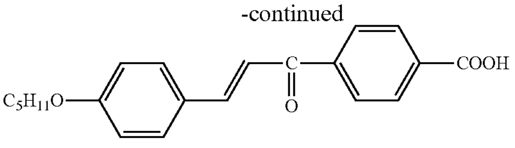

(A-1-C9-1)

24.4 g of 4-hydroxybenzaldehyde, 27.6 g of potassium carbonate, 1.0 g of potassium iodide and 500 ml of acetone were fed to a 1-liter three-necked flask and stirred at room temperature for 30 minutes, and 30.2 g of 1-bromopentane was added to carry out a reaction under reflux in a nitrogen atmosphere for 5 hours. After the end of the reaction, the reaction solution was injected into water to precipitate a product. The formed precipitate was collected by filtration and recrystallized with acetone to obtain 33 g of a white crystal of a compound (A-1-C9-1A), that is, 4-pentyloxybenzaldehyde.

19.2 g of the obtained 4-pentyloxybenzaldehyde, 16.4 g of 4-acetylbenzoic acid, 8.0 g of sodium hydroxide and 150 ml of ethanol were put into a 500 ml three-necked flask to carry out a reaction under reflux for 6 hours. After the end of the reaction, heating was stopped to gradually cool the reaction mixture down to room temperature, and 200 ml of water was added and stirred until a homogeneous solution was obtained. This solution was put into a 1-liter beaker, and concentrated hydrochloric acid was added dropwise under agitation until pH became 7 or less. The formed precipitate was collected by filtration and recrystallized with ethanol to obtain 29 g of a white crystal of the compound (A-1-C9-1), that is, 4-pentyloxy-4'-carboxychalcone.

Synthesis Example A-1-C(7)

30 g of a white crystal of a compound (A-1-C9-2) represented by the following formula was obtained in the same manner as in the above Synthesis Example A-1-C(6) except that 47.6 g of 1-iodo-4,4,4-trifluorobutane was used in place of 1-bromopentane.

(A-1-C9-2)

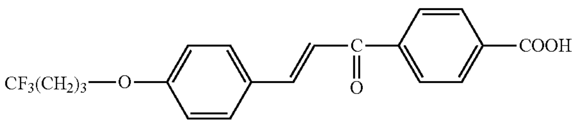

[Synthesis of Compound Represented by the Above Formula (A-2)]

Synthesis Example A-2-C(1)

A compound (A-2-C1-1) was synthesized based on the following scheme.

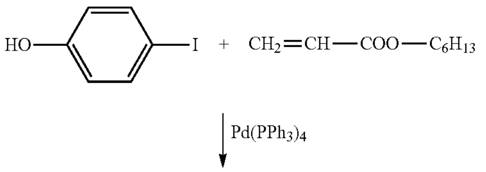

-continued

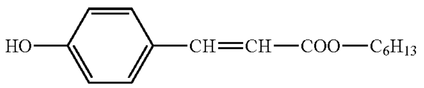

(A-2-C1-1A)

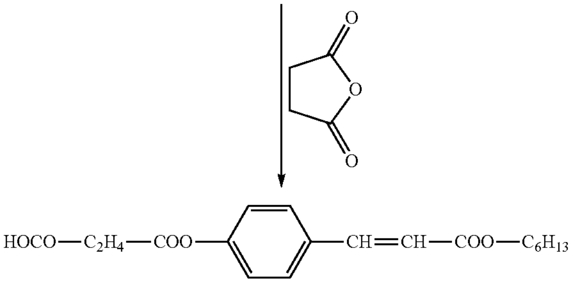

(A-2-C1-1)

22 g of 4-iodophenol, 16 g of hexyl acrylate, 14 ml of triethylamine, 2.3 g of tetrakistriphenylphosphine palladium and 1 liter of N,N-dimethylformamide were fed to a 2-liter three-necked flask equipped with a thermometer and a nitrogen introduction tube, and the inside of the system was fully dried. Then, the above mixture was heated at 90° C. and stirred in a nitrogen stream for 2 hours to carry out a reaction. After the end of the reaction, diluted hydrochloric acid was added to carry out extraction with ethyl acetate. An organic layer was rinsed in water, dried with magnesium sulfate, concentrated, column purified with a mixed solvent of hexane and ethyl acetate, concentrated and dried up to obtain 12 g of a compound (A-2-C1-1A).

Thereafter, 12 g of the above compound (A-2-C1-1A), 5.5 g of succinic anhydride and 0.6 g of 4-dimethylaminopyridine were fed to a 200 ml three-necked flask equipped with a thermometer, a nitrogen introduction tube and a reflux tube, and the inside of the system was fully dried. 5.6 g of triethylamine and 100 ml of tetrahydrofuran were added to this mixture to carry out a reaction under reflux for 5 hours. After the end of the reaction, diluted hydrochloric acid was added to the reaction mixture to carry out extraction with ethyl acetate. After the extract was rinsed in water, dried with magnesium sulfate and concentrated, it was recrystallized with ethanol to obtain 8.7 g of the compound (A-2-C1-1).

Synthesis Example A-2-C(2)

A compound (A-2-C3-1) was synthesized based on the following scheme.

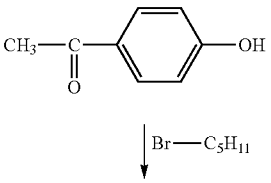

-continued

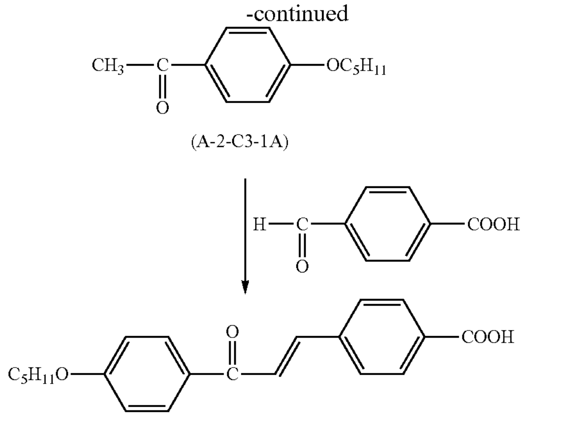

(A-2-C3-1A)

(A-2-C3-1)

27.2 g of 4-hydroxyacetophenone, 27.6 g of potassium carbonate, 1.0 g of potassium iodide and 500 ml of acetone were fed to a 1 liter three-necked flask and stirred at room temperature for 30 minutes, and 30.2 g of 1-bromopentane was added to carry out a reaction under reflux in a nitrogen atmosphere for 5 hours. After the end of the reaction, the reaction solution was injected into water to precipitate a product. The formed precipitate was collected by filtration and recrystallized with acetone to obtain 35 g of a white crystal of a compound (A-2-C3-1A), that is, 4-pentyloxyacetophenone.

20.6 g of the obtained 4-pentyloxyacetophenone, 15.0 g of 4-formylbenzoic acid, 8.0 g of sodium hydroxide and 150 ml of ethanol were fed to a 500 ml three-necked flask to carry out a reaction under reflux for 6 hours. After the end of the reaction, heating was stopped to gradually cool the reaction product down to room temperature, and 200 ml of water was added and stirred until a homogeneous solution was obtained. This solution was put into a 1 liter beaker, and concentrated hydrochloric acid was added dropwise under agitation until pH became 7 or less. The formed precipitate was collected by filtration and recrystallized with ethanol to obtain 25 g of a white crystal of the compound (A-2-C3-1), that is, 4-carboxy-4'-pentyloxychalcone.

Synthesis Example A-2-C(3)

28 g of a white powder of a compound (A-2-C3-2) represented by the following formula was obtained in the same manner as in the above Synthesis Example A-2-C(2) except that 47.6 g of 1-iodo-4,4,4-trifluorobutane was used in place of 1-bromopentane.

(A-2-C3-2)

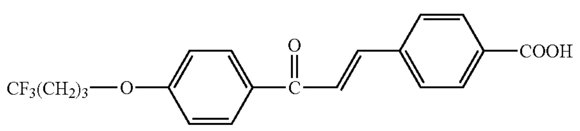

[Synthesis of Compound Represented by the Above Formula (A-3)]

Synthesis Example A-3-C(1)

A compound (A-3-C1-1) was synthesized based on the following scheme.

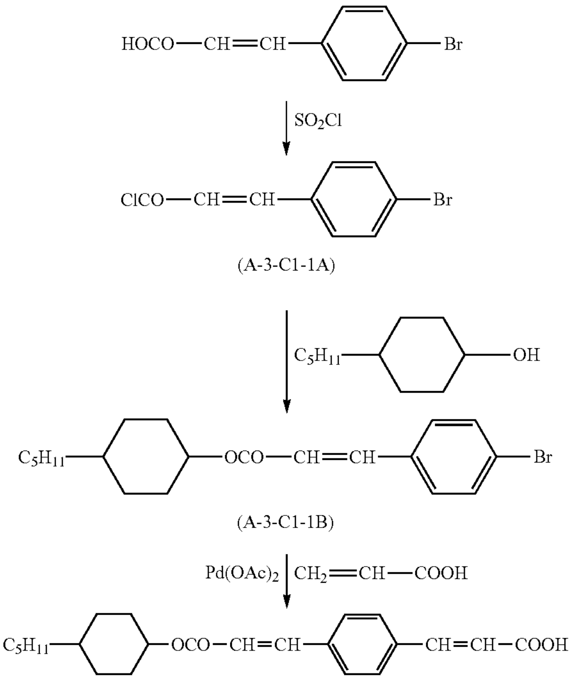

(A-3-C1-1A)

(A-3-C1-1B)

(A-3-C1-1)

(Synthesis of Compound (A-3-C1-1A))

107 g (0.47 mole) of 4-bromocinnamic acid was refluxed in 83 g of thionyl chloride for 4 hours to obtain a red transparent solution. Then, after unreacted thionyl chloride was distilled off, the residue was recrystallized from toluene and washed with n-hexane to obtain 85 g of a white crystal of a compound (A-3-C1-1A) (yield of 74%).

(Synthesis of Compound (A-3-C1-1B)) (Synthesis of (4-amylcyclohexyl)-4-bromocinnamate)

25.0 g (0.147 mole) of 4-amylcyclohexanol was dissolved in 25 ml of pyridine. A solution prepared by suspending 43.3 g (0.176 mole) of the compound (A-3-C1-1A) obtained above in 350 ml of pyridine was added dropwise to this solution while this solution was kept at about 3° C. to further carry out a reaction for 3 hours. The obtained reaction mixture (suspension) was injected into 1.3 kg of hydrochloric acid ice water, and the formed precipitate was collected by filtration, rinsed in water and dried to obtain 50 g of a crude compound (A-3-C1-1B) (cream colored powder) (yield of 85%).

(Synthesis of Compound (A-3-C1-1))

125 ml (0.9 mole) of dry triethylamine was added to a mixture of 50 g of the crude compound (A-3-C1-1B) obtained above, 0.28 g (1.25 mmol) of palladium acetate and 1.52 g (5 mmol) of tri(o-tolyl)phosphine in a nitrogen atmosphere to carry out a reaction. After the crude compound (A-3-C1-1B) was completely dissolved, 10.8 g (0.15 mole) of acrylic acid was injected from a syringe to further continue the reaction at 95° C. for 2 hours. The obtained dark green reaction mixture was injected into 1.3 kg of hydrochloric acid iced water, and the formed precipitate was collected by filtration. This precipitate was dissolved in 500 ml of ethyl acetate and washed with 1N hydrochloric acid and a 5 wt % sodium hydrogen carbonate solution sequentially, an organic layer was collected and dried with magnesium sulfate, and the solvent was distilled off to obtain 56 g of a crude compound (A-3-C1-1)

(yellow solid). This crude product was recrystallized from ethanol to obtain 30 g of a yellow powder of the compound (A-3-C1-1) (yield of 55%).

Synthesis Examples A-3-C(2) and A-3-C(3)

The following compounds (A-3-C1-2) and (A-3-$C_{1-3}$) were obtained in the same manner as in the above Synthesis Example A-3-C(1) except that 0.147 mol of hexanol and 0.147 mol of cyclohexanol were used in place of 4-amylcyclohexanol, respectively.

(A-3-C1-2)

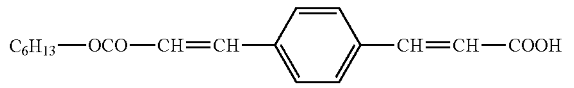

(A-3-C1-3)

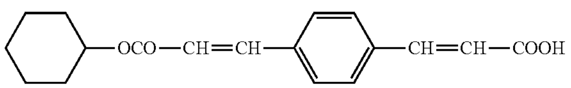

Synthesis Example A-3-C(4)

A compound (A-3-C2-1) (the double bonds on both sides of the benzene ring were trans forms) was synthesized in the same manner as in the above Synthesis Example A-3-C(1) except that 0.47 mole of 2-fluoro-4-bromocinnamic acid was used in place of 4-bromocinnamic acid.

[Synthesis of Compound Represented by the Above Formula (A-4)]

Synthesis Example A-4-C(1)

A compound (A-4-C1-1) was synthesized based on the following scheme.

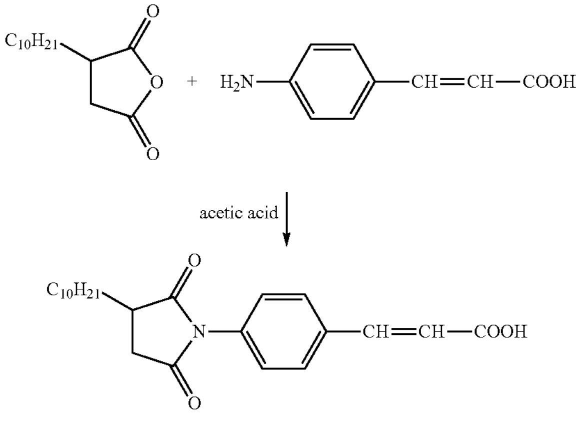

(A-4-C1-1)

12 g of decylsuccinic anhydride, 8.2 g of 4-aminocinnamic acid and 100 ml of acetic acid were fed to a 200 ml eggplant-shaped flask equipped with a reflux tube to carry out a reaction under reflux for 2 hours. After the end of the reaction, the reaction mixture was extracted with ethyl acetate, and an organic layer was rinsed in water, dried with magnesium sulfate, purified with a silica column and recrystallized with a mixed solvent of ethanol and tetrahydrofuran to obtain 10 g of a white crystal of the compound (A-4-C1-1) (purity of 98.0%). The obtained compound will be referred to as "compound (A-4-C1-1(1))" hereinafter.

Synthesis Example A-4-C(2)

The compound (A-4-C1-1) was synthesized by a different method from that in the above Synthesis Example A-4-C(1) based on the following scheme.

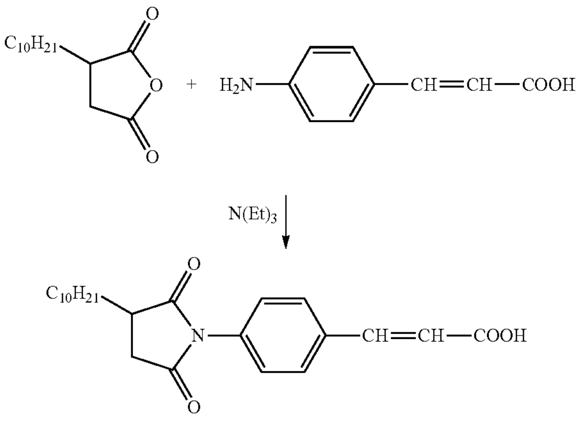

(A-4-C1-1)

72 g of decylsuccinic anhydride, 49 g of 4-amionocinnamic acid, 70 ml of triethylamine, 500 ml of toluene and 200 ml of tetrahydrofuran were fed to a 1-liter eggplant-shaped flask equipped with a reflux tube, a nitrogen introduction tube and a Dean-Stark tube to carry out a reaction under reflux for 36 hours. After the end of the reaction, the reaction mixture was washed with diluted hydrochloric acid and water sequentially, and an organic layer was dried with magnesium sulfate, concentrated and recrystallized with a mixed solvent of ethanol and tetrahydrofuran to obtain 72 g of a white crystal of the compound (A-4-C1-1) (purity of 99%). The obtained compound will be referred to as "compound (A-4-C1-1(2))" hereinafter.

Synthesis Example A-4-C(3)

The compound (A-1-C1-1) was synthesized by a different method from those in the above Synthesis Examples A-4-C(1) and A-4-C(2) based on the following scheme.

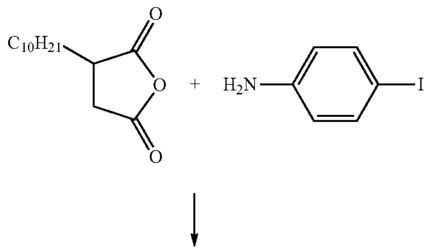

-continued

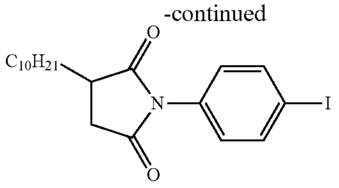

(A-4-C1-1A)

Pd(PPh$_3$)$_4$ CH$_2$=CH—COOH

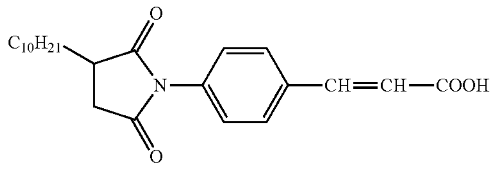

(A-4-C1-1)

(Synthesis of Compound (A-4-C1-1A))

24 g of decylsuccinic anhydride, 22 g of 4-iodoaniline and 200 nil of acetic acid were fed to a 500 ml eggplant-shaped flask equipped with a reflux tube to carry out a reaction under reflux for 5 hours. After the end of the reaction, the reaction mixture was extracted with ethyl acetate, and an organic layer was washed in water, dried with magnesium sulfate, concentrated, dried up and recrystallized with ethanol to obtain 33 g of a compound (A-4-C1-1A)

(Synthesis of Compound (A-4-C1-1))

26.4 g of the compound (A-4-C1-1A) obtained above and 1.38 g of tetrakistriphenylphosphine palladium were fed to a 1-liter three-necked flask equipped with a nitrogen introduction tube and a thermometer, and the inside of the flask was substituted by nitrogen. 4.8 ml of dried and deaerated acrylic acid, 25 ml of triethylamine and 600 ml of N,N-dimethylformamide were added to the above mixture by a syringe and stirred at 90° C. for 3 hours to carry out a reaction. After the end of the reaction, the reaction mixture was injected into a diluted hydrochloric acid aqueous solution cooled with ice, and ethyl acetate was added to separate an organic layer. The organic layer was washed with diluted hydrochloric acid, a sodium thiosulfate aqueous solution and water sequentially, dried with magnesium sulfate, purified with a silica column and recrystallized with a mixed solvent of ethanol and tetrahydrofuran to obtain 4.2 g of a white crystal of the compound (A-4-C1-1) (purity of 98.0%). The obtained compound will be referred to as "compound (A-4-C1-1(3))" hereinafter.

Synthesis A-4-C(4)

12 g of a white crystal of a compound (A-4-C1-2) represented by the following formula (purity of 98.5%) was obtained in the same manner as in the above Synthesis Example A-4-C(1) except that 18 g of octadecylsuccinic anhydride was used in place of decylsuccinic anhydride.

(A-4-C1-2)

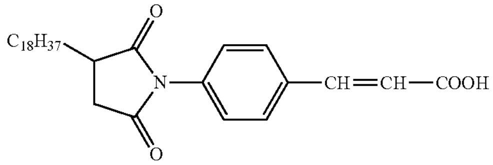

[Synthesis of Compound Represented by the Above Formula (A-5)]

Synthesis Example A-5-C(1)

A compound (A-5-C1-1) was synthesized based on the following scheme.

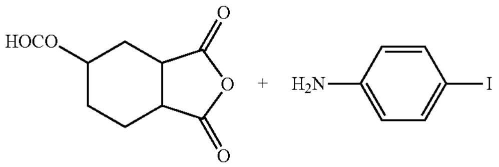

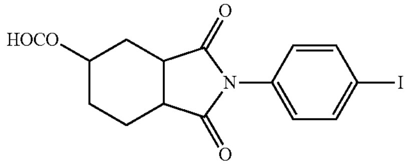

(A-5-C1-1A)

SOCl$_2$

C$_2$F$_5$C$_3$H$_6$—OH

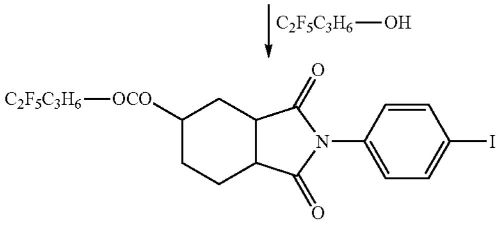

(A-5-C1-1B)

Pd(Ph$_3$)$_4$ CH$_2$=CH—COOH

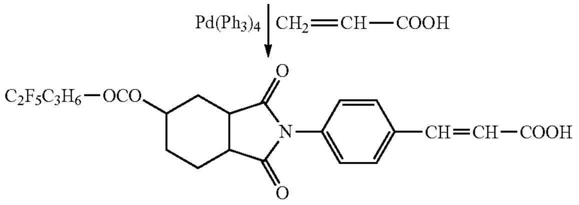

(A-5-C1-1)

(Synthesis of Compound (A-5-C1-1A))

30 g of cyclohexane-1,2,4-tricarboxylic anhydride, 33 g of 4-iodoaniline and 200 ml of acetic acid were fed to a 500 ml eggplant-shaped flask equipped with a reflux tube to carry out a reaction under reflux for 2 hours. After the end of the reaction, ethyl acetate was added to the reaction mixture, and an organic layer was rinsed in water, dried with magnesium sulfate, concentrated and recrystallized with ethanol to obtain 31 g of a gray crystal of a compound (A-5-C1-1A).

(Synthesis of Compound (A-5-C1-1B)

15 g of the compound (A-5-C1-1A) obtained above, 20 ml of thionyl chloride and 0.1 ml of N,N-dimethylformamide were fed to a 100 ml eggplant-shaped flask equipped with a reflux tube and a nitrogen introduction tube to carry out a reaction at 80° C. for 1 hour. After the end of the reaction, thionyl chloride was removed under reduced pressure, methylene chloride was added to the residue, and an organic layer was washed with water and a saturated sodium hydrogen carbonate aqueous solution sequentially. Then, the organic layer was dried with magnesium sulfate, methylene chloride was removed under reduced pressure, and 80 ml of tetrahydrofuran was added.

Separately from this, 6.8 g of 4,4,5,5,5-pentafluoropentanol, 6.5 ml of pyridine and 20 ml of tetrahydrofuran were fed to a 200 ml three-necked flask equipped with a dropping funnel, a thermometer and a nitrogen introduction tube and cooled with ice. A tetrahydrofuran solution containing a reaction product of the above compound (A-5-C1-1A) and thionyl chloride was added dropwise to the resulting mixture and stirred for 3 hour under cooling with ice to carry out a reaction. After the end of the reaction, the reaction mixture was washed with ethyl acetate, diluted hydrochloric acid and water sequentially. An organic layer was dried with magnesium sulfate, concentrated and recrystallized with ethanol to obtain 14 g of a gray crystal of a compound (A-5-C1-1B).

(Synthesis of Compound (A-5-C1-1))

14 g of the compound (A-5-C1-1B) obtained above, 1.8 ml of acrylic acid, 11 ml of triethylamine, 0.46 g of tetrakistriphenylphosphine palladium and 250 ml of N,N-dimethylformamide were fed to a 500 ml three-necked flask equipped with a nitrogen introduction tube and a thermometer, and the inside of the flask was deaerated to carry out reaction at 90° C. for 3 hours. After the end of the reaction, ethyl acetate was added to the reaction mixture, and the resulting mixture was washed with diluted hydrochloric acid and water sequentially. An organic layer was purified with a silica column, concentrated and recrystallized with methanol to obtain 9.0 g of a white crystal of the compound (A-5-C1-1) having a purity of 98%.

Synthesis Example A-5-C(2)

A compound (A-5-C1-2) was synthesized based on the following scheme.

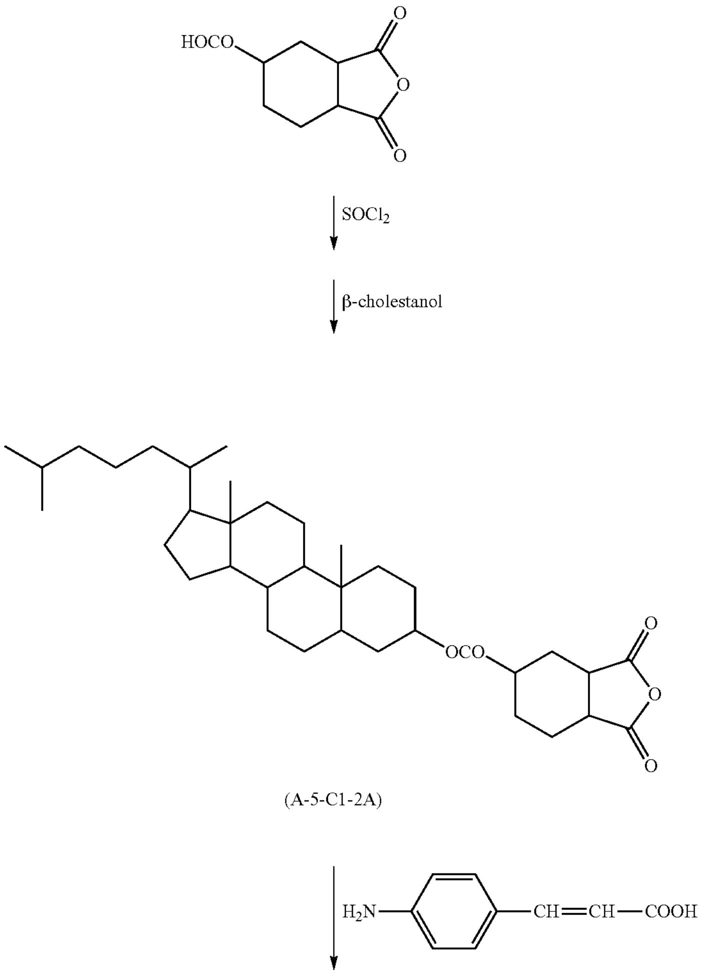

-continued

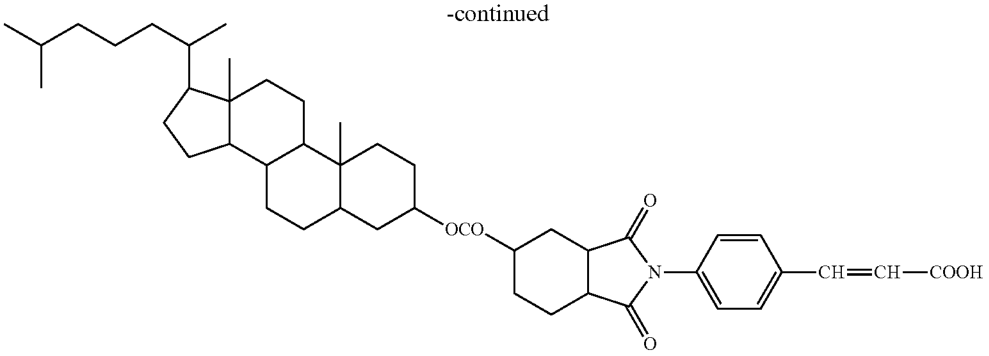

(A-5-C1-2)

(Synthesis of Compound (A-5-C1-2A))

12 g of cyclohexane-1,2,4-tricarboxylic anhydride, 30 ml of thionyl chloride and 0.1 ml of N,N-dimethylformamide were fed to a 200 ml eggplant-shaped flask equipped with a reflux tube to carry out a reaction under reflux at 80° C. for 1 hour. After the end of the reaction, thionyl chloride was removed under reduced pressure, methylene chloride was added to the residue, an organic layer was washed with a saturated sodium hydrogen carbonate aqueous solution and water sequentially, dried with magnesium sulfate, concentrated and dried up, and tetrahydrofuran was added to prepare a solution.

Meanwhile, 19 g of β-cholestanol, 8.0 ml of pyridine and 100 ml of toluene were fed to a 300 ml three-necked flask equipped with a dropping funnel, a thermometer and a nitrogen introduction tube and cooled in an iced bath. The tetrahydrofuran solution containing a reaction product of the above cyclohexane-1,2,4-tricarboxylic anhydride and thionyl chloride was added dropwise slowly to the resulting mixture and stirred at room temperature for 4 hours to carry out a reaction. After the end of the reaction, extraction was carried out with ethyl acetate. An organic layer was rinsed in water, dried with magnesium sulfate and recrystallized with a mixed solvent of ethyl acetate and hexane to obtain 18 g of a compound (A-5-C1-2A).

(Synthesis of Compound (A-5-C1-2))

11 g of the compound (A-5-C1-2A) obtained above, 3.3 g of 4-aminocinnamic acid, 0.1 ml of triethylamine and 100 ml of toluene were fed to a 200 ml eggplant-shaped flask equipped with a Dean-Stark tube to carry out a reaction under reflux for 3 hours. After the end of the reaction, the reaction mixture was washed in water. An organic layer was dried with magnesium sulfate and recrystallized with a mixed solvent of ethyl acetate and tetrahydrofuran to obtain 6.1 g of a white crystal of the compound (A-5-C1-2) (purity of 99.2%).

[Synthesis of Compound Represented by the Above Formula (A-6)]

Synthesis Example A-6-C(1)

A compound (A-6-C1-1) was synthesized based on the following scheme.

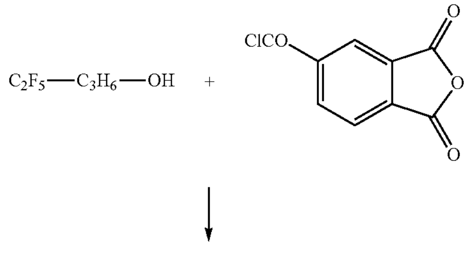

-continued

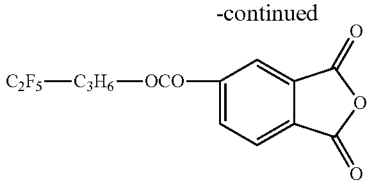

(A-6-C1-1A)

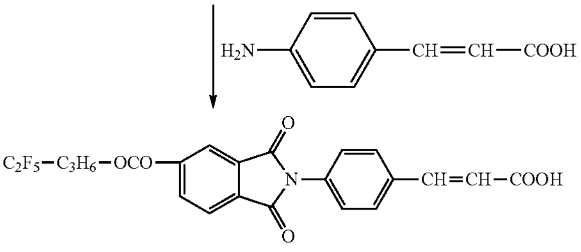

(A-6-C1-1)

(Synthesis of Compound (A-6-C1-1A))

18 g of 4,4,5,5,5-pentafluoropentanol, 11.1 g of triethylamine and 50 ml of tetrahydrofuran were fed to a 500 ml eggplant-shaped flask equipped with a thermometer and a dropping funnel and cooled with ice. A solution consisting of 21 g of anhydrous trimellitic acid chloride and 200 ml of tetrahydrofuran was added dropwise to the resulting mixture over 30 minutes or longer and stirred for 2 hours to carry out a reaction. After the end of the reaction, 500 ml of ethyl acetate and 500 ml of water were added to separate an organic layer which was then dried with magnesium sulfate, concentrated and recrystallized with a mixed solvent of ethyl acetate and hexane to obtain 29 g of a compound (A-6-C1-1A).

(Synthesis of Compound (A-6-C1-1))

28 g of the compound (A-6-C1-1A) obtained above, 13 g of 4-aminocinnamic acid and 150 ml of acetic acid were refluxed for 2 hours to carry out a reaction. After the end of the reaction, the reaction mixture was extracted with ethyl acetate, and the extract was washed in water, dried with magnesium sulfate, purified with a silica column and recrystallized with a mixed solvent of ethanol and tetrahydrofuran to obtain 18 g of a crystal of the compound (A-6-C1-1) (purity of 98.0%).

Synthesis Example A-6-C(2)

A compound (A-6-C1-2) was synthesized based on the following scheme.

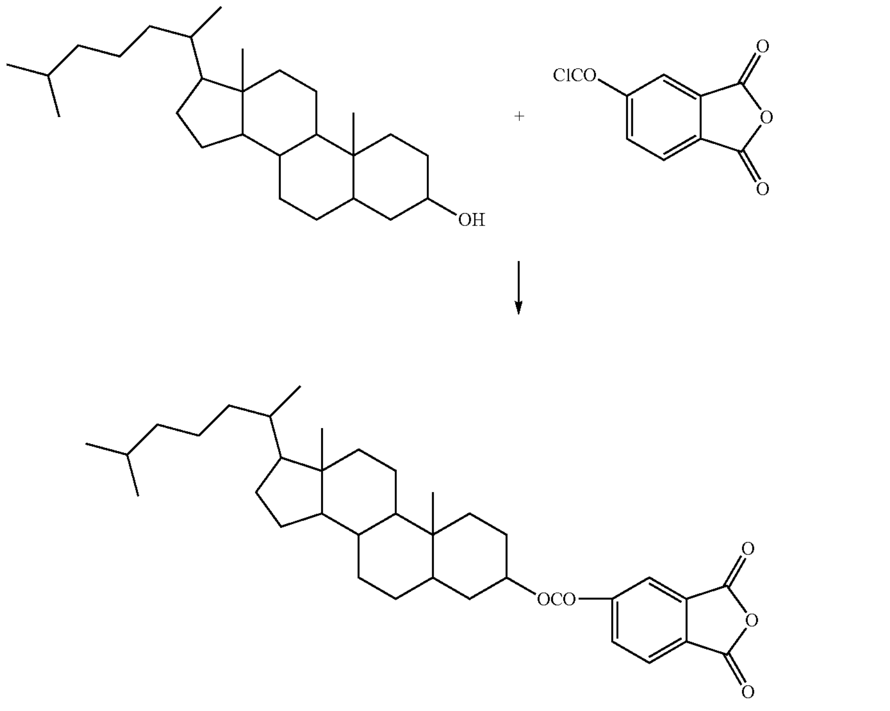
(A-6-C1-2A)

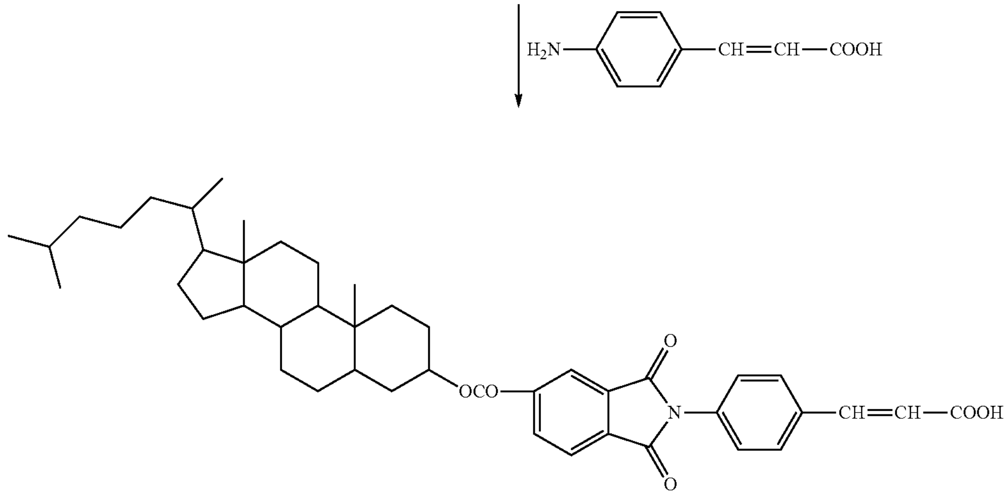
(A-6-C1-2)

Synthesis of Compound (A-6-C1-2A)

39 g of cholestanol, 11.1 g of triethylamine and 200 ml of toluene were fed to a 1,000 ml eggplant-shaped flask equipped with a thermometer and a dropping funnel and cooled with ice. A solution consisting of 21 g of anhydrous trimellitic acid chloride and 200 ml of tetrahydrofuran charged into the dropping funnel was added dropwise to the resulting mixture over 30 minutes or longer to carry out a reaction under agitation for 2 hours. After the end of the reaction, 500 ml of toluene and 500 ml of water were added to separate an organic layer which was then dried with magnesium sulfate, concentrated and further recrystallized with a mixed solvent of ethyl acetate and hexane to obtain 48 g of a compound (A-6-C1-2A).

Synthesis of Compound (A-6-C1-2)

46 g of the compound (A-6-C1-2A) obtained above, 13 g of 4-aminocinnamic acid and 300 ml of acetic acid were mixed together to carry out a reaction under reflux for 2 hours. After the end of the reaction, the reaction mixture was extracted with ethyl acetate, and an organic layer was washed in water, dried with magnesium sulfate, purified with a silica column and recrystallized with a mixed solvent of ethyl acetate and hexane to obtain 20 g of a crystal of the compound (A-6-C1-2) (purity of 98.1%).

Synthesis Example A-6-C(3)

A compound (A-6-C2-1) was synthesized based on the following scheme.

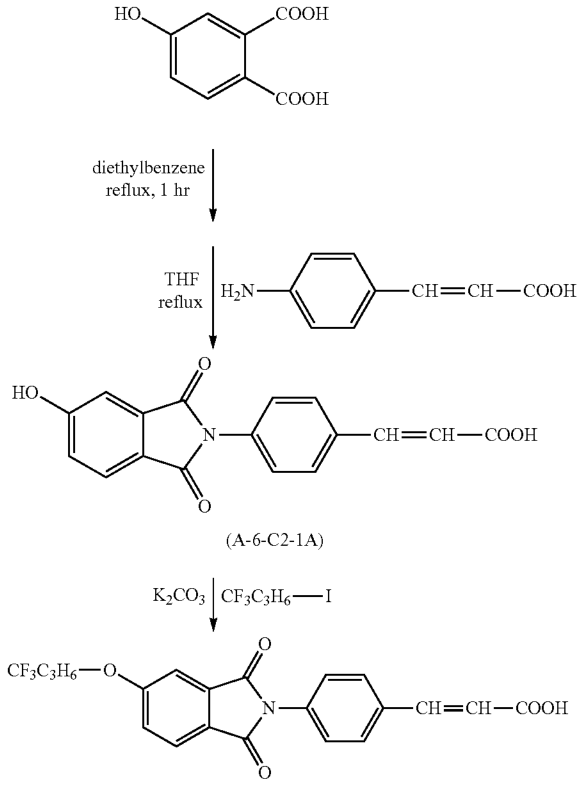

(A-6-C2-1A)

(A-6-C2-1)

(Synthesis of Compound (A-6-C2-1A))

18 g of 5-hydroxyphthalic acid and 100 ml of diethylbenzene were added to a 300 ml three-necked flask equipped with a Dean-Stark tube to carryout a reaction under reflux for 1 hour. 16 g of 4-aminocinnamic acid, 42 ml of triethylamine and 100 ml of tetrahydrofuran were added to the resulting reaction mixture to carryout a reaction under reflux for 10 hours. After the end of the reaction, ethyl acetate was added to the reaction mixture to carry out extraction, and the obtained extract was washed with diluted hydrochloric acid and water sequentially, dried with magnesium sulfate, concentrated and recrystallized with ethyl acetate to obtain 14 g of a compound (A-6-C2-1A).

(Synthesis of Compound (A-6-C2-1))

12 g of the compound (A-6-C2-1A) obtained above and 70 ml of N,N-dimethylacetamide were fed to a 300 ml eggplant-shaped flask equipped with a dropping funnel and stirred at room temperature for 1 hour. 11 g of 4,4,4-trifluoro-1-iodobutane and 30 ml of N,N-dimethylacetamide were added dropwise to the resulting mixture over 30 minutes or longer to carry out a reaction at room temperature for 8 hours. After the end of the reaction, ethyl acetate was added to the reaction mixture to carryout extraction, and the obtained extract was washed with water 3 times, dried with magnesium sulfate, concentrated, purified with a silica column and recrystallized with ethanol to obtain 12 g of the compound (A-6-C2-1).

[Synthesis of Compound Represented by the Above Formula (A-7)]

Synthesis Example A-7-C(1)

A compound (A-7-C1-1) was synthesized based on the following scheme.

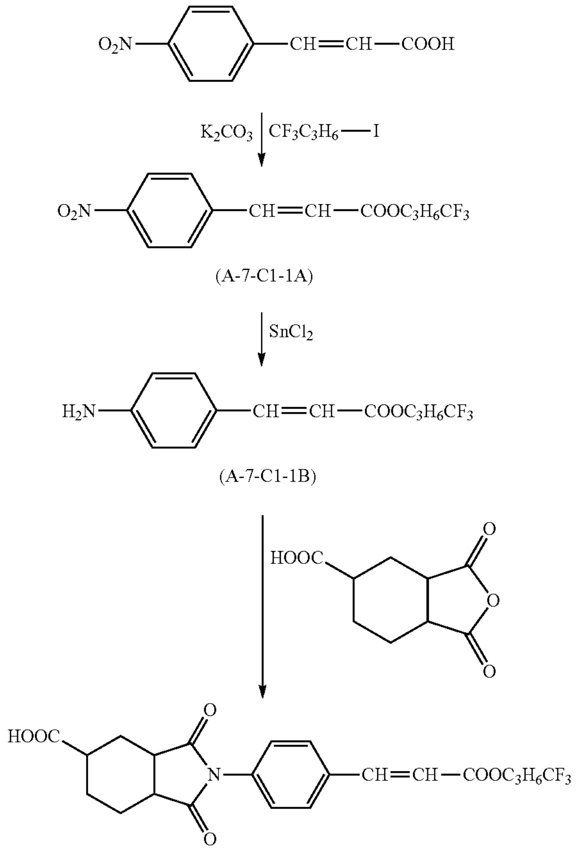

(A-7-C1-1A)

(A-7-C1-1B)

(A-7-C1-1)

(Synthesis of Compound (A-7-C1-1A))

9.7 g of 4-nitrocinnamic acid, 12 g of 4,4,4-trifluoro-1-iodobutane, 14 g of potassium carbonate and 150 ml of 1-methyl-2-pyrrolidone were fed to a 300 ml three-necked flask equipped with a thermometer and a nitrogen introduction tube and stirred at 50° C. for 1 hour to carry out a reaction. After the end of the reaction, ethyl acetate was added to the reaction mixture to carry out extraction. The extract was rinsed in water, dried with magnesium sulfate, concentrated and dried up to obtain 14 g of a compound (A-7-C1-1A).

(Synthesis of Compound (A-7-C1-1B))

14 of the compound (A-7-C1-1A) obtained above, 53 g of tin chloride dihydrate and 150 ml of ethanol were fed to a 300 ml three-necked flask equipped with a thermometer and a nitrogen introduction tube and stirred at 70° C. for 1 hour to carry out a reaction. After the end of the reaction, the reaction mixture was injected into iced water and neutralized with a 2M sodium hydroxide aqueous solution, ethyl acetate was added, and the formed precipitate was removed. Ethyl acetate was added to the filtrate to carry out extraction. This extract was rinsed in water, dried with magnesium sulfate, concentrated and dried up to obtain 12 g of a compound (A-7-C1-1B).

(Synthesis of Compound (A-7-C1-1))

12 g of the compound (A-7-C1-1B) obtained above, 8.7 g of 1,2,4-cyclohexanetricarboxylic anhydride and 100 ml of acetic acid were fed to a 200 ml eggplant-shaped flask equipped with a reflux tube and a nitrogen introduction tube to carry out a reaction under reflux for 1 hour. After the end of the reaction, the reaction mixture was extracted with ethyl acetate. This extract was rinsed in water, dried with magnesium sulfate, concentrated, dried up and recrystallized with a mixed solvent of ethyl acetate and hexane to obtain 11 g of a white crystal of the compound (A-7-C1-1) (purity of 98.3%).

[Synthesis of Compound Represented by the Above Formula (A-8)]

Synthesis Example A-8-C(1)

A compound (A-8-C1-1) was synthesized based on the following scheme

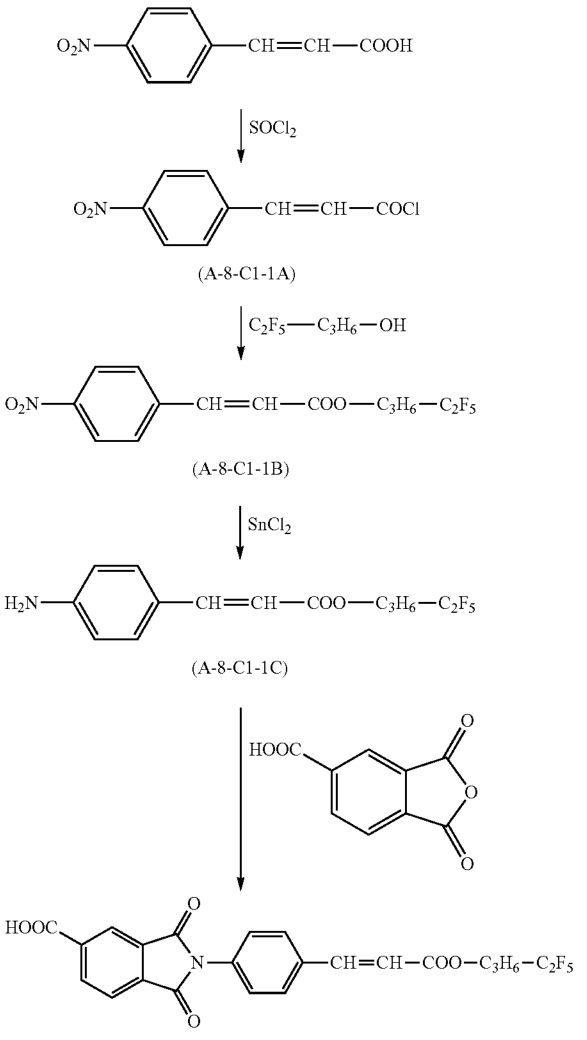

(A-8-C1-1A)

(A-8-C1-1B)

(A-8-C1-1C)

(A-8-C1-1)

(Synthesis of Compound (A-8-C1-1B)

19 g of 4-nitrocinnamic acid, 100 ml of thionyl chloride and 50 μl of N,N-dimethylformamide were fed to a 300 ml eggplant-shaped flask equipped with a reflux tube to carry out a reaction at 80° C. for 1 hour. After the end of the reaction, thionyl chloride was distilled off under reduced pressure, methylene chloride was added to obtain an organic layer, this organic layer was washed with a sodium hydrogen carbonate aqueous solution, dried with magnesium sulfate and concentrated, and tetrahydrofuran was added to obtain a tetrahydrofuran solution of a compound (A-8-C1-1A).

Then, 18 g of 4,4,5,5,5-pentafluoropentanol, 11.1 g of triethylamine and 100 ml of tetrahydrofuran were fed to a different 500 ml three-necked flask. This solution was cooled with ice, and the above tetrahydrofuran solution of the compound (A-8-C1-1A) was added dropwise slowly to this solution and stirred for 2 hours to carry out a reaction. After the end of the reaction, an extract obtained by extracting the reaction mixture with ethyl acetate was dried with magnesium sulfate, concentrated and recrystallized with ethanol to obtain 29 g of a crystal of a compound (A-8-C1-1B).

Synthesis of Compound (A-8-C1-1C)

28 g of the compound (A-8-C1-1B) obtained above, 181 g of tin chloride dihydrate and 300 ml of ethanol were fed to a 300 ml three-necked flask equipped with a thermometer and a nitrogen introduction tube and stirred at 70° C. for 1 hour to carry out a reaction. After the end of the reaction, the reaction mixture was injected into iced water and neutralized with a 2M sodium hydroxide aqueous solution, ethyl acetate was added, and the formed precipitate was removed. Thereafter, ethyl acetate was added to the filtrate to carry out extraction. The obtained extract was rinsed in water, dried with magnesium sulfate, concentrated and dried up to obtain 20 g of a compound (A-8-C1-1C).

(Synthesis of Compound (A-8-C1-1))

16 g of the compound (A-8-C1-1C) obtained above, 9.6 g of trimellitic anhydride and 150 ml of acetic acid were fed to a 200 ml eggplant-shaped flask equipped with a reflux tube and a nitrogen introduction tube to carry out a reaction under reflux for 1 hour. After the end of the reaction, the reaction mixture was extracted with ethyl acetate. The obtained extract was rinsed in water, dried with magnesium sulfate, concentrated, dried up and recrystallized with a mixed solvent of ethyl acetate and hexane to obtain 18 g of a white crystal of the compound (A-8-C1-1) (purity of 98.0%).

<Synthesis of Compound R—CH=$CH_2$>

[Synthesis of Compound Represented by the Above Formula (A-1)]

Synthesis Example A-1-P(1)

A compound (A-1-P4-1) was synthesized based on the following scheme.

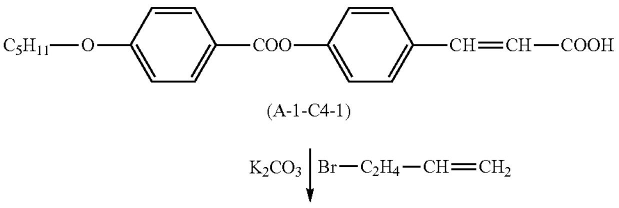

(A-1-C4-1)

-continued

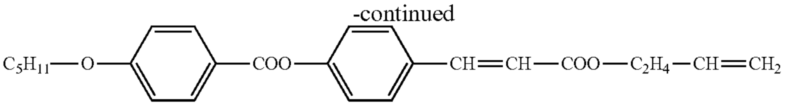

(A-1-P4-1)

42.3 g of the compound (A-1-C4-1) synthesized above, 41.5 g of potassium carbonate, 5.00 g of potassium iodide, 22.3 g of 4-bromo-1-butene and 600 ml of 1-methyl-2-pyrrolidone were fed to a 300 ml three-necked flask equipped with a stirrer, a nitrogen introduction tube and a thermometer to carry out a reaction in a nitrogen atmosphere under agitation at 90° C. for 3 hours. After the end of the reaction, toluene and water were added to carry out extraction, and an organic layer was dried with magnesium sulfate, concentrated and recrystallized with methanol to obtain 35 g of the compound (A-1-P4-1).

Synthesis Examples A-1-P(2) to (4)

Compounds (A-2-P1-1), (A-3-P1-1) and (A-4-P1-1) were obtained in the same manner as in the above Synthesis Example A-1-P(1) except that 0.12 mole of the compound (A-2-C1-1), 0.12 mole of the compound (A-5-C1-1) and 0.12 mole of the compound (A-3-C1-1) were used in place of the compound (A-1-C4-1), respectively.

Synthesis Example A-1-P(5)

A compound (A-1-P4-2) was obtained in the same manner as in the above Synthesis Example A-1-P(1) except that 20.0 g of allyl bromide was used in place of 4-bromo-1-butene.

<Synthesis of Compound R—OCO—CH=$CH_2$>

[Synthesis of Compound Represented by the Above Formula (A-1)]

Synthesis Example A-1-A(1)

Synthesis of Compound (A-4-A1-1)

39 g of the compound (A-4-C1-1) synthesized above, 300 ml of thionyl chloride and 0.2 ml of N,N-dimethylformamide were fed to a 300 ml three-necked flask equipped with a reflux tube and a nitrogen introduction tube to carry out a reaction at 80° C. for 1 hour. After the end of the reaction, thionyl chloride was removed under reduced pressure, 300 ml of methylene chloride was added to the residue to obtain an organic layer which was then rinsed in water 3 times and dried with magnesium sulfate, methylene chloride was distilled off under reduced pressure, and 200 ml of tetrahydrofuran was added (this solution was designated as reaction solution 1A).

Meanwhile, 11.6 g of hydroxyethyl acrylate, 10.1 g of triethylamine and 50 ml of tetrahydrofuran were fed to a 500 ml three-necked flask equipped with a dropping funnel, a thermometer and a nitrogen introduction tube and cooled with ice. The above reaction solution 1A was added dropwise to this mixture over 30 minutes or longer and returned to room temperature to carry out a reaction for 2 hours. After the end of the reaction, 500 ml of ethyl acetate was added to the reaction mixture, the resulting mixture was washed in water 3 times, dried with magnesium sulfate and concentrated, and the solvent was removed to obtain 47 g of a compound (A-4-A1-1).

<Synthesis of Another Polymer>

[Synthesis of Polyamic Acid]

Synthesis Example PA-1

109 g (0.50 molar equivalent) of pyromellitic dianhydride and 98 g (0.50 molar equivalent) of 1,2,3,4-cyclobutanetetracarboxylic dianhydride as tetracarboxylic dianhydrides and 200 g (1.0 molar equivalent) of 4,4-diaminodiphenyl ether as a diamine were dissolved in 2,290 g of N-methyl-2-pyrrolidone to carry out a reaction at 40° C. for 3 hours, and 1,350 g of N-methyl-2-pyrrolidone was added to obtain about 4,000 g of a solution containing 10 wt % of a polyamic acid (PA-1). The solution viscosity of this polyamic acid solution was 210 mPa·s.

Synthesis Example PA-2

98 g (0.50 molar equivalent) of 1,2,3,4-cyclobutanetetracarboxylic dianhydride and 109 g (0.50 molar equivalent) of pyromellitic dianhydride as tetracarboxylic dianhydrides and 198 g (1.0 molar equivalent) of 4,4'-diaminodiphenylmethane as a diamine were dissolved in 2,290 g of N-methyl-2-pyrrolidone to carry out a reaction at 40° C. for 3 hours, and 1,350 g of N-methyl-2-pyrrolidone was added to obtain about 4,000 g of a solution containing 10 wt % of a polyamic acid (PA-2). The solution viscosity of this polyamic acid solution was 135 mPa·s.

Synthesis Example PA-3

196 g (1.0 molar equivalent) of 1,2,3,4-cyclobutanetetracarboxylic dianhydride as a tetracarboxylic dianhydride and 200 g (1.0 molar equivalent) of 4,4'-diaminodiphenyl ether as a diamine were dissolved in 2,246 g of N-methyl-2-pyrrolidone to carry out a reaction at 40° C. for 4 hours, and 1,321 g of N-methyl-2-pyrrolidone was added to obtain about 3,950 g of a solution containing 10 wt % of a polyamic acid (PA-3). The solution viscosity of this polyamic acid solution was 220 mPa·s.

Synthesis Example PA-4

196 g (1.0 molar equivalent) of 1,2,3,4-cyclobutanetetracarboxylic dianhydride as a tetracarboxylic dianhydride and 212 g (1.0 molar equivalent) of 2,2'-dimethyl-4,4'-diaminobiphenyl as a diamine were dissolved in 4,050 g of N-methyl-2-pyrrolidone to carry out a reaction at 40° C. for 3 hours so as to obtain 3,700 g of a solution containing 10 wt % of a polyamic acid (PA-4). The solution viscosity of this polyamic acid solution was 170 mPa·s.

Synthesis Example PA-5

224 g (1.0 molar equivalent) of 2,3,5-tricarboxycyclopentylacetic dianhydride as a tetracarboxylic dianhydride and 200 g (1.0 molar equivalent) of 4,4'-diaminodiphenyl ether as a diamine were dissolved in 2,404 g of N-methyl-2-pyrrolidone to carry out a reaction at 40° C. for 4 hours so as to obtain about 2,800 g of a solution containing 15 wt % of a polyamic acid (PA-5).

The solution viscosity of a solution containing 10 wt % of a polymer prepared by dispensing a small amount of this polyamic acid solution and adding N-methyl-2-pyrrolidone to this solution was 190 mPa·s.

Synthesis Example PA-6

22.4 g (0.1 mole) of 2,3,5-tricarboxycyclopentylacetic dianhydride and 14.23 g (0.1 mole) of cyclohexanebis(methylamine) were dissolved in 329.3 g of N-methyl-2-pyrrolidone to carry out a reaction at 60° C. for 6 hours. Thereafter, the reaction mixture was injected into an excessive amount of methanol to precipitate the reaction product. The precipitate was washed with methanol and dried at 40° C. under reduced pressure for 15 hours to obtain 32 g of a polyamic acid (PA-6).

Synthesis Example PA-7

19.61 g (0.1 mole) of cyclobutanetetracarboxylic dianhydride and 21.23 g (0.1 mole) of 4,4'-diamino-2,2'-dimethylbiphenyl were dissolved in 367.6 g of N-methyl-2-pyrrolidone to carry out a reaction at room temperature for 6 hours. Thereafter, the reaction mixture was injected into an excessive amount of methanol to precipitate the reaction product. The precipitate was washed with methanol and dried at 40° C. under reduced pressure for 15 hours to obtain 35 g of a polyamic acid (PA-7).

[Synthesis of Polyimide]

Synthesis Example PI-1

112 g (0.50 mole) of 2,3,5-tricarboxycyclopentylacetic dianhydride and 157 g (0.50 mole) of 1,3,3a,4,5,9b-hexahydro-8-methyl-5-(tetrahydro-2,5-dioxo-3-furanyl)-naphtho [1,2-c]-furan-1,3-dione as tetracarboxylic dianhydrides and 95 g (0.88 mole) of p-phenylenediamine, 32 g (0.10 mole) of 2,2-ditrifluoromethyl-4,4-diaminobiphenyl, 6.4 g (0.010 mole) of 3,6-bis(4-aminobenzoyloxy)cholestane and 4.0 g (0.015 mole) of octadecanoxy-2,5-diaminobenzene as diamines were dissolved in 960 g of N-methyl-2-pyrrolidone to carry out a reaction at 60° C. for 9 hours. The solution viscosity of a solution containing 10 wt % of a polymer prepared by dispensing a small amount of the obtained polyamic acid solution and adding N-methyl-2-pyrrolidone to this solution was 58 mPa·s.

2,740 g of N-methyl-2-pyrrolidone, 396 g of pyridine and 409 g of acetic anhydride were added to the obtained polyamic acid solution to carry out a dehydration ring-closure reaction at 110° C. for 4 hours. After the end of the dehydration ring-closure reaction, the solvent in the system was substituted by new N-methyl-2-pyrrolidone (pyridine and acetic anhydride used in the dehydration ring-closure reaction were removed to the outside of the system by this operation, the same shall apply hereinafter) to obtain about 2,500 g of a solution containing 15 wt % of a polyimide (PI-1) having an imidization rate of about 95%.

The solution viscosity of a solution containing 8.0 wt % of a polymer prepared by dispensing a small amount of this polyimide solution, removing the solvent under reduced pressure and dissolving the residue in γ-butyrolactone was 33 mPa·s.

Synthesis Example PI-2

112 g (0.50 mole) of 2,3,5-tricarboxycyclopentylacetic dianhydride and 157 g (0.50 mole) of 1,3,3a,4,5,9b-hexahydro-8-methyl-5-(tetrahydro-2,5-dioxo-3-furanyl)-naphtho [1,2-c]-furan-1,3-dione as tetracarboxylic dianhydrides, 96 g (0.89 mole) of p-phenylenediamine, 25 g (0.10 mole) of bisaminopropyltetramethyldisiloxane and 13 g (0.020 mole) of 3,6-bis(4-aminobenzoyloxy)cholestane as diamines, and 8.1 g (0.030 mole) of N-octadecylamine as a monoamine were dissolved in 960 g of N-methyl-2-pyrrolidone to carry out a reaction at 60° C. for 6 hours. The solution viscosity of a solution containing 10 wt % of a polymer prepared by dispensing a small amount of the obtained polyamic acid solution and adding N-methyl-2-pyrrolidone to this solution was 60 mPa·s.

Then, 2,700 g of N-methyl-2-pyrrolidone was added to the obtained polyamic acid solution, and 396 g of pyridine and 409 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 2,400 g of a solution containing 15 wt % of a polyimide (PI-2) having an imidization rate of about 95%.

The solution viscosity of a solution containing 6.0 wt % of a polymer prepared by dispensing a small amount of the obtained polyimide solution and adding N-methyl-2-pyrrolidone to this solution was 18 mPa·s.

Synthesis Example PI-3

224 g (1.0 mole) of 2,3,5-tricarboxycyclopentylacetic dianhydride as a tetracarboxylic dianhydride and 107 g (0.99 mole) of p-phenylenediamine and 6.43 g (0.010 mole) of 3,6-bis(4-aminobenzoyloxy)cholestane as diamines were dissolved in 3,039 g of N-methyl-2-pyrrolidone to carryout a reaction at 60° C. for 6 hours so as to obtain a solution containing 10 wt % of a polyamic acid. The solution viscosity of this polyamic acid was 260 mPa·s.

2,700 g of N-methyl-2-pyrrolidone was added to the obtained polyamic acid solution, and 396 g of pyridine and 306 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 3,500 g of a solution containing 9.0 wt % of a polyimide (PI-3) having an imidization rate of about 89%.

The solution viscosity of a solution containing 5.0 wt % of a polymer prepared by dispensing a small amount of the obtained polyimide solution and adding N-methyl-2-pyrrolidone to this solution was 74 mPa·s.

Synthesis Example PI-4

112 g (0.50 mole) of 2,3,5-tricarboxycyclopentylacetic dianhydride and 157 g (0.50 mole) of 1,3,3a,4,5,9b-hexahydro-8-methyl-5-(tetrahydro-2,5-dioxo-3-furanyl)-naphtho [1,2-c]-furan-1,3-dione as tetracarboxylic dianhydrides and 89 g (0.82 mole) of p-phenylenediamine, 32 g (0.10 mole) of 2,2'-ditrifluoromethyl-4,4'-diaminobiphenyl, 25 g (0.059 mole) of 1-(3,5-diaminobenzoyloxy)-4-(4-trifluoromethylbenzoyloxy)-cyclohexane and 4.0 g (0.011 mole) of octadecanoxy-2,5-diaminobenzene as diamines were dissolved in 2,175 g of N-methyl-2-pyrrolidone to carryout a reaction at 60° C. for 6 hours so as to obtain a solution containing a polyamic acid. The solution viscosity of a solution containing 10 wt % of a polymer prepared by dispensing a small amount of the obtained polyamic acid solution and adding N-methyl-2-pyrrolidone to this solution was 110 mPa·s.

3,000 g of N-methyl-2-pyrrolidone was added to 1,500 g of the obtained polyamic acid solution, and 221 g of pyridine and 228 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 4,000 g of a solution containing 10 wt % of polyimide (PI-4) having an imidization rate of about 92%.

The solution viscosity of a solution containing 4.5 wt % of a polymer prepared by dispensing a small amount of the obtained polyimide solution and adding N-methyl-2-pyrrolidone to this solution was 28 mPa·s.

Synthesis Example PI-5

19.9 g (0.089 mole) of 2,3,5-tricarboxycyclopentylacetic dianhydride as a tetracarboxylic dianhydride and 6.8 g (0.063 mole) of p-phenylenediamine, 3.6 g (0.018 mole) of 4,4'-diaminodiphenylmethane and 4.7 g (0.009 mole) of a compound represented by the following formula (D-6) as diamines were dissolved in 140 g of N-methyl-2-pyrrolidone to carry out a reaction at 60° C. for 4 hours. The solution viscosity of a solution containing 10 wt % of a polymer prepared by dispensing a small amount of the obtained polyamic acid solution and adding N-methyl-2-pyrrolidone to this solution was 115 mPa·s.

(D-6)

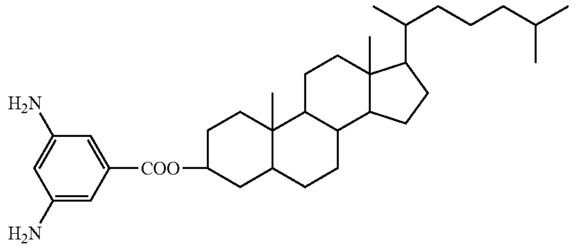

Then, 325 g of N-methyl-2-pyrrolidone was added to the obtained polyamic acid solution, and 14 g of pyridine and 18 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 220 g of a solution containing 15.4 wt % of a polyimide (PI-5) having an imidization rate of about 77%.

The solution viscosity of a solution containing 10 wt % of a polymer prepared by dispensing a small amount of the obtained polyimide solution and adding N-methyl-2-pyrrolidone to this solution was 84 mPa·s.

Synthesis Example PI-6

20.9 g (0.093 mole) of 2,3,5-tricarboxycyclopentylacetic dianhydride as a tetracarboxylic dianhydride and 9.2 g (0.085 mole) of p-phenylenediamine and 4.9 g (0.009 mole) of the compound represented by the above formula (D-6) as diamines were dissolved in 140 g of N-methyl-2-pyrrolidone to carry out a reaction at 60° C. for 4 hours so as to obtain a solution containing a polyamic acid. The solution viscosity of a solution containing 10 wt % of a polymer prepared by dispensing a small amount of the obtained polyamic acid solution and adding N-methyl-2-pyrrolidone to this solution was 126 mPa·s.

Then, 325 g of N-methyl-2-pyrrolidone was added to the obtained polyamic acid solution, and 7.4 g of pyridine and 9.5 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 220 g of a solution containing 16.1 wt % of a polyimide (PI-6) having an imidization rate of about 54%.

The solution viscosity of a solution containing 10 wt % of a polymer prepared by dispensing a small amount of the obtained polyimide solution and adding N-methyl-2-pyrrolidone to this solution was 75 mPa·s.

Synthesis Example PI-7

18.8 g (0.084 mole) of 2,3,5-tricarboxycyclopentylacetic dianhydride as a tetracarboxylic dianhydride and 7.4 g (0.068 mole) of p-phenylenediamine and 8.9 g (0.017 mole) of the compound represented by the above formula (D-6) as diamines were dissolved in 140 g of N-methyl-2-pyrrolidone to carry out a reaction at 60° C. for 4 hours so as to obtain a solution containing a polyamic acid. The solution viscosity of a solution containing 10 wt % of a polymer prepared by dispensing a small amount of the obtained polyamic acid solution and adding N-methyl-2-pyrrolidone to this solution was 126 mPa·s.

Then, 325 g of N-methyl-2-pyrrolidone was added to the obtained polyamic acid solution, and 6.6 g of pyridine and 8.5 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 210 g of a solution containing 15.9 wt % of a polyimide (PI-7) having an imidization rate of about 55%.

The solution viscosity of a solution containing 10 wt % of a polymer prepared by dispensing a small amount of the obtained polyimide solution and adding N-methyl-2-pyrrolidone to this solution was 75 mPa·s.

Synthesis Example PI-8

19.1 g (0.085 mole) of 2,3,5-tricarboxycyclopentylacetic dianhydride as a tetracarboxylic dianhydride and 7.4 g (0.069 mole) of p-phenylenediamine and 8.5 g (0.017 mole) of a compound represented by the following formula (D-7) as diamines were dissolved in 140 g of N-methyl-2-pyrrolidone to carry out a reaction at 60° C. for 4 hours so as to obtain a solution containing a polyamic acid. The solution viscosity of a solution containing 10 wt % of a polymer prepared by dispensing a small amount of the obtained polyamic acid solution and adding N-methyl-2-pyrrolidone to this solution was 206 mPa·s.

(D-7)

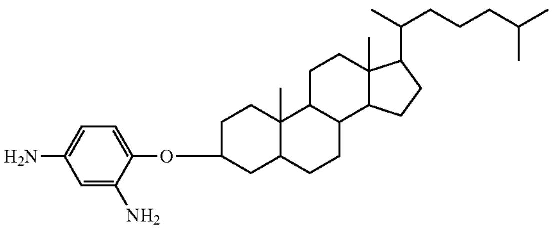

Then, 325 g of N-methyl-2-pyrrolidone was added to the obtained polyamic acid solution, and 6.7 g of pyridine and 8.7 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 200 g of a solution containing 15.8 wt % of a polyimide (PI-8) having an imidization rate of about 52%.

The solution viscosity of a solution containing 10 wt % of a polymer prepared by dispensing a small amount of the obtained polyimide solution and adding N-methyl-2-pyrrolidone to this solution was 105 mPa·s.

Synthesis Example PI-9

17.3 g (0.077 mole) of 2,3,5-tricarboxycyclopentylacetic dianhydride as a tetracarboxylic dianhydride and 5.9 g (0.054 mole) of p-phenylenediamine, 4.1 g (0.008 mole) of the compound represented by the above formula (D-6) and 7.7 g (0.016 mole) of the compound represented by the above formula (D-7) as diamines were dissolved in 140 g of N-methyl-2-pyrrolidone to carry out a reaction at 60° C. for 4 hours. The solution viscosity of a solution containing 10 wt % of a polymer prepared by dispensing a small amount of the obtained polyamic acid solution and adding N-methyl-2-pyrrolidone to this solution was 117 mPa·s.

Then, 325 g of N-methyl-2-pyrrolidone was added to the obtained polyamic acid solution, and 6.1 g of pyridine and 7.9 g of acetic anhydride were added to carry out a dehydration ring-closure reaction at 110° C. for 4 hours. After the end of the dehydration ring-closure reaction, the solvent in the system was substituted by new N-methyl-2-pyrrolidone to obtain about 210 g of a solution containing 15.4 wt % of a polyimide (PI-9) having an imidization rate of about 55%.

The solution viscosity of a solution containing 10 wt % of a polymer prepared by dispensing a small amount of the obtained polyimide solution and adding N-methyl-2-pyrrolidone to this solution was 109 mPa·s.

[Synthesis of Another Polysiloxane]

Synthesis Example PS-1

20.8 g of tetraethoxysilane and 28.2 g of 1-ethoxy-2-propanol were fed to a 200 ml three-necked flask equipped with a cooling tube, heated at 60° C. and stirred. A maleic anhydride aqueous solution prepared in a different 20 ml flask by dissolving 0.26 g of maleic anhydride in 10.8 g of water was added to the resulting mixture and heated at 60° C. and stirred for another 4 hours to carry out a reaction. The solvent was distilled off from the obtained reaction mixture, and 1-ethoxy-2-propanol was added to concentrate the reaction mixture again so as to obtain a polymer solution containing 10 wt % of a polyorganosiloxane PS-1. The weight average molecular weight Mw of PS-1 was 5,100.

<Synthesis of Liquid Crystal Aligning Polyorganosiloxane>

Example VE-1

10.0 g of the reactive polyorganosiloxane EPS-1 prepared in the above Synthesis Example 1, 30.28 g of methyl isobutyl ketone, 3.82 g of stearic acid and 0.10 g of UCAT 18X (trade name, curing accelerator for epoxy compounds of Sun Apro Ltd.) were fed to a 200 ml three-necked flask to carry out a reaction under agitation at 100° C. for 48 hours. After the end of the reaction, methanol was added to the reaction mixture to produce a precipitate, a solution obtained by dissolving this precipitate in ethyl acetate was rinsed in water 3 times, an organic layer was dried with magnesium sulfate, and the solvent was distilled off to obtain 8.1 g of a white powder of a liquid crystal aligning polyorganosiloxane S-VE-1. The weight average molecular weight of S-VE-1 was 10,100.

Example VE-2

8.2 g of a white powder of a liquid crystal aligning polyorganosiloxane S-VE-2 was obtained in the same manner as in the above Example VE-1 except that 11.82 g of EPS-10 synthesized in the above Synthesis Example 10 was used in place of EPS-1. The weight average molecular weight of S-VE-2 was 15,200.

Example VE-3

A white powder of a liquid crystal aligning polyorganosiloxane S-VE-3 was obtained in the same manner as in the above Example VE-1 except that 14.92 g of EPS-11 synthesized in Synthesis Example 11 was used in place of EPS-1. The weight average molecular weight of S-VE-3 was 9,500.

Example VE-4

9.0 g of a white powder of a liquid crystal aligning polyorganosiloxane S-VE-4 was obtained in the same manner as in the above Example VE-1 except that 3.98 g of 4-n-dodecyloxybenzoic acid was used in place of stearic acid. The weight average molecular weight of S-VE-4 was 9,900.

Example VE-5

8.6 g of a white powder of a liquid crystal aligning polyorganosiloxane S-VE-5 was obtained in the same manner as in the above Example VE-2 except that 3.98 g of 4-n-dodecyloxybenzoic acid was used in place of stearic acid. The weight average molecular weight of S-VE-5 was 9,900.

Example VE-6

8.8 g of a white powder of a liquid crystal aligning polyorganosiloxane S-VE-6 was obtained in the same manner as in the above Example VE-3 except that 3.98 g of 4-n-dodecyloxybenzoic acid was used in place of stearic acid. The weight average molecular weight of S-VE-6 was 9,400.

<Preparation of Liquid Crystal Aligning Agent and Evaluation of Storage Stability>

Example VE-7

1,000 parts by weight in terms of PA-4 of the solution containing a polyamic acid PA-4 synthesized in the above Synthesis Example PA-4 was collected, 100 parts by weight of the liquid crystal aligning polyorganosiloxane S-VE-1 synthesized in the above Synthesis Example VE-1 was added to the solution, and further N-methyl-2-pyrrolidone and butyl cellosolve were added to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-VE-1.

When the storage stability of this liquid crystal aligning agent A-VE-1 was evaluated by the following method based on the following criteria, the storage stability of the liquid crystal aligning agent A-VE-1 was "acceptable".

[Method of Evaluating Storage Stability]

A coating film of a liquid crystal aligning agent was formed on a glass substrate by spin coating with the number of revolutions as a variable to find the number of revolutions at which the thickness of the coating film after the removal of the solvent became 1,000 Å.

Then, part of the liquid crystal aligning agent A-VE-1 was collected and stored at −15° C. for 5 weeks. When the liquid crystal aligning agent after storage was observed with the eye and the precipitation of an undissolved product was seen, the storage stability was judged as "unacceptable".

When no undissolved product was seen after 5 weeks of storage, a coating film was formed on a glass substrate by spin coating at the number of revolutions at which the film thickness became 1,000 Å before storage to measure the thickness of the film after the removal of the solvent. When this film thickness was 10% or more larger or smaller than 1,000 Å, the storage stability was judged as "unacceptable" and when the film thickness was less than 10% larger or smaller than 1,000 Å, the storage stability was judged as "acceptable".

The thickness of the coating film was measured by using the tracer type uneven film thickness meter of KLA-Tencor Corporation.

Examples VE-8 to -12

Liquid crystal aligning agents A-VE-2 to -6 were prepared in the same manner as in the above Example VE-7 except that the types of the liquid crystal aligning polyorganosiloxane and the another polymer were changed as shown in Table 2, and the storage stabilities of the agents were evaluated. The evaluation results are shown in Table 2.

Example VE-13

100 parts by weight of the liquid crystal aligning polyorganosiloxane S-VE-1 synthesized in the above Example VE-1 and 1,000 parts by weight of the polyamic acid PA-6 synthesized in the above Synthesis Example PA-6 were used in combination, and N-methyl-2-pyrrolidone and butyl cellosolve were added to these so as to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-VE-7.

When the storage stability of this liquid crystal aligning agent A-VE-7 was evaluated in the same manner as in the above Example VE-7, the storage stability of the liquid crystal aligning agent A-VE-7 was "acceptable".

Examples VE-14 to -18

Liquid crystal aligning agents A-VE-8 to -12 were prepared in the same manner as in the above Example VE-13 except that the type of the liquid crystal aligning polyorganosiloxane was changed as shown in Table 2.

The storage stabilities of these liquid crystal aligning agents were evaluated in the same manner as in the above Example VE-7. The evaluation results are shown in Table 2.

Example VE-19

500 parts by weight in terms of PS-1 of the solution containing another polysiloxane PS-1 synthesized in the above Synthesis Example PS-1 was collected, 100 parts by weight of the liquid crystal aligning polyorganosiloxane S-VE-1 synthesized in the above Example VE-1 was added to the above solution, and further 1-ethoxy-2-propanol was added to prepare a solution having a solids content of 4.0 wt %. This solution was filtered with a filter having an opening diameter of 1 μm to prepare a liquid crystal aligning agent A-VE-13.

The storage stability of this liquid crystal aligning agent A-VE-13 was evaluated in the same manner as in the above Example VE-7. The evaluation result is shown in Table 2.

Examples VE-20 to -24

Liquid crystal aligning agents A-VE-14 to -18 were prepared in the same manner as in the above Example VE-19 except that the type of the liquid crystal aligning polyorganosiloxane was changed as shown in Table 2.

The storage stabilities of these liquid crystal aligning agents were evaluated in the same manner as in the above Example VE-7. The evaluation results are shown in Table 2.

Comparative Example VE-1

26.4 g of ethanol was fed to a four-necked flask equipped with a reflux tube, and 10.0 g of oxalic acid was added slowly to ethanol under agitation to prepare an ethanol solution of oxalic acid.

This solution was then heated up to its reflux temperature, and a mixture of 10.9 g of tetraethoxysilane and 2.45 g of octadecyltriethoxysilane was added dropwise to this solution under reflux. After the end of addition, heating was continued under reflux for 5 hours, the obtained product was cooled, and 37.5 g of butyl cellosolve was added to prepare a solution containing a polysiloxane VE-PSR-1. The content of the polysiloxane VE-PSR-1 in this solution was 4 wt % as the content of silicon in terms of $SiO_2$. This solution was filtered by a filter having an opening diameter of 1 μM to prepare a comparative liquid crystal aligning agent R-VE-1.

The storage stability of this liquid crystal aligning agent R-VE-1 was evaluated in the same manner as in Example VE-7. The evaluation result is shown in Table 2.

TABLE 2

| | Name of liquid crystal aligning agent | Name of liquid crystal aligning polyorganosiloxane | Name of another polymer | Storage stability |
|---|---|---|---|---|
| Example VE-7 | A-VE-1 | S-VE-1 | PA-4 | Acceptable |
| Example VE-8 | A-VE-2 | S-VE-2 | PA-4 | Acceptable |
| Example VE-9 | A-VE-3 | S-VE-3 | PA-4 | Acceptable |
| Example VE-10 | A-VE-4 | S-VE-4 | PA-4 | Acceptable |
| Example VE-11 | A-VE-5 | S-VE-5 | PA-4 | Acceptable |
| Example VE-12 | A-VE-6 | S-VE-6 | PA-4 | Acceptable |
| Example VE-13 | A-VE-7 | S-VE-1 | PA-6 | Acceptable |
| Example VE-14 | A-VE-8 | S-VE-2 | PA-6 | Acceptable |
| Example VE-15 | A-VE-9 | S-VE-3 | PA-6 | Acceptable |
| Example VE-16 | A-VE-10 | S-VE-4 | PA-6 | Acceptable |
| Example VE-17 | A-VE-11 | S-VE-5 | PA-6 | Acceptable |
| Example VE-18 | A-VE-12 | S-VE-6 | PA-6 | Acceptable |
| Example VE-19 | A-VE-13 | S-VE-1 | PS-1 | Acceptable |
| Example VE-20 | A-VE-14 | S-VE-2 | PS-1 | Acceptable |
| Example VE-21 | A-VE-15 | S-VE-3 | PS-1 | Acceptable |
| Example VE-22 | A-VE-16 | S-VE-4 | PS-1 | Acceptable |
| Example VE-23 | A-VE-17 | S-VE-5 | PS-1 | Acceptable |
| Example VE-24 | A-VE-18 | S-VE-6 | PS-1 | Acceptable |
| Comparative Example VE-1 | R-VE-1 | none | VE-PSR-1 | Unacceptable |

<Manufacture and Evaluation of Homeotropic Alignment Type Liquid Crystal Display Device>

Example VE-25

Manufacture of Homeotropic Alignment Type Liquid Crystal Display Device

The liquid crystal aligning agent A-VE-1 obtained in the above Example VE-7 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to remove the solvent so as to form a coating film (liquid crystal alignment film) having a thickness of 0.1 μm. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film side of one of the above substrates by screen printing, and the liquid crystal alignment film sides of the pair of the substrates were joined and contact bonded together and heated at 150° C. for 1 hour to thermally cure the adhesive. After negative type liquid crystals (MLC-6608 of Merk & Co., Inc.) were filled into the space between the substrates from a liquid crystal injection port, the liquid crystal injection port was sealed with an epoxy-based adhesive, and the resulting assembly was heated at 150° C. for 10 minutes and then gradually cooled to room temperature to remove flow alignment at the time of injecting liquid crystals.

A polarizing plate was put on the exterior sides of the substrates in such a manner that the polarizing directions of the two polarizing plates became orthogonal to each other to manufacture a homeotropic alignment type liquid crystal display device.

[Evaluation of Liquid Crystal Display Device]

(1) Evaluation of Liquid Crystal Alignability

The existence of an abnormal domain formed by a change in brightness when the liquid crystal display device manufactured above was turned on and off by applying and not applying a voltage of 5 V (application and cancellation of voltage) was checked with the eye.

Liquid crystal alignability was evaluated as “acceptable” when light leakage from the cell was not observed at the time of not applying voltage, and a cell drive area displayed white and there was no light leakage from other areas at the time of applying voltage. Meanwhile, liquid crystal alignability was evaluated as “unacceptable” when light leakage from the cell was observed at the time of not applying voltage or light leakage from other areas except for the cell drive area was observed at the time of applying voltage. The liquid crystal alignability of this liquid crystal display device was “acceptable”.

(2) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio. When the voltage holding ratio was 90% or more, it was evaluated as “acceptable”. The voltage holding ratio of this liquid crystal display device was “acceptable”.

(3) Evaluation of Heat Resistance

The initial voltage holding ratio of a liquid crystal display device manufactured in the same manner as above was measured under the same conditions as the above evaluation of voltage holding ratio. After the liquid crystal display device was left in an oven at 100° C. for 1,000 hours, the voltage holding ratio of the liquid crystal display device was measured again under the same conditions as above. When the voltage holding ratio changed less than ±2% from the initial value, the heat resistance was evaluated as “acceptable” and when the voltage holding ratio changed ±2% or more from the initial value, the heat resistance was evaluated as “unacceptable”. The heat resistance of this liquid crystal display device was “acceptable”.

(4) Evaluation of After Image Property

A voltage of DC 17V was applied to a liquid crystal display device manufactured in the same manner as above in a 100° C. environment for 20 hours, and the residual voltage (residual DC voltage) in the liquid crystal cell right after DC voltage was cut off was obtained by a flicker erasing method. When this residual DC voltage value was 500 mV or less, the heat resistance was evaluated as “acceptable” and when the residual DC voltage value was larger than 500 mV, the heat resistance was evaluated as “unacceptable”. The after image property of this liquid crystal display device was “acceptable”.

(5) Evaluation of Light Resistance

The initial voltage holding ratio of a liquid crystal display device manufactured in the same manner as above was measured under the same conditions as the above evaluation of voltage holding ratio. Thereafter, the liquid crystal display device was placed at a distance of 5 cm below a 40 W white fluorescent lamp and illuminated for 1,000 hours, and its voltage holding ratio was measured again under the same conditions as above. When the voltage holding ratio changed less than ±2% from the initial value, the light resistance was evaluated as “acceptable” and when the voltage holding ratio changed ±2% or more from the initial value, the light resistance was evaluated as “unacceptable”. The light resistance of this liquid crystal display device was “acceptable”.

Examples VE-26 to VE-42 and Comparative Example VE-2

Liquid crystal display devices were manufactured in the same manner as in Example VE-25 except that liquid crystal aligning agents shown in Table 3 were used. The results are shown in Table 3.

TABLE 3

| | Name of liquid crystal aligning agent | Liquid crystal alignability | Voltage holding ratio | Heat resistance | After image property | Light resistance |
|---|---|---|---|---|---|---|
| Example VE-25 | A-VE-1 | Acceptable | Acceptable | Acceptable | Acceptable | Acceptable |
| Example VE-26 | A-VE-2 | Acceptable | Acceptable | Acceptable | Acceptable | Acceptable |
| Example VE-27 | A-VE-3 | Acceptable | Acceptable | Acceptable | Acceptable | Acceptable |
| Example VE-28 | A-VE-4 | Acceptable | Acceptable | Acceptable | Acceptable | Acceptable |
| Example VE-29 | A-VE-5 | Acceptable | Acceptable | Acceptable | Acceptable | Acceptable |
| Example VE-30 | A-VE-6 | Acceptable | Acceptable | Acceptable | Acceptable | Acceptable |

TABLE 3-continued

| | Name of liquid crystal aligning agent | Liquid crystal alignability | Voltage holding ratio | Heat resistance | After image property | Light resistance |
|---|---|---|---|---|---|---|
| Example VE-31 | A-VE-7 | Acceptable | Acceptable | Acceptable | Acceptable | Acceptable |
| Example VE-32 | A-VE-8 | Acceptable | Acceptable | Acceptable | Acceptable | Acceptable |
| Example VE-33 | A-VE-9 | Acceptable | Acceptable | Acceptable | Acceptable | Acceptable |
| Example VE-34 | A-VE-10 | Acceptable | Acceptable | Acceptable | Acceptable | Acceptable |
| Example VE-35 | A-VE-11 | Acceptable | Acceptable | Acceptable | Acceptable | Acceptable |
| Example VE-36 | A-VE-12 | Acceptable | Acceptable | Acceptable | Acceptable | Acceptable |
| Example VE-37 | A-VE-13 | Acceptable | Acceptable | Acceptable | Acceptable | Acceptable |
| Example VE-38 | A-VE-14 | Acceptable | Acceptable | Acceptable | Acceptable | Acceptable |
| Example VE-39 | A-VE-15 | Acceptable | Acceptable | Acceptable | Acceptable | Acceptable |
| Example VE-40 | A-VE-16 | Acceptable | Acceptable | Acceptable | Acceptable | Acceptable |
| Example VE-41 | A-VE-17 | Acceptable | Acceptable | Acceptable | Acceptable | Acceptable |
| Example VE-42 | A-VE-18 | Acceptable | Acceptable | Acceptable | Acceptable | Acceptable |
| Comparative Examplme VE-2 | R-VE-1 | Acceptable | Acceptable | Unacceptable | Unacceptable | Unacceptable |

<Synthesis of Liquid Crystal Aligning Polyorganosiloxane>

Example CE-1

5.0 g of the reactive polyorganosiloxane (EPS-1) obtained in the above Synthesis Example 1, 46.4 g of methyl isobutyl ketone, 4.76 g of the compound (A-1-C4-1) obtained in the above Synthesis Example A-1-C(1) and 0.10 g of UCAT 18X (trade name, quaternary amine salt of San-Apro Ltd.) were fed to a 200 ml three-necked flask to carry out a reaction under agitation at 80° C. for 12 hours. After the end of the reaction, re-precipitation was carried out with methanol, the precipitate was dissolved in ethyl acetate to obtain a solution, the solution was rinsed in water 3 times, and the solvent was distilled off to obtain 2.8 g of a white powder of a liquid crystal aligning polyorganosiloxane S-CE-1. The weight average molecular weight Mw of this liquid crystal aligning polyorganosiloxane S-CE-1 was 10,100.

Example CE-2

3.0 g of a white powder of a liquid crystal aligning polyorganosiloxane S-CE-2 was obtained in the same manner as in the above Example CE-1 except that 0.10 g of triisopropylamine was used in place of UCAT 18× and the agitation time was changed to 24 hours. The weight average molecular weight Mw of this liquid crystal aligning polyorganosiloxane S-CE-2 was 15,200.

Example CE-3

2.7 g of a white powder of a liquid crystal aligning polyorganosiloxane S-CE-3 was obtained in the same manner as in the above Example CE-1 except that 0.10 g of tetrabutylammonium bromide was used in place of UCAT 18X and the agitation time was changed to 8 hours. The weight average molecular weight Mw of this liquid crystal aligning polyorganosiloxane S-CE-3 was 9,500.

Example CE-4

2.7 g of a white powder of a liquid crystal aligning polyorganosiloxane S-CE-4 was obtained in the same manner as in the above Example CE-3 except that 5.30 g of the compound (A-1-C4-2) obtained in the above Synthesis Example A-1-C(2) was used in place of the compound (A-1-C4-1). The weight average molecular weight Mw of this liquid crystal aligning polyorganosiloxane S-CE-4 was 9,900.

Example CE-5

7.6 g of a white powder of a liquid crystal aligning polyorganosiloxane S-CE-S was obtained in the same manner as in the above Example CE-4 except that 9.54 g of the compound (A-1-C4-2) was used and the agitation time was changed to 24 hours. The weight average molecular weight Mw of this liquid crystal aligning polyorganosiloxane S-CE-5 was 9,900.

<Preparation of Liquid Crystal Aligning Agent and Evaluation of Storage Stability>

Example CE-6

100 parts by weight of the liquid crystal aligning polyorganosiloxane S-CE-1 obtained in the above Example CE-1 and 1,000 parts by weight in terms of PA-4 of the solution containing a polyamic acid PA-4 obtained in the above Synthesis Example PA-4 as the another polymer were used in combination, and N-methyl-2-pyrrolidone and butyl cellosolve were added to these so as to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-CE-1.

This liquid crystal aligning agent A-CE-1 was stored at −15° C. for 6 months. The viscosity of the liquid crystal aligning agent A-CE-1 was measured at 25° C. before and after storage with an E type viscometer. The storage stability was evaluated as "acceptable" when the change rate of the solution viscosity before and after storage was less than 10% and as "unacceptable when the change rate was 10% or more. The storage stability of the liquid crystal aligning agent A-CE-1 was "acceptable".

Examples CE-7 and -12 to -14

Liquid crystal aligning agents A-CE-2 and A-CE-7 to A-CE-9 were prepared in the same manner as in the above Example CE-6 except that the type of the liquid crystal aligning polyorganosiloxane and the type and amount of the another polymer were changed as shown in Table 4.

The storage stabilities of these liquid crystal aligning agents were evaluated in the same manner as in Example CE-6. The evaluation results are shown in Table 4.

Example CE-8

100 parts by weight of the liquid crystal aligning polyorganosiloxane S-CE-1 obtained in the above Example CE-1 and 1,000 parts by weight of the polyamic acid PA-6 obtained in the above Synthesis Example PA-6 as the another polymer were used in combination, and N-methyl-2-pyrrolidone and butyl cellosolve were added to these so as to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-CE-3.

Examples CE-9 to -11, -15 and -16

Liquid crystal aligning agents A-CE-4 to A-CE-6, A-CE-10 and A-CE-11 were prepared in the same manner as in the above Example CE-6 except that the types of the liquid crystal aligning polyorganosiloxane and the another polymer were changed as shown in Table 4.

The storage stabilities of these liquid crystal aligning agents were evaluated in the same manner as in Example CE-6. The evaluation results are shown in Table 4.

Example CE-17

2,000 parts by weight in terms of PS-1 of the solution containing another polyorganosiloxane PS-1 obtained in the above Synthesis Example PS-1 as the another polymer was collected, 100 parts by weight of the radiation sensitive polyorganosiloxane S-CE-5 obtained in the above Example CE-5 was added to this solution, and 1-ethoxy-2-propanol was further added to the resulting mixture so as to prepare a solution having a solids content of 4.0 wt %. This solution was filtered with a filter having an opening diameter of 1 μm to prepare a liquid crystal aligning agent A-CE-12.

The storage stability of this liquid crystal aligning agent was evaluated in the same manner as in the above Example CE-6. The evaluation result is shown in Table 4.

inside had been substituted by nitrogen at 200° C. for 1 hour to form a coating film having a thickness of 0.1 μm. 1,000 $J/m^2$ of polarized ultraviolet radiation including a 313 nm bright line was applied to the surface of this coating film by using an Hg—Xe lamp and a Glan-Taylor prism from a direction 40° inclined from the normal of the substrate to form a liquid crystal alignment film. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film side of one of the above substrates by screen printing, the liquid crystal alignment film sides of the pair of substrates were opposed to each other and contact bonded together in such a manner that the projection directions on the substrate surfaces of the optical axis of ultraviolet radiation of the substrates became anti-parallel to each other, and the adhesive was thermally cured at 150° C. for 1 hour. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and formed an angle of 45° from the projection directions on the substrate surfaces of the optical axis of ultraviolet radiation of the liquid crystal alignment films to manufacture a homeotropic alignment type liquid crystal display device.

This liquid crystal display device was evaluated by the following methods. The evaluation results are shown in Table 5.

TABLE 4

| | Name of liquid crystal aligning agent | Name of liquid crystal aligning polyorganosiloxane | Another polymer Name | Another polymer Amount (parts by weight) | Storage stability |
|---|---|---|---|---|---|
| Example CE-6 | A-CE-1 | S-CE-1 | PA-4 | 1,000 | Acceptable |
| Example CE-7 | A-CE-2 | S-CE-1 | PA-4 | 500 | Acceptable |
| Example CE-8 | A-CE-3 | S-CE-1 | PA-6 | 500 | Acceptable |
| Example CE-9 | A-CE-4 | S-CE-1 | PI-10 | 500 | Acceptable |
| Example CE-10 | A-CE-5 | S-CE-2 | PA-6 | 500 | Acceptable |
| Example CE-11 | A-CE-6 | S-CE-3 | PA-6 | 500 | Acceptable |
| Example CE-12 | A-CE-7 | S-CE-4 | PA-4 | 2,000 | Acceptable |
| Example CE-13 | A-CE-8 | S-CE-4 | PA-4 | 1,000 | Acceptable |
| Example CE-14 | A-CE-9 | S-CE-4 | PA-4 | 500 | Acceptable |
| Example CE-15 | A-CE-10 | S-CE-4 | PA-6 | 500 | Acceptable |
| Example CE-16 | A-CE-11 | S-CE-5 | PA-6 | 500 | Acceptable |
| Example CE-17 | A-CE-12 | S-CE-5 | PS-1 | 500 | Acceptable |

<Manufacture and Evaluation of Homeotropic Alignment Type Liquid Crystal Display Device>

Example CE-18

Manufacture of Homeotropic Alignment Type Liquid Crystal Display Device

The liquid crystal aligning agent A-VE-1 prepared in the above Example CE-6 was applied to the transparent electrode side of a glass substrate having a transparent electrode which was composed of an ITO film with a spinner, prebaked on a hot plate at 80° C. for 1 minute and heated in an oven whose

[Evaluation of Liquid Crystal Display Device]

(1) Evaluation of Liquid Crystal Alignability

The existence of an abnormal domain formed by a change in brightness when the liquid crystal display device manufactured above was turned on and off by applying and not applying a voltage of 5 V (application and cancellation of voltage) was checked through an optical microscope. Liquid crystal alignability was evaluated as "acceptable" when there was no abnormal domain.

(2) Evaluation of Pretilt Angle

The pretilt angle of the liquid crystal display device manufactured above was measured by a crystal rotation method using a He—Ne laser beam in accordance with the method described in T. J. Scheffer et. al. J. Appl. Phys. Vol. 19, p. 2013 (1980).

(3) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio.

(4) Evaluation of Burn-In

After a 30 HZ, 3 V rectangular wave on which DC 5V had been superimposed was applied to the liquid crystal display device manufactured above in a 60° C. environment for 2 hours, the residual DC voltage in the liquid crystal cell right after the DC voltage was cut off was obtained by a flicker erasing method.

(5) Evaluation of Light Resistance

The initial voltage holding ratio of a liquid crystal display device manufactured in the same manner as above was measured under the same conditions as the above evaluation of voltage holding ratio. Thereafter, the liquid crystal display device was placed at a distance of 5 cm below a 40 W white fluorescent lamp and illuminated for 1,000 hours, and its voltage holding ratio was measured again under the same conditions as above. When the voltage holding ratio changed less than ±2% from the initial value, the light resistance was evaluated as “acceptable” and when the voltage holding ratio changed ±2% or more from the initial value, the light resistance was evaluated as “unacceptable”.

Examples CE-19 to CE-33

Homeotropic alignment type liquid crystal display devices were manufactured and evaluated in the same manner as in the above Example CE-18 except that the type of the liquid crystal aligning agent used and the dose of polarized ultraviolet radiation used to form the liquid crystal alignment film were changed as shown in Table 5. The results are shown in Table 5.

Comparative Example CE-1

Synthesis Of Polyamic Acid 22.4 g (0.1 mole) of 2,3,5-tricarboxycyclopentylacetic dianhydride and 48.46 g (0.1 mole) of a compound represented by the following formula (d-1) synthesized in accordance with JP-A 2003-520878 were dissolved in 283.4 g of N-methyl-2-pyrrolidone to carryout a reaction at room temperature for 6 hours.

(d-1)

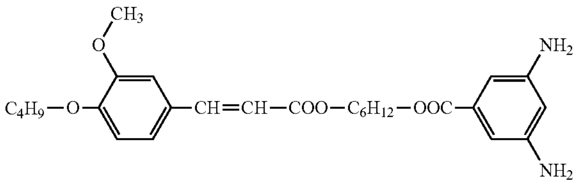

Then, the reaction mixture was injected into an excessive amount of methanol to precipitate a reaction product. The obtained precipitate was washed with methanol and dried at 40° C. under reduced pressure for 15 hours to obtain 67 g of a polyamic acid.

<Preparation of Liquid Crystal Aligning Agent>

The polyamic acid synthesized above was dissolved in a mixed solvent of N-methyl-2-pyrrolidone and butyl cellosolve (weight ratio of 50:50) to prepare a solution having a solid content of 3.0 wt %. This solution was filtered with a filter having an opening diameter of 1 μm to prepare a liquid crystal aligning agent R-CE-1.

<Manufacture and Evaluation of Liquid Crystal Display Device>

A homeotropic alignment type liquid crystal display device was manufactured and evaluated in the same manner as in the above Example CE-18 except that the liquid crystal aligning agent R-CE-1 prepared above was used. The results are shown in Table 5.

TABLE 5

| | Name of liquid crystal aligning agent | Dose of ultraviolet radiation/ ($J/m^2$) | Liquid crystal alignability | Pretilt angle (°) | Voltage holding ratio (%) | Burn-in (mV) | Light resistance |
|---|---|---|---|---|---|---|---|
| Example CE-18 | A-CE-1 | 1,000 | Acceptable | 89 | 98 | 5 | Acceptable |
| Example CE-19 | A-CE-2 | 1,000 | Acceptable | 89 | 98 | 5 | Acceptable |
| Example CE-20 | A-CE-3 | 200 | Acceptable | 89 | 98 | 7 | Acceptable |
| Example CE-21 | A-CE-3 | 1,000 | Acceptable | 89 | 98 | 6 | Acceptable |
| Example CE-22 | A-CE-3 | 3,000 | Acceptable | 89 | 98 | 6 | Acceptable |
| Example CE-23 | A-CE-4 | 1,000 | Acceptable | 89 | 98 | 8 | Acceptable |
| Example CE-24 | A-CE-5 | 1,000 | Acceptable | 89 | 98 | 6 | Acceptable |
| Example CE-25 | A-CE-6 | 1,000 | Acceptable | 89 | 98 | 6 | Acceptable |
| Example CE-26 | A-CE-7 | 1,000 | Acceptable | 89 | 99 | 6 | Acceptable |
| Example CE-27 | A-CE-8 | 1,000 | Acceptable | 89 | 99 | 5 | Acceptable |
| Example CE-28 | A-CE-9 | 200 | Acceptable | 89 | 99 | 6 | Acceptable |

TABLE 5-continued

| | Name of liquid crystal aligning agent | Dose of ultraviolet radiation/ ($J/m^2$) | Liquid crystal alignability | Pretilt angle (°) | Voltage holding ratio (%) | Burn-in (mV) | Light resistance |
|---|---|---|---|---|---|---|---|
| Example CE-29 | A-CE-9 | 1,000 | Acceptable | 89 | 99 | 5 | Acceptable |
| Example CE-30 | A-CE-9 | 3,000 | Acceptable | 89 | 99 | 5 | Acceptable |
| Example CE-31 | A-CE-10 | 1,000 | Acceptable | 89 | 99 | 5 | Acceptable |
| Example CE-32 | A-CE-11 | 1,000 | Acceptable | 89 | 99 | 5 | Acceptable |
| Example CE-33 | A-CE-12 | 200 | Acceptable | 89 | 99 | 7 | Acceptable |
| Comparative Example CE-1 | R-CE-1 | 3,000 | Acceptable | 89 | 97 | 150 | Unacceptable |

<Synthesis of Liquid Crystal Aligning Polyorganosiloxane>

Example CE-34

5.0 g of the reactive polyorganosiloxane EPS-1 obtained in the above Synthesis Example 1, 46.4 g of methyl isobutyl ketone, 3.18 g of the compound (A-1-C4-2) obtained in the above Synthesis Example A-1-C(2) as the compound R—Z, 1.35 g of n-octyloxybenzoic acid as the another pretilt angle generating compound and 0.10 g of tetrabutylammonium bromide were fed to a 200 ml three-necked flask to carry out a reaction under agitation at 80° C. for 8 hours. After the end of the reaction, re-precipitation was carried out with methanol, the precipitate was dissolved in ethyl acetate to prepare a solution, the solution was rinsed in water 3 times, and the solvent was distilled off to obtain a liquid crystal aligning polyorganosiloxane S-CE-6 as a white powder. The weight average molecular weight Mw of the liquid crystal aligning polyorganosiloxane S-CE-6 was 11,500.

Examples CE-35 to -45

Liquid crystal aligning polyorganosiloxanes S-CE-7 to S-CE-17 were obtained in the same manner as in the above Example CE-34 except that the amount of the compound (A-1-C4-2) and the type and amount of the another pretilt angle generating compound were changed as shown in Table 6. The weight average molecular weights Mw of these liquid crystal aligning polyorganosiloxanes are shown in Table 6.

In Table 6, the pretilt angle generating compounds "(5-3-1)", "(5-3-2)" and "(5-3-3)" are compounds represented by the above formulas (S-1), (5-3-2) and (5-3-3), respectively.

TABLE 6

| | Name of liquid crystal aligning polyorganosiloxane | Amount of compound (A-1-C4-2) (g) | Another pretilt angle generating compound Type | Another pretilt angle generating compound Amount (g) | Mw of polyorganosiloxane |
|---|---|---|---|---|---|
| Example CE-34 | S-CE-6 | 3.18 | n-octyloxybenzoic acid | 1.35 | 11,500 |
| Example CE-35 | S-CE-7 | 5.30 | n-octyloxybenzoic acid | 1.35 | 12,000 |
| Example CE-36 | S-CE-8 | 3.18 | 5-3-1 | 1.11 | 11,800 |
| Example CE-37 | S-CE-9 | 5.30 | 5-3-1 | 1.11 | 12,300 |
| Example CE-38 | S-CE-10 | 3.18 | 5-3-2 | 1.33 | 12,500 |
| Example CE-39 | S-CE-11 | 5.30 | 5-3-2 | 1.33 | 13,000 |
| Example CE-40 | S-CE-12 | 3.18 | 5-3-3 | 1.60 | 12,600 |
| Example CE-41 | S-CE-13 | 5.30 | 5-3-3 | 1.60 | 13,000 |
| Example CE-42 | S-CE-14 | 3.18 | Dodecanoic acid | 1.08 | 11,000 |
| Example CE-43 | S-CE-15 | 5.30 | Dodecanoic acid | 1.08 | 11,200 |
| Example CE-44 | S-CE-16 | 3.18 | Stearic acid | 1.53 | 12,100 |
| Example CE-45 | S-CE-17 | 5.30 | Stearic acid | 1.53 | 12,400 |

<Preparation of Liquid Crystal Aligning Agent>

Example CE-46

1,000 parts by weight in terms of PA-2 of the solution containing a polyamic acid PA-2 obtained in the above Synthesis Example PA-2 was collected as the another polymer, 100 parts by weight of the liquid crystal aligning polyorganosiloxane obtained in the above Example CE-4 was added to this solution, and N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-CE-13.

The storage stability of the liquid crystal aligning agent was evaluated in the same manner as in Example CE-6. The evaluation result is shown in Table 7.

Examples CE-47 to -75

Liquid crystal aligning agents A-CE-14 to -42 were prepared in the same manner as in the above Example CE-46 except that the types of the liquid crystal aligning polyorganosiloxane and the another polymer contained in the polymer solution were changed as shown in Table 7.

The storage stabilities of these liquid crystal aligning agents were evaluated in the same manner as in the above Example CE-6. The evaluation results are shown in Table 7.

TABLE 7

| | Name of liquid crystal aligning agent | Name of liquid crystal aligning polyorgano-siloxane | Type of another polymer | Storage stability |
|---|---|---|---|---|
| Example CE-46 | A-CE-13 | S-CE-4 | PA-2 | Acceptable |
| Example CE-47 | A-CE-14 | S-CE-4 | PA-3 | Acceptable |
| Example CE-48 | A-CE-15 | S-CE-4 | PA-4 | Acceptable |
| Example CE-49 | A-CE-16 | S-CE-4 | PA-5 | Acceptable |
| Example CE-50 | A-CE-17 | S-CE-4 | PI-1 | Acceptable |
| Example CE-51 | A-CE-18 | S-CE-4 | PI-2 | Acceptable |
| Example CE-52 | A-CE-19 | S-CE-4 | PI-3 | Acceptable |
| Example CE-53 | A-CE-20 | S-CE-4 | PI-4 | Acceptable |
| Example CE-54 | A-CE-21 | S-CE-4 | PI-5 | Acceptable |
| Example CE-55 | A-CE-22 | S-CE-4 | PI-6 | Acceptable |
| Example CE-56 | A-CE-23 | S-CE-4 | PI-7 | Acceptable |
| Example CE-57 | A-CE-24 | S-CE-4 | PI-8 | Acceptable |
| Example CE-58 | A-CE-25 | S-CE-4 | PI-9 | Acceptable |
| Example CE-59 | A-CE-26 | S-CE-6 | PA-4 | Acceptable |
| Example CE-60 | A-CE-27 | S-CE-7 | PA-4 | Acceptable |
| Example CE-61 | A-CE-28 | S-CE-8 | PA-4 | Acceptable |
| Example CE-62 | A-CE-29 | S-CE-9 | PA-4 | Acceptable |
| Example CE-63 | A-CE-30 | S-CE-10 | PA-4 | Acceptable |
| Example CE-64 | A-CE-31 | S-CE-11 | PA-4 | Acceptable |
| Example CE-65 | A-CE-32 | S-CE-12 | PA-4 | Acceptable |
| Example CE-66 | A-CE-33 | S-CE-13 | PA-4 | Acceptable |
| Example CE-67 | A-CE-34 | S-CE-14 | PA-4 | Acceptable |
| Example CE-68 | A-CE-35 | S-CE-15 | PA-4 | Acceptable |
| Example CE-69 | A-CE-36 | S-CE-16 | PA-4 | Acceptable |
| Example CE-70 | A-CE-37 | S-CE-17 | PA-4 | Acceptable |
| Example CE-71 | A-CE-38 | S-CE-17 | PI-5 | Acceptable |
| Example CE-72 | A-CE-39 | S-CE-17 | PI-6 | Acceptable |
| Example CE-73 | A-CE-40 | S-CE-17 | PI-7 | Acceptable |
| Example CE-74 | A-CE-41 | S-CE-17 | PI-8 | Acceptable |
| Example CE-75 | A-CE-42 | S-CE-17 | PI-9 | Acceptable |

Example CE-76

100 parts by weight of the radiation sensitive polyorganosiloxane S-CE-4 obtained in the above Example CE-4 and 1,000 parts by weight in terms of PA-4 of the solution containing a polyamic acid PA-4 obtained in the above Synthesis Example PA-4 were used in combination, 50 parts by weight of a compound represented by the following formula (E-1) as an epoxy compound was added to the obtained mixture, and further N-methyl-2-pyrrolidone and butyl cellosolve were added to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-CE-43.

(E-1)

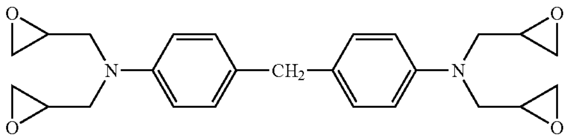

The storage stability of this liquid crystal aligning agent was evaluated in the same manner as in Example CE-6. The evaluation result is shown in Table 8.

Examples CE-77 to -107

Liquid crystal aligning agents A-CE-44 to -74 were obtained in the same manner as in the above Example CE-76 except that the types of the liquid crystal aligning polyorganosiloxane and the another polymer contained in the polymer solution and the type and amount of the epoxy compound were changed as shown in Table 8.

The storage stabilities of these liquid crystal aligning agents were evaluated in the same manner as in Example CE-6. The evaluation results are shown in Table 8.

In Table 8, the epoxy compound "E-1" is a compound represented by the above formula (E-1) and the epoxy compound "E-2" is a compound represented by the following formula (E-2).

(E-2)

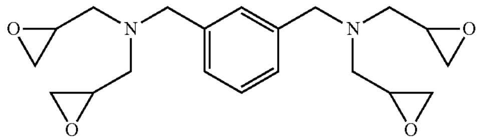

TABLE 8

| | Name of liquid crystal aligning agent | Type of liquid crystal aligning polyorganosiloxane | Type of another polymer | Epoxy compound Type | Epoxy compound Amount (parts by weight) | Storage stability |
|---|---|---|---|---|---|---|
| Example CE-76 | A-CE-43 | S-CE-4 | PA-4 | E-1 | 50 | Acceptable |
| Example CE-77 | A-CE-44 | S-CE-4 | PA-4 | E-1 | 200 | Acceptable |
| Example CE-78 | A-CE-45 | S-CE-4 | PA-4 | E-2 | 50 | Acceptable |
| Example CE-79 | A-CE-46 | S-CE-4 | PA-4 | E-2 | 200 | Acceptable |
| Example CE-80 | A-CE-47 | S-CE-4 | PI-5 | E-1 | 50 | Acceptable |
| Example CE-81 | A-CE-48 | S-CE-4 | PI-5 | E-1 | 200 | Acceptable |
| Example CE-82 | A-CE-49 | S-CE-4 | PI-5 | E-2 | 50 | Acceptable |
| Example CE-83 | A-CE-50 | S-CE-4 | PI-5 | E-2 | 200 | Acceptable |
| Example CE-84 | A-CE-51 | S-CE-4 | PI-6 | E-1 | 50 | Acceptable |
| Example CE-85 | A-CE-52 | S-CE-4 | PI-6 | E-1 | 200 | Acceptable |
| Example CE-86 | A-CE-53 | S-CE-4 | PI-6 | E-2 | 50 | Acceptable |
| Example CE-87 | A-CE-54 | S-CE-4 | PI-6 | E-2 | 200 | Acceptable |

TABLE 8-continued

| | Name of liquid crystal aligning agent | Type of liquid crystal aligning polyorganosiloxane | Type of another polymer | Epoxy compound Type | Amount (parts by weight) | Storage stability |
|---|---|---|---|---|---|---|
| Example CE-88 | A-CE-55 | S-CE-4 | PI-7 | E-1 | 50 | Acceptable |
| Example CE-89 | A-CE-56 | S-CE-4 | PI-7 | E-1 | 200 | Acceptable |
| Example CE-90 | A-CE-57 | S-CE-4 | PI-7 | E-2 | 50 | Acceptable |
| Example CE-91 | A-CE-58 | S-CE-4 | PI-7 | E-2 | 200 | Acceptable |
| Example CE-92 | A-CE-59 | S-CE-17 | PA-4 | E-1 | 50 | Acceptable |
| Example CE-93 | A-CE-60 | S-CE-17 | PA-4 | E-1 | 200 | Acceptable |
| Example CE-94 | A-CE-61 | S-CE-17 | PA-4 | E-2 | 50 | Acceptable |
| Example CE-95 | A-CE-62 | S-CE-17 | PA-4 | E-2 | 200 | Acceptable |
| Example CE-96 | A-CE-63 | S-CE-17 | PI-5 | E-1 | 50 | Acceptable |
| Example CE-97 | A-CE-64 | S-CE-17 | PI-5 | E-1 | 200 | Acceptable |
| Example CE-98 | A-CE-65 | S-CE-17 | PI-5 | E-2 | 50 | Acceptable |
| Example CE-99 | A-CE-66 | S-CE-17 | PI-5 | E-2 | 200 | Acceptable |
| Example CE-100 | A-CE-67 | S-CE-17 | PI-6 | E-1 | 50 | Acceptable |
| Example CE-101 | A-CE-68 | S-CE-17 | PI-6 | E-1 | 200 | Acceptable |
| Example CE-102 | A-CE-69 | S-CE-17 | PI-6 | E-2 | 50 | Acceptable |
| Example CE-103 | A-CE-70 | S-CE-17 | PI-6 | E-2 | 200 | Acceptable |
| Example CE-104 | A-CE-71 | S-CE-17 | PI-7 | E-1 | 50 | Acceptable |
| Example CE-105 | A-CE-72 | S-CE-17 | PI-7 | E-1 | 200 | Acceptable |
| Example CE-106 | A-CE-73 | S-CE-17 | PI-7 | E-2 | 50 | Acceptable |
| Example CE-107 | A-CE-74 | S-CE-17 | PI-7 | E-2 | 200 | Acceptable |

Examples CE-108 to -169

Homeotropic alignment type liquid crystal display devices were manufactured and evaluated in the same manner as in the above Example CE-18 except that the type of the liquid crystal aligning agent used was changed as shown in Table 9.

The evaluation results are shown in Table 9.

TABLE 9

| | Name of liquid crystal aligning agent | Liquid crystal alignability | Pretilt angle (°) | Voltage holding ratio (%) | Burn-in (mV) | Light resistance |
|---|---|---|---|---|---|---|
| Example CE-108 | A-CE-13 | Acceptable | 89 | 99 | 6 | Acceptable |
| Example CE-109 | A-CE-14 | Acceptable | 89 | 99 | 6 | Acceptable |
| Example CE-110 | A-CE-15 | Acceptable | 89 | 99 | 6 | Acceptable |
| Example CE-111 | A-CE-16 | Acceptable | 89 | 99 | 6 | Acceptable |
| Example CE-112 | A-CE-17 | Acceptable | 89 | 99 | 6 | Acceptable |
| Example CE-113 | A-CE-18 | Acceptable | 89 | 99 | 6 | Acceptable |
| Example CE-114 | A-CE-19 | Acceptable | 89 | 99 | 6 | Acceptable |
| Example CE-115 | A-CE-20 | Acceptable | 89 | 99 | 6 | Acceptable |
| Example CE-116 | A-CE-21 | Acceptable | 89 | 99 | 5 | Acceptable |
| Example CE-117 | A-CE-22 | Acceptable | 89 | 99 | 5 | Acceptable |
| Example CE-118 | A-CE-23 | Acceptable | 89 | 99 | 5 | Acceptable |
| Example CE-119 | A-CE-24 | Acceptable | 89 | 99 | 5 | Acceptable |
| Example CE-120 | A-CE-25 | Acceptable | 89 | 99 | 5 | Acceptable |
| Example CE-121 | A-CE-26 | Acceptable | 89 | 99 | 6 | Acceptable |
| Example CE-122 | A-CE-27 | Acceptable | 89 | 99 | 6 | Acceptable |
| Example CE-123 | A-CE-28 | Acceptable | 89 | 99 | 6 | Acceptable |
| Example CE-124 | A-CE-29 | Acceptable | 89 | 99 | 6 | Acceptable |
| Example CE-125 | A-CE-30 | Acceptable | 89 | 99 | 5 | Acceptable |
| Example CE-126 | A-CE-31 | Acceptable | 89 | 99 | 5 | Acceptable |
| Example CE-127 | A-CE-32 | Acceptable | 89 | 99 | 5 | Acceptable |
| Example CE-128 | A-CE-33 | Acceptable | 89 | 99 | 5 | Acceptable |
| Example CE-129 | A-CE-34 | Acceptable | 89 | 99 | 5 | Acceptable |
| Example CE-130 | A-CE-35 | Acceptable | 89 | 99 | 5 | Acceptable |
| Example CE-131 | A-CE-36 | Acceptable | 89 | 99 | 5 | Acceptable |
| Example CE-132 | A-CE-37 | Acceptable | 89 | 99 | 5 | Acceptable |
| Example CE-133 | A-CE-38 | Acceptable | 89 | 99 | 5 | Acceptable |
| Example CE-134 | A-CE-39 | Acceptable | 89 | 99 | 5 | Acceptable |
| Example CE-135 | A-CE-40 | Acceptable | 89 | 99 | 5 | Acceptable |
| Example CE-136 | A-CE-41 | Acceptable | 89 | 99 | 5 | Acceptable |
| Example CE-137 | A-CE-42 | Acceptable | 89 | 99 | 5 | Acceptable |
| Example CE-138 | A-CE-43 | Acceptable | 89 | 99 | 6 | Acceptable |
| Example CE-139 | A-CE-44 | Acceptable | 89 | 99 | 6 | Acceptable |
| Example CE-140 | A-CE-45 | Acceptable | 89 | 99 | 6 | Acceptable |

TABLE 9-continued

| | Name of liquid crystal aligning agent | Liquid crystal alignability | Pretilt angle (°) | Voltage holding ratio (%) | Burn-in (mV) | Light resistance |
|---|---|---|---|---|---|---|
| Example CE-141 | A-CE-46 | Acceptable | 89 | 99 | 6 | Acceptable |
| Example CE-142 | A-CE-47 | Acceptable | 89 | 99 | 6 | Acceptable |
| Example CE-143 | A-CE-48 | Acceptable | 89 | 99 | 8 | Acceptable |
| Example CE-144 | A-CE-49 | Acceptable | 89 | 99 | 6 | Acceptable |
| Example CE-145 | A-CE-50 | Acceptable | 89 | 99 | 6 | Acceptable |
| Example CE-146 | A-CE-51 | Acceptable | 89 | 99 | 6 | Acceptable |
| Example CE-147 | A-CE-52 | Acceptable | 89 | 99 | 6 | Acceptable |
| Example CE-148 | A-CE-53 | Acceptable | 89 | 99 | 6 | Acceptable |
| Example CE-149 | A-CE-54 | Acceptable | 89 | 99 | 6 | Acceptable |
| Example CE-150 | A-CE-55 | Acceptable | 89 | 99 | 6 | Acceptable |
| Example CE-151 | A-CE-56 | Acceptable | 89 | 99 | 6 | Acceptable |
| Example CE-152 | A-CE-57 | Acceptable | 89 | 99 | 6 | Acceptable |
| Example CE-153 | A-CE-58 | Acceptable | 89 | 99 | 6 | Acceptable |
| Example CE-154 | A-CE-59 | Acceptable | 89 | 99 | 6 | Acceptable |
| Example CE-155 | A-CE-60 | Acceptable | 89 | 99 | 6 | Acceptable |
| Example CE-156 | A-CE-61 | Acceptable | 89 | 99 | 6 | Acceptable |
| Example CE-157 | A-CE-62 | Acceptable | 89 | 99 | 6 | Acceptable |
| Example CE-158 | A-CE-63 | Acceptable | 89 | 99 | 6 | Acceptable |
| Example CE-159 | A-CE-64 | Acceptable | 89 | 99 | 6 | Acceptable |
| Example CE-160 | A-CE-65 | Acceptable | 89 | 99 | 6 | Acceptable |
| Example CE-161 | A-CE-66 | Acceptable | 89 | 99 | 6 | Acceptable |
| Example CE-162 | A-CE-67 | Acceptable | 89 | 99 | 6 | Acceptable |
| Example CE-163 | A-CE-68 | Acceptable | 89 | 99 | 6 | Acceptable |
| Example CE-164 | A-CE-69 | Acceptable | 89 | 99 | 6 | Acceptable |
| Example CE-165 | A-CE-70 | Acceptable | 89 | 99 | 6 | Acceptable |
| Example CE-166 | A-CE-71 | Acceptable | 89 | 99 | 6 | Acceptable |
| Example CE-167 | A-CE-72 | Acceptable | 89 | 99 | 6 | Acceptable |
| Example CE-168 | A-CE-73 | Acceptable | 89 | 99 | 6 | Acceptable |
| Example CE-169 | A-CE-74 | Acceptable | 89 | 99 | 6 | Acceptable |

<Synthesis of Liquid Crystal Aligning Polyorganosiloxane>

Example CE-170

5.0 g of the reactive polyorganosiloxane EPS-1 obtained in the above Synthesis Example 1, 46.4 g of methyl isobutyl ketone, 50 mol based on the silicon atom of EPS-1 of the compound (A-1-C1-1) obtained in the above Synthesis Example A-1-C(1) as the compound R—Z and 0.10 g of tetrabutylammonium bromide were fed to a 200 ml three-necked flask to carry out a reaction under agitation at 80° C. for 8 hours. After the end of the reaction, re-precipitation was carried out with methanol, the precipitate was dissolved in ethyl acetate to prepare a solution, the solution was rinsed in water 3 times, and the solvent was distilled off to obtain a liquid crystal aligning polyorganosiloxane S-CE-18 as a white powder. The weight average molecular weight Mw of this liquid crystal aligning polyorganosiloxane S-CE-18 was 8,800.

Examples CE-171 to -181

Liquid crystal aligning polyorganosiloxanes S-CE-19 to -29 were obtained in the same manner as in the above Example CE-170 except that the types of the reactive polyorganosiloxane and the compound R—Z were changed as shown in Table 10.

The weight average molecular weights Mw of these liquid crystal aligning polyorganosiloxanes are shown in Table 10.

TABLE 10

| | Type of reactive polyorgano-siloxane | Type of compound R—Z | liquid crystal aligning polyorganosiloxane Name | Mw |
|---|---|---|---|---|
| Example CE-170 | EPS-1 | A-1-C1-1 | S-CE-18 | 8,800 |
| Example CE-171 | EPS-1 | A-1-C8-1 | S-CE-19 | 9,400 |
| Example CE-172 | EPS-6 | A-3-C1-1 | S-CE-20 | 10,600 |
| Example CE-173 | EPS-6 | A-3-C2-1 | S-CE-21 | 11,000 |
| Example CE-174 | EPS-6 | A-2-C3-1 | S-CE-22 | 12,000 |
| Example CE-175 | EPS-6 | A-2-C3-2 | S-CE-23 | 12,300 |
| Example CE-176 | EPS-6 | A-1-C9-1 | S-CE-24 | 12,000 |
| Example CE-177 | EPS-6 | A-1-C9-2 | S-CE-25 | 12,200 |
| Example CE-178 | EPS-2 | A-1-C4-2 | S-CE-26 | 10,500 |
| Example CE-179 | EPS-3 | A-1-C4-2 | S-CE-27 | 10,000 |
| Example CE-180 | EPS-4 | A-1-C4-2 | S-CE-28 | 13,000 |
| Example CE-181 | EPS-5 | A-1-C4-2 | S-CE-29 | 10,300 |

<Preparation of Liquid Crystal Aligning Agent and Evaluation of Storage Stability>

Examples CE-182 to -193

Liquid crystal aligning agents were prepared in the same manner as in the above Example CE-6 except that the type of the liquid crystal aligning polyorganosiloxane was changed as shown in Table 11. The storage stabilities of these liquid crystal aligning agents were evaluated in the same manner as in Example CE-6. The evaluation results are shown in Table 11.

TABLE 11

| | Name of liquid crystal aligning agent | Type of liquid crystal aligning polyorganosiloxane | Storage stability |
|---|---|---|---|
| Example CE-182 | A-CE-75 | S-CE-18 | Acceptable |
| Example CE-183 | A-CE-76 | S-CE-19 | Acceptable |
| Example CE-184 | A-CE-77 | S-CE-20 | Acceptable |
| Example CE-185 | A-CE-78 | S-CE-21 | Acceptable |
| Example CE-186 | A-CE-79 | S-CE-22 | Acceptable |
| Example CE-187 | A-CE-80 | S-CE-23 | Acceptable |
| Example CE-188 | A-CE-81 | S-CE-24 | Acceptable |
| Example CE-189 | A-CE-82 | S-CE-25 | Acceptable |
| Example CE-190 | A-CE-83 | S-CE-26 | Acceptable |
| Example CE-191 | A-CE-84 | S-CE-27 | Acceptable |
| Example CE-192 | A-CE-85 | S-CE-28 | Acceptable |
| Example CE-193 | A-CE-86 | S-CE-29 | Acceptable |

<Manufacture and Evaluation of Liquid Crystal Display Device>

[Manufacture and Evaluation of Homeotropic Alignment Type Liquid Crystal Display Device]

Examples CE-194 to -197 and -200 to -205

Homeotropic alignment type liquid crystal display devices were manufactured and evaluated in the same manner as in the above Example CE-18 except that the type of the liquid crystal aligning agent used and the dose of ultraviolet radiation were changed as shown in Table 12. The results are shown in Table 12.

[Manufacture and Evaluation of TN Alignment Type Liquid Crystal Display Device]

Examples CE-198 and -199

The liquid crystal aligning agent A-CE-79 prepared in the above Example CE-186 was applied to the transparent electrode side of a glass substrate having a transparent electrode which was composed of an ITO film with a spinner, prebaked on a hot plate at 80° C. for 1 minute and heated at 180° C. for 1 hour to form a coating film having a thickness of 0.1 μm. 3,000 J/m$^2$ of polarized ultraviolet radiation including a 313 nm bright line was applied to the surface of this coating film by using an Hg—Xe lamp and a Glan-Taylor prism from a direction 40° inclined from the normal of the substrate to provide liquid crystal aligning capability so as form a liquid crystal alignment film.

This operation was repeated to prepare a pair of (two) substrates having this liquid crystal alignment film on the transparent conductive film.

An epoxy resin adhesive containing aluminum oxide spheres having a diameter of 5.5 μm was applied to the peripheries of the liquid crystal alignment film formed sides of the above pair of substrates by screen printing, and the substrates were joined and contact bonded together in such a manner that the application directions of polarized ultraviolet radiation became orthogonal to each other and heated at 150° C. for 1 hour to thermally cure the adhesive. After positive type nematic liquid crystals (MLC-6221 of Merk & Co., Inc., containing a chiral agent) were injected into the space between the substrates from a liquid crystal injection port to fill the space, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and parallel to the polarizing directions of the liquid crystal alignment films to manufacture a TN alignment type liquid crystal display device.

The liquid crystal alignability, voltage holding ratio, burn-in and light resistance of this liquid crystal display device were evaluated in the same manner as in Example CE-18. The evaluation results are shown in Table 12.

TABLE 12

| | Name of liquid crystal aligning agent | Dose of ultraviolet radiation (J/m$^2$) | Alignment mode | Liquid crystal alignability | Pretilt angle (°) | Voltage holding ratio (%) | Burn-in (mV) | Light resistance |
|---|---|---|---|---|---|---|---|---|
| Example CE-194 | A-CE-75 | 1,000 | Homeotropic | Acceptable | 89 | 98 | 6 | Acceptable |
| Example CE-195 | A-CE-76 | 1,000 | Homeotropic | Acceptable | 89 | 98 | 5 | Acceptable |
| Example CE-196 | A-CE-77 | 1,000 | Homeotropic | Acceptable | 89 | 98 | 10 | Acceptable |
| Example CE-197 | A-CE-78 | 1,000 | Homeotropic | Acceptable | 89 | 98 | 10 | Acceptable |
| Example CE-198 | A-CE-79 | 3,000 | TN | Acceptable | — | 97 | 15 | Acceptable |
| Example CE-199 | A-CE-80 | 3,000 | TN | Acceptable | — | 97 | 16 | Acceptable |
| Example CE-200 | A-CE-81 | 3,000 | Homeotropic | Acceptable | 89 | 97 | 13 | Acceptable |
| Example CE-201 | A-CE-82 | 3,000 | Homeotropic | Acceptable | 89 | 97 | 14 | Acceptable |
| Example CE-202 | A-CE-83 | 1,000 | Homeotropic | Acceptable | 89 | 99 | 6 | Acceptable |
| Example CE-203 | A-CE-84 | 1,000 | Homeotropic | Acceptable | 89 | 99 | 6 | Acceptable |
| Example CE-204 | A-CE-85 | 1,000 | Homeotropic | Acceptable | 89 | 99 | 6 | Acceptable |
| Example CE-205 | A-CE-86 | 1,000 | Homeotropic | Acceptable | 89 | 99 | 4 | Acceptable |

<Synthesis of Liquid Crystal Aligning Polyorganosiloxane>

Example IE-1

5.0 g of the reactive polyorganosiloxane EPS-1 obtained in the above Synthesis Example 1, 5.18 g (corresponding to 50 mol % of the oxiranyl group of the reactive polyorganosiloxane) of the compound (A-4-C1-1(1)) obtained in the above Example A-4-C(1) as the compound R—Z and 0.5 g of tetrabutylammonium bromide were fed to a 200 ml three-necked flask equipped with a reflux tube, and N,N-dimethylacetamide was added to ensure that the solids content of the solution became 20 wt % so as to carry out a reaction at 120° C. for 10 hours. After the end of the reaction, methanol was added to produce a precipitate, a solution obtained by dissolving this precipitate in ethyl acetate was rinsed in water 3 times, and the solvent was distilled off to obtain 7.8 g of a white powder of a liquid crystal aligning polyorganosiloxane S-IE-1. The weight average molecular weight Mw of this liquid crystal aligning polyorganosiloxane S-IE-1 was 18,100.

Examples IE-2 to -8

Liquid crystal aligning polyorganosiloxanes S-IE-2 to S-IE-8 were synthesized in the same manner as in the above Example IE-1 except that the type of the reactive polyorganosiloxane and the type and amount of the compound R—Z were changed as shown in Table 13. The weight average molecular weights Mw of these liquid crystal aligning polyorganosiloxanes are shown in Table 13

In Examples IE-6 and -7, two different compounds R—Z were used, respectively.

In Table 13, the amount of the compound R—Z is based on the silicon atom of the reactive polyorganosiloxane.

TABLE 13

| | Type of reactive polyorganosiloxane | Compound R—Z Type | Compound R—Z Amount (mol %) | liquid crystal aligning polyorganosiloxane Name | liquid crystal aligning polyorganosiloxane Mw |
|---|---|---|---|---|---|
| Example IE-1 | EPS-1 | A-4-C1-1(1) | 50 | S-IE-1 | 18,100 |
| Example IE-2 | EPS-1 | A-4-C1-1(1) | 75 | S-IE-2 | 21,000 |
| Example IE-3 | EPS-2 | A-4-C1-1(2) | 50 | S-IE-3 | 20,500 |
| Example IE-4 | EPS-3 | A-4-C1-1(3) | 50 | S-IE-4 | 17,200 |
| Example IE-5 | EPS-1 | A-5-C1-1 | 50 | S-IE-5 | 20,800 |
| Example IE-6 | EPS-1 | A-4-C1-1(2) | 30 | S-IE-6 | 21,300 |
| | | A-4-C1-2 | 20 | | |
| Example IE-7 | EPS-1 | A-4-C1-1(2) | 40 | S-IE-7 | 21,200 |
| | | A-5-C1-2 | 10 | | |
| Example IE-8 | EPS-1 | A-8-C1-1 | 50 | S-IE-8 | 29,900 |

<Preparation of Liquid Crystal Aligning Agent and Evaluation of Storage Stability>

Example IE-9

100 parts by weight of the liquid crystal aligning polyorganosiloxane S-IE-1 obtained in the above Example IE-1 and 2,000 parts by weight in terms of PA-1 of the solution containing a polyamic acid PA-1 obtained in the above Synthesis Example PA-1 as the another polymer were used in combination, and 1-methyl-2-pyrrolidone and butyl cellosolve were added to these to prepare a solution having a solvent composition of 1-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-IE-1.

This liquid crystal aligning agent A-IE-1 was stored at −15° C. for 6 months. The viscosity of the liquid crystal aligning agent A-1E-1 was measured at 25° C. before and after storage with an E type viscometer. The storage stability was evaluated as "acceptable" when the change rate of the solution viscosity before and after storage was less than 10% and as "unacceptable" when the change rate was 10% or more. The storage stability of the liquid crystal aligning agent A-IE-1 was "acceptable".

Examples IE-10 to -32

Liquid crystal aligning agents A-IE-2 to A-IE-24 were prepared in the same manner as in the above Example IE-9 except that the type of the liquid crystal aligning polyorganosiloxane and the type and amount of the another polymer were changed as shown in Table 14. The storage stabilities of these liquid crystal aligning agents were evaluated in the same manner as in Example IE-9 and shown in Table 14.

Examples IE-33 to -36

Solutions having a solids content of 3.0 wt % were prepared in the same manner as in the above Example IE-9 except that the type and amount of the another polymer were changed as shown in Table 14 and the type and amount of the epoxy compound shown in Table 14 were used, and filtered with a filter having an opening diameter of 1 μm to prepare liquid crystal aligning agents A-IE-25 to A-IE-28.

In Table 14, the epoxy compounds E-1 and E-2 are compounds represented by the above formulas (E-1) and (E-2), respectively.

Example IE-37

500 parts by weight in terms of PS-1 of the solution containing another polysiloxane PS-1 obtained in the above Synthesis Example PS-1 was collected as the another polymer, 100 parts by weight of the radiation sensitive polyorganosiloxane S-IE-1 obtained in the above Example IE-1 was added to this solution and further 1-ethoxy-2-propanol was added to prepare a solution having a solids content of 4.0 wt %. This solution was filtered with a filter having an opening diameter of 1 μm to prepare a liquid crystal aligning agent A-IE-29.

The storage stability of this liquid crystal aligning agent A-IE-29 was evaluated in the same manner as in the above Example IE-9 and shown in Table 14.

TABLE 14

| | Name of liquid crystal aligning agent | Type of liquid crystal aligning polyorganosiloxane | Another polymer Type | Another polymer Amount (parts by weight) | Epoxy compound Type | Epoxy compound Amount (parts by weight) | Storage stability |
|---|---|---|---|---|---|---|---|
| Example IE-9 | A-IE-1 | S-IE-1 | PA-1 | 2,000 | — | 0 | Acceptable |
| Example IE-10 | A-IE-2 | S-IE-1 | PA-2 | 2,000 | — | 0 | Acceptable |
| Example IE-11 | A-IE-3 | S-IE-1 | PA-3 | 2,000 | — | 0 | Acceptable |
| Example IE-12 | A-IE-4 | S-IE-1 | PA-4 | 2,000 | — | 0 | Acceptable |
| Example IE-13 | A-IE-5 | S-IE-1 | PA-5 | 2,000 | — | 0 | Acceptable |
| Example IE-14 | A-IE-6 | S-IE-1 | PA-4 | 500 | — | 0 | Acceptable |
| Example IE-15 | A-IE-7 | S-IE-1 | PA-4 | 1,000 | — | 0 | Acceptable |
| Example IE-16 | A-IE-8 | S-IE-1 | PI-1 | 2,000 | — | 0 | Acceptable |
| Example IE-17 | A-IE-9 | S-IE-1 | PI-2 | 2,000 | — | 0 | Acceptable |
| Example IE-18 | A-IE-10 | S-IE-1 | PI-3 | 2,000 | — | 0 | Acceptable |
| Example IE-19 | A-IE-11 | S-IE-1 | PI-4 | 2,000 | — | 0 | Acceptable |
| Example IE-20 | A-IE-12 | S-IE-1 | PI-5 | 2,000 | — | 0 | Acceptable |
| Example IE-21 | A-IE-13 | S-IE-1 | PI-6 | 2,000 | — | 0 | Acceptable |
| Example IE-22 | A-IE-14 | S-IE-1 | PI-7 | 2,000 | — | 0 | Acceptable |
| Example IE-23 | A-IE-15 | S-IE-1 | PI-8 | 2,000 | — | 0 | Acceptable |
| Example IE-24 | A-IE-16 | S-IE-1 | PI-9 | 2,000 | — | 0 | Acceptable |
| Example IE-25 | A-IE-17 | S-IE-1 | PI-5 | 1,000 | — | 0 | Acceptable |
| Example IE-26 | A-IE-18 | S-IE-2 | PA-4 | 2,000 | — | 0 | Acceptable |
| Example IE-27 | A-IE-19 | S-IE-3 | PA-4 | 2,000 | — | 0 | Acceptable |
| Example IE-28 | A-IE-20 | S-IE-4 | PA-4 | 2,000 | — | 0 | Acceptable |
| Example IE-29 | A-IE-21 | S-IE-5 | PA-4 | 2,000 | — | 0 | Acceptable |
| Example IE-30 | A-IE-22 | S-IE-6 | PA-4 | 2,000 | — | 0 | Acceptable |
| Example IE-31 | A-IE-23 | S-IE-7 | PA-4 | 1,000 | — | 0 | Acceptable |
| Example IE-32 | A-IE-24 | S-IE-8 | PA-4 | 1,000 | — | 0 | Acceptable |
| Example IE-33 | A-IE-25 | S-IE-1 | PI-5 | 1,000 | E-1 | 50 | Acceptable |
| Example IE-34 | A-IE-26 | S-IE-1 | PI-5 | 1,000 | E-1 | 200 | Acceptable |
| Example IE-35 | A-IE-27 | S-IE-1 | PI-7 | 1,000 | E-2 | 50 | Acceptable |
| Example IE-36 | A-IE-28 | S-IE-1 | PI-7 | 1,000 | E-2 | 200 | Acceptable |
| Example IE-37 | A-IE-29 | S-IE-1 | PS-1 | 500 | — | 0 | Acceptable |

Example IE-38

Manufacture of Homeotropic Alignment Type Liquid Crystal Display Device

The liquid crystal aligning agent A-IE-1 prepared in the above Example IE-9 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to form a coating film having a thickness of 0.1 μm. 1,000 $J/m^2$ of polarized ultraviolet radiation including a 313 nm bright line was applied to the surface of this coating film by using an Hg—Xe lamp and a Glan-Taylor prism from a direction 40° inclined from the normal of the substrate to form a liquid crystal alignment film. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film side of one of the above substrates by screen printing, the liquid crystal alignment film sides of the pair of substrates were opposed to each other and contact bonded together in such a manner that the projection directions on the substrate surfaces of the optical axis of ultraviolet radiation of the substrates became anti-parallel to each other, and the adhesive was thermally cured at 150° C. for 1 hour. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and formed an angle of 45° from the projection directions on the substrate surfaces of the optical axis of ultraviolet radiation of the liquid crystal alignment films to manufacture a homeotropic alignment type liquid crystal display device.

This liquid crystal display device was evaluated by the following methods. The evaluation results are shown in Table 15.

<Evaluation of Liquid Crystal Display Device>

(1) Evaluation of Liquid Crystal Alignability

The existence of an abnormal domain formed by a change in brightness when the liquid crystal display device manufactured above was turned on and off by applying and not applying a voltage of 5 V (application and cancellation of voltage) was checked through an optical microscope. Liquid crystal alignability was evaluated as "acceptable" when there was no abnormal domain.

(2) Evaluation of Pretilt Angle

The pretilt angle of the liquid crystal display device manufactured above was measured by a crystal rotation method using a He—Ne laser beam in accordance with the method described in T. J. Scheffer et. al. J. Appl. Phys. Vol. 19, p. 2013 (1980).

(3) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio.

(4) Evaluation of Burn-In

After a 30 HZ, 3 V rectangular wave on which DC 5V had been superimposed was applied to the liquid crystal display device manufactured above in a 60° C. environment for 2 hours, the residual DC voltage in the liquid crystal cell right after the DC voltage was cut off was obtained by a flicker erasing method.

Examples IE-39 to -64

Homeotropic alignment type liquid crystal display devices were manufactured and evaluated in the same manner as in the above Example IE-38 except that the liquid crystal aligning agents shown in Table 15 were used. The evaluation results are shown in Table 15.

Example IE-65

Manufacture and Evaluation of TN Alignment Type Liquid Crystal Display Device The liquid crystal aligning agent A-IE-21 prepared in the above Example IE-29 was applied to the transparent electrode side of a glass substrate having a transparent electrode which was composed of an ITO film with a spinner and heated at 180° C. for 1 hour to form a coating film having a thickness of 0.1 μm. 1,000 $J/m^2$ of polarized ultraviolet radiation including a 313 nm bright line was applied to the surface of this coating film by using an Hg—Xe lamp and a Glan-Taylor prism from a direction 40° inclined from the normal of the substrate to provide liquid crystal aligning capability so as form a liquid crystal alignment film.

This operation was repeated to prepare a pair of (two) substrates having this liquid crystal alignment film on the transparent conductive film.

An epoxy resin adhesive containing aluminum oxide spheres having a diameter of 5.5 μm was applied to the peripheries of the liquid crystal alignment film formed sides of the above pair of substrates by screen printing, and the substrates were joined and contact bonded together in such a manner that the application directions of polarized ultraviolet radiation became orthogonal to each other and heated at 150° C. for 1 hour to thermally cure the adhesive. After positive type nematic liquid crystals (MLC-6221 of Merk & Co., Inc., containing a chiral agent) were injected into the space between the substrates from a liquid crystal injection port to fill the space, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and parallel to the polarizing directions of the liquid crystal alignment films to manufacture a TN alignment type liquid crystal display device.

The liquid crystal alignability, voltage holding ratio and burn-in of this liquid crystal display device were evaluated in the same manner as in Example IE-38. The evaluation results are shown in Table 15.

Example IE-66

A TN alignment type liquid crystal display device was manufactured and evaluated in the same manner as in the above Example IE-65 except that the liquid crystal aligning agent A-IE-24 prepared in Example IE-32 was used as the liquid crystal aligning agent. The evaluation results are shown in Table 15.

TABLE 15

| | Type of liquid crystal aligning agent | Liquid crystal display device | | | | |
|---|---|---|---|---|---|---|
| | | Operation mode | Light crystal alignability | Pretilt angle(°) | Voltage holding ratio(%) | Burn-in (mV) |
| Example IE-38 | A-IE-1 | Homeotropic | Acceptable | 89 | 98 | 6 |
| Example IE-39 | A-IE-2 | Homeotropic | Acceptable | 89 | 98 | 6 |
| Example IE-40 | A-IE-3 | Homeotropic | Acceptable | 89 | 98 | 6 |
| Example IE-41 | A-IE-4 | Homeotropic | Acceptable | 89 | 98 | 5 |
| Example IE-42 | A-IE-5 | Homeotropic | Acceptable | 89 | 98 | 6 |
| Example IE-43 | A-IE-6 | Homeotropic | Acceptable | 89 | 98 | 5 |
| Example IE-44 | A-IE-7 | Homeotropic | Acceptable | 89 | 99 | 5 |
| Example IE-45 | A-IE-8 | Homeotropic | Acceptable | 89 | 98 | 6 |
| Example IE-46 | A-IE-9 | Homeotropic | Acceptable | 89 | 98 | 6 |
| Example IE-47 | A-IE-10 | Homeotropic | Acceptable | 89 | 98 | 6 |
| Example IE-48 | A-IE-11 | Homeotropic | Acceptable | 89 | 99 | 5 |
| Example IE-49 | A-IE-12 | Homeotropic | Acceptable | 89 | 99 | 6 |
| Example IE-50 | A-IE-13 | Homeotropic | Acceptable | 89 | 99 | 5 |
| Example IE-51 | A-IE-14 | Homeotropic | Acceptable | 89 | 99 | 5 |
| Example IE-52 | A-IE-15 | Homeotropic | Acceptable | 89 | 99 | 5 |
| Example IE-53 | A-IE-16 | Homeotropic | Acceptable | 89 | 99 | 5 |
| Example IE-54 | A-IE-17 | Homeotropic | Acceptable | 89 | 99 | 5 |
| Example IE-55 | A-IE-18 | Homeotropic | Acceptable | 89 | 98 | 5 |
| Example IE-56 | A-IE-19 | Homeotropic | Acceptable | 89 | 99 | 5 |
| Example IE-57 | A-IE-20 | Homeotropic | Acceptable | 89 | 99 | 5 |
| Example IE-58 | A-IE-22 | Homeotropic | Acceptable | 89 | 99 | 5 |
| Example IE-59 | A-IE-23 | Homeotropic | Acceptable | 89 | 99 | 6 |
| Example IE-60 | A-IE-25 | Homeotropic | Acceptable | 89 | 99 | 5 |
| Example IE-61 | A-IE-26 | Homeotropic | Acceptable | 89 | 98 | 6 |
| Example IE-62 | A-IE-27 | Homeotropic | Acceptable | 89 | 99 | 5 |
| Example IE-63 | A-IE-28 | Homeotropic | Acceptable | 89 | 98 | 6 |
| Example IE-64 | A-IE-29 | Homeotropic | Acceptable | 89 | 99 | 3 |
| Example IE-65 | A-IE-21 | TN | Acceptable | — | 99 | 10 |
| Example IE-66 | A-IE-24 | TN | Acceptable | — | 98 | 10 |

<Evaluation of Physical Properties of Coating Film>

Examples IE-67 to -93

(1) Evaluation of i-Line Absorption

The liquid crystal aligning agents shown in Table 16 were each spin coated on a quartz substrate, prebaked on a hot plate at 80° C. for 1 minute and then heated at 200° C. for 1 hour to form coating films having a thickness of 0.1 μm. The UV absorption spectra at a wavelength of 250 to 500 nm of the substrates having this coating film thereon were measured with a spectrophotometer (U-2010 of Hitachi, Ltd.)

As for the evaluation of i-line absorption, a coating film having an absorbance at 365 nm of less than 1 when the maximum absorbance at above wavelength range is 100 was "acceptable" and a coating film having an absorbance at 365 nm of 1 or more was "unacceptable".

The evaluation results are shown in Table 16.

(2) Evaluation of Heat Resistance

Homeotropic alignment type liquid crystal display devices were manufactured in the same manner as in the above Example IE-28 except that the liquid crystal aligning agents shown in Table 16 were used and the post-baking temperature was changed to 250° C. in the <manufacture of homeotropic alignment type liquid crystal display device> in the above Example IE-38. The heat resistance was evaluated as "acceptable" when the obtained liquid crystal display device showed satisfactory homeotropic alignability (uniform display of black) and as "unacceptable" when light leakage was seen.

The evaluation results are shown in Table 16.

Example IE-94 and -95

(1) Evaluation of i-Line Absorption

The UV absorption spectra at a wavelength of 250 to 500 nm were measured in the same manner as in the above Examples IE-67 to -93 except that the liquid crystal aligning agents shown in Table 16 were used. The evaluation results are shown in Table 16.

(2) Evaluation of Heat Resistance

TN alignment type liquid crystal display devices were manufactured in the same manner as in the above Example IE-65 except that the liquid crystal aligning agents shown in Table 16 were used and the post-baking temperature was changed to 250° C. in the <manufacture of TN alignment type liquid crystal display device> in the above Example IE-65. The heat resistance was evaluated as "acceptable" when the obtained liquid crystal display device showed satisfactory homeotropic alignability (uniform display of black) and as "unacceptable" when light leakage was seen.

The evaluation results are shown in Table 16.

Comparative Example IE-1

Synthesis Of Polyamic Acid 22.4 g (0.1 mole) of 2,3,5-tricarboxycyclopentylacetic dianhydride and 48.46 g (0.1 mole) of the compound represented by the above formula (d-1) synthesized in accordance with JP-A 2003-520878 were dissolved in 283.4 g of N-methyl-2-pyrrolidone to carry out a reaction at room temperature for 6 hours. Then, the reaction mixture was injected into an excessive amount of methanol to precipitate a reaction product. The obtained precipitate was washed with methanol and dried at 40° C. under reduced pressure for 15 hours to obtain 67 g of a polyamic acid.

<Preparation of Liquid Crystal Aligning Agent>

The polyamic acid synthesized above was dissolved in a mixed solvent of N-methyl-2-pyrrolidone and butyl cellosolve (mixing ratio=50:50 (weight ratio)) to prepare a solution having a solid content of 3.0 wt. %. This solution was filtered with a filter having an opening diameter of 1 μm to prepare a liquid crystal aligning agent RA-IE-1.

<Evaluation of Physical Properties Of Coating Film>

The physical properties of a coating film were evaluated in the same manner as in Examples IE-67 to -93 except that the liquid crystal aligning agent RA-IE-1 prepared above was used.

The evaluation results are shown in Table 16.

TABLE 16

| | Type of liquid crystal aligning agent | Physical properties of coating film | |
|---|---|---|---|
| | | i-line absorption | Heat resistance acceptable |
| Example IE-67 | A-IE-1 | Acceptable | Acceptable |
| Example IE-68 | A-IE-2 | Acceptable | Acceptable |
| Example IE-69 | A-IE-3 | Acceptable | Acceptable |
| Example IE-70 | A-IE-4 | Acceptable | Acceptable |
| Example IE-71 | A-IE-5 | Acceptable | Acceptable |
| Example IE-72 | A-IE-6 | Acceptable | Acceptable |
| Example IE-73 | A-IE-7 | Acceptable | Acceptable |
| Example IE-74 | A-IE-8 | Acceptable | Acceptable |
| Example IE-75 | A-IE-9 | Acceptable | Acceptable |
| Example IE-76 | A-IE-10 | Acceptable | Acceptable |
| Example IE-77 | A-IE-11 | Acceptable | Acceptable |
| Example IE-78 | A-IE-12 | Acceptable | Acceptable |
| Example IE-79 | A-IE-13 | Acceptable | Acceptable |
| Example IE-80 | A-IE-14 | Acceptable | Acceptable |
| Example IE-81 | A-IE-15 | Acceptable | Acceptable |
| Example IE-82 | A-IE-16 | Acceptable | Acceptable |
| Example IE-83 | A-IE-17 | Acceptable | Acceptable |
| Example IE-84 | A-IE-18 | Acceptable | Acceptable |
| Example IE-85 | A-IE-19 | Acceptable | Acceptable |
| Example IE-86 | A-IE-20 | Acceptable | Acceptable |
| Example IE-87 | A-IE-22 | Acceptable | Acceptable |
| Example IE-88 | A-IE-23 | Acceptable | Acceptable |
| Example IE-89 | A-IE-25 | Acceptable | Acceptable |
| Example IE-90 | A-IE-26 | Acceptable | Acceptable |
| Example IE-91 | A-IE-27 | Acceptable | Acceptable |
| Example IE-92 | A-IE-28 | Acceptable | Acceptable |
| Example IE-93 | A-IE-29 | Acceptable | Acceptable |
| Example IE-94 | A-IE-21 | Acceptable | Acceptable |
| Example IE-95 | A-IE-24 | Acceptable | Acceptable |
| Comparative Example IE-1 | RA-IE-1 | Unacceptable | Acceptable |

<Preparation of Liquid Crystal Aligning Agent and Evaluation of Storage Stability>

Examples IE-96 to -107

Liquid crystal aligning agents A-IE-30 to A-IE-41 were prepared in the same manner as in the above Example IE-16 except that the type of the liquid crystal aligning polyorganosiloxane and the type and amount of the another polymer were changed as shown in Table 17. The storage stabilities of these liquid crystal aligning agents were evaluated in the same manner as in Example IE-16 and shown in Table 17.

<Manufacture and Evaluation of Homeotropic Alignment Type Liquid Crystal Display Device>

Examples IE-108 to -119

Homeotropic alignment type liquid crystal display devices were manufactured and evaluated in the same manner as in the above Example IE-38 except that the liquid crystal aligning agents shown in Table 18 were used. The evaluation results are shown in Table 18.

<Evaluation of Physical Properties of Coating Film>

The i-line absorption and the heat resistance were evaluated in the same manner as in Examples IE-67 to -93 except that the liquid crystal aligning agents shown in Table 19 were used.

The evaluation results are shown in Table 19.

TABLE 17

| | Name of liquid crystal aligning agent | Type of liquid crystal aligning polyorganosiloxane | Another polymer Type | Another polymer Amount (parts by weight) | Storage stability |
|---|---|---|---|---|---|
| Example IE-96 | A-IE-30 | S-IE-1 | PA-1 | 1,000 | Acceptable |
| Example IE-97 | A-IE-31 | S-IE-1 | PA-2 | 1,000 | Acceptable |
| Example IE-98 | A-IE-32 | S-IE-1 | PA-3 | 1,000 | Acceptable |
| Example IE-99 | A-IE-33 | S-IE-1 | PA-5 | 1,000 | Acceptable |
| Example IE-100 | A-IE-34 | S-IE-1 | PI-1 | 1,000 | Acceptable |
| Example IE-101 | A-IE-35 | S-IE-1 | PI-2 | 1,000 | Acceptable |
| Example IE-102 | A-IE-36 | S-IE-1 | PI-3 | 1,000 | Acceptable |
| Example IE-103 | A-IE-37 | S-IE-1 | PI-4 | 1,000 | Acceptable |
| Example IE-104 | A-IE-38 | S-IE-1 | PI-6 | 1,000 | Acceptable |
| Example IE-105 | A-IE-39 | S-IE-1 | PI-7 | 1,000 | Acceptable |
| Example IE-106 | A-IE-40 | S-IE-1 | PI-8 | 1,000 | Acceptable |
| Example IE-107 | A-IE-41 | S-IE-1 | PI-9 | 1,000 | Acceptable |

TABLE 18

| | Liquid crystal aligning agent (name) | Liquid crystal display device: Operation mode | Liquid crystal alignability | Pretilt angle (°) | Voltage holding ratio (%) | burn-in (residual DC voltage) (mV) |
|---|---|---|---|---|---|---|
| Example IE-108 | A-IE-30 | Homeotropic | Acceptable | 89 | 98 | 6 |
| Example IE-109 | A-IE-31 | Homeotropic | Acceptable | 89 | 98 | 6 |
| Example IE-110 | A-IE-32 | Homeotropic | Acceptable | 89 | 98 | 6 |
| Example IE-111 | A-IE-33 | Homeotropic | Acceptable | 89 | 98 | 6 |
| Example IE-112 | A-IE-34 | Homeotropic | Acceptable | 89 | 99 | 6 |
| Example IE-113 | A-IE-35 | Homeotropic | Acceptable | 89 | 99 | 6 |
| Example IE-114 | A-IE-36 | Homeotropic | Acceptable | 89 | 99 | 6 |
| Example IE-115 | A-IE-37 | Homeotropic | Acceptable | 89 | 99 | 6 |
| Example IE-116 | A-IE-38 | Homeotropic | Acceptable | 89 | 99 | 6 |
| Example IE-117 | A-IE-39 | Homeotropic | Acceptable | 89 | 99 | 6 |
| Example IE-118 | A-IE-40 | Homeotropic | Acceptable | 89 | 99 | 6 |
| Example IE-119 | A-IE-41 | Homeotropic | Acceptable | 89 | 99 | 6 |

TABLE 19

| | Name of liquid crystal aligning agent | Physical properties of coating film: i-line absorption | Heat resistance |
|---|---|---|---|
| Example IE-120 | A-IE-30 | Acceptable | Acceptable |
| Example IE-121 | A-IE-31 | Acceptable | Acceptable |
| Example IE-122 | A-IE-32 | Acceptable | Acceptable |
| Example IE-123 | A-IE-33 | Acceptable | Acceptable |
| Example IE-124 | A-IE-34 | Acceptable | Acceptable |
| Example IE-125 | A-IE-35 | Acceptable | Acceptable |

TABLE 19-continued

| | Name of liquid crystal aligning agent | Physical properties of coating film: i-line absorption | Heat resistance |
|---|---|---|---|
| Example IE-126 | A-IE-36 | Acceptable | Acceptable |
| Example IE-127 | A-IE-37 | Acceptable | Acceptable |
| Example IE-128 | A-IE-38 | Acceptable | Acceptable |
| Example IE-129 | A-IE-39 | Acceptable | Acceptable |
| Example IE-130 | A-IE-40 | Acceptable | Acceptable |
| Example IE-131 | A-IE-41 | Acceptable | Acceptable |

<Synthesis of Liquid Crystal Aligning Polyorganosiloxane>

Example IE-132

A liquid crystal aligning polyorganosiloxane S-IE-9 was obtained in the same manner as in the above Example IE-1 except that 5.0 g of EPS-4 synthesized in the above Synthesis Example 4 was used in place of EPS-1 as the reactive polyorganosiloxane and the amount of the compound (A-4-C1-1 (2)) as the compound R—Z was changed to 50 mol % based on the oxiranyl group of EPS-4. The weight average molecular weight Mw of S-IE-9 was 16,200.

Example IE-133

A liquid crystal aligning polyorganosiloxane S-IE-10 was obtained in the same manner as in the above Example 1E-1 except that a mixture of 50 mol % based on the oxiranyl group of EPS-1 of the compound (A-4-C1-1(2)) and 5 mol % based on the oxiranyl group of EPS-1 of the compound represented by the above formula (S-1) as the another pretilt angle generating compound was used in place of the compound (A-4-C1-1(1)). The weight average molecular weight Mw of S-IE-10 was 18,400.

Examples IE-134 to -141

Liquid crystal aligning polyorganosiloxanes S-IE-11 to S-IE-18 were obtained in the same manner as in the above Example IE-133 except that the types and amounts of the compound R—Z and the another pretilt angle generating compound were changed as shown in Table 20. The weight average molecular weights Mw of these liquid crystal aligning polyorganosiloxanes are shown in Table 20.

In Table 20, the pretilt angle generating compounds "(5-3-1)", "(5-3-2)" and "(5-3-3)" are compounds represented by the above formulas (5-1), (5-3-2) and (5-3-3), respectively.

<Preparation of Liquid Crystal Aligning Agent and Evaluation of Storage Stability>

Examples IE-142 to -171

Liquid crystal aligning agents A-IE-42 to A-IE-71 were prepared in the same manner as in the above Example IE-9 except that the type of the liquid crystal aligning polyorganosiloxane and the type and amount of the another polymer were changed as shown in Table 21. The storage stabilities of these liquid crystal aligning agents were evaluated in the same manner as in Example IE-9 and shown in Table 21.

<Manufacture and Evaluation of Homeotropic Alignment Type Liquid Crystal Display Device>

Examples IE-172 to -201

Homeotropic alignment type liquid crystal display devices were manufactured and evaluated in the same manner as in the above Example IE-38 except that the liquid crystal aligning agents shown in Table 22 were used. The evaluation results are shown in Table 22.

<Evaluation of Physical Properties of Coating Film>

Examples IE-202 to -231

The i-line absorption and the heat resistance were evaluated in the same manner as in the above Examples IE-67 to -93 except that the liquid crystal aligning agents shown in Table 23 were used.

The evaluation results are shown in Table 23.

TABLE 20

| | Type of polyorganosiloxane having an oxiranyl group | Compound R—Z | | Another pretilt angle generating compound | | Liquid crystal aligning polyorganosiloxane | |
|---|---|---|---|---|---|---|---|
| | | Name | Amount (mol %) | Name | Amount (mol %) | Name | Mw |
| Example IE-132 | EPS-4 | A-4-C1-1(2) | 50 | — | 0 | S-IE-9 | 16,200 |
| Example IE-133 | EPS-1 | A-4-C1-1(2) | 50 | (5-3-1) | 5 | S-IE-10 | 18,400 |
| Example IE-134 | EPS-1 | A-4-C1-1(2) | 50 | (5-3-1) | 10 | S-IE-11 | 18,800 |
| Example IE-135 | EPS-1 | A-4-C1-1(2) | 50 | (5-3-1) | 20 | S-IE-12 | 19,100 |
| Example IE-136 | EPS-1 | A-4-C1-1(2) | 50 | (5-3-2) | 20 | S-IE-13 | 19,500 |
| Example IE-137 | EPS-1 | A-4-C1-1(2) | 50 | (5-3-3) | 20 | S-IE-14 | 19,600 |
| Example IE-138 | EPS-1 | A-4-C1-1(2) | 50 | Dodecanoic acid | 20 | S-IE-15 | 19,000 |
| Example IE-139 | EPS-1 | A-4-C1-1(2) | 50 | Stearic acid | 20 | S-IE-16 | 19,300 |
| Example IE-140 | EPS-1 | A-4-C1-1(3) | 50 | Dodecanoic acid | 20 | S-IE-17 | 19,100 |
| Example IE-141 | EPS-1 | A-4-C1-1(3) | 50 | Stearic acid | 20 | S-IE-18 | 19,300 |

TABLE 21

| | Name of liquid crystal aligning agent | Type of liquid crystal aligning polyorgano-siloxane | Another polymer | | Storage stability |
|---|---|---|---|---|---|
| | | | Type | amount (parts by weight) | |
| Example IE-142 | A-IE-42 | S-IE-9 | PA-4 | 1,000 | Acceptable |
| Example IE-143 | A-IE-43 | S-IE-9 | PA-4 | 500 | Acceptable |
| Example IE-144 | A-IE-44 | S-IE-9 | PA-4 | 1,000 | Acceptable |
| Example IE-145 | A-IE-45 | S-IE-9 | PI-5 | 1,000 | Acceptable |
| Example IE-146 | A-IE-46 | S-IE-9 | PI-6 | 1,000 | Acceptable |
| Example IE-147 | A-IE-47 | S-IE-9 | PI-7 | 1,000 | Acceptable |

TABLE 21-continued

| | Name of liquid crystal aligning agent | Type of liquid crystal aligning polyorgano-siloxane | Another polymer Type | amount (parts by weight) | Storage stability |
|---|---|---|---|---|---|
| Example IE-148 | A-IE-48 | S-IE-9 | PI-8 | 1,000 | Acceptable |
| Example IE-149 | A-IE-49 | S-IE-9 | PI-9 | 1,000 | Acceptable |
| Example IE-150 | A-IE-50 | S-IE-9 | PA-4 | 2,000 | Acceptable |
| Example IE-151 | A-IE-51 | S-IE-10 | PA-4 | 2,000 | Acceptable |
| Example IE-152 | A-IE-52 | S-IE-10 | PI-5 | 2,000 | Acceptable |
| Example IE-153 | A-IE-53 | S-IE-10 | PI-6 | 2,000 | Acceptable |
| Example IE-154 | A-IE-54 | S-IE-10 | PI-7 | 2,000 | Acceptable |
| Example IE-155 | A-IE-55 | S-IE-10 | PI-8 | 2,000 | Acceptable |
| Example IE-156 | A-IE-56 | S-IE-10 | PI-9 | 2,000 | Acceptable |
| Example IE-157 | A-IE-57 | S-IE-11 | PA-4 | 2,000 | Acceptable |
| Example IE-158 | A-IE-58 | S-IE-12 | PA-4 | 2,000 | Acceptable |
| Example IE-159 | A-IE-59 | S-IE-13 | PA-4 | 2,000 | Acceptable |
| Example IE-160 | A-IE-60 | S-IE-14 | PA-4 | 2,000 | Acceptable |
| Example IE-161 | A-IE-61 | S-IE-15 | PA-4 | 2,000 | Acceptable |
| Example IE-162 | A-IE-62 | S-IE-16 | PA-4 | 2,000 | Acceptable |
| Example IE-163 | A-IE-63 | S-IE-17 | PA-4 | 2,000 | Acceptable |
| Example IE-164 | A-IE-64 | S-IE-18 | PA-4 | 2,000 | Acceptable |
| Example IE-165 | A-IE-65 | S-IE-18 | PA-4 | 1,000 | Acceptable |
| Example IE-166 | A-IE-66 | S-IE-18 | PA-4 | 500 | Acceptable |
| Example IE-167 | A-IE-67 | S-IE-18 | PI-5 | 1,000 | Acceptable |
| Example IE-168 | A-IE-68 | S-IE-18 | PI-6 | 1,000 | Acceptable |
| Example IE-169 | A-IE-69 | S-IE-18 | PI-7 | 1,000 | Acceptable |
| Example IE-170 | A-IE-70 | S-IE-18 | PI-8 | 1,000 | Acceptable |
| Example IE-171 | A-IE-71 | S-IE-18 | PI-9 | 1,000 | Acceptable |

TABLE 22

| | Liquid crystal aligning agent (name) | Liquid crystal display device: Alignment mode | Liquid crystal alignability | Pretilt angle (°) | Voltage holding ratio (%) | Burn-in (residual DC voltage) (mV) |
|---|---|---|---|---|---|---|
| Example IE-172 | A-IE-42 | Homeotropic | Acceptable | 89 | 99 | 5 |
| Example IE-173 | A-IE-43 | Homeotropic | Acceptable | 89 | 99 | 5 |
| Example IE-174 | A-IE-44 | Homeotropic | Acceptable | 89 | 99 | 5 |
| Example IE-175 | A-IE-45 | Homeotropic | Acceptable | 89 | 99 | 5 |
| Example IE-176 | A-IE-46 | Homeotropic | Acceptable | 89 | 99 | 5 |
| Example IE-177 | A-IE-47 | Homeotropic | Acceptable | 89 | 99 | 5 |
| Example IE-178 | A-IE-48 | Homeotropic | Acceptable | 89 | 99 | 5 |
| Example IE-179 | A-IE-49 | Homeotropic | Acceptable | 89 | 99 | 5 |
| Example IE-180 | A-IE-50 | Homeotropic | Acceptable | 89 | 98 | 5 |
| Example IE-181 | A-IE-51 | Homeotropic | Acceptable | 89 | 99 | 5 |
| Example IE-182 | A-IE-52 | Homeotropic | Acceptable | 89 | 99 | 5 |
| Example IE-183 | A-IE-53 | Homeotropic | Acceptable | 89 | 99 | 5 |
| Example IE-184 | A-IE-54 | Homeotropic | Acceptable | 89 | 99 | 5 |
| Example IE-185 | A-IE-55 | Homeotropic | Acceptable | 89 | 99 | 5 |
| Example IE-186 | A-IE-56 | Homeotropic | Acceptable | 89 | 99 | 5 |
| Example IE-187 | A-IE-57 | Homeotropic | Acceptable | 89 | 99 | 5 |
| Example IE-188 | A-IE-58 | Homeotropic | Acceptable | 89 | 99 | 5 |

TABLE 22-continued

| | Liquid crystal aligning agent (name) | Liquid crystal display device: Alignment mode | Liquid crystal alignability | Pretilt angle (°) | Voltage holding ratio (%) | Burn-in (residual DC voltage) (mV) |
|---|---|---|---|---|---|---|
| Example IE-189 | A-IE-59 | Homeotropic | Acceptable | 89 | 99 | 5 |
| Example IE-190 | A-IE-60 | Homeotropic | Acceptable | 89 | 99 | 5 |
| Example IE-191 | A-IE-61 | Homeotropic | Acceptable | 89 | 98 | 5 |
| Example IE-192 | A-IE-62 | Homeotropic | Acceptable | 89 | 98 | 5 |
| Example IE-193 | A-IE-63 | Homeotropic | Acceptable | 89 | 99 | 5 |
| Example IE-194 | A-IE-64 | Homeotropic | Acceptable | 89 | 99 | 5 |
| Example IE-195 | A-IE-65 | Homeotropic | Acceptable | 89 | 99 | 5 |
| Example IE-196 | A-IE-66 | Homeotropic | Acceptable | 89 | 99 | 5 |
| Example IE-197 | A-IE-67 | Homeotropic | Acceptable | 89 | 99 | 5 |
| Example IE-198 | A-IE-68 | Homeotropic | Acceptable | 89 | 99 | 5 |
| Example IE-199 | A-IE-69 | Homeotropic | Acceptable | 89 | 99 | 5 |
| Example IE-200 | A-IE-70 | Homeotropic | Acceptable | 89 | 99 | 5 |
| Example IE-201 | A-IE-71 | Homeotropic | Acceptable | 89 | 99 | 5 |

TABLE 23

| | Name of liquid crystal aligning agent | Physical properties of coating film: i-line absorption | Heat resistance |
|---|---|---|---|
| Example IE-202 | A-IE-42 | Acceptable | Acceptable |
| Example IE-203 | A-IE-43 | Acceptable | Acceptable |
| Example IE-204 | A-IE-44 | Acceptable | Acceptable |
| Example IE-205 | A-IE-45 | Acceptable | Acceptable |
| Example IE-206 | A-IE-46 | Acceptable | Acceptable |
| Example IE-207 | A-IE-47 | Acceptable | Acceptable |
| Example IE-208 | A-IE-48 | Acceptable | Acceptable |
| Example IE-209 | A-IE-49 | Acceptable | Acceptable |
| Example IE-210 | A-IE-50 | Acceptable | Acceptable |
| Example IE-211 | A-IE-51 | Acceptable | Acceptable |
| Example IE-212 | A-IE-52 | Acceptable | Acceptable |
| Example IE-213 | A-IE-53 | Acceptable | Acceptable |
| Example IE-214 | A-IE-54 | Acceptable | Acceptable |
| Example IE-215 | A-IE-55 | Acceptable | Acceptable |
| Example IE-216 | A-IE-56 | Acceptable | Acceptable |
| Example IE-217 | A-IE-57 | Acceptable | Acceptable |
| Example IE-218 | A-IE-58 | Acceptable | Acceptable |
| Example IE-219 | A-IE-59 | Acceptable | Acceptable |
| Example IE-220 | A-IE-60 | Acceptable | Acceptable |
| Example IE-221 | A-IE-61 | Acceptable | Acceptable |
| Example IE-222 | A-IE-62 | Acceptable | Acceptable |
| Example IE-223 | A-IE-63 | Acceptable | Acceptable |
| Example IE-224 | A-IE-64 | Acceptable | Acceptable |
| Example IE-225 | A-IE-65 | Acceptable | Acceptable |
| Example IE-226 | A-IE-66 | Acceptable | Acceptable |
| Example IE-227 | A-IE-67 | Acceptable | Acceptable |
| Example IE-228 | A-IE-68 | Acceptable | Acceptable |
| Example IE-229 | A-IE-69 | Acceptable | Acceptable |
| Example IE-230 | A-IE-70 | Acceptable | Acceptable |
| Example IE-231 | A-IE-71 | Acceptable | Acceptable |

<Synthesis of Liquid Crystal Aligning Polyorganosiloxane>

Example ArIE-1

5.0 g of the polyorganosiloxane EPS-1 having an epoxy group obtained in the above Synthesis Example 1, 6.7 g (corresponding to 50 mol % based on the oxiranyl group of the reactive polyorganosiloxane) of the compound (A-6-C1-1) obtained in the above Synthesis Example A-6-C(1) as the compound R—Z and 0.5 g of tetrabutylammonium bromide were fed to a 200 ml three-necked flask equipped with a reflux tube, and N, N-dimethylacetamide was added to ensure that the solids content became 20 wt % so as to carry out a reaction at 120° C. for 10 hours. After the end of the reaction, methanol was added to produce a precipitate, a solution prepared by dissolving this precipitate in ethyl acetate was rinsed in water 3 times, and the solvent was distilled off to obtain 8.4 g of a white powder of a liquid crystal aligning group-containing polyorganosiloxane S-ArIE-1. The weight average molecular weight Mw of the liquid crystal aligning polyorganosiloxane S-ArIE-1 was 28,100.

Examples ArIE-2 to -13

Liquid crystal aligning polyorganosiloxanes S-ArIE-2 to S-ArIE-13 were synthesized in the same manner as in the above Example ArIE-1 except that the type of the reactive polyorganosiloxane and the type and amount of the compound R—Z were changed as shown in Table 24. The weight average molecular weights Mw of these liquid crystal aligning polyorganosiloxanes are shown in Table 24.

Two different compounds R—Z were used in Examples ArIE-6 and -7, respectively.

In Table 24, the amount of the compound R—Z is based on the oxiranyl group of the reactive polyorganosiloxane.

TABLE 24

| | Name of reactive | Compound R—Z | | Liquid crystal aligning polyorganosiloxane | |
|---|---|---|---|---|---|
| | polyorganosiloxane | Type | Amount (mol %) | Name | Mw |
| Example ArIE-1 | EPS-1 | A-6-C1-1 | 50 | S-ArIE-1 | 28,100 |
| Example ArIE-2 | EPS-1 | A-6-C1-1 | 75 | S-ArIE-2 | 35,000 |
| Example ArIE-3 | EPS-2 | A-6-C1-1 | 50 | S-ArIE-3 | 27,500 |
| Example ArIE-4 | EPS-3 | A-6-C1-1 | 50 | S-ArIE-4 | 27,200 |
| Example ArIE-5 | EPS-4 | A-6-C1-1 | 50 | S-ArIE-5 | 27,800 |
| Example ArIE-6 | EPS-1 | A-6-C2-1 | 30 | S-ArIE-6 | 28,300 |
| | | A-6-C1-2 | 20 | | |
| Example ArIE-7 | EPS-1 | A-6-C2-1 | 40 | S-ArIE-7 | 28,200 |
| | | A-6-C1-2 | 10 | | |
| Example ArIE-8 | EPS-1 | A-8-C1-1 | 50 | S-ArIE-8 | 30,000 |
| Example ArIE-9 | EPS-1 | A-6-C2-1 | 50 | S-ArIE-9 | 27,600 |
| Example ArIE-10 | EPS-1 | A-6-C2-1 | 75 | S-ArIE-10 | 29,900 |
| Example ArIE-11 | EPS-2 | A-6-C2-1 | 50 | S-ArIE-11 | 27,000 |
| Example ArIE-12 | EPS-3 | A-6-C2-1 | 50 | S-ArIE-12 | 26,500 |
| Example ArIE-13 | EPS-4 | A-6-C2-1 | 50 | S-ArIE-13 | 26,900 |

<Preparation of Liquid Crystal Aligning Agent and Evaluation of Storage Stability>

Example ArIE-14

100 parts by weight of the liquid crystal aligning polyorganosiloxane S-ArIE-1 obtained in the above Example ArIE-1 and 2,000 parts by weight in terms of PA-1 of the solution containing a polyamic acid PA-1 obtained in the above Synthesis Example PA-1 as the another polymer were used in combination, and N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %.

This solution was filtered with a filter having an opening diameter of 1 μm to prepare a liquid crystal aligning agent A-ArIE-1.

This liquid crystal aligning agent A-ArIE-1 was stored at −15° C. for 6 months. The viscosity of this liquid crystal aligning agent was measured at 25° C. before and after storage with an E type viscometer. The storage stability was evaluated as “acceptable” when the change rate of the solution viscosity before and after storage was less than 10% and as “unacceptable when the change rate was 10% or more. The storage stability of the liquid crystal aligning agent A-ArIE-1 was “acceptable”.

Examples ArIE-15 to -31 and -33 to -52

Liquid crystal aligning agents A-ArIE-2 to A-18 and A-ArIE-20 to -39 were prepared in the same manner as in the above Example ArIE-14 except that the type of the liquid crystal aligning polyorganosiloxane and the type and amount of the another polymer were changed as shown in Table 25. The storage stabilities of the liquid crystal aligning agents were evaluated in the same manner as in Example ArIE-14 and shown in Table 25.

Example ArIE-32

500 parts by weight in terms of PS-1 of the solution containing another polysiloxane PS-1 obtained in the above Synthesis Example PS-1 as the another polymer was collected, 100 parts by weight of the liquid crystal aligning polyorganosiloxane S-ArIE-1 obtained in the above Example ArIE-1 was added to this solution, and further 1-ethoxy-2-propanol was added to prepare a solution having a solids content of 4.0 wt %. This solution was filtered with a filter having an opening diameter of 1 μm to prepare a liquid crystal aligning agent A-ArIE-19.

The storage stability of this liquid crystal aligning agent A-ArIE-19 was evaluated in the same manner as in Example ArIE-14 and shown in Table 25.

Example ArIE-53

A liquid crystal aligning agent A-ArIE-40 was prepared in the same manner as in the above Example ArIE-32 except that 100 parts by weight of the liquid crystal aligning polyorganosiloxane S-ArIE-9 obtained in the above Example ArIE-9 was used in place of the liquid crystal aligning polyorganosiloxane S-ArIE-1, and the storage stability of the liquid crystal aligning agent A-ArIE-40 was evaluated. The evaluation result of the storage stability is shown in Table 25.

Examples ArIE-54 to -57

Liquid crystal aligning agents A-ArIE-41 to A-ArIE-44 were prepared in the same manner as in the above Example ArIE-14 except that the type and amount of the another polymer were changed as shown in Table 25 and epoxy compounds shown in Table 25 were used in amounts shown in Table 25.

The storage stabilities of these liquid crystal aligning agents were evaluated in the same manner as in Example ArIE-14 and shown in Table 25.

In Table 25, the epoxy compounds “(E-1)” and “(E-2)” are compounds represented by the above formulas (E-1) and (E-2), respectively.

TABLE 25

| | Name of liquid crystal aligning agent | Type of liquid crystal aligning polyorganosiloxane | Another polymer Type | Another polymer Amount (parts by weight) | Epoxy compound Type | Epoxy compound Amount (parts by weight) | Storage stability |
|---|---|---|---|---|---|---|---|
| Example ArIE-14 | A-ArIE-1 | S-ArIE-1 | PA-1 | 2,000 | — | — | Acceptable |
| Example ArIE-15 | A-ArIE-2 | S-ArIE-1 | PA-2 | 2,000 | — | — | Acceptable |
| Example ArIE-16 | A-ArIE-3 | S-ArIE-1 | PA-3 | 2,000 | — | — | Acceptable |
| Example ArIE-17 | A-ArIE-4 | S-ArIE-1 | PA-4 | 2,000 | — | — | Acceptable |
| Example ArIE-18 | A-ArIE-5 | S-ArIE-1 | PA-5 | 2,000 | — | — | Acceptable |
| Example ArIE-19 | A-ArIE-6 | S-ArIE-1 | PA-4 | 500 | — | — | Acceptable |
| Example ArIE-20 | A-ArIE-7 | S-ArIE-1 | PA-4 | 1,000 | — | — | Acceptable |
| Example ArIE-21 | A-ArIE-8 | S-ArIE-1 | PI-1 | 2,000 | — | — | Acceptable |
| Example ArIE-22 | A-ArIE-9 | S-ArIE-1 | PI-2 | 2,000 | — | — | Acceptable |
| Example ArIE-23 | A-ArIE-10 | S-ArIE-1 | PI-3 | 2,000 | — | — | Acceptable |
| Example ArIE-24 | A-ArIE-11 | S-ArIE-1 | PI-4 | 2,000 | — | — | Acceptable |
| Example ArIE-25 | A-ArIE-12 | S-ArIE-2 | PA-4 | 2,000 | — | — | Acceptable |
| Example ArIE-26 | A-ArIE-13 | S-ArIE-3 | PA-4 | 2,000 | — | — | Acceptable |
| Example ArIE-27 | A-ArIE-14 | S-ArIE-4 | PA-4 | 2,000 | — | — | Acceptable |
| Example ArIE-28 | A-ArIE-15 | S-ArIE-5 | PA-4 | 2,000 | — | — | Acceptable |
| Example ArIE-29 | A-ArIE-16 | S-ArIE-6 | PA-4 | 2,000 | — | — | Acceptable |
| Example ArIE-30 | A-ArIE-17 | S-ArIE-7 | PA-4 | 2,000 | — | — | Acceptable |
| Example ArIE-31 | A-ArIE-18 | S-ArIE-8 | PA-4 | 2,000 | — | — | Acceptable |
| Example ArIE-32 | A-ArIE-19 | S-ArIE-1 | PS-1 | 500 | — | — | Acceptable |
| Example ArIE-33 | A-ArIE-20 | S-ArIE-9 | PA-1 | 2,000 | — | — | Acceptable |
| Example ArIE-34 | A-ArIE-21 | S-ArIE-9 | PA-2 | 2,000 | — | — | Acceptable |
| Example ArIE-35 | A-ArIE-22 | S-ArIE-9 | PA-3 | 2,000 | — | — | Acceptable |
| Example ArIE-36 | A-ArIE-23 | S-ArIE-9 | PA-4 | 2,000 | — | — | Acceptable |
| Example ArIE-37 | A-ArIE-24 | S-ArIE-9 | PA-5 | 2,000 | — | — | Acceptable |
| Example ArIE-38 | A-ArIE-25 | S-ArIE-9 | PA-4 | 500 | — | — | Acceptable |
| Example ArIE-39 | A-ArIE-26 | S-ArIE-9 | PA-4 | 1,000 | — | — | Acceptable |
| Example ArIE-40 | A-ArIE-27 | S-ArIE-9 | PI-1 | 2,000 | — | — | Acceptable |
| Example ArIE-41 | A-ArIE-28 | S-ArIE-9 | PI-2 | 2,000 | — | — | Acceptable |
| Example ArIE-42 | A-ArIE-29 | S-ArIE-9 | PI-3 | 2,000 | — | — | Acceptable |
| Example ArIE-43 | A-ArIE-30 | S-ArIE-9 | PI-4 | 2,000 | — | — | Acceptable |
| Example ArIE-44 | A-ArIE-31 | S-ArIE-9 | PI-4 | 2,000 | — | — | Acceptable |
| Example ArIE-45 | A-ArIE-32 | S-ArIE-9 | PI-4 | 2,000 | — | — | Acceptable |
| Example ArIE-46 | A-ArIE-33 | S-ArIE-9 | PI-4 | 2,000 | — | — | Acceptable |
| Example ArIE-47 | A-ArIE-34 | S-ArIE-9 | PI-4 | 2,000 | — | — | Acceptable |
| Example ArIE-48 | A-ArIE-35 | S-ArIE-9 | PI-4 | 2,000 | — | — | Acceptable |
| Example ArIE-49 | A-ArIE-36 | S-ArIE-10 | PA-4 | 2,000 | — | — | Acceptable |
| Example ArIE-50 | A-ArIE-37 | S-ArIE-11 | PA-4 | 2,000 | — | — | Acceptable |
| Example ArIE-51 | A-ArIE-38 | S-ArIE-12 | PA-4 | 2,000 | — | — | Acceptable |
| Example ArIE-52 | A-ArIE-39 | S-ArIE-13 | PA-4 | 2,000 | — | — | Acceptable |
| Example ArIE-53 | A-ArIE-40 | S-ArIE-9 | PS-1 | 500 | — | — | Acceptable |
| Example ArIE-54 | A-ArIE-41 | S-ArIE-9 | PI-5 | 2,000 | E-1 | 50 | Acceptable |
| Example ArIE-55 | A-ArIE-42 | S-ArIE-9 | PI-5 | 2,000 | E-1 | 200 | Acceptable |
| Example ArIE-56 | A-ArIE-43 | S-ArIE-9 | PI-7 | 2,000 | E-2 | 50 | Acceptable |
| Example ArIE-57 | A-ArIE-44 | S-ArIE-9 | PI-7 | 2,000 | E-2 | 200 | Acceptable |

Example ArIE-58

Manufacture of TN Alignment Type Liquid Crystal Display Device

The liquid crystal aligning agent A-ArIE-1 prepared in the above Example ArIE-14 was applied to the transparent electrode side of a glass substrate having a transparent electrode which was composed of an ITO film with a spinner, prebaked on a hot plate at 80° C. for 1 minute and heated at 180° C. for 1 hour to form a coating film having a thickness of 0.1 μm. 1,000 $J/m^2$ of polarized ultraviolet radiation including a 313 nm bright line was applied to the surface of this coating film by using an Hg—Xe lamp and a Glan-Taylor prism from a direction 40° inclined from the normal of the substrate to provide liquid crystal aligning capability so as to form a liquid crystal alignment film.

This operation was repeated to prepare a pair of (two) glass substrates having this liquid crystal alignment film on the transparent conductive film.

An epoxy resin adhesive containing aluminum oxide spheres having a diameter of 5.5 μm was applied to the peripheries of the liquid crystal alignment film formed sides of the above pair of substrates by screen printing, and the substrates were joined and contact bonded together in such a manner that the application directions of polarized ultraviolet radiation became orthogonal to each other and heated at 150° C. for 1 hour to thermally cure the adhesive. After positive type nematic liquid crystals (MLC-6221 of Merk & Co., Inc., containing a chiral agent) were injected into the space between the substrates from a liquid crystal injection port to fill the space, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and parallel to the polarizing directions of the liquid crystal alignment films to manufacture a TN alignment type liquid crystal display device.

This liquid crystal display device was evaluated by the following methods. The evaluation results are shown in Table 26.

<Evaluation of Liquid Crystal Display Device>

(1) Evaluation of Liquid Crystal Alignability

The existence of an abnormal domain formed by a change in brightness when the liquid crystal display device manufactured above was turned on and off by applying and not applying a voltage of 5 V (application and cancellation of voltage) was checked through an optical microscope. Liquid crystal alignability was evaluated as "acceptable" when there was no abnormal domain.

(2) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio.

(3) Evaluation of Burn-In

After a 30 HZ, 3 V rectangular wave on which DC 5V had been superimposed was applied to the liquid crystal display device manufactured above in a 60° C. environment for 2 hours, the residual DC voltage in the liquid crystal cell right after the DC voltage was cut off was obtained by a flicker erasing method.

Examples ArIE-59 to -74

TN alignment type liquid crystal display devices were manufactured and evaluated in the same manner as in the above Example ArIE-58 except that liquid crystal aligning agents shown in Table 26 were used. The results are shown in Table 26.

TABLE 26

| | Liquid crystal aligning agent (name) | TN alignment type liquid crystal display device: Liquid crystal alignability | Voltage holding ratio(%) | Burn-in (mV) |
|---|---|---|---|---|
| Example ArIE-58 | A-ArIE-1 | Acceptable | 98 | 12 |
| Example ArIE-59 | A-ArIE-2 | Acceptable | 98 | 12 |
| Example ArIE-60 | A-ArIE-3 | Acceptable | 98 | 13 |
| Example ArIE-61 | A-ArIE-4 | Acceptable | 98 | 12 |
| Example ArIE-62 | A-ArIE-5 | Acceptable | 98 | 12 |
| Example ArIE-63 | A-ArIE-6 | Acceptable | 98 | 15 |
| Example ArIE-64 | A-ArIE-7 | Acceptable | 98 | 12 |
| Example ArIE-65 | A-ArIE-8 | Acceptable | 98 | 12 |
| Example ArIE-66 | A-ArIE-9 | Acceptable | 98 | 13 |
| Example ArIE-67 | A-ArIE-10 | Acceptable | 98 | 12 |
| Example ArIE-68 | A-ArIE-11 | Acceptable | 98 | 12 |
| Example ArIE-69 | A-ArIE-12 | Acceptable | 98 | 14 |
| Example ArIE-70 | A-ArIE-13 | Acceptable | 98 | 12 |
| Example ArIE-71 | A-ArIE-14 | Acceptable | 98 | 12 |
| Example ArIE-72 | A-ArIE-15 | Acceptable | 98 | 12 |
| Example ArIE-73 | A-ArIE-18 | Acceptable | 98 | 15 |
| Example ArIE-74 | A-ArIE-19 | Acceptable | 98 | 12 |

Example ArIE-75

Manufacture of Homeotropic Alignment Type Liquid Crystal Display Device

The liquid crystal aligning agent A-ArIE-16 obtained in the above Example ArIE-29 was applied to the transparent electrode side of a glass substrate having a transparent electrode which was composed of an ITO film with a spinner, prebaked on a hot plate at 80° C. for 1 minute and heated (post-baked) in an oven whose inside had been substituted by nitrogen at 200° C. for 1 hour to form a coating film having a thickness of 0.1 μm. 1,000 J/m$^2$ of polarized ultraviolet radiation including a 313 nm bright line was applied to the surface of this coating film by using an Hg—Xe lamp and a Glan-Taylor prism from a direction 40° inclined from the normal of the substrate to form a liquid crystal alignment film. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film side of one of the above substrates by screen printing, the liquid crystal alignment film sides of the pair of substrates were opposed to each other and contact bonded together in such a manner that the projection directions on the substrate surfaces of the optical axis of ultraviolet radiation of the substrates became antiparallel to each other, and the adhesive was thermally cured at 150° C. for 1 hour. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and formed an angle of 45° from the projection directions on the substrate surfaces of the optical axis of ultraviolet radiation of the liquid crystal alignment films to manufacture a homeotropic alignment type liquid crystal display device.

The liquid crystal alignability, voltage holding ratio and burn-in of this homeotropic alignment type liquid crystal display device were evaluated in the same manner as in Example ArIE-58 and the pretilt angle and heat resistance of the liquid crystal display device were evaluated by the following methods. The evaluation results are shown in Table 27.

(4) Evaluation of Pretilt Angle

The pretilt angle of the liquid crystal display device manufactured above was measured by a crystal rotation method using a He—Ne laser beam in accordance with the method described in T. J. Scheffer et. al. J. Appl. Phys. Vol. 19, p. 2013 (1980).

(5) Evaluation of Heat Resistance

A liquid crystal alignment film was formed to manufacture a homeotropic alignment type liquid crystal display device in the same manner as described above except that the post-baking temperature for forming the above liquid crystal alignment film was changed to 250° C. The heat resistance was evaluated as "acceptable" when the obtained liquid crystal display device showed satisfactory homeotropic alignability (uniform display of black) and as "unacceptable" when light leakage was seen.

Examples ArIE-76 to -101

Homeotropic alignment type liquid crystal display devices were manufactured and evaluated in the same manner as in Example ArIE-75 except that the liquid crystal aligning agents shown in Table 27 were used. The results are shown in Table 27.

TABLE 27

| | Liquid crystal aligning agent (name) | Homeotropic alignment type liquid crystal display device | | | | |
|---|---|---|---|---|---|---|
| | | Liquid crystal alignability | Pretilt angle (°) | Voltage holding ratio (%) | Burn-in (mV) | Heat resistance |
| Example ArIE-75 | A-ArIE-16 | Acceptable | 89 | 98 | 7 | Acceptable |
| Example ArIE-76 | A-ArIE-17 | Acceptable | 89 | 98 | 6 | Acceptable |
| Example ArIE-77 | A-ArIE-20 | Acceptable | 89 | 98 | 7 | Acceptable |
| Example ArIE-78 | A-ArIE-21 | Acceptable | 89 | 98 | 7 | Acceptable |
| Example ArIE-79 | A-ArIE-22 | Acceptable | 89 | 98 | 7 | Acceptable |
| Example ArIE-80 | A-ArIE-23 | Acceptable | 89 | 98 | 8 | Acceptable |
| Example ArIE-81 | A-ArIE-24 | Acceptable | 89 | 98 | 8 | Acceptable |
| Example ArIE-82 | A-ArIE-25 | Acceptable | 89 | 97 | 7 | Acceptable |
| Example ArIE-83 | A-ArIE-26 | Acceptable | 89 | 97 | 7 | Acceptable |
| Example ArIE-84 | A-ArIE-27 | Acceptable | 89 | 98 | 7 | Acceptable |
| Example ArIE-85 | A-ArIE-28 | Acceptable | 89 | 98 | 7 | Acceptable |
| Example ArIE-86 | A-ArIE-29 | Acceptable | 89 | 98 | 7 | Acceptable |
| Example ArIE-87 | A-ArIE-30 | Acceptable | 89 | 98 | 8 | Acceptable |
| Example ArIE-88 | A-ArIE-31 | Acceptable | 89 | 98 | 8 | Acceptable |
| Example ArIE-89 | A-ArIE-32 | Acceptable | 89 | 98 | 7 | Acceptable |
| Example ArIE-90 | A-ArIE-33 | Acceptable | 89 | 98 | 7 | Acceptable |
| Example ArIE-91 | A-ArIE-34 | Acceptable | 89 | 98 | 7 | Acceptable |
| Example ArIE-92 | A-ArIE-35 | Acceptable | 89 | 98 | 7 | Acceptable |
| Example ArIE-93 | A-ArIE-36 | Acceptable | 89 | 98 | 7 | Acceptable |
| Example ArIE-94 | A-ArIE-37 | Acceptable | 89 | 98 | 8 | Acceptable |
| Example ArIE-95 | A-ArIE-38 | Acceptable | 89 | 98 | 7 | Acceptable |
| Example ArIE-96 | A-ArIE-39 | Acceptable | 89 | 98 | 7 | Acceptable |
| Example ArIE-97 | A-ArIE-40 | Acceptable | 89 | 98 | 7 | Acceptable |
| Example ArIE-98 | A-ArIE-41 | Acceptable | 89 | 98 | 7 | Acceptable |
| Example ArIE-99 | A-ArIE-42 | Acceptable | 89 | 98 | 8 | Acceptable |
| Example ArIE-100 | A-ArIE-43 | Acceptable | 89 | 98 | 7 | Acceptable |
| Example ArIE-101 | A-ArIE-44 | Acceptable | 89 | 98 | 7 | Acceptable |

<Synthesis Of Liquid Crystal Aligning Polyorganosiloxane>

Example LE-1

5.0 g of the reactive polyorganosiloxane EPS-1 obtained in the above Synthesis Example 1, 5.7 g (corresponding to 50 mol % based on the oxiranyl group of the reactive polyorganosiloxane) of the compound (A-3-C1-1) obtained in the above Example A-3-C(1) as the compound R—Z and 0.5 g of tetrabutylammonium bromide were fed to a 200 ml three-necked flask equipped with a reflux tube, and methyl isobutyl ketone was added to ensure that the solids content became 20 wt % so as to carry out a reaction under reflux for 2 hours. After the end of the reaction, methanol was added to produce a precipitate, a solution obtained by dissolving this precipitate in ethyl acetate was rinsed in water 3 times, and the solvent was distilled off to obtain 7.5 g of a white powder of a liquid crystal aligning group-containing polyorganosiloxane S-LE-1. The weight average molecular weight Mw of the liquid crystal aligning group-containing polyorganosiloxane S-LE-1 was 9,800.

Examples LE-2 to -8

Liquid crystal aligning polyorganosiloxanes S-LE-2 to S-LE-6 were synthesized in the same manner as in the above Example LE-1 except that the type of the compound R—Z was changed as shown in Table 28. The weight average molecular weights Mw of these liquid crystal aligning polyorganosiloxanes are shown in Table 28.

The amount of the compound R—Z was 50 mol % based on the oxiranyl group of the reactive polyorganosiloxane.

<Preparation of Liquid Crystal Aligning Agent and Evaluation of Storage Stability>

Examples LE-9 to -16

Liquid crystal aligning agents A-LE-1 to A-LE-8 were prepared in the same manner as in the above Example CE-6 except that the types of the liquid crystal aligning polyorganosiloxane and the another polymer were changed as shown in Table 29.

The storage stabilities of these liquid crystal aligning agents were evaluated in the same manner as in Example CE-6. The evaluation results are shown in Table 29.

<Manufacture and Evaluation of Homeotropic Alignment Type Liquid Crystal Display Device>

Examples LE-17, -18, -20, -23 and -24

Homeotropic alignment type liquid crystal display devices were manufactured and evaluated in the same manner as in the above Example CE-18 except that the type of the liquid crystal aligning agent and the dose of polarized ultraviolet radiation for forming a liquid crystal alignment film were changed as shown in Table 30. The results are shown in Table 30.

<Manufacture and Evaluation of TN Alignment Type Liquid Crystal Display Device>

Examples LE-19, -21 and -22

TN alignment type liquid crystal display devices were manufactured and evaluated in the same manner as in the above Examples CE-198 and -199 except that the type of the liquid crystal aligning agent was changed as shown in Table 30. The results are shown in Table 30.

TABLE 28

| | Type of compound R—Z | Liquid crystal aligning polyorganosiloxane Name | Mw |
|---|---|---|---|
| Example LE-1 | A-3-C1-1 | S-LE-1 | 9,800 |
| Example LE-2 | A-3-C1-2 | S-LE-2 | 9,400 |
| Example LE-3 | A-3-C1-3 | S-LE-3 | 9,500 |
| Example LE-4 | A-3-C2-1 | S-LE-4 | 9,700 |
| Example LE-5 | A-2-C3-1 | S-LE-5 | 11,100 |
| Example LE-6 | A-2-C3-2 | S-LE-6 | 11,600 |
| Example LE-7 | A-1-C9-1 | S-LE-7 | 11,200 |
| Example LE-8 | A-1-C9-2 | S-LE-8 | 11,000 |

TABLE 29

| | Type of liquid crystal aligning polyorganosiloxane | Type of another polymer | Liquid crystal aligning agent Name | Storage stability |
|---|---|---|---|---|
| Example LE-9 | S-LE-1 | PA-4 | A-LE-1 | Acceptable |
| Example LE-10 | S-LE-2 | PA-4 | A-LE-2 | Acceptable |
| Example LE-11 | S-LE-3 | PA-4 | A-LE-3 | Acceptable |
| Example LE-12 | S-LE-4 | PA-4 | A-LE-4 | Acceptable |
| Example LE-13 | S-LE-5 | PA-4 | A-LE-5 | Acceptable |
| Example LE-14 | S-LE-6 | PA-4 | A-LE-6 | Acceptable |
| Example LE-15 | S-LE-7 | PA-4 | A-LE-7 | Acceptable |
| Example LE-16 | S-LE-8 | PA-4 | A-LE-8 | Acceptable |

TABLE 30

| | Type of liquid crystal aligning agent | Operation mode | Dose (J/m2) | Liquid crystal alignability | Voltage holding ratio (%) | Burn-in (mV) | Light resistance |
|---|---|---|---|---|---|---|---|
| Example LE-17 | A-LE-1 | Homeotropic | 1,000 | Acceptable | 98 | 12 | Acceptable |
| Example LE-18 | A-LE-2 | Homeotropic | 1,000 | Acceptable | 98 | 10 | Acceptable |
| Example LE-19 | A-LE-3 | TN | 1,000 | Acceptable | 98 | 15 | Acceptable |
| Example LE-20 | A-LE-4 | Homeotropic | 1,000 | Acceptable | 97 | 15 | Acceptable |
| Example LE-21 | A-LE-5 | TN | 3,000 | Acceptable | 98 | 18 | Acceptable |
| Example LE-22 | A-LE-6 | TN | 3,000 | Acceptable | 98 | 19 | Acceptable |
| Example LE-23 | A-LE-7 | Homeotropic | 3,000 | Acceptable | 98 | 19 | Acceptable |
| Example LE-24 | A-LE-8 | Homeotropic | 3,000 | Acceptable | 98 | 20 | Acceptable |

<Preparation of Liquid Crystal Aligning Polyorganosiloxane>

Synthesis Example CO-1

5.0 g of OX-SQ (trade name, manufactured by Toagosei Co., Ltd.) as the reactive polyorganosiloxane, 66 g of methyl isobutyl ketone, 11 g of the compound (A-1-C4-3) synthesized in the above Synthesis Example A-1-C(4) as the compound R—Z and the W-200-N alumina (trade name, manufactured by ICN Pharmaceuticals, Inc.) were fed to a 200 ml three-necked flask to carry out a reaction at room temperature under agitation for 48 hours. After the end of the reaction, re-precipitation was carried out with methanol, a solution prepared by re-dissolving the obtained precipitate in ethyl acetate was rinsed in water 3 times, and the solvent was distilled off to obtain 3.6 g of a white powder of a liquid crystal aligning polyorganosiloxane (S-CO-1). The weight average molecular weight of the liquid crystal aligning polyorganosiloxane (S-CO-1) was 14,500.

Synthesis Example CO-2

3.0 g of a white powder of a liquid crystal aligning polyorganosiloxane (S-CO-2) was obtained in the same manner as in the above Synthesis Example CO-1 except that 8 g of the compound (A-2-C1-1) synthesized in the above Synthesis Example A-2-C(1) was used in place of the compound (A-1-C4-3). The weight average molecular weight of the liquid crystal aligning polyorganosiloxane (S-CO-2) was 14,200.

<Preparation of Liquid Crystal Aligning Agent>

Example CO-1

100 parts by weight of the radiation sensitive polyorganosiloxane S-CO-1 obtained in the above Synthesis Example CO-1 and 1,000 parts by weight in terms of PA-4 of the solution containing a polyamic acid (PA-4) obtained in the above Synthesis Example PA-4 were used in combination, N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %, and this solution was filtered with a filter having an opening diameter of 1 μm to prepare liquid crystal aligning agent A-CO-1.

Example CO-2

A liquid crystal aligning agent A-CO-2 was prepared in the same manner as in the above Example CO-1 except that the radiation sensitive polyorganosiloxane S-CO-2 obtained in the above Synthesis Example CO-2 was used in place of the radiation sensitive polyorganosiloxane S-CO-1.

Example CO-3

500 parts by weight (solid content) in terms of PS-1 of the solution containing another polyorganosiloxane (PS-1) obtained in the above Synthesis Example PS-1 was collected, 100 parts by weight of the radiation sensitive polyorganosiloxane S-CO-1 obtained in the above Synthesis Example CO-1 was added to this solution, and further 1-ethoxy-2-propanol was added to prepare a solution having a solids content of 4.0 wt %. This solution was filtered with a filter having an opening diameter of 1 μm to prepare a liquid crystal aligning agent A-CO-3.

<Preparation and Evaluation of Homeotropic Alignment Type Liquid Crystal Display Device>

Example CO-4

The liquid crystal aligning agent A-CO-1 obtained in the above Example CO-1 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to form a coating film having a thickness of 0.1 μm. 1,000 $J/m^2$ of polarized ultraviolet radiation including a 313 nm bright line was applied to the surface of this coating film by using an Hg—Xe lamp and a Glan-Taylor prism from a direction 40° inclined from the normal of the substrate to provide liquid crystal aligning capability so as to form a liquid crystal alignment film. This operation was repeated to prepare two (a pair of) substrates having this liquid crystal alignment film thereon.

An epoxy resin adhesive containing aluminum oxide spheres having a diameter of 5.5 μm was applied to the peripheries of the liquid crystal alignment film formed sides of the above pair of substrates having the liquid crystal alignment film thereon by screen printing, the substrates were joined and contact bonded together in such a manner that the projection directions on the substrate surfaces of the optical axis of ultraviolet radiation became antiparallel to each other, and the adhesive was thermally cured at 150° C. for 1 hour. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated up to 150° C. and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and formed an angle of 45° from the projection directions on the substrate surfaces of the optical axis of ultraviolet radiation of the liquid crystal alignment films to manufacture a homeotropic alignment type liquid crystal display device.

This homeotropic alignment type liquid crystal display device was evaluated as follows. The results are shown in Table 31.

(1) Evaluation of Liquid Crystal Alignability

The existence of an abnormal domain formed by a change in brightness when the liquid crystal display device manufactured above was turned on and off by applying and not applying a voltage of 5 V (application and cancellation of voltage) was checked through an optical microscope. Liquid crystal alignability was evaluated as "acceptable" when there was no abnormal domain.

(2) Evaluation of Pretilt Angle

The pretilt angle of the liquid crystal display device manufactured above was measured by a crystal rotation method using a He—Ne laser beam in accordance with the method described in T. J. Scheffer et. al. J. Appl. Phys. Vol. 19, p. 2013 (1980).

(3) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio.

(4) Evaluation of Burn-In

After a 30 HZ, 3 V rectangular wave on which DC 5V had been superimposed was applied to the liquid crystal display device manufactured above in a 60° C. environment for 2 hours, the DC voltage was cut off, and the liquid crystal display device was left at room temperature for 15 minutes, the residual DC voltage in the liquid crystal display device was obtained by a flicker erasing method.

Example CO-5

A homeotropic alignment type liquid crystal display device was manufactured and evaluated in the same manner as in the above Example CO-4 except that the liquid crystal aligning agent A-CO-3 prepared in the above Example 3 was used in place of the liquid crystal aligning agent A-CO-i. The evaluation results are shown in Table 31.

Comparative Example CO-1

Synthesis of Polyamic Acid

Comparative Synthesis Example CO-1

22.4 g (0.1 mole) of 2,3,5-tricarboxycyclopentylacetic dianhydride and 48.46 g (0.1 mole) of the compound represented by the above formula (d-1) synthesized in accordance with JP-A 2003-520878 were dissolved in 283.4 g of N-methyl-2-pyrrolidone to carry out a reaction at room temperature for 6 hours. Then, the reaction mixture was injected into an excessive amount of methanol to precipitate a reaction product. The precipitate was washed with methanol and dried at 40° C. under reduced pressure for 15 hours to obtain 67 g of a polyamic acid (RPA-CO-1).

<Preparation of Liquid Crystal Aligning Agent>

The polyamic acid RPA-CO-1 obtained above was dissolved in a mixed solvent of N-methyl-2-pyrrolidone and butyl cellosolve (mixing ratio of 50:50 (weight ratio)) to prepare a solution having a solid content of 3.0 wt % which was then filtered with a filter having an opening diameter of 1 μm to prepare a comparative liquid crystal aligning agent R-CO-1.

<Preparation and Evaluation of Homeotropic Alignment Type Liquid Crystal Display Device>

A homeotropic alignment type liquid crystal display device was manufactured and evaluated in the same manner as in the above Example CO-4 except that the liquid crystal aligning agent R-CO-1 prepared above was used in place of the liquid crystal aligning agent A-CO-1. The evaluation results are shown in Table 31.

Example CO-6

Preparation and Evaluation of TN Alignment Type Liquid Crystal Display Device The liquid crystal aligning agent A-CO-2 prepared in the above Example CO-2 was applied to the transparent electrode side of a glass substrate having a transparent electrode which was composed of an ITO film with a spinner, prebaked on a hot plate at 80° C. for 1 minute and heated at 200° C. for 1 hour to form a coating film having a thickness of 0.1 μm. 1,000 J/m$^2$ of polarized ultraviolet radiation including a 313 nm bright line was applied to the surface of this coating film by using an Hg—Xe lamp and a Glan-Taylor prism from a direction 40° inclined from the normal of the substrate to provide liquid crystal aligning capability so as form a liquid crystal alignment film. This operation was repeated to prepare a pair of (two) glass substrates having this liquid crystal alignment film on the transparent conductive film.

An epoxy resin adhesive containing aluminum oxide spheres having a diameter of 5.5 μm was applied to the peripheries of the liquid crystal alignment film formed sides of the above pair of substrates by screen printing, and the substrates were joined and contact bonded together in such a manner that the application directions of polarized ultraviolet radiation became orthogonal to each other and heated at 150° C. for 1 hour to thermally cure the adhesive. After positive type nematic liquid crystals (MLC-6221 of Merk & Co., Inc. containing a chiral agent) were injected into the space between the substrates from a liquid crystal injection port to fill the space, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and parallel to the projection directions on the substrate surfaces of the optical axis of ultraviolet radiation applied to the liquid crystal alignment films to manufacture a TN alignment type liquid crystal display device.

The liquid crystal alignability, voltage holding ratio and burn-in characteristics (residual voltage) of this liquid crystal display device were evaluated in the same manner as in the above Example CO-4. The results are shown in Table 31.

TABLE 31

| | Operation mode | Type of liquid crystal aligning agent | Alignability | Pretilt angle | Voltage holding ratio (%) | Burn-in (residual voltage) (mV) |
|---|---|---|---|---|---|---|
| Example CO-4 | Homeotropic alignment | A-CO-1 | Acceptable | 89° | 99 | 7 |
| Example CO-5 | Homeotropic alignment | A-CO-3 | Acceptable | 89° | 99 | 9 |
| Comparative Example CO-1 | Homeotropic alignment | R-CO-1 | Acceptable | 89° | 97 | 150 |
| Example CO-6 | TN alignment | R-CO-2 | Acceptable | — | 98 | 10 |

<Synthesis of Liquid Crystal Aligning Polyorganosiloxane>

Example VO-1

2.5 g of a white powder of a liquid crystal aligning polyorganosiloxane (S-VO-1) was obtained in the same manner as in the above Synthesis Example CO-1 except that 6.5 g of stearic acid was used in place of the compound (A-1-C4-3). The weight average molecular weight of the liquid crystal aligning polyorganosiloxane (S-VO-1) was 10,900.

<Preparation of Liquid Crystal Aligning Agent and Evaluation of Storage Stability>

Example VO-2

100 parts by weight of the liquid crystal aligning polyorganosiloxane S-VI-1 synthesized in the above Synthesis Example VO-1 and 1,000 parts by weight in terms of PA-4 of the solution containing a polyamic acid PA-4 synthesized in the above Synthesis Example PA-4 were used in combination, N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-VO-1.

When the storage stability of this liquid crystal aligning agent A-VO-i was evaluated by the following method based on the following criteria, the storage stability of the liquid crystal aligning agent A-VO-1 was "acceptable".

[Method of Evaluating Storage Stability]

A coating film of a liquid crystal aligning agent was formed on a glass substrate by spin coating with the number of revolutions as a variable to find the number of revolutions at which the thickness of the coating film after the removal of the solvent became 1,000 Å.

Then, part of the liquid crystal aligning agent A-VO-1 was collected and stored at −15° C. for 5 weeks. When the liquid crystal aligning agent after storage was observed with the eye and the precipitation of an undissolved product was seen, the storage stability was judged as "unacceptable".

When no undissolved product was seen after 5 weeks of storage, a coating film was formed on a glass substrate by spin coating at the number of revolutions at which the film thickness became 1,000 Å before storage to measure the thickness of the film after the removal of the solvent. When this film thickness was 10% or more larger or smaller than 1,000 Å, the storage stability was judged as "unacceptable" and when the film thickness was less than 10% larger or smaller than 1,000 Å, the storage stability was judged as "acceptable".

The thickness of the coating film was measured by using the tracer type uneven film thickness meter of KLA-Tencor Corporation.

<Manufacture and Evaluation of Homeotropic Alignment Type Liquid Crystal Display Device>

Example VO-3

The liquid crystal aligning agent A-VO-1 prepared in the above Example VO-2 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to remove the solvent so as to form a coating film (liquid crystal alignment film) having a thickness of 0.1 p.m. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film formed side of one of the above substrates by screen printing, and the liquid crystal alignment film sides of the pair of substrates were opposed to each other, joined and contact bonded together, and heated at 150° C. for 1 hour to thermally cure the adhesive. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. for 10 minutes and then gradually cooled to room temperature to remove flow alignment at the time of injecting liquid crystals.

Then, a polarizing plate was put on the exterior sides of the substrates in such a manner that the polarizing directions of the two polarizing plates became orthogonal to each other to manufacture a homeotropic alignment type liquid crystal display device.

[Evaluation of Liquid Crystal Alignability]

The existence of an abnormal domain formed by a change in brightness when the liquid crystal display device manufactured above was turned on and off by applying and not applying a voltage of 5 V (application and cancellation of voltage) was checked with the eye.

Liquid crystal alignability was evaluated as "acceptable" when light leakage from the cell was not observed at the time of not applying voltage, and a cell drive area displayed white and there was no light leakage from other areas at the time of applying voltage. Meanwhile, liquid crystal alignability was evaluated as "unacceptable" when light leakage from the cell was observed at the time of not applying voltage or light leakage from other areas except for the cell drive area was observed at the time of applying voltage. The liquid crystal alignability of this liquid crystal display device was "acceptable".

[Evaluation of Voltage Holding Ratio]

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio. When the voltage holding ratio was 90% or more, it was evaluated as "acceptable". The voltage holding ratio of this liquid crystal display device was "acceptable".

[Evaluation of Heat Resistance]

The initial voltage holding ratio of a liquid crystal display device manufactured in the same manner as above was measured under the same conditions as the above evaluation of voltage holding ratio. After the liquid crystal display device was left in an oven at 100° C. for 1,000 hours, the voltage holding ratio of the liquid crystal display device was measured again under the same conditions as above. When the voltage holding ratio changed less than ±2% from the initial value, the heat resistance was evaluated as "acceptable" and when the voltage holding ratio changed ±2% or more from the initial value, the heat resistance was evaluated as "unacceptable". The heat resistance of this liquid crystal display device was "acceptable".

[Evaluation of After Image Property]

A voltage of DC 17 V was applied to a liquid crystal display device manufactured in the same manner as above in a 100° C. environment for 20 hours, and the residual voltage (residual DC voltage) in the liquid crystal cell right after DC voltage was cut off was obtained by a flicker erasing method. When this residual DC voltage value was 500 mV or less, the heat resistance was evaluated as "acceptable" and when the residual DC voltage value was larger than 500 mV, the heat resistance was evaluated as "unacceptable". The after image property of this liquid crystal display device was "acceptable".

[Evaluation of Light Resistance]

The initial voltage holding ratio of a liquid crystal display device manufactured in the same manner as above was measured under the same conditions as the above evaluation of voltage holding ratio. Thereafter, the liquid crystal display device was placed at a distance of 5 cm below a 40 W white fluorescent lamp and illuminated for 1,000 hours, and its voltage holding ratio was measured again under the same conditions as above. When the voltage holding ratio changed less than ±2% from the initial value, the light resistance was evaluated as "acceptable" and when the voltage holding ratio changed ±2% or more from the initial value, the light resistance was evaluated as "unacceptable". The light resistance of this liquid crystal display device was "acceptable".

Example CH-1

0.85 g of octakis(hydridosilsesquioxane) (of TAL MATERIALS Inc.), 8.97 g of the compound (A-1-P4-1) synthesized in the above Synthesis Example A-1-P(1), 80 ml of toluene and 100 μl of a xylene solution containing 2 wt % of a platinum-divinyltetramethyldisiloxane complex were added to carry out a reaction under reflux in a nitrogen atmosphere for 20 hours. After the end of the reaction, re-precipitation was carried out with methanol, the obtained precipitate was dissolved in ethyl acetate and rinsed in water, and the solvent was distilled off to obtain 5.4 g of a white powder of a liquid crystal aligning polysiloxane S-CH-1.

Example CH-2

A liquid crystal aligning polysiloxane S-CH-2 was obtained in the same manner as in the above Example CH-1 except that a mixture of 4.49 g of the compound (A-1-P4-1) and 1.14 g of allyl glycidyl ether was used in place of 8.97 g of the compound (A-1-P4-1).

Example CH-3

A liquid crystal aligning polysiloxane S-CH-3 was obtained in the same manner as in the above Example CH-1 except that 8.05 g of the compound (A-2-P1-1) was used in place of 8.97 g of the compound (A-1-P4-1).

<Preparation of Liquid Crystal Aligning Agent>

Example CH-4

100 parts by weight of the liquid crystal aligning polysiloxane S-CH-1 obtained in the above Example CH-1 and 2,000 parts by weight in terms of PA-4 of the solution containing a polyamic acid PA-4 obtained in the above Synthesis Example PA-4 as the another polymer were used in combination, and N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %.

This solution was filtered with a filter having an opening diameter of 1 μm to prepare a liquid crystal aligning agent A-CH-1.

When the storage stability of this liquid crystal aligning agent A-CH-1 was evaluated by the following method based on the following criteria, the storage stability of the liquid crystal aligning agent A-CH-1 was "acceptable".

[Method of Evaluating Storage Stability]

A coating film of a liquid crystal aligning agent was formed on a glass substrate by spin coating with the number of revolutions as a variable to find the number of revolutions at which the thickness of the coating film after the removal of the solvent became 1,000 Å.

Then, part of the liquid crystal aligning agent A-CH-1 was collected and stored at −15° C. for 5 weeks. When the liquid crystal aligning agent after storage was observed with the eye and the precipitation of an undissolved product was seen, the storage stability was judged as "unacceptable".

When no undissolved product was seen after 5 weeks of storage, a coating film was formed on a glass substrate by spin coating at the number of revolutions at which the film thickness became 1,000 Å before storage to measure the thickness of the film after the removal of the solvent. When this film thickness was 10% or more larger or smaller than 1,000 Å, the storage stability was judged as "unacceptable" and when the film thickness was less than 10% larger or smaller than 1,000 Å, the storage stability was judged as "acceptable".

The thickness of the coating film was measured by using the tracer type uneven film thickness meter of KLA-Tencor Corporation.

Examples CH-5, -6, -8 and -14

Liquid crystal aligning agents A-CH-2, -3, -5 and -11 were prepared in the same manner as in the above Example CH-4 except that the type of the radiation sensitive polysiloxane and the amount of PA-4 contained in the polymer solution were changed as shown in Table 32, and the storage stabilities of these liquid crystal aligning agents were evaluated. The evaluation results are show in Table 32.

Example CH-7

100 parts by weight of the radiation sensitive polysiloxane shown in Table 32 and 500 parts by weight of the polyamic acid PA-6 obtained in the above Synthesis Example PA-6 were dissolved in a mixed solvent of N-methyl-2-pyrrolidone and butyl cellosolve (mixing ratio of 50:50 (weight ratio)) to prepare a solution having a solids content of 3.0 wt % which was then filtered with a filter having an opening diameter of 1 μm to prepare a liquid crystal aligning agent A-CH-4.

The storage stability of this liquid crystal aligning agent was evaluated in the same manner as in the above Example CH-4. The evaluation result is shown in Table 32.

Examples CH-9 to -13, -15 and -16

Liquid crystal aligning agents A-CH-6 to A-CH-10, A-CH-12 and A-CH-13 were prepared in the same manner as in the above Example CH-7 except that the type and amount of the another polymer shown in Table 32 were used. The storage stabilities of these liquid crystal aligning agents were evaluated in the same manner as in the above Example CH-4. The evaluation results are show in Table 32.

TABLE 32

| | Liquid crystal aligning agent (name) | Type of radiation sensitive polyorganosiloxane | Another polymer Type | Another polymer Amount (parts by weight) | Storage stability |
|---|---|---|---|---|---|
| Example CH-4 | A-CH-1 | S-CH-1 | PA-4 | 2,000 | Acceptable |
| Example CH-5 | A-CH-2 | S-CH-1 | PA-4 | 1,000 | Acceptable |
| Example CH-6 | A-CH-3 | S-CH-1 | PA-4 | 500 | Acceptable |
| Example CH-7 | A-CH-4 | S-CH-1 | PA-6 | 500 | Acceptable |
| Example CH-8 | A-CH-5 | S-CH-2 | PA-4 | 500 | Acceptable |
| Example CH-9 | A-CH-6 | S-CH-2 | PA-6 | 500 | Acceptable |
| Example CH-10 | A-CH-7 | S-CH-1 | PS-1 | 2,000 | Acceptable |
| Example CH-11 | A-CH-8 | S-CH-1 | PS-1 | 1,000 | Acceptable |
| Example CH-12 | A-CH-9 | S-CH-1 | PS-1 | 500 | Acceptable |
| Example CH-13 | A-CH-10 | S-CH-2 | PS-1 | 500 | Acceptable |
| Example CH-14 | A-CH-11 | S-CH-3 | PA-4 | 500 | Acceptable |
| Example CH-15 | A-CH-12 | S-CH-3 | PA-6 | 500 | Acceptable |
| Example CH-16 | A-CH-13 | S-CH-3 | PS-1 | 500 | Acceptable |

Example CH-17

Manufacture of Homeotropic Alignment Type Liquid Crystal Display Device

The liquid crystal aligning agent A-CH-1 prepared in the above Example CH-4 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to form a coating film having a thickness of 0.1 μm. 1,000 $J/m^2$ of polarized ultraviolet radiation including a 313 nm bright line was applied to the surface of this coating film by using an Hg—Xe lamp and a Glan-Taylor prism from a direction 40° inclined from the normal of the substrate to form a liquid crystal alignment film. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film formed side of one of the above substrates by screen printing, the liquid crystal alignment film sides of the pair of substrates were opposed to each other and contact bonded together in such a manner that the projection directions on the substrate surfaces of the optical axis of ultraviolet radiation of the substrates became antiparallel to each other, and the adhesive was thermally cured at 150° C. for 1 hour. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and formed an angle of 45° from the projection directions on the substrate surfaces of the optical axis of ultraviolet radiation of the liquid crystal alignment films to manufacture a homeotropic alignment type liquid crystal display device.

This liquid crystal display device was evaluated by the following methods. The evaluation results are shown in Table 33.

<Method of Evaluating Liquid Crystal Display Device>

(1) Evaluation of Liquid Crystal Alignability

The existence of an abnormal domain formed by a change in brightness when the liquid crystal display device manufactured above was turned on and off by applying and not applying a voltage of 5 V (application and cancellation of voltage) was checked through an optical microscope. Liquid crystal alignability was evaluated as "acceptable" when there was no abnormal domain.

(2) Evaluation of Pretilt Angle

The pretilt angle of the liquid crystal display device manufactured above was measured by a crystal rotation method using a He—Ne laser beam in accordance with the method described in T. J. Scheffer et. al. J. Appl. Phys. Vol. 19, p. 2013 (1980).

(3) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio.

(4) Evaluation of Burn-In

After a 30 HZ, 3 V rectangular wave on which DC 5V had been superimposed was applied to the liquid crystal display device manufactured above in a 60° C. environment for 2 hours, the residual DC voltage in the liquid crystal cell right after the DC voltage was cut off was obtained by a flicker erasing method.

Examples CH-18 to -30

Homeotropic alignment type liquid crystal display devices were manufactured and evaluated in the same manner as in Example CH-17 except that the type of the liquid crystal aligning agent used and the dose of polarized ultraviolet radiation for forming the liquid crystal alignment film were changed as shown in Table 33. The results are shown in Table 33.

Comparative Example CH-1

Synthesis of Polyamic Acid 22.4 g (0.1 mole) of 2,3,5-tricarboxycyclopentylacetic dianhydride and 48.46 g (0.1 mole) of the compound represented by the above formula (d-1) synthesized in accordance with JP-A 2003-520878 were dissolved in 283.4 g of N-methyl-2-pyrrolidone to carry out a reaction at room temperature for 6 hours. Then, the reaction mixture was injected into an excessive amount of methanol to precipitate a reaction product. The precipitate was washed with methanol and dried at 40° C. under reduced pressure for 15 hours to obtain 67 g of a polyamic acid.

<Preparation of Liquid Crystal Aligning Agent>

The polyamic acid synthesized above was dissolved in a mixed solvent of N-methyl-2-pyrrolidone and butyl cellosolve (mixing ratio of 50:50 (weight ratio)) to prepare a solution having a solid content of 3.0 wt %. This solution was filtered with a filter having an opening diameter of 1 μm to prepare a liquid crystal aligning agent R-CH-1.

<Manufacture and Evaluation of Homeotropic Alignment Type Liquid Crystal Display Device>

A liquid crystal alignment film was formed to manufacture and evaluate a homeotropic alignment type liquid crystal display device in the same manner as in Example CH-17 except that the liquid crystal aligning agent R-CH-1 prepared above was used. The results are shown in Table 33.

TABLE 33

| | Type of liquid crystal aligning agent | Dose of ultraviolet radiation($J/m^2$) | Liquid crystal alignability | Pretilt angle | Voltage holding ratio (%) | Burn-in (residual DC voltage)(mv) |
|---|---|---|---|---|---|---|
| Example CH-17 | A-CH-1 | 1,000 | Acceptable | 89° | 98 | 8 |
| Example CH-18 | A-CH-2 | 1,000 | Acceptable | 89° | 98 | 8 |
| Example CH-19 | A-CH-3 | 200 | Acceptable | 89° | 98 | 10 |
| Example CH-20 | A-CH-3 | 1,000 | Acceptable | 89° | 98 | 8 |
| Example CH-21 | A-CH-3 | 3,000 | Acceptable | 89° | 98 | 8 |
| Example CH-22 | A-CH-4 | 1,000 | Acceptable | 89° | 98 | 8 |
| Example CH-23 | A-CH-5 | 1,000 | Acceptable | 89° | 98 | 9 |
| Example CH-24 | A-CH-6 | 1,000 | Acceptable | 89° | 98 | 8 |
| Example CH-25 | A-CH-7 | 1,000 | Acceptable | 89° | 98 | 8 |
| Example CH-26 | A-CH-8 | 1,000 | Acceptable | 89° | 98 | 8 |
| Example CH-27 | A-CH-9 | 200 | Acceptable | 89° | 98 | 9 |
| Example CH-28 | A-CH-9 | 1,000 | Acceptable | 89° | 98 | 8 |
| Example CH-29 | A-CH-9 | 3,000 | Acceptable | 89° | 98 | 8 |
| Example CH-30 | A-CH-10 | 1,000 | Acceptable | 89° | 98 | 8 |
| Comparative Example CH-1 | R-CH-1 | 3,000 | Acceptable | 89° | 97 | 150 |

manner that the application directions of polarized ultraviolet radiation became orthogonal to each other and heated at 150° C. for 1 hour to thermally cure the adhesive. After positive type nematic liquid crystals (MLC-6221 of Merk & Co., Inc., containing a chiral agent) were injected into the space between the substrates from a liquid crystal injection port to fill the space, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and parallel to the polarizing directions of the liquid crystal alignment films to manufacture a TN alignment type liquid crystal display device.

The liquid crystal alignability, voltage holding ratio and burn-in of this liquid crystal display device were evaluated in the same manner as in the above Example CH-17. The results are shown in Table 34.

Example CH-31

Manufacture of TN Alignment Type Liquid Crystal Display Device

The liquid crystal aligning agent A-CH-11 prepared in the above Example CH-14 was applied to the transparent electrode side of a glass substrate having a transparent electrode which was composed of an ITO film with a spinner, prebaked on a hot plate at 80° C. for 1 minute and heated at 200° C. for 1 hour to form a coating film having a thickness of 0.1 μm. 1,000 $J/m^2$ of polarized ultraviolet radiation including a 313 nm bright line was applied to the surface of this coating film by using an Hg—Xe lamp and a Glan-Taylor prism from a direction 40° inclined from the normal of the substrate to provide liquid crystal aligning capability so as to form a liquid crystal alignment film.

This operation was repeated to prepare a pair of (two) glass substrates having this liquid crystal alignment film on the transparent conductive film.

An epoxy resin adhesive containing aluminum oxide spheres having a diameter of 5.5 μm was applied to the peripheries of the liquid crystal alignment film formed sides of the above pair of substrates by screen printing, and the substrates were joined and contact bonded together in such a

Examples CH-32 and -33

TN alignment type liquid crystal display devices were manufactured and evaluated in the same manner as in Example CH-31 except that the type of the liquid crystal aligning agent used was changed as shown in Table 34. The results are shown in Table 34.

TABLE 34

| | Type of liquid crystal aligning agent | Liquid crystal alignability | Voltage holding ratio (%) | Burn-in (residual DC voltage) (mV) |
|---|---|---|---|---|
| Example CH-31 | A-CH-11 | Acceptable | 98 | 10 |
| Example CH-32 | A-CH-12 | Acceptable | 98 | 10 |
| Example CH-33 | A-CH-13 | Acceptable | 98 | 10 |

<Synthesis of Liquid Crystal Aligning Polyorganosiloxane>

Examples CH-34 to -36

Liquid crystal aligning polyorganosiloxanes S-CH-4 to S-CH-6 were obtained in the same manner as in the above Example CH-1 except that 9.65 g of the compound (A-3-P1-1) (Example CH-34), 9.98 g of the compound (A-4-P1-1)

(Example CH-35) and 8.66 g of the compound (A-1-P4-2) (Example CH-36) were used in place of the compound (A-1-P4-1), respectively.

Examples CH-37 to -39

Liquid crystal aligning agents A-CH-14 to A-CH-16 were prepared and the storage stabilities of these liquid crystal aligning agents were evaluated in the same manner as in the above Example CH-4 except that the liquid crystal aligning polyorganosiloxanes S-CH-4 to S-CH-6 obtained in the above Examples CH-34 to -36 were used in place of the liquid crystal aligning polysiloxane S-CH-1, respectively. The storage stabilities of the liquid crystal aligning agents A-CH-14 to A-CH-16 were "acceptable".

Examples CH-40 to -42

Homeotropic alignment type liquid crystal display devices were manufactured and evaluated in the same manner as in the above Example CH-17 except that the type of the liquid crystal aligning agent used was changed as shown in Table 35. The evaluation results are shown in Table 35.

TABLE 35

| | Type of liquid crystal aligning agent | Liquid crystal align-ability | Pretilt angle | Voltage holding ratio (%) | Burn-in (mV) | Light resistance |
|---|---|---|---|---|---|---|
| Example CH-40 | A-CH-14 | Accept-ance | 89° | 98 | 12 | Acceptance |
| Example CH-41 | A-CH-15 | Accept-ance | 89° | 98 | 9 | Acceptance |
| Example CH-42 | A-CH-16 | Accept-ance | 89° | 98 | 8 | Acceptance |

<Synthesis of Liquid Crystal Aligning Group-Containing Polyorganosiloxane>

Example VH-1

4.5 g of a white powder of a liquid crystal aligning polyorganosiloxane (S-VH-1) was obtained in the same manner as in the above Example CH-1 except that 5.54 g of 1-octadecene was used in place of the compound (A-1-P4-1).

<Preparation of Liquid Crystal Aligning Agent and Evaluation of Storage Stability>

Example VH-2

100 parts by weight of the liquid crystal aligning polyorganosiloxane S-VH-1 synthesized in the above Example VH-1 and 1,000 parts by weight in terms of PA-4 of the solution containing a polyamic acid (PA-4) synthesized in the above Synthesis Example PA-4 were used in combination, and N-methyl-2-pyrrolidone and butyl cellosolve were added to these to prepare a solution having a solution composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-VH-1.

When the storage stability of this liquid crystal aligning agent A-VH-1 was evaluated by the following method based on the following criteria, the storage stability of the liquid crystal aligning agent A-VH-1 was "acceptable".

[Method of Evaluating Storage Stability]

A coating film of a liquid crystal aligning agent was formed on a glass substrate by spin coating with the number of revolutions as a variable to find the number of revolutions at which the thickness of the coating film after the removal of the solvent became 1,000 Å.

Then, part of the liquid crystal aligning agent A-VH-1 was collected and stored at −15° C. for 5 weeks. When the liquid crystal aligning agent after storage was observed with the eye and the precipitation of an undissolved product was seen, the storage stability was judged as "unacceptable".

When no undissolved product was seen after 5 weeks of storage, a coating film was formed on a glass substrate by spin coating at the number of revolutions at which the film thickness became 1,000 Å before storage to measure the thickness of the film after the removal of the solvent. When this film thickness was 10% or more larger or smaller than 1,000 Å, the storage stability was judged as "unacceptable" and when the film thickness was less than 10% larger or smaller than 1,000 Å, the storage stability was judged as "acceptable".

The thickness of the coating film was measured by using the tracer type uneven film thickness meter of KLA-Tencor Corporation.

<Manufacture and Evaluation of Homeotropic Alignment Type Liquid Crystal Display Device>

Example VH-3

Manufacture of Homeotropic Alignment Type Liquid Crystal Display Device

The liquid crystal aligning agent A-VH-1 prepared in the above Example VH-2 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to remove the solvent so as to form a coating film (liquid crystal alignment film) having a thickness of 0.1 μm. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film formed side of one of the above substrates by screen printing, and the liquid crystal alignment film sides of the substrates were opposed to each other, joined and contact bonded together, and heated at 150° C. for 1 hour to thermally cure the adhesive. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. for 10 minutes and then gradually cooled to room temperature to remove flow alignment at the time of injecting liquid crystals.

Then, a polarizing plate was put on the exterior sides of the substrates in such a manner that the polarizing directions of the two polarizing plates became orthogonal to each other to manufacture a homeotropic alignment type liquid crystal display device.

[Evaluation of Liquid Crystal Alignability]

The existence of an abnormal domain formed by a change in brightness when the liquid crystal display device manufactured above was turned on and off by applying and not applying a voltage of 5 V (application and cancellation of voltage) was checked with the eye.

Liquid crystal alignability was evaluated as "acceptable" when light leakage from the cell was not observed at the time of not applying voltage, and a cell drive area displayed white and there was no light leakage from other areas at the time of applying voltage. Meanwhile, liquid crystal alignability was evaluated as "unacceptable" when light leakage from the cell was observed at the time of not applying voltage or light leakage from other areas except for the cell drive area was observed at the time of applying voltage. The liquid crystal alignability of this liquid crystal display device was "acceptable".

[Evaluation of Voltage Holding Ratio]

After a voltage of 5V was applied to the liquid crystal display device manufactured above for an application time of 601s and a span of 167 ms, the voltage holding ratio was measured 167 ms after the cancellation of voltage application. The VHR-1 of Toyo Corporation was used to measure the voltage holding ratio. When the voltage holding ratio was 90% or more, it was evaluated as "acceptable". The voltage holding ratio of this liquid crystal display device was "acceptable".

[Evaluation of Heat Resistance]

The initial voltage holding ratio of a liquid crystal display device manufactured in the same manner as above was measured under the same conditions as the above evaluation of voltage holding ratio. After the liquid crystal display device was left in an oven at 100° C. for 1,000 hours, the voltage holding ratio of the liquid crystal display device was measured again under the same conditions as above. When the voltage holding ratio changed less than ±2% from the initial value, the heat resistance was evaluated as "acceptable" and when the voltage holding ratio changed ±2% or more from the initial value, the heat resistance was evaluated as "unacceptable". The heat resistance of this liquid crystal display device was "acceptable".

[Evaluation of After Image Property]

A voltage of DC 17 V was applied to a liquid crystal display device manufactured in the same manner as above in a 100° C. environment for 20 hours, and the residual voltage (residual DC voltage) in the liquid crystal cell right after DC voltage was cut off was obtained by a flicker erasing method. When this residual DC voltage value was 500 mV or less, the heat resistance was evaluated as "acceptable" and when the residual DC voltage value was larger than 500 mV, the heat resistance was evaluated as "unacceptable". The after image property of this liquid crystal display device was "acceptable".

[Evaluation of Light Resistance]

The initial voltage holding ratio of a liquid crystal display device manufactured in the same manner as above was measured under the same conditions as the above evaluation of voltage holding ratio. Thereafter, the liquid crystal display device was placed at a distance of 5 cm below a 40 W white fluorescent lamp and illuminated for 1,000 hours, and its voltage holding ratio was measured again under the same conditions as above. When the voltage holding ratio changed less than ±2% from the initial value, the light resistance was evaluated as "acceptable" and when the voltage holding ratio changed ±2% or more from the initial value, the light resistance was evaluated as "unacceptable". The light resistance of this liquid crystal display device was "acceptable".

<Synthesis of Liquid Crystal Aligning Polyorganosiloxane>

Example CM-1

5.0 g of the reactive polyorganosiloxane (EPS-7) obtained in the above Synthesis Example 7, 15 g of acetonitrile, 8 g of the compound (A-4-A1-1) obtained in the above Synthesis Example A-1-A(1) and 1.8 g of triethylamine were fed to a 200 ml three-necked flask and stirred at 50° C. for 3 hours. After the end of a reaction, re-precipitation was carried out with methanol, the precipitate was dissolved in ethyl acetate to obtain a solution, the solution was rinsed in water 3 times, and the solvent was distilled off to obtain 3.5 g of a white powder of a liquid crystal aligning polyorganosiloxane S-CM-1. The weight average molecular weight Mw of the liquid crystal aligning polyorganosiloxane S-CM-1 was 12,100.

<Preparation of Liquid Crystal Aligning Agent and Evaluation of Storage Stability>

Example CM-2

100 parts by weight of the liquid crystal aligning polyorganosiloxane S-CM-1 obtained in the above Example CM-1 and 2,000 parts by weight in terms of PA-1 of the solution containing a polyamic acid PA-1 obtained in the above Synthesis Example PA-1 as the another polymer were used in combination, and 1-methyl-2-pyrrolidone and butyl cellosolve were added to these to prepare a solution having a solvent composition of 1-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-CM-1.

This liquid crystal aligning agent A-CM-1 was stored at −15° C. for 6 months. The viscosity of the liquid crystal aligning agent A-CM-1 was measured at 25° C. before and after storage with an E type viscometer. The storage stability was evaluated as "acceptable" when the change rate of the solution viscosity before and after storage was less than 10% and as "unacceptable when the change rate was 10% or more. The storage stability of the liquid crystal aligning agent A-CM-1 was "acceptable".

Example CM-3

Manufacture of Homeotropic Alignment Type Liquid Crystal Display Device

The liquid crystal aligning agent A-CM-1 prepared in the above Example CM-2 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to form a coating film having a thickness of 0.1 μm. 1,000 J/$m^2$ of polarized ultraviolet radiation including a 313 nm bright line was applied to the surface of this coating film by using an Hg—Xe lamp and a Glan-Taylor prism from a direction 40° inclined from the normal of the substrate to form a liquid crystal alignment film. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film formed side of one of the above substrates by screen printing, the liquid crystal alignment film sides of the pair of substrates were opposed to each other and contact bonded together in such a manner that the projection directions on the substrate surfaces of the optical axis of ultraviolet radiation of the substrates became antiparallel to each other, and the adhesive was thermally cured at 150° C. for 1 hour. After negative type liquid crystals (MLC-6608 of Merk E. Co., Inc.) were filled into the space between the substrates from a liquid crystal injection port, the liquid crystal injection port was sealed with an epoxy-based adhesive. Further, the resulting assembly was heated at 150° C. for 10 minutes and then gradually cooled to room temperature to remove flow alignment at the time of injecting liquid crystals. Then, a polarizing plate was put on the exterior sides of the substrates in such a manner that the polarizing directions of the two polarizing plates became orthogonal to each other and formed an angle of 45° from the projection directions on the substrate surfaces of the optical axis of ultraviolet radiation of the liquid crystal alignment films to manufacture a homeotropic alignment type liquid crystal display device.

When this liquid crystal display device was evaluated in the same manner as in the above Example CH-17, it had "acceptable" liquid crystal alignability, a pretilt angle of 89°, a voltage holding ratio of 98%, a burn-in of 10 mV and "acceptable" light resistance.

<Synthesis of Liquid Crystal Aligning Polyorganosiloxane>

Example VM-1

4.0 g of a white powder of a liquid crystal aligning polyorganosiloxane (S-VM-1) was obtained in the same manner as in Example CM-1 except that 5 g of stearyl acrylate was used in place of the compound (A-4-A1-1).

<Preparation of Liquid Crystal Aligning Agent and Evaluation of Storage Stability>

Example VM-2

100 parts by weight of the liquid crystal aligning polyorganosiloxane S-VM-1 synthesized in the above Example VH-1 and 1,000 parts by weight in terms of PA-4 of the solution containing a polyamic acid PA-4 synthesized in the above Synthesis Example PA-4 were dissolved in a mixed solvent of N-methyl-2-pyrrolidone and butyl cellosolve (mixing ratio=50:50 (weight ratio)) to prepare a solution having a solids content of 3.0 wt %. This solution was filtered with a filter having an opening diameter of 1 vim to prepare a liquid crystal aligning agent A-VM-1.

When the storage stability of this liquid crystal aligning agent A-VM-1 was evaluated by the following method based on the following criteria, the storage stability of the liquid crystal aligning agent A-VM-1 was "acceptable".

[Method of Evaluating Storage Stability]

A coating film of a liquid crystal aligning agent was formed on a glass substrate by spin coating with the number of revolutions as a variable to find the number of revolutions at which the thickness of the coating film after the removal of the solvent became 1,000 Å.

Then, part of the liquid crystal aligning agent A-VM-1 was collected and stored at −15° C. for 5 weeks. When the liquid crystal aligning agent after storage was observed with the eye and the precipitation of an undissolved product was seen, the storage stability was judged as "unacceptable".

When no undissolved product was seen after 5 weeks of storage, a coating film was formed on a glass substrate by spin coating at the number of revolutions at which the film thickness became 1,000 Å before storage to measure the thickness of the film after the removal of the solvent. When this film thickness was 10% or more larger or smaller than 1,000 Å, the storage stability was judged as "unacceptable" and when the film thickness was less than 10% larger or smaller than 1,000 Å, the storage stability was judged as "acceptable".

The thickness of the above coating film was measured by using the tracer type uneven film thickness meter of KLA-Tencor Corporation.

<Manufacture and Evaluation of Homeotropic Alignment Type Liquid Crystal Display Device>

Example VM-3

Manufacture of Homeotropic Alignment Type Liquid Crystal Display Device

The liquid crystal aligning agent A-VM-1 prepared in the above Example VM-2 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to remove the solvent so as to form a coating film (liquid crystal alignment film) having a thickness of 0.1 μm. This operation was repeated to prepare a pair of (two) substrates having this liquid crystal alignment film thereon.

An epoxy resin adhesive containing aluminum oxide spheres having a diameter of 5.5 μm was applied to the periphery of the liquid crystal alignment film formed side of one of the above substrates by screen printing, and the liquid crystal alignment film sides of the pair of substrates were opposed to each other, joined and contact bonded together, and heated at 150° C. for 1 hour to thermally cure the adhesive. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. for 10 minutes and then gradually cooled to room temperature to remove flow alignment at the time of injecting liquid crystals.

Then, a polarizing plate was put on the exterior sides of the substrates in such a manner that the polarizing directions of the two polarizing plates became orthogonal to each other to manufacture a homeotropic alignment type liquid crystal display device.

[Evaluation of Liquid Crystal Alignability]

The existence of an abnormal domain formed by a change in brightness when the liquid crystal display device manufactured above was turned on and off by applying and not applying a voltage of 5 V (application and cancellation of voltage) was checked with the eye.

Liquid crystal alignability was evaluated as "acceptable" when light leakage from the cell was not observed at the time of not applying voltage, and a cell drive area displayed white and there was no light leakage from other areas at the time of applying voltage. Meanwhile, liquid crystal alignability was evaluated as "unacceptable" when light leakage from the cell was observed at the time of not applying voltage or light leakage from other areas except for the cell drive area was observed at the time of applying voltage. The liquid crystal alignability of this liquid crystal display device was "acceptable".

[Evaluation of Voltage Holding Ratio]

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio. When the voltage holding ratio was 90% or more, it was evaluated as "acceptable". The voltage holding ratio of this liquid crystal display device was "acceptable".

[Evaluation of Heat Resistance]

The initial voltage holding ratio of a liquid crystal display device manufactured in the same manner as above was measured under the same conditions as the above evaluation of voltage holding ratio. After the liquid crystal display device was left in an oven at 100° C. for 1,000 hours, the voltage holding ratio of the liquid crystal display device was measured again under the same conditions as above. When the voltage holding ratio changed less than ±2% from the initial value, the heat resistance was evaluated as "acceptable" and when the voltage holding ratio changed ±2% or more from the initial value, the heat resistance was evaluated as "unacceptable". The heat resistance of this liquid crystal display device was "acceptable".

[Evaluation of After Image Property]

A voltage of DC 17 V was applied to a liquid crystal display device manufactured in the same manner as above in a 100° C. environment for 20 hours, and the residual voltage (residual DC voltage) in the liquid crystal cell right after DC voltage was cut off was obtained by a flicker erasing method. When this residual DC voltage value was 500 mV or less, the heat resistance was evaluated as "acceptable" and when the residual DC voltage value was larger than 500 mV, the heat resistance was evaluated as "unacceptable". The after image property of this liquid crystal display device was "acceptable".

[Evaluation of Light Resistance]

The initial voltage holding ratio of a liquid crystal display device manufactured in the same manner as above was measured under the same conditions as the above evaluation of voltage holding ratio. Thereafter, the liquid crystal display device was placed at a distance of 5 cm below a 40 W white fluorescent lamp and illuminated for 1,000 hours, and its voltage holding ratio was measured again under the same conditions as above. When the voltage holding ratio changed less than ±2% from the initial value, the light resistance was evaluated as "acceptable" and when the voltage holding ratio changed ±2% or more from the initial value, the light resistance was evaluated as "unacceptable". The light resistance of this liquid crystal display device was "acceptable".

<Synthesis of Liquid Crystal Aligning Polyorganosiloxane>

Example VA-1

30 g of dodecane thiol, 50 g of the polyorganosiloxane AC-SQ having an acryloyloxyl group (trade name, manufactured by Toagosei Co., Ltd.) and 80 g of acetonitrile were added to a 300 ml three-necked flask equipped with a thermometer and uniformly dissolved. Subsequently, 7.6 g of triethylamine was added to carry out a reaction at 50° C. for 3 hours. After the end of the reaction, 500 ml of butyl acetate and 500 ml of diluted hydrochloric acid were added, the mixture was rinsed in 500 ml of water 3 times, and the solvent was distilled off to obtain a transparent viscous liquid crystal aligning polyorganosiloxane (S-VA-1) liquid. The weight average molecular weight Mw of this liquid crystal aligning polyorganosiloxane (S-VA-1) was 14,000.

Example VA-2

43 g of octadecane thiol, 50 g of AC-SQ and 93 g of acetonitrile were added to a 300 ml three-necked flask equipped with a thermometer and uniformly dissolved.

Subsequently, 7.6 g of triethylamine was added to carry out a reaction at 50° C. for 3 hours. After the end of the reaction, 500 ml of butyl acetate and 500 ml of diluted hydrochloric acid were added, the mixture was rinsed in 500 ml of water 3 times, and the solvent was distilled off to obtain a transparent viscous liquid crystal aligning polyorganosiloxane (S-VA-2) liquid. The weight average molecular weight Mw of this liquid crystal aligning polyorganosiloxane (S-VA-2) was 15,000.

Example VA-3

64 g of octadecane thiol, 50 g of AC-SQ and 114 g of acetonitrile were added to a 300 ml three-necked flask equipped with a thermometer and uniformly dissolved. Subsequently, 11 g of triethylamine was added to carry out a reaction at 50° C. for 3 hours. After the end of the reaction, 500 ml of butyl acetate and 500 ml of diluted hydrochloric acid were added, the mixture was rinsed in 500 ml of water 3 times, and the solvent was distilled off to obtain a transparent viscous liquid crystal aligning polyorganosiloxane (S-VA-3) liquid. The weight average molecular weight Mw of this liquid crystal aligning polyorganosiloxane (S-VA-3) was 16,000.

Example VA-4

43 g of octadecane thiol, 50 g of EPS-8 obtained in the above Synthesis Example 8 and 93 g of acetonitrile were added to a 300 ml three-necked flask equipped with a thermometer and uniformly dissolved. Subsequently, 7.6 g of triethylamine was added to carry out a reaction at 50° C. for 3 hours. After the end of the reaction, 500 ml of butyl acetate and 500 ml of diluted hydrochloric acid were added, the mixture was rinsed in 500 ml of water 3 times, and the solvent was distilled off to obtain a transparent viscous liquid crystal aligning polyorganosiloxane (S-VA-4) liquid. The weight average molecular weight Mw of this liquid crystal aligning polyorganosiloxane (S-VA-4) was 16,000.

Example VA-5

43 g of octadecane thiol, 50 g of EPS-9 obtained in the above Synthesis Example 9 and 93 g of acetonitrile were added to a 300 ml three-necked flask equipped with a thermometer and uniformly dissolved. Subsequently, 7.6 g of triethylamine was added to carry out a reaction at 50° C. for 3 hours. After the end of the reaction, 500 ml of butyl acetate and 500 ml of diluted hydrochloric acid were added, the mixture was rinsed in 500 ml of water 3 times, and the solvent was distilled off to obtain a transparent viscous liquid crystal aligning polyorganosiloxane (S-VA-5) liquid. The weight average molecular weight Mw of this liquid crystal aligning polyorganosiloxane (S-VA-5) was 16,000.

Example VA-6

43 g of octadecane thiol, 50 g of AC-SQ, 5.5 g of thioglycolic acid and 93 g of acetonitrile were added to a 300 ml three-necked flask equipped with a thermometer and uniformly dissolved. Subsequently, 7.6 g of triethylamine was added to carryout a reaction at 50° C. for 3 hours. After the end of the reaction, 500 ml of butyl acetate and 500 ml of diluted hydrochloric acid were added, the mixture was rinsed in 500 ml of water 3 times, and the solvent was distilled off to obtain a transparent viscous liquid crystal aligning polyorganosiloxane (S-VA-6) liquid.

<Preparation of Liquid Crystal Aligning Agent and Evaluation of Storage Stability>

Example VA-7

100 parts by weight of the liquid crystal aligning polyorganosiloxane S-VA-1 obtained in the above Example VA-1 and 1,000 parts by weight in terms of PA-4 of the solution containing a polyamic acid PA-4 obtained in the above Synthesis Example PA-4 as the another polymer were used in combination, N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-VA-1.

This liquid crystal aligning agent A-VA-1 was stored at −15° C. for 6 months. The viscosity of the liquid crystal aligning agent A-VA-1 was measured at 25° C. before and after storage with an E type viscometer. The storage stability was evaluated as "acceptable" when the change rate of the solution viscosity before and after storage was less than 10% and as "unacceptable when the change rate was 10% or more. The storage stability of the liquid crystal aligning agent A-VA-1 was "acceptable".

Examples VA-8 to -14

Liquid crystal aligning agents A-VA-2 to A-VA-8 were prepared in the same manner as in the above Example VA-7 except that the type of the liquid crystal aligning polyorganosiloxane and the type and amount of the another polymer were changed as shown in Table 36. The evaluation results of the storage stabilities of the liquid crystal aligning agents which were evaluated in the same manner as in Example VA-7 are shown in Table 36.

Example VA-15

100 parts by weight of the liquid crystal aligning polyorganosiloxane S-VA-6 obtained in the above Example VA-6 and 1,000 parts by weight in terms of PA-4 of the solution containing a polyamic acid PA-4 obtained in the above Synthesis Example PA-4 as the another polymer were used in combination, 200 parts by weight of the epoxy compound represented by the above formula (E-1) was added, and further N-methyl-2-pyrrolidone and butyl cellosolve were added to these to prepare a solution having a solvent composition of N-methyl-2-pyrrolidone:butyl cellosolve=50:50 (weight ratio) and a solids content of 3.0 wt %. This solution was filtered with a filter having an opening diameter of 1 μm to prepare a liquid crystal aligning agent A-VA-9.

The evaluation result of the storage stability of this liquid crystal aligning agent A-VA-9 which was evaluated in the same manner as in Example VA-7 is shown in Table 36.

Example VA-16

500 parts by weight in terms of PS-1 of the solution containing another polysiloxane PS-1 obtained in the above Synthesis Example PS-1 was collected as the another polymer, 100 parts by weight of the radiation sensitive polyorganosiloxane S-VA-2 obtained in the above Example VA-2 was added to this solution, and 1-ethoxy-2-propanol was further added to prepare a solution having a solids content of 4.0 wt %. This solution was filtered with a filter having an opening diameter of 1 μm to prepare a liquid crystal aligning agent A-VA-10.

The evaluation result of the storage stability of this liquid crystal aligning agent A-VA-10 which was evaluated in the same manner as in Example VA-7 is shown in Table 36.

TABLE 36

| | Type of liquid crystal aligning polyorganosiloxane | Another polymer Type | Another polymer Amount (parts by weight) | Amount of E-1 (parts by weight) | Liquid crystal aligning agent Name | Liquid crystal aligning agent Storage stability |
|---|---|---|---|---|---|---|
| Example VA-7 | S-VA-1 | PA-4 | 1,000 | 0 | A-VA-1 | Acceptable |
| Example VA-8 | S-VA-2 | PA-1 | 1,000 | 0 | A-VA-2 | Acceptable |
| Example VA-9 | S-VA-2 | PA-4 | 1,000 | 0 | A-VA-3 | Acceptable |
| Example VA-10 | S-VA-2 | PI-5 | 1,000 | 0 | A-VA-4 | Acceptable |
| Example VA-11 | S-VA-2 | PA-4 | 2,000 | 0 | A-VA-5 | Acceptable |
| Example VA-12 | S-VA-3 | PA-4 | 1,000 | 0 | A-VA-6 | Acceptable |
| Example VA-13 | S-VA-4 | PA-4 | 1,000 | 0 | A-VA-7 | Acceptable |
| Example VA-14 | S-VA-5 | PA-4 | 1,000 | 0 | A-VA-8 | Acceptable |
| Example VA-15 | S-VA-6 | PA-4 | 1,000 | 200 | A-VA-9 | Acceptable |
| Example VA-16 | S-VA-2 | PS-1 | 500 | 0 | A-VA-10 | Acceptable |

Example VA-17

Manufacture of Homeotropic Alignment Type Liquid Crystal Display Device

The liquid crystal aligning agent A-VA-1 obtained in the above Example VA-7 was applied to the transparent electrode side of a glass substrate having a transparent electrode which was composed of an ITO film with a spinner, prebaked on a hot plate at 80° C. for 1 minute and heated in an oven whose inside had been substituted by nitrogen at 200° C. for 1 hour to form a coating film having a thickness of 0.1 μm, to prepare a pair of (two) substrates having a liquid crystal alignment film thereon.

An epoxy resin adhesive containing aluminum oxide spheres having a diameter of 5.5 μm was applied to the periphery of the liquid crystal alignment film formed side of one of the above substrates by screen printing, the liquid crystal alignment film sides of the pair of substrates were opposed to each other and contact bonded together, and the adhesive was thermally cured at 150° C. for 1 hour. After negative type liquid crystals (MLC-6608 of Merk & Co., Inc.) were filled into the space between the substrates from a liquid crystal injection port, the liquid crystal injection port was sealed with an epoxy-based adhesive. Further, the resulting assembly was heated at 150° C. for 10 minutes and then gradually cooled to room temperature to remove flow alignment at the time of injecting liquid crystals, thereby manufacturing a homeotropic alignment type liquid crystal display device (liquid crystal cell).

This liquid crystal display device was evaluated by the following methods. The evaluation results are shown in Table 37.

<Evaluation of Liquid Crystal Display Device>

(1) Evaluation of Liquid Crystal Alignability

The liquid crystal display device manufactured above was sandwiched between two polarizing plates which were orthogonal to each other and observed through a microscope. When there was no light leakage, the liquid crystal alignability was evaluated as "acceptable".

(2) Evaluation of Voltage Holding Ratio

After a voltage of 5V was applied to the liquid crystal display device manufactured above for an application time of 60 μs and a span of 167 ms, the voltage holding ratio was measured 167 ms after the cancellation of voltage application. The VHR-1 of Toyo Corporation was used to measure the voltage holding ratio.

(3) Evaluation of Burn-In

After a 30 Hz, 3 V rectangular wave on which DC 4V had been superimposed was applied to the liquid crystal display device manufactured above in a 60° C. environment for 5 hours, the residual DC voltage in the liquid crystal cell right after the DC voltage was cut off was obtained by a flicker erasing method.

Examples VA-18 to -26

Homeotropic alignment type liquid crystal display devices were manufactured and evaluated in the same manner as in the above Example VA-17 except that the liquid crystal aligning agents shown in Table 37 were used. The evaluation results are shown in Table 37.

Comparative Example VA-1

Preparation of Liquid Crystal Aligning Agent

N-methyl-2-pyrrolidone and butyl cellosolve were added to the polyimide PI-5 obtained in the above Synthesis Example PI-5 to prepare a solution having a solvent composition of N-methyl-2-pyrrolidone:butyl cellosolve=50:50 (weight ratio) and a solid content of 3.0 wt %. This solution was filtered with a filter having an opening diameter of 1 μm to prepare a liquid crystal aligning agent R-VA-1.

<Manufacture and Evaluation of Homeotropic Alignment Type Liquid Crystal Display Device>

A homeotropic alignment type liquid crystal display device was manufactured and evaluated in the same manner as in Example VA-17 except that the liquid crystal aligning agent R-VA-1 prepared above was used. The evaluation results are shown in Table 37.

TABLE 37

| | Type of liquid crystal aligning agent | Liquid crystal alignability | Voltage holding ratio(%) | Burn-in (mV) |
|---|---|---|---|---|
| Example VA-17 | A-VA-1 | Acceptable | 99.7 | 5 |
| Example VA-18 | A-VA-2 | Acceptable | 99.8 | 6 |
| Example VA-19 | A-VA-3 | Acceptable | 99.7 | 6 |
| Example VA-20 | A-VA-4 | Acceptable | 99.7 | 6 |
| Example VA-21 | A-VA-5 | Acceptable | 99.8 | 7 |
| Example VA-22 | A-VA-6 | Acceptable | 99.8 | 6 |
| Example VA-23 | A-VA-7 | Acceptable | 99.8 | 5 |
| Example VA-24 | A-VA-8 | Acceptable | 99.7 | 5 |
| Example VA-25 | A-VA-9 | Acceptable | 99.8 | 7 |
| Example VA-26 | A-VA-10 | Acceptable | 99.6 | 8 |
| Comparative Example VA-1 | R-VA-1 | Acceptable | 99.3 | 21 |

EFFECT OF THE INVENTION

When the liquid crystal aligning agent of the present invention is used, a liquid crystal alignment film having higher heat resistance and higher light resistance than an alignment film of the prior art, especially a liquid crystal alignment film which is free from a reduction in voltage holding ratio and has excellent electric properties can be obtained even when high-intensity light is applied thereto in a high-temperature environment. Therefore, this liquid crystal alignment film can be advantageously used in various liquid crystal display devices.

The liquid crystal display device of the present invention comprising a liquid crystal alignment film formed from the liquid crystal aligning agent of the present invention can be advantageously used in equipment such as desk-top calculators, wristwatches, clocks, counter displays, word processors, personal computers, car navigation systems and liquid crystal TVs.

The invention claimed is:

1. A composition that comprises a reaction product of a compound represented by formula (1)

R-Z (1)

and at least one member selected from the group consisting of a polysiloxane having a structure represented by formula (S-1), a hydrolysate thereof and a condensate of the hydrolysate (S-1)

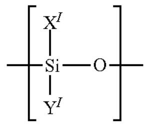

wherein

R represents a group having an alkyl group with 4 to 20 carbon atoms, a fluoroalkyl group with 1 to 20 carbon atoms, a cyclohexyl group, a group having from 17 to 51 carbon atoms and a steroid skeleton, or a group represented by formula (2)

(2)

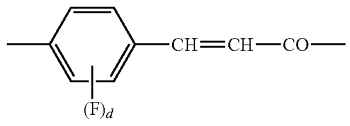

in which d is an integer of 0 to 4 and the group represented by Z is attached to either the optionally fluorinated phenyl group or the CO— group of formula (2);

Z is a —COOH group, a —OH group,

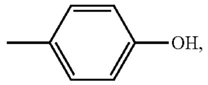 —C≡CH a —SH group, a —NCO group, a —NHR' group where R' is a hydrogen atom, alkyl group having 1 to 6 carbon atoms or aryl group having 6 to 30 carbon atoms, a (meth)acryloyloxyl group or a —$SO_2$Cl group;

$X^I$ represents a monovalent group having an oxiranyl group, a monovalent group having an oxetanyl group, a monovalent group having a vinyl group, a monovalent group having a (meth)acryloyloxyl group, or a monovalent group having a mercapto group; and $Y^I$ represents a hydroxyl group, an alkoxyl group having 1 to 10 carbon atoms, an alkyl group having 1 to 6 carbon atoms or an aryl group having 6 to 10 carbon atoms.

2. The composition according to claim 1, wherein R in formula (1) is a group represented by formula (2):

(2)

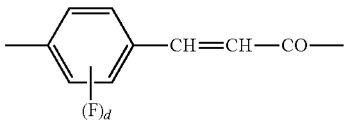

in which d is an integer of 0 to 4 and the group represented by Z is attached to either the optionally fluorinated phenyl group or the CO— group of formula (2).

3. The composition according to claim 1, wherein the compound represented by formula (1) is at least one compound represented by formulas (A-1) to (A-8):

(A-1)

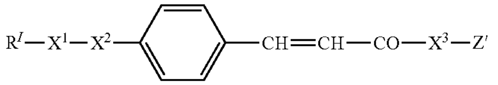

where $R^I$ is an alkyl group having 4 to 20 carbon atoms, a fluoroalkyl group having 1 to 20 carbon atoms, a cyclohexyl group, an alkylcyclohexyl group having an alkyl group with 1 to 20 carbon atoms, a fluoroalkylcyclohexyl group having a fluoroalkyl group with 1 to 20 carbon atoms, or a group having 17 to 51 carbon atoms and a steroid skeleton, $X^1$ is a single bond, an oxygen atom, a sulfur atom, a phenylene group, a cyclohexylene group, —COO—, —NHCO—, —CONH— or —CO—, $X^2$ is a single bond or a group represented by any one of formulas ($X^2$-1) to ($X^2$-6):

($X^2$-1)

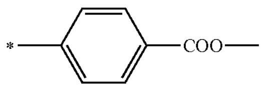

($X^2$-2)

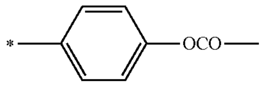

($X^2$-3)

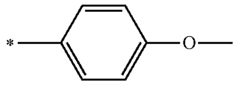

($X^2$-4)

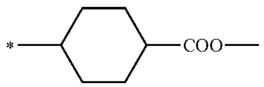

-continued ($X^2$-5)

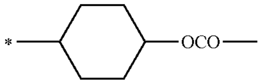

($X^2$-6)

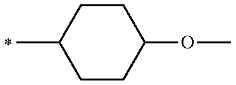

where bonds marked with the asterisk are on the $X^1$ side $X^3$ is a single bond, a phenylene group, *-O—$(CH_2)_a$—, *-O—$(CH_2)_a$—CO—,

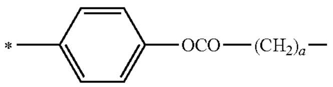

or *-$(CH_2)_a$—OCO—$(CH_2)_a$— in which a is an integer of 1 to 6, and bonds marked with the asterisk are on the —CH=CH—CO— side, and Z' is —COOH, —OH,

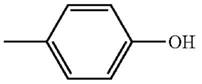

—SH, —NCO, —NHR' in which R' is a hydrogen atom, an alkyl group having 1 to 6 carbon atoms or an aryl group having 6 to 30 carbon atoms, —CH=$CH_2$ or —$SO_2$Cl, with the proviso that when two adjacent bonds are single bonds, they are collectively regarded as one single bond;

(A-2)

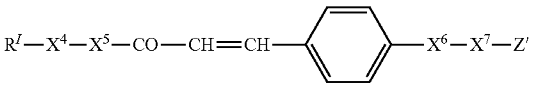

where $R^I$ and Z' are identical to $R^I$ and Z' in formula (A-1), respectively, $X^4$ is a single bond, an oxygen atom, a sulfur atom, —COO—, —OCO—, —NHCO—, —CONH— or —CO—, $X^5$ is a single bond or a phenylene group, $X^6$ is a single bond or a group represented by formula ($X^6$-1):

($X^6$-1)

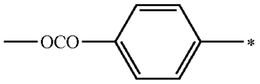

where the bond marked with the asterisk is on the $X^7$ side and $X^7$ is a single bond, *-CO—, *-OCO—$(CH_2)_a$—, *-OCO—$(CH_2)_a$—CO—, *-O—$(CH_2)_a$— or

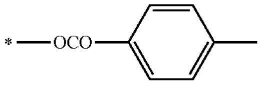

where a is an integer of 1 to 6, and bonds marked with the asterisk are on the $X^6$ side, with the proviso that when two adjacent bonds are single bonds, they are collectively regarded as one single bond;

(A-3)

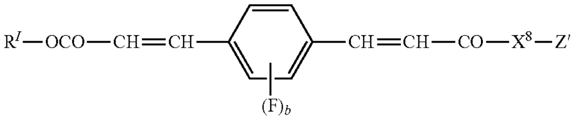

where $R^I$ and Z' are identical to $R^I$ and Z' in formula (A-1), respectively, and $X^8$ is a single bond or *-O—$(CH_2)_a$— where a is an integer of 1 to 6, and a bond marked with the asterisk is on the —CH═CH—CO— side, and b is an integer of 0 to 4;

(A-4)

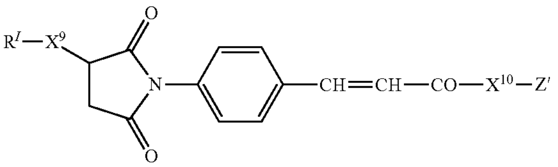

(A-5)

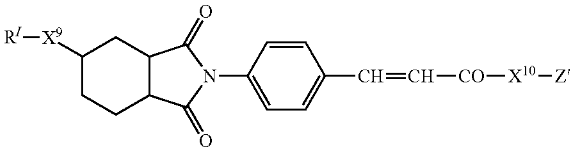

(A-6)

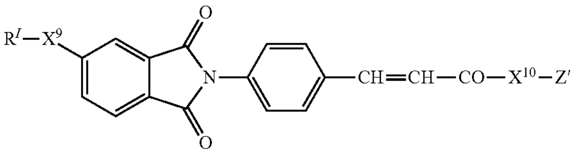

where $R^I$ and Z' are identical to $R^I$ and Z' in formula (A-1), respectively, $X^9$ is a single bond, an oxygen atom, a sulfur atom, —COO—, —OCO—, —NHCO—, —CONH— or —CO—, and $X^{10}$ is a single bond, an oxygen atom, a sulfur atom or —O—$(CH_2)_a$—* in which a is an integer of 1 to 6, and a bond marked with the asterisk is on the Z' side; and (A-7)

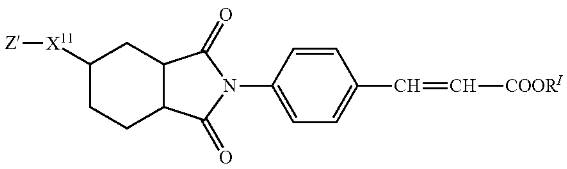

-continued (A-8)

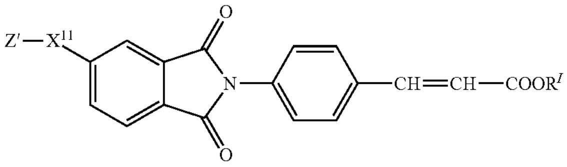

where $R^I$ and Z' are identical to $R^I$ and Z' in the above formula (A-1), respectively, and $X^{11}$ is a single bond, *-$(CH_2)_a$—OCO—, *-COO—$(CH_2)_a$— or *-O—$(CH_2)_a$—O— in which a is an integer of 1 to 6, and bonds marked with the asterisk are on the Z' side.

4. The composition according to claim 1, wherein $X^1$ in formula (S-1) is a group represented by any one of formulas ($X^1$-1) to ($X^1$-7):

($X^I$-1)

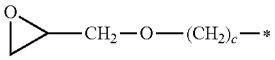

($X^I$-2)

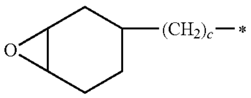

($X^I$-3)

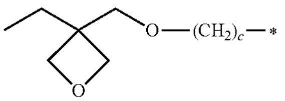

($X^I$-4)

$CH_2$═CH—COO—$(CH_2)_c$—*

($X^I$-5)

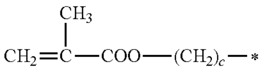

($X^I$-6)

$CH_2$═CH—*

($X^I$-7)

HS—$(CH_2)_c$—* where c is an integer of 1 to 10, and bonds marked with the asterisk are bonded to the silicon atom.

5. The composition according to claim 1, further comprising at least one member selected from the group consisting of a polyamic acid and a polyimide.

6. The composition according to claim 1, further comprising at least one member selected from the group consisting of a polysiloxane having a structure represented by formula (S-2), a hydrolysate thereof and a condensate of the hydrolysate:

(S-2)

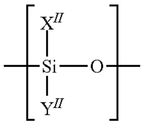

wherein $X^{II}$ is a hydroxyl group, an alkoxyl group having 1 to 10 carbon atoms, an alkyl group having 1 to 6 carbon atoms or an aryl group having 6 to 10 carbon atoms, and $Y^{II}$ is a hydroxyl group or an alkoxyl group having 1 to 10 carbon atoms.

7. A method, comprising:

applying the composition according to claim 1 to a substrate and irradiating the composition.

8. A liquid crystal display device comprising a liquid crystal alignment film formed from the composition according to claim 1.

9. A reaction product of a compound represented by formula (1)

R-Z (1)

and at least one member selected from the group consisting of a polysiloxane having a structure represented by formula (S-1), a hydrolysate thereof and a condensate of the hydrolysate (S-1)

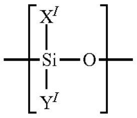

wherein

R represents a group having an alkyl group with 4 to 20 carbon atoms, a fluoroalkyl group with 1 to 20 carbon atoms, a cyclohexyl group, a group having from 17 to 51 carbon atoms and a steroid skeleton, or a group represented by formula (2)

(2)

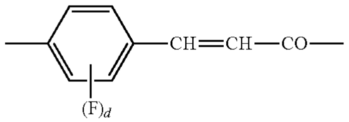

in which d is an integer of 0 to 4 and the group represented by Z is attached to either the optionally fluorinated phenyl group or the CO— group of formula (2);

Z is a —COOH group, a —OH group,

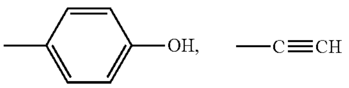

a —SH group, a —NCO group, a —NHR' group where R' is a hydrogen atom, alkyl group having 1 to 6 carbon atoms or aryl group having 6 to 30 carbon atoms, a (meth)acryloyloxyl group or a —$SO_2$Cl group;

$X^I$ represents a monovalent group having an oxiranyl group, a monovalent group having an oxetanyl group, a monovalent group having a vinyl group, a monovalent group having a (meth)acryloyloxyl group, or a monovalent group having a mercapto group; and $Y^I$ represents a hydroxyl group, an alkoxyl group having 1 to 10 carbon atoms, an alkyl group having 1 to 6 carbon atoms or an aryl group having 6 to 10 carbon atoms.

10. The composition according to claim 1, wherein said at least one member selected from the group consisting of a polysiloxane having a structure represented by the above formula (S-1), a hydrolysate thereof and a condensate is obtained by a process comprising hydrolyzing or hydrolyzing and condensing a silane compound represented by formula (S-1-1)

(S-1-1)

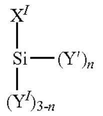

or a mixture of the silane compound represented by formula (S-1-1) and another silane compound in the presence of an alkali metal compound or an organic base, wherein $X^I$ represents a monovalent group having an oxiranyl group, a monovalent group having an oxetanyl group, a monovalent group having a vinyl group, a monovalent group having a (meth)acryloyloxyl group, or a monovalent group having a mercapto group;

$Y^I$ represents a hydroxyl group, an alkoxyl group having 1 to 10 carbon atoms, an alkyl group having 1 to 6 carbon atoms or an aryl group having 6 to 10 carbon atoms;

Y' is an alkoxyl group having 1 to 10 carbon atoms or halogen atom;

n is an integer of 1 to 3; and said another silane compound comprises at least one member selected from the group consisting of tetrachlorosilane, tetramethoxysilane, tetraethoxysilane, tetra-n-propoxysilane, tetra-i-propoxysilane, tetra-n-butoxysilane, tetra-sec-butoxysilane, fluorotrichlorosilane, fluorotrimethoxysilane, fluorotriethoxysilane, fluorotri-n-propoxysilane, fluorotri-i-propoxysilane, fluorotri-n-butoxysilane, fluorotri-sec-butoxysilane, methyl trichlorosilane, methyl trimethoxysilane, methyl triethoxysilane, methyl tri-n-propoxysilane, methyl tri-i-propoxysilane, methyl tri-n-butoxysilane, methyl tri-sec-butoxysilane, 2-(trifluoromethyl)ethyl trichlorosilane, 2-(trifluoromethyl)ethyl trimethoxysilane, 2-(trifluoromethyl)ethyl triethoxysilane, 2-(trifluoromethyl)ethyl tri-n-propoxysilane, 2-(trifluoromethyl)ethyl tri-i-propoxysilane, 2-(trifluoromethyl)ethyl tri-n-butoxysilane, 2-(trifluoromethyl)ethyl tri-sec-butoxysilane, 2-(perfluoro-n-hexyl)ethyl trichlorosilane, 2-(perfluoro-n-hexyl)ethyl trimethoxysilane, 2-(perfluoro-n-hexyl)ethyl triethoxysilane, 2-(perfluoro-n-hexyl)ethyl tri-n-propoxysilane, 2-(perfluoro-n-hexyl) ethyl tri-i-propoxysilane, 2-(perfluoro-n-hexyl)ethyl tri-n-butoxysilane, 2-(perfluoro-n-hexyl)ethyl tri-sec-butoxysilane, 2-(perfluoro-n-octyl)ethyl trichlorosilane, 2-(perfluoro-n-octyl)ethyl trimethoxysilane, 2-(perfluoro-n-octyl)ethyl triethoxysilane, 2-(perfluoro-n-octyl)ethyl tri-n-propoxysilane, 2-(perfluoro-n-octyl)ethyl tri-i-propoxysilane, 2-(perfluoro-n-octyl)ethyl tri-n-butoxysilane, 2-(perfluoro-n-octyl)ethyl tri-sec-butoxysilane, hydroxymethyl trichlorosilane, hydroxymethyl trimethoxysilane, hydroxyethyl trimethoxysilane, hydroxymethyl tri-n-propoxysilane, hydroxymethyl tri-i-propoxysilane, hydroxymethyl tri-n-butoxysilane, hydroxymethyl tri-sec-butoxysilane, phenyl trichlorosilane, phenyl trimethoxysilane, phenyl triethoxysilane, phenyl tri-n-propoxysilane, phenyl tri-i-propoxysilane, phenyl tri-n-butoxysilane, phenyl tri-sec-butoxysilane, dimethyl dichlorosilane, dimethyl dimethoxysilane, dimethyl diethoxysilane, dimethyl di-n-propoxysilane, dimethyl di-i-propoxysilane, dimethyl di-n-butoxysilane, dimethyl di-sec-butoxysilane, (methyl)[2-(perfluoro-n-octyl)ethyl]dichlorosilane, (methyl)[2-(perfluoro-n-octyl)ethyl]dimethoxysilane, (methyl)[2-(perfluoro-n-octyl)ethyl]diethoxysilane, (methyl)[2-(perfluoro-n-octyl)ethyl]di-n-propoxysilane, (methyl)[2-(perfluoro-n-octyl)ethyl]di-i-propoxysilane, (methyl)[2-(perfluoro-n-octyl)ethyl]di-n-butoxysilane, (methyl)[2-(perfluoro-n-octyl)ethyl]di-sec-butoxysilane, (methyl)(3-mercaptopropyl)dichlorosilane, diphenyl dichlorosilane, diphenyl dimethoxysilane, diphenyl diethoxysilane, diphenyl di-n-propoxysilane, diphenyl di-i-propoxysilane, diphenyl di-n-butoxysilane, diphenyl di-sec-butoxysilane, chlorotrimethylsilane, bromotrimethylsilane, iodotrimethylsilane, methoxytrimethylsilane, ethoxytrimethylsilane, n-propoxytrimethylsilane, i-propoxytrimethylsilane, n-butoxytrimethylsilane, sec-butoxytrimethylsilane, t-butoxytrimethylsilane, (chloro)(vinyl)dimethylsilane, (methoxy)(vinyl)dimethylsilane, (ethoxy)(vinyl)dimethylsilane, (chloro)(methyl)diphenylsilane, (methoxy)(methyl)diphenylsilane, and (ethoxy)(methyl)diphenylsilane.

11. The composition according to claim 10, wherein said hydrolyzing or hydrolyzing and condensing is carried out at a temperature of from 40° C. to 100° C.

12. The composition according to claim 10, wherein said alkali metal compound comprises at least one member selected from the group consisting of sodium hydroxide, potassium hydroxide, sodium methoxide, potassium methoxide, sodium ethoxide and potassium ethoxide; and said organic base comprises at least one member selected from the group consisting of ethylamine, diethylamine, piperazine, piperidine, pyrrolidine, pyrrole, triethylamine, tri-n-propylamine, tri-n-butylamine, pyridine, 4-dimethylaminopyridine, diazabicycloundecene, and tetramethylammonium hydroxide.

13. The composition according to claim 1, wherein said reaction product has a weight average molecular weight in terms of polystyrene measured by gel permeation chromatography (GPC) of 500 to 100,000.

14. The composition according to claim 1, wherein said group having an alkyl group with 4 to 20 carbon atoms for R in formula (1) is a n-butyl group, a n-pentyl group, a n-hexyl group, a n-octyl group, a n-nonyl group, a n-decyl group, a n-lauryl group, a n-dodecyl group, a n-tridecyl group, a n-tetradecyl group, a n-pentadecyl group, a n-hexadecyl group, a n-heptadecyl group, a n-stearyl group or an-eicosyl group;

said group having a fluoroalkyl group with 1 to 20 carbon atoms for R in formula (1) is a 4,4,4-trifluorobutyl group, a 4,4,5,5,5-pentafluoropentyl group, or a 3,3,4,4,5,5,5-heptafluoropentyl group; and said group having from 17 to 51 carbon atoms and a steroid skeleton for R in formula (1) is a cholestan-3-yl group, a cholesta-5-ene-3-yl group, a cholesta-24-ene-3-yl group, a cholesta-5,24-diene-3-yl group, or a lanostan-3-yl group.

15. The composition according to claim 1, wherein said compound represented by formula (1) is a compound represented by formula (A-9)

$$R^{I}\text{-}Z' \quad (A\text{-}9)$$

where $R^{I}$ is an alkyl group having 4 to 20 carbon atoms, a fluoroalkyl group having 1 to 20 carbon atoms, a cyclohexyl group, an alkylcyclohexyl group having an alkyl group with 1 to 20 carbon atoms, a fluoroalkylcyclohexyl group having a fluoroalkyl group with 1 to 20 carbon atoms, or a group having 17 to 51 carbon atoms and a steroid skeleton; and Z' is —COOH, —OH,

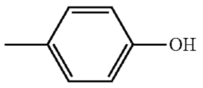

—SH, —NCO, —NHR' in which R' is a hydrogen atom, an alkyl group having 1 to 6 carbon atoms or an aryl group having 6 to 30 carbon atoms, or —$SO_2$Cl, with the proviso that when two adjacent bonds are single bonds, they are collectively regarded as one single bond.

16. The composition according to claim 1, wherein said compound represented by formula (1) is a compound represented by formula (A-10)

(A-10)

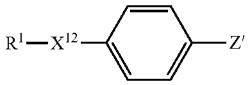

where $R^{I}$ is an alkyl group having 4 to 20 carbon atoms, a fluoroalkyl group having 1 to 20 carbon atoms, a cyclohexyl group, an alkylcyclohexyl group having an alkyl group with 1 to 20 carbon atoms, a fluoroalkylcyclohexyl group having a fluoroalkyl group with 1 to 20 carbon atoms, or a group having 17 to 51 carbon atoms and a steroid skeleton;

Z' is —COOH, —OH,

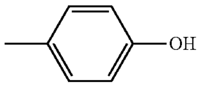

—SH, —NCO, —NHR' in which R' is a hydrogen atom, an alkyl group having 1 to 6 carbon atoms or an aryl group having 6 to 30 carbon atoms, or —$SO_2$Cl, with the proviso that when two adjacent bonds are single bonds, they are collectively regarded as one single bond; and $X^{12}$ is a single bond, an oxygen atom, a —COO— group or a —OCO— group.

17. The composition according to claim 1, wherein said compound represented by formula (1) is a compound represented by formula (A-11)

(A-11)

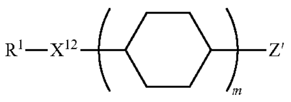

where $R^{I}$ is an alkyl group having 4 to 20 carbon atoms, a fluoroalkyl group having 1 to 20 carbon atoms, a cyclohexyl group, an alkylcyclohexyl group having an alkyl group with 1 to 20 carbon atoms, a fluoroalkylcyclohexyl group having a fluoroalkyl group with 1 to 20 carbon atoms, or a group having 17 to 51 carbon atoms and a steroid skeleton;

Z' is —COOH, —OH,

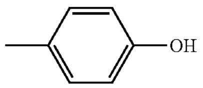

—SH, —NCO, —NHR' in which R' is a hydrogen atom, an alkyl group having 1 to 6 carbon atoms or an aryl group having 6 to 30 carbon atoms, or $—SO_2Cl$, with the proviso that when two adjacent bonds are single bonds, they are collectively regarded as one single bond;

$X^{12}$ is a single bond, an oxygen atom, a —COO— group or a —OCO— group; and m is 1 or 2.

18. The composition according to claim 1, wherein said compound represented by formula (1) comprises at least one member selected from the group consisting of n-butanoic acid, n-pentanoic acid, n-hexanoic acid, n-heptanoic acid, n-octanoic acid, n-nonanoic acid, n-decanoic acid, n-lauric acid, n-dodecanoic acid, n-tridecanoic acid, n-tetradecanoic acid, n-pentadecanoic acid, n-hexadecanoic acid, n-heptadecanoic acid, n-stearic acid, n-nonadecanoic acid, n-eicosanoic acid, tetrahydroabietic acid, monocholestanyl succinate, monocholestanyl glutarate, a compound represented by formula (5-1)

$$C_hF_{2h+1}—C_iH_{2i}—COOH \quad (5\text{-}1)$$

where h is an integer of 1 to 3 and i is an integer of 3 to 18, 1-butanol, 1-pentanol, 1-hexanol, 1-heptanol, 1-octanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol and 1-eicosanol, 1-butanethiol, 1-pentanethiol, 1-hexanethiol, 1-heptanethiol, 1-octanethiol, 1-nonanethiol, 1-decanethiol, 1-undecanethiol, 1-dodecanethiol, 1-tridecanethiol, 1-tetradecanethiol, 1-pentadecanethiol, 1-hexadecanethiol, 1-heptadecanethiol, 1-octadecanethiol, 1-nonadecanethiol, 1-eicosanethiol, butyl isocyanate, octyl isocyanate, dodecyl isocyanate, phenyl isocyanate, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-hexyne, 1-heptyne, 1-octyne, 1-nonyne, 1-decyne, 1-undecyne, 1-dodecyne, 1-tridecyne, 1-tetradecyne, 1-pentadecyne, 1-hexadecyne, 1-heptadecyne, 1-octadecyne, 1-nonadecyne, 1-eicosyne, butyl acrylate, pentyl acrylate, hexyl acrylate, heptyl acrylate, octyl acrylate, nonyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, nonadecyl acrylate, eicosyl acrylate, butyl methacrylate, pentyl methacrylate, hexyl methacrylate, heptyl methacrylate, octyl methacrylate, nonyl methacrylate, decyl methacrylate, undecyl methacrylate, dodecyl methacrylate, tridecyl methacrylate, tetradecyl methacrylate, pentadecyl methacrylate, hexadecyl methacrylate, heptadecyl methacrylate, octadecyl methacrylate, nonadecyl methacrylate, eicosyl methacrylate, 2,2,3,3,3-pentafluoropropyl methacrylate, and 2,2,3,3-tetrafluoropropyl methacrylate.

19. The composition according to claim 1, wherein said compound represented by formula (1) comprises at least one member selected from the group consisting of 4-methylbenzoic acid, 4-ethylbenzoic acid, 4-(n-propyl)benzoic acid, 4-(n-butyl)benzoic acid, 4-(n-pentyl)benzoic acid, 4-(n-hexyl)benzoic acid, 4-(n-heptyl)benzoic acid, 4-(n-octyl)benzoic acid, 4-(n-nonyl)benzoic acid, 4-(n-decyl)benzoic acid, 4-(n-dodecyl)benzoic acid, 4-(n-octadecyl)benzoic acid, 4-(n-methoxy)benzoic acid, 4-(n-ethoxy)benzoic acid, 4-(n-propoxy)benzoic acid, 4-(n-butoxy)benzoic acid, 4-(n-pentyloxy)benzoic acid, 4-(n-hexyloxy)benzoic acid, 4-(n-heptyloxy)benzoic acid, 4-(n-octyloxy)benzoic acid, 4-(n-nonyloxy)benzoic acid, 4-(n-decyloxy)benzoic acid, 4-(n-dodecyloxy)benzoic acid, 4-(n-octadecyloxy)benzoic acid, and a compound represented by one of formulas (5-2) to (5-4):

(5-2)

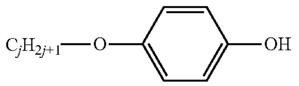

(5-3)

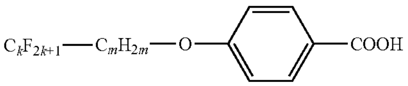

(5-4)

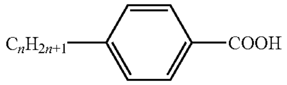

where j is an integer of 5 to 20, k is an integer of 1 to 3, m is an integer of 0 to 18, and n is an integer of 1 to 18.

20. The composition according to claim 1, wherein said compound represented by formula (1) comprises at least one member selected from the group consisting of 4-(n-butyl)cyclohexylcarboxylic acid, 4-(n-pentyl)cyclohexylcarboxylic acid, 4-(n-butyl)bicyclohexylcarboxylic acid and 4-(n-pentyl)bicyclohexylcarboxylic acid.

* * * * *

UNITED STATES PATENT AND TRADEMARK OFFICE

CERTIFICATE OF CORRECTION

PATENT NO. : 8,216,649 B2
APPLICATION NO. : 12/674479
DATED : July 10, 2012
INVENTOR(S) : Toshiyuki Akiike et al.

It is certified that error appears in the above-identified patent and that said Letters Patent is hereby corrected as shown below:

On the title page, Item (86), the PCT information is incorrect. Item (86) should read:

--(86) PCT No.: PCT/JP2008/065228

§ 371 (c)(1),
(2), (4) Date: Sep. 28, 2010--

Signed and Sealed this
Fourth Day of September, 2012

David J. Kappos
*Director of the United States Patent and Trademark Office*